US012488657B2

(12) United States Patent
Moshal

(10) Patent No.: US 12,488,657 B2
(45) Date of Patent: Dec. 2, 2025

(54) SYSTEM FOR PLAYING A NON-GAMBLING GAME AND A METHOD THEREOF

(71) Applicant: Fusion Holdings Limited, Douglas (IM)

(72) Inventor: Martin Paul Moshal, Sydney (AU)

(73) Assignee: Fusion Holdings Limited, Douglas (IM)

( * ) Notice: Subject to any disclaimer, the term of this patent is extended or adjusted under 35 U.S.C. 154(b) by 0 days.

(21) Appl. No.: 19/217,736

(22) Filed: May 23, 2025

(65) Prior Publication Data

US 2025/0285509 A1 Sep. 11, 2025

Related U.S. Application Data

(63) Continuation-in-part of application No. PCT/IB2024/056945, filed on Jul. 18, 2024, which is (Continued)

(51) Int. Cl.
*G07F 17/32* (2006.01)

(52) U.S. Cl.
CPC ...... *G07F 17/3262* (2013.01); *G07F 17/3241* (2013.01)

(58) Field of Classification Search
CPC .......................... G07F 17/3262; G07F 17/3241

(Continued)

(56) References Cited

U.S. PATENT DOCUMENTS

| | | | | |
|---|---|---|---|---|
| 8,771,074 B2 * | 7/2014 | Walker | G07F 17/3255 463/16 |
| 10,217,314 B2 * | 2/2019 | Thomas | G07F 17/3213 |

(Continued)

FOREIGN PATENT DOCUMENTS

| | | |
|---|---|---|
| WO | 2025017505 A1 | 1/2025 |
| WO | 2025078977 A1 | 4/2025 |

OTHER PUBLICATIONS

International Searching Authority; Notification of Transmittal of the International Search Report and the Written Opinion of the International Searching Authority, or the Declaration, PCT International Search Report, and PCT Written Opinion of the International Searching Authority, all for International Application No. PCT/IB2024/056945 with notification of transmittal, mailing date: Sep. 30, 2024.

(Continued)

*Primary Examiner* — Pierre E Elisca
(74) *Attorney, Agent, or Firm* — McDonnell Boehnen Hulbert & Berghoff LLP

(57) ABSTRACT

A method for playing a non-gambling game in a SmartPlay or SlowPlay mode is provided. A block of outcomes includes a game outcome for each round of the game. The game outcomes are determined while playing the game offline, and include a mix of true and non-winning game outcomes. Each true game outcome is either a winning or non-winning game outcome. Each indexed record of the block corresponds to an index identifier from among a first sequential order of index identifiers and includes one true or non-winning game outcome. For each round of the game played out in the selected mode, the game outcome corresponding to the indexed record is read from memory and output for the player. An identifier corresponding to an indexed record with a true outcome can be encrypted to deter hacking. An authorized processor can decrypt the encrypted record identifier for the SmartPlay mode.

20 Claims, 65 Drawing Sheets

Related U.S. Application Data a continuation-in-part of application No. 18/355,591, filed on Jul. 20, 2023.

(58) Field of Classification Search
USPC .......................................................... 463/25
See application file for complete search history.

(56) References Cited

U.S. PATENT DOCUMENTS

| | | | | |
|---|---|---|---|---|
| 10,580,256 | B2 | 3/2020 | Escalante | |
| 10,713,895 | B2 | 7/2020 | Pececnik et al. | |
| 10,953,328 | B1 | 3/2021 | Schuster | |
| 2003/0224852 | A1* | 12/2003 | Walker | G07F 17/3276 463/20 |
| 2004/0127284 | A1* | 7/2004 | Walker | G07F 17/32 463/30 |
| 2006/0148551 | A1* | 7/2006 | Walker | G07F 17/323 463/16 |
| 2006/0247030 | A1 | 11/2006 | Walker et al. | |
| 2006/0287070 | A1 | 12/2006 | Walker et al. | |
| 2007/0202941 | A1 | 8/2007 | Miltenberger et al. | |
| 2007/0259709 | A1 | 11/2007 | Kelly et al. | |
| 2007/0265094 | A1 | 11/2007 | Tone et al. | |
| 2008/0153567 | A1 | 6/2008 | Juds et al. | |
| 2009/0131175 | A1 | 5/2009 | Kelly et al. | |
| 2009/0172035 | A1 | 7/2009 | Lessing et al. | |
| 2009/0270174 | A1 | 10/2009 | Kelly et al. | |
| 2010/0151926 | A1 | 6/2010 | Ruppert et al. | |
| 2011/0151965 | A1 | 6/2011 | Tarantino | |
| 2011/0183745 | A1 | 7/2011 | Gagner et al. | |
| 2011/0269535 | A1 | 11/2011 | Kelly et al. | |
| 2011/0270425 | A1 | 11/2011 | Kelly et al. | |
| 2012/0004747 | A1 | 1/2012 | Kelly et al. | |
| 2012/0058818 | A1 | 3/2012 | Kelly et al. | |
| 2012/0157187 | A1 | 6/2012 | Moshal | |
| 2012/0190441 | A1 | 7/2012 | Crowder, Jr. | |
| 2013/0029761 | A1* | 1/2013 | Walker | G07F 17/3255 463/29 |
| 2013/0079120 | A1* | 3/2013 | Walker | G07F 17/32 463/25 |
| 2013/0079134 | A1* | 3/2013 | Walker | G07F 17/32 463/31 |
| 2013/0079153 | A1 | 3/2013 | Crowder, Jr. et al. | |
| 2013/0225272 | A1 | 8/2013 | Moshal | |
| 2014/0128135 | A1 | 5/2014 | Balise, III | |
| 2014/0179390 | A1 | 6/2014 | Kelly et al. | |
| 2015/0199868 | A1 | 7/2015 | Kelly et al. | |
| 2016/0117882 | A1 | 4/2016 | Walker et al. | |
| 2016/0125521 | A1 | 5/2016 | Randel | |
| 2016/0240040 | A1 | 8/2016 | Gnanasundram et al. | |
| 2017/0301178 | A1* | 10/2017 | Thomas | G07F 17/3211 |
| 2019/0005769 | A1 | 1/2019 | Escalante | |
| 2020/0250930 | A1 | 8/2020 | Escalante | |
| 2020/0286338 | A1 | 9/2020 | Liss | |
| 2022/0036692 | A1 | 2/2022 | Gupta et al. | |
| 2022/0351571 | A1 | 11/2022 | Blackwelder et al. | |
| 2025/0029445 | A1 | 1/2025 | Moshal | |

OTHER PUBLICATIONS

U.S. Appl. No. 19/295,429, filing date: Aug. 8, 2025, Inventor: Martin Paul Moshal.
U.S. Appl. No. 19/295,360, filing date: Aug. 8, 2025, Inventor: Martin Paul Moshal.
Wikipedia, "McDonald's Monopoly", Retrieved from Internet: https://en.wikipedia.org/wiki/McDonald's_Monopoly, Apr. 25, 2025.
Hogan Short, "Chumba Casino Online Free Coins Bonus and Review for Jul. 2025", Retrieved from Internet: https://onefootball.com/en/betting/us/sweepstakes-casinos/chumba-casino, Article Published Mar. 10, 2025.
Chumba Casino, "Play free scratchcards online at Chumba Casino", Retrieved from Internet: https://www.chumbacasino.com/games/scratchcards, Aug. 1, 2018.
International Searching Authority; Notification of transmittal of the international search report and the written opinion of the international searching authority, or the declaration, the international search report, and the written opinion of the international searching authority (PCT Rule 43 bis. 1) for international patent application No. PCT/IB2025/057064; downloaded from the World Intellectual Property Office on Oct. 5, 2025.

* cited by examiner

163

| PLAYER | RAFFFLE TICKET ID. | TICKET COUNT |
|---|---|---|
| 1 | 1000 | 1 |
| 1 | 1001 | 2 |
| 1 | 1002 | 3 |
| 1 | 1003 | 4 |
| 1 | 1015 | 5 |
| 1 | 1016 | 6 |
| 1 | 1017 | 7 |
| 2 | 1011 | 8 |
| 2 | 1012 | 9 |
| 2 | 1013 | 10 |
| 2 | 1014 | 11 |
| 2 | 1024 | 12 |
| 2 | 1025 | 13 |
| 2 | 1026 | 14 |
| 2 | 1027 | 15 |
| 3 | 1018 | 16 |
| 3 | 1019 | 17 |
| 3 | 1020 | 18 |
| 3 | 1021 | 19 |
| 4 | 1004 | 20 |
| 4 | 1005 | 21 |
| 4 | 1006 | 22 |
| 4 | 1007 | 23 |
| 4 | 1008 | 24 |
| 4 | 1009 | 25 |
| 4 | 1010 | 26 |
| 4 | 1022 | 27 |
| 4 | 1023 | 28 |

151 153 155

165

| PLAYER | RAFFFLE TICKET ID. | TICKET COUNT |
|---|---|---|
| 2 | 1011 | 1 |
| 2 | 1012 | 2 |
| 2 | 1013 | 3 |
| 2 | 1014 | 4 |
| 2 | 1024 | 5 |
| 2 | 1025 | 6 |
| 2 | 1026 | 7 |
| 2 | 1027 | 8 |
| 4 | 1004 | 9 |
| 4 | 1005 | 10 |
| 4 | 1006 | 11 |
| 4 | 1007 | 12 |
| 4 | 1008 | 13 |
| 4 | 1009 | 14 |
| 4 | 1010 | 15 |
| 4 | 1022 | 16 |
| 4 | 1023 | 17 |

151 153 155

FIG. 8

226 228 230

| OUTCOME DESCRIPTION | PAYOUT | PROBABILITY |
|---|---|---|
| NON-WINNING COMBINATION | 0 | 80.480% |
| CHERRY / ANY / ANY | 2 | 6.386% |
| ANY / ANY / CHERRY | 2 | 6.386% |
| CHERRY / CHERRY / ANY | 5 | 1.878% |
| ANY / CHERRY / CHERRY | 5 | 1.878% |
| CHERRY / ANY / CHERRY | 5 | 0.639% |
| CHERRY / CHERRY / CHERRY | 20 | 0.188% |
| BAR / LEMON / LEMON | 14 | 0.394% |
| LEMON / LEMON / BAR | 14 | 0.056% |
| LEMON / LEMON / LEMON | 20 | 0.394% |
| BAR / PLUM / PLUM | 10 | 0.188% |
| PLUM / PLUM / BAR | 10 | 0.047% |
| PLUM / PLUM / PLUM | 20 | 0.470% |
| BAR / BELL / BELL | 18 | 0.038% |
| BELL / BELL / BAR | 18 | 0.188% |
| BELL / BELL / BELL | 20 | 0.188% |
| BAR / BAR / BAR | 50 | 0.188% |
| 7 / 7 / 7 | 100 | 0.009% |
| | TOTAL | 100% |

224

FIG. 14

226 228 230

| OUTCOME DESCRIPTION | PAYOUT | PROBABILITY |
|---|---|---|
| NON-WINNING COMBINATION | 0 | 80.480% |
| CHERRY / ANY / ANY | 2 RAFFLE TICKETS | 6.386% |
| ANY / ANY / CHERRY | 2 RAFFLE TICKETS | 6.386% |
| CHERRY / CHERRY / ANY | 5 RAFFLE TICKETS | 1.878% |
| ANY / CHERRY / CHERRY | 5 RAFFLE TICKETS | 1.878% |
| CHERRY / ANY / CHERRY | 5 RAFFLE TICKETS | 0.639% |
| CHERRY / CHERRY / CHERRY | 20 RAFFLE TICKETS | 0.188% |
| BAR / LEMON / LEMON | 14 RAFFLE TICKETS | 0.394% |
| LEMON / LEMON / BAR | 14 RAFFLE TICKETS | 0.056% |
| LEMON / LEMON / LEMON | 20 RAFFLE TICKETS | 0.394% |
| BAR / PLUM / PLUM | 10 RAFFLE TICKETS | 0.188% |
| PLUM / PLUM / BAR | 10 RAFFLE TICKETS | 0.047% |
| PLUM / PLUM / PLUM | 20 RAFFLE TICKETS | 0.470% |
| BAR / BELL / BELL | 18 RAFFLE TICKETS | 0.038% |
| BELL / BELL / BAR | 18 RAFFLE TICKETS | 0.188% |
| BELL / BELL / BELL | 20 RAFFLE TICKETS | 0.188% |
| BAR / BAR / BAR | 50 RAFFLE TICKETS | 0.188% |
| 7 / 7 / 7 | 100 RAFFLE TICKETS | 0.009% |
| | TOTAL | 100% |

232

FIG. 15

226 228 230

| OUTCOME DESCRIPTION | PAYOUT | PROBABILITY |
|---|---|---|
| NON-WINNING COMBINATION | 0 | 80.480% |
| CHERRY / ANY / ANY | 20 RAFFLE TICKETS | 6.386% |
| ANY / ANY / CHERRY | 20 RAFFLE TICKETS | 6.386% |
| CHERRY / CHERRY / ANY | 50 RAFFLE TICKETS | 1.878% |
| ANY / CHERRY / CHERRY | 50 RAFFLE TICKETS | 1.878% |
| CHERRY / ANY / CHERRY | 50 RAFFLE TICKETS | 0.639% |
| CHERRY / CHERRY / CHERRY | 200 RAFFLE TICKETS | 0.188% |
| BAR / LEMON / LEMON | 140 RAFFLE TICKETS | 0.394% |
| LEMON / LEMON / BAR | 140 RAFFLE TICKETS | 0.056% |
| LEMON / LEMON / LEMON | 200 RAFFLE TICKETS | 0.394% |
| BAR / PLUM / PLUM | 100 RAFFLE TICKETS | 0.188% |
| PLUM / PLUM / BAR | 100 RAFFLE TICKETS | 0.047% |
| PLUM / PLUM / PLUM | 200 RAFFLE TICKETS | 0.470% |
| BAR / BELL / BELL | 180 RAFFLE TICKETS | 0.038% |
| BELL / BELL / BAR | 180 RAFFLE TICKETS | 0.188% |
| BELL / BELL / BELL | 200 RAFFLE TICKETS | 0.188% |
| BAR / BAR / BAR | 500 RAFFLE TICKETS | 0.188% |
| 7 / 7 / 7 | $10.00 | 0.009% |
| | TOTAL | 100% |

234

FIG. 16

226 228 230

| OUTCOME DESCRIPTION | PAYOUT | PROBABILITY |
|---|---|---|
| NON-WINNING COMBINATION | 0 | 80.480% |
| CHERRY / ANY / ANY | 40 RAFFLE TICKETS | 6.386% |
| ANY / ANY / CHERRY | 40 RAFFLE TICKETS | 6.386% |
| CHERRY / CHERRY / ANY | 100 RAFFLE TICKETS | 1.878% |
| ANY / CHERRY / CHERRY | 100 RAFFLE TICKETS | 1.878% |
| CHERRY / ANY / CHERRY | 100 RAFFLE TICKETS | 0.639% |
| CHERRY / CHERRY / CHERRY | 400 RAFFLE TICKETS | 0.188% |
| BAR / LEMON / LEMON | 280 RAFFLE TICKETS | 0.394% |
| LEMON / LEMON / BAR | 280 RAFFLE TICKETS | 0.056% |
| LEMON / LEMON / LEMON | 400 RAFFLE TICKETS | 0.394% |
| BAR / PLUM / PLUM | 200 RAFFLE TICKETS | 0.188% |
| PLUM / PLUM / BAR | 200 RAFFLE TICKETS | 0.047% |
| PLUM / PLUM / PLUM | 400 RAFFLE TICKETS | 0.470% |
| BAR / BELL / BELL | 360 RAFFLE TICKETS | 0.038% |
| BELL / BELL / BAR | 360 RAFFLE TICKETS | 0.188% |
| BELL / BELL / BELL | 400 RAFFLE TICKETS | 0.188% |
| BAR / BAR / BAR | $10.00 | 0.188% |
| 7 / 7 / 7 | $20.00 | 0.009% |
| | TOTAL | 100% |

236

FIG. 17

226 228 230

| OUTCOME DESCRIPTION | PAYOUT | PROBABILITY |
|---|---|---|
| NON-WINNING COMBINATION | 0 | 80.480% |
| CHERRY / ANY / ANY | 60 RAFFLE TICKETS | 6.386% |
| ANY / ANY / CHERRY | 60 RAFFLE TICKETS | 6.386% |
| CHERRY / CHERRY / ANY | 150 RAFFLE TICKETS | 1.878% |
| ANY / CHERRY / CHERRY | 150 RAFFLE TICKETS | 1.878% |
| CHERRY / ANY / CHERRY | 150 RAFFLE TICKETS | 0.639% |
| CHERRY / CHERRY / CHERRY | 600 RAFFLE TICKETS | 0.188% |
| BAR / LEMON / LEMON | 420 RAFFLE TICKETS | 0.394% |
| LEMON / LEMON / BAR | 420 RAFFLE TICKETS | 0.056% |
| LEMON / LEMON / LEMON | 600 RAFFLE TICKETS | 0.394% |
| BAR / PLUM / PLUM | 300 RAFFLE TICKETS | 0.188% |
| PLUM / PLUM / BAR | 300 RAFFLE TICKETS | 0.047% |
| PLUM / PLUM / PLUM | 600 RAFFLE TICKETS | 0.470% |
| BAR / BELL / BELL | 540 RAFFLE TICKETS | 0.038% |
| BELL / BELL / BAR | 540 RAFFLE TICKETS | 0.188% |
| BELL / BELL / BELL | $1.00 | 0.188% |
| BAR / BAR / BAR | $10.00 | 0.188% |
| 7 / 7 / 7 | $50.00 | 0.009% |
| | TOTAL | 100% |

238

FIG. 18

226 228 230

| OUTCOME DESCRIPTION | PAYOUT | PROBABILITY |
|---|---|---|
| NON-WINNING COMBINATION | 0 | 80.480% |
| CHERRY / ANY / ANY | 80 RAFFLE TICKETS | 6.386% |
| ANY / ANY / CHERRY | 80 RAFFLE TICKETS | 6.386% |
| CHERRY / CHERRY / ANY | 200 RAFFLE TICKETS | 1.878% |
| ANY / CHERRY / CHERRY | 200 RAFFLE TICKETS | 1.878% |
| CHERRY / ANY / CHERRY | 200 RAFFLE TICKETS | 0.639% |
| CHERRY / CHERRY / CHERRY | 800 RAFFLE TICKETS | 0.188% |
| BAR / LEMON / LEMON | 560 RAFFLE TICKETS | 0.394% |
| LEMON / LEMON / BAR | 560 RAFFLE TICKETS | 0.056% |
| LEMON / LEMON / LEMON | 800 RAFFLE TICKETS | 0.394% |
| BAR / PLUM / PLUM | 400 RAFFLE TICKETS | 0.188% |
| PLUM / PLUM / BAR | 400 RAFFLE TICKETS | 0.047% |
| PLUM / PLUM / PLUM | 800 RAFFLE TICKETS | 0.470% |
| BAR / BELL / BELL | $1.00 | 0.038% |
| BELL / BELL / BAR | $5.00 | 0.188% |
| BELL / BELL / BELL | $5.00 | 0.188% |
| BAR / BAR / BAR | $15.00 | 0.188% |
| 7 / 7 / 7 | $60.00 | 0.009% |
|  | TOTAL | 100% |

240

FIG. 19

| | | | | | | | |
|---|---|---|---|---|---|---|---|
| 1 | W1 | 26 | LOSE | 51 | LOSE | 76 | LOSE |
| 2 | W2 | 27 | LOSE | 52 | LOSE | 77 | LOSE |
| 3 | W2 | 28 | LOSE | 53 | LOSE | 78 | LOSE |
| 4 | W3 | 29 | LOSE | 54 | LOSE | 79 | LOSE |
| 5 | W3 | 30 | LOSE | 55 | LOSE | 80 | LOSE |
| 6 | W4 | 31 | LOSE | 56 | LOSE | 81 | LOSE |
| 7 | W4 | 32 | LOSE | 57 | LOSE | 82 | LOSE |
| 8 | W4 | 33 | LOSE | 58 | LOSE | 83 | LOSE |
| 9 | W5 | 34 | LOSE | 59 | LOSE | 84 | LOSE |
| 10 | W5 | 35 | LOSE | 60 | LOSE | 85 | LOSE |
| 11 | W5 | 36 | LOSE | 61 | LOSE | 86 | LOSE |
| 12 | LOSE | 37 | LOSE | 62 | LOSE | 87 | LOSE |
| 13 | LOSE | 38 | LOSE | 63 | LOSE | 88 | LOSE |
| 14 | LOSE | 39 | LOSE | 64 | LOSE | 89 | LOSE |
| 15 | LOSE | 40 | LOSE | 65 | LOSE | 90 | LOSE |
| 16 | LOSE | 41 | LOSE | 66 | LOSE | 91 | LOSE |
| 17 | LOSE | 42 | LOSE | 67 | LOSE | 92 | LOSE |
| 18 | LOSE | 43 | LOSE | 68 | LOSE | 93 | LOSE |
| 19 | LOSE | 44 | LOSE | 69 | LOSE | 94 | LOSE |
| 20 | LOSE | 45 | LOSE | 70 | LOSE | 95 | LOSE |
| 21 | LOSE | 46 | LOSE | 71 | LOSE | 96 | LOSE |
| 22 | LOSE | 47 | LOSE | 72 | LOSE | 97 | LOSE |
| 23 | LOSE | 48 | LOSE | 73 | LOSE | 98 | LOSE |
| 24 | LOSE | 49 | LOSE | 74 | LOSE | 99 | LOSE |
| 25 | LOSE | 50 | LOSE | 75 | LOSE | 100 | LOSE |

440

FIG. 47

506 507 508 509

| WIN / LOSS | SYMBOL COMBINATIONS | PAYOUT | PROBABILITY |
|---|---|---|---|
| LOSE | NON-WINNING COMBINATION | 0 | 89% |
| W5 | CHERRY / CHERRY / CHERRY | $2.00 | 3% |
| W4 | LEMON / LEMON / LEMON | $2.00 | 3% |
| W3 | PLUM / PLUM / PLUM | $5.00 | 2% |
| W2 | BAR / BAR / BAR | $5.00 | 2% |
| W1 | 7 / 7 / 7 | $10.00 | 1% |
| | | TOTAL | 100% |

505

FIG. 48

| R1 to R25 | R26 to R50 | R51 to R75 | R76 to R100 |
|---|---|---|---|
| 48 | 9 | 18 | 92 |
| 80 | 23 | 30 | 3 |
| 98 | 48 | 96 | 56 |
| 84 | 63 | 12 | 79 |
| 46 | 81 | 19 | 70 |
| 99 | 56 | 68 | 77 |
| 2 | 42 | 88 | 31 |
| 64 | 26 | 64 | 21 |
| 84 | 93 | 33 | 32 |
| 57 | 5 | 40 | 6 |
| 73 | 59 | 96 | 94 |
| 45 | 16 | 7 | 29 |
| 86 | 54 | 14 | 41 |
| 29 | 29 | 11 | 19 |
| 96 | 14 | 3 | 50 |
| 81 | 59 | 15 | 34 |
| 48 | 98 | 17 | 38 |
| 100 | 99 | 81 | 79 |
| 16 | 67 | 50 | 62 |
| 26 | 91 | 37 | 93 |
| 36 | 17 | 93 | 95 |
| 49 | 61 | 97 | 30 |
| 34 | 22 | 28 | 64 |
| 52 | 58 | 24 | 78 |
| 61 | 3 | 43 | 96 |

515

FIG. 49

| R1 to R25 | R26 to R50 | R51 to R75 | R76 to R100 |
|---|---|---|---|
| 86 | 69 | 60 | 15 |
| 49 | 6 | 61 | 33 |
| 71 | 32 | 73 | 12 |
| 79 | 9 | 15 | 60 |
| 20 | 78 | 58 | 3 |
| 54 | 11 | 39 | 66 |
| 1 | 79 | 2 | 27 |
| 46 | 10 | 91 | 48 |
| 46 | 98 | 60 | 38 |
| 29 | 40 | 80 | 19 |
| 80 | 32 | 44 | 51 |
| 49 | 95 | 16 | 83 |
| 52 | 13 | 47 | 57 |
| 47 | 73 | 80 | 13 |
| 89 | 94 | 97 | 47 |
| 40 | 8 | 2 | 64 |
| 49 | 96 | 16 | 80 |
| 28 | 38 | 28 | 77 |
| 72 | 60 | 88 | 6 |
| 71 | 34 | 3 | 97 |
| 29 | 36 | 25 | 71 |
| 88 | 47 | 6 | 28 |
| 75 | 48 | 18 | 100 |
| 100 | 69 | 27 | 83 |
| 6 | 22 | 35 | 3 |

516

FIG. 50

| R1 to R25 | R26 to R50 | R51 to R75 | R76 to R100 |
|---|---|---|---|
| 34 | 41 | 95 | 26 |
| 49 | 74 | 74 | 43 |
| 71 | 81 | 50 | 44 |
| 33 | 81 | 77 | 74 |
| 79 | 85 | 77 | 61 |
| 91 | 48 | 54 | 33 |
| 61 | 53 | 48 | 76 |
| 27 | 53 | 21 | 25 |
| 91 | 20 | 82 | 56 |
| 67 | 47 | 32 | 25 |
| 16 | 62 | 69 | 78 |
| 90 | 97 | 37 | 66 |
| 28 | 59 | 91 | 97 |
| 99 | 22 | 16 | 77 |
| 62 | 62 | 25 | 74 |
| 98 | 66 | 24 | 22 |
| 12 | 30 | 19 | 79 |
| 94 | 70 | 13 | 45 |
| 29 | 79 | 13 | 51 |
| 51 | 24 | 97 | 66 |
| 50 | 22 | 77 | 54 |
| 66 | 85 | 61 | 12 |
| 96 | 90 | 86 | 56 |
| 16 | 83 | 33 | 57 |
| 25 | 78 | 29 | 23 |

517

FIG. 51

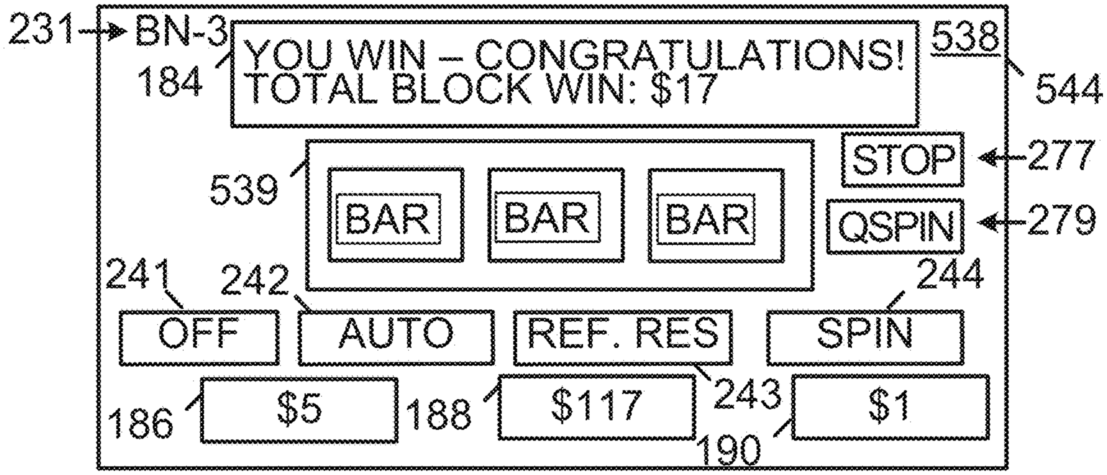
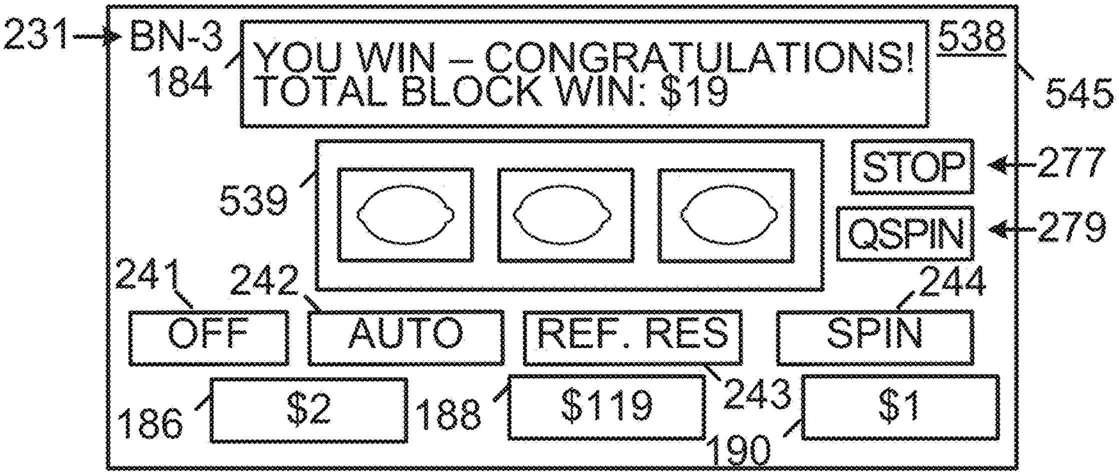
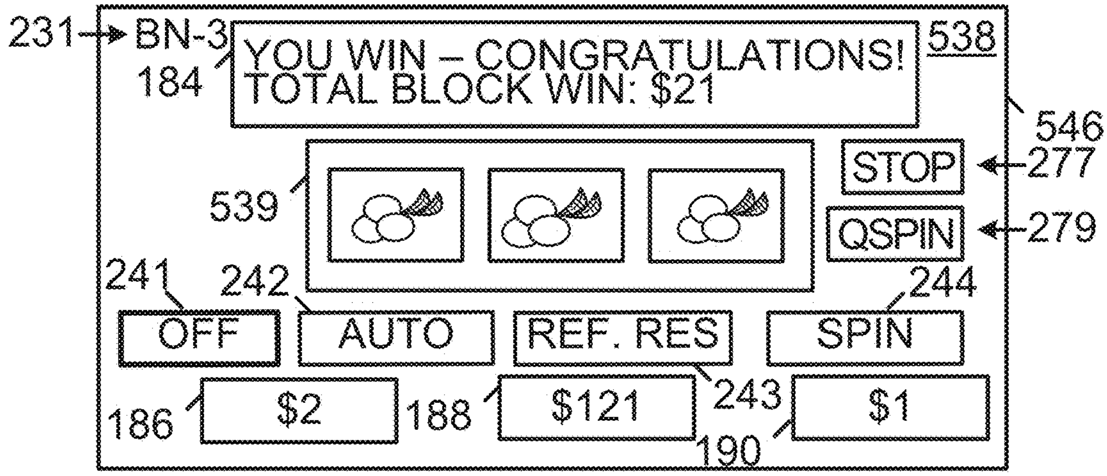
FIG. 52B

SYSTEM FOR PLAYING A NON-GAMBLING GAME AND A METHOD THEREOF

CROSS REFERENCE TO RELATED APPLICATION

This application is a continuation-in-part of International Patent Application No. PCT/IB2024/056945, entitled Apparatus and Method for a Non-gambling Game and filed on Jul. 18, 2024. International Patent Application No. PCT/IB2024/056945 claims priority to and is a continuation-in-part of U.S. patent application Ser. No. 18/355,591, entitled Apparatus and Method for a Non-gambling Game and filed on Jul. 20, 2023.

International Patent Application No. PCT/IB2024/056945 published on Jan. 23, 2025 as International Publication No. WO 2025/017505 A1. U.S. patent application Ser. No. 18/355,591 published on Jan. 23, 2025 as United States Patent Application Publication No. US 2025/0029445 A1.

International Patent Application No. PCT/IB2024/056945, U.S. patent application Ser. No. 18/355,591, International Publication No. WO 2025/017505 A1, and United States Patent Application Publication No US 2025/0029445 A1 are incorporated herein by reference.

FIELD

This disclosure relates to systems for providing a game that allows a participant to play at no cost, whenever and for as long as the participant wishes to play.

BACKGROUND

As used in this disclosure, the activity of placing a wager requires an individual player to place something of value, such as money, at risk. Further, as used in this disclosure, gambling requires the player to make a wager with the expectation that a random or unknown event will result in a return of value to the player that is larger than the wager. When an individual participates in a game of chance without any wager, even though the individual may predict (that is, "bet" on) a particular outcome in the game, such activity does not amount to gambling.

An example of a non-gambling game may be found in the so-called "sweepstakes casinos." In a sweepstakes casino, players cannot directly use cash to place a wager (that is, gamble) on games offered by the casino. Players can, instead, acquire so-called "gold coins" to play games offered by the casino. Gold coins are, in effect, a type of a virtual currency that has no redeemable value.

Gold coins are associated with "Sweeps Coins," which can also be used to play games offered by the casino. In contrast to Gold Coins, however, Sweeps Coins can be redeemed for cash awards or other prizes of value.

Players may obtain Sweeps Coins in a variety of different ways: For example, a player may:

- Purchase gold coins and be given a proportional number of sweeps coins as a purchase bonus;
- Be given sweeps coins as a sign-on bonus for signing up and creating an account with the casino;
- Enter a contest and, if she or he wins the contest, receive sweeps coins without further charge; or
- Log in to a particular Sweepstakes Casino website repeatedly and thereby receive Sweeps Coins from the casinos as a loyalty bonus.

Further, in some cases (particularly if all other methods of obtaining Sweeps Coins require an individual to make purchase or spend money), the individual may also obtain Sweeps Coins simply by mailing to the Sweeps Casino a request for the coins. This last option is referred to as an Alternative Means of Entry ("AMOE").

AMOEs are commonly offered to ensure that there is no requirement for consideration to play the game, particularly in jurisdictions where only free-play games are allowed. Players who obtain Sweeps Coins via an AMOE typically have the same opportunity to win the same prizes or other awards as those who pay to play the game and are allowed to play as many times as those who pay to play the game.

Free play can be effected on an electronic gaming machine by, for example, simply giving virtual tokens to a player without charge. The provider of a game without a wagering requirement—essentially a free game—may offer the game as a gift to players, subsidizing the game platform from its savings or from the proceeds of other businesses. A provider may show advertisements to those playing the free games and obtain revenue from the entities whose advertisements are presented to the players. Revenue from such advertisement undertaking may be limited and cause the game provider to incur the costs of operating an advertising business.

Despite advances in the computing field, there is a continuing need to improve a process for a computing system to provide non-gambling games to players.

Overview

The present application discloses embodiments related to systems, methods, and apparatus that provide non-gambling games to players.

In a first aspect, a computing system receives individual registration data and thereafter initiates a game without any requirement of payment for a wager. The computing system provides a first mode of game operation upon detecting registration data corresponding to a base tier and provides an enhanced mode of game operation upon detecting registration data corresponding to a premium tier. The premium tier can be associated with a membership.

In a second aspect, a computing system having at least one processor and a computer-readable memory is provided. The memory has stored thereon program instructions that, if executed by the processor(s), effects a non-gambling game. Again, the game has a first mode of game operation upon detecting registration data corresponding to a base tier and provides an enhanced mode of game operation upon detecting registration data corresponding to a premium tier. The premium tier can be associated with a membership.

In a third aspect, a computing system having at least a processor and a computer-readable memory is provided. The memory has stored thereon program instructions that, when executed by the processor, cause the computing system to perform operations. The operations include launching an application to play a non-gambling game. The operations also include determining whether a playout mode of the non-gambling game is a manual mode or an automatic mode. The operations further include receiving a quantity of results of a block of results. The block of results includes multiple results for the non-gambling game. Furthermore, the operations include outputting, on a display, a representation of one or more results of the block. If the playout mode is the manual mode, then outputting the representation includes displaying a respective animation for the one or more results of the block. If the playout mode is the automatic mode, then outputting the representation includes displaying an award amount based on all results of the block without displaying an animation for every individual result of the block.

In a fourth aspect, a first computing system having at least a processor and a computer-readable memory is provided. The memory has stored thereon program instructions that, when executed by the processor, cause the first computing system to perform operations. The operations included receiving, at the first computing system from a second computing system, a first input regarding playing a non-gambling game. The operations also include generating, at the first computing system, a first block of results. The first block of results includes multiple results of the non-gambling game. Additionally, the method includes determining, at the first computing system, whether a playout mode of the non-gambling game is a manual mode or an automatic mode. Furthermore, the method includes outputting, via the first computing system to the second computing system, data for displaying a representation of one or more results of the first block at the second computing system. If the playout mode is the manual mode, then outputting the representation includes displaying a respective animation for each result of the one or more results of the first block. If the playout mode is the automatic mode, then outputting the representation includes displaying an award amount based on all results of the first block without displaying an animation for every individual result of the first block.

In a fifth aspect, a method is provided. The method includes determining, at a processor, a first input to the processor includes a request for the processor to output outcomes of a game to a display device during a first time period according to a first mode. Each outcome of the game corresponds to a respective round of the game. The method also includes determining, at the processor, a first block of outcomes to use during the first time period. The first block includes indexed records for multiple outcomes of the game determined while playing the game offline. The multiple outcomes of the first block include a mix of true and non-winning game outcomes. Each true game outcome of the first block is either a winning or non-winning game outcome. Each indexed record of the first block corresponds to a respective index identifier from among a first sequential order of index identifiers and includes one true or non-winning game outcome of the first block. The method also includes, for each round of the game output during the first time period, the processor reading a respective indexed record. The respective indexed record read for each round of the game is based on an index identifier corresponding to the respective indexed record. The method further includes, for each round of the game output during the first time period, the processor outputting, to the display device, the outcome of the game corresponding to the respective indexed record.

In a sixth aspect, a computing system is provided. The computing system includes a processor; and a non-transitory computer-readable memory having stored thereon program instructions that, when executed by the processor, cause the computing system to perform functions. The functions include determining, at the processor, a first input to the processor includes a request for the processor to output outcomes of a game to a display device during a first time period according to a first mode. Each outcome of the game corresponds to a respective round of the game. The functions also include determining, at the processor, a first block of outcomes to use during the first time period. The first block includes indexed records for multiple outcomes of the game determined while playing the game offline. The multiple outcomes of the first block include a mix of true and non-winning game outcomes. Each true game outcome of the first block is either a winning or non-winning game outcome. Each indexed record of the first block corresponds to a respective index identifier from among a first sequential order of index identifiers and includes one true or non-winning game outcome of the first block. The functions also include, for each round of the game output during the first time period, the processor reading a respective indexed record. The respective indexed record read for each round of the game is based on an index identifier corresponding to the respective indexed record. The functions also include, for each round of the game output during the first time period, the processor outputting, to the display device, the outcome of the game corresponding to the respective indexed record.

In a seventh aspect, a non-transitory computer-readable memory is provided. The memory having stored therein instructions executable by a processor to cause a computing system to perform functions. The functions include determining, at the processor, a first input to the processor includes a request for the processor to output outcomes of a game to a display device during a first time period according to a first mode. Each outcome of the game corresponds to a respective round of the game. The functions also include determining, at the processor, a first block of outcomes to use during the first time period. The first block includes indexed records for multiple outcomes of the game determined while playing the game offline. The multiple outcomes of the first block include a mix of true and non-winning game outcomes. Each true game outcome of the first block is either a winning or non-winning game outcome. Each indexed record of the first block corresponds to a respective index identifier from among a first sequential order of index identifiers and includes one true or non-winning game outcome of the first block. The functions also include, for each round of the game output during the first time period, the processor reading a respective indexed record. The respective indexed record read for each round of the game is based on an index identifier corresponding to the respective indexed record. The functions also include, for each round of the game output during the first time period, the processor outputting, to the display device, the outcome of the game corresponding to the respective indexed record.

In an eighth aspect, a method is provided. The method includes determining, at a processor, a first input to the processor includes a request for the processor to output outcomes of a game to a display device during a first time period according to a first mode. Each outcome of the game corresponds to a respective round of the game. The method also includes determining, at the processor, one or more blocks of outcomes to use during the first time period. Each block of outcomes includes indexed records for multiple outcomes of the game determined while playing the game offline. The multiple outcomes of each block include a mix of true and non-winning game outcomes. Each true game outcome is either a winning or non-winning game outcome. Each indexed record of each block corresponds to a respective index identifier from among sequential orders of index identifiers and includes one true or non-winning game outcome. Each block further includes encrypted data representing the respective index identifier corresponding to each indexed record of the block that includes a true game outcome. The method also includes, for each round of the game performed during the first time period, the processor: decrypting the encrypted data within a single block of the one or more blocks to determine a respective index identifier corresponding to at least one indexed record that includes a true game outcome, reading the at least one indexed record that includes the true game outcome; and outputting, to the display device, the true game outcome corresponding to the at least one indexed record read by the processor.

In a ninth aspect, a computing system is provided. The computing system includes a processor; and a non-transitory computer-readable memory having stored thereon program instructions that, when executed by the processor, cause the computing system to perform functions. The functions include determining, at a processor, a first input to the processor includes a request for the processor to output outcomes of a game to a display device during a first time period according to a first mode. Each outcome of the game corresponds to a respective round of the game. The functions also include determining, at the processor, one or more blocks of outcomes to use during the first time period. Each block of outcomes includes indexed records for multiple outcomes of the game determined while playing the game offline. The multiple outcomes of each block include a mix of true and non-winning game outcomes. Each true game outcome is either a winning or non-winning game outcome. Each indexed record of each block corresponds to a respective index identifier from among sequential orders of index identifiers and includes one true or non-winning game outcome. Each block further includes encrypted data representing the respective index identifier corresponding to each indexed record of the block that includes a true game outcome. The method also includes, for each round of the game performed during the first time period, the processor: decrypting the encrypted data within a single block of the one or more blocks to determine a respective index identifier corresponding to at least one indexed record that includes a true game outcome, reading the at least one indexed record that includes the true game outcome; and outputting, to the display device, the true game outcome corresponding to the at least one indexed record read by the processor.

In a tenth aspect, a non-transitory computer-readable memory is provided. The memory having stored therein instructions executable by a processor to cause a computing system to perform functions. The functions include determining, at the processor, a first input to the processor includes a request for the processor to output outcomes of a game to a display device during a first time period according to a first mode. Each outcome of the game corresponds to a respective round of the game. The functions also include determining, at the processor, one or more blocks of outcomes to use during the first time period. Each block of outcomes includes indexed records for multiple outcomes of the game determined while playing the game offline. The multiple outcomes of each block include a mix of true and non-winning game outcomes. Each true game outcome is either a winning or non-winning game outcome. Each indexed record of each block corresponds to a respective index identifier from among sequential orders of index identifiers and includes one true or non-winning game outcome. Each block further includes encrypted data representing the respective index identifier corresponding to each indexed record of the block that includes a true game outcome. The functions also include, for each round of the game performed during the first time period, the processor: decrypting the encrypted data within a single block of the one or more blocks to determine a respective index identifier corresponding to at least one indexed record that includes a true game outcome, reading the at least one indexed record that includes the true game outcome; and outputting, to the display device, the true game outcome corresponding to the at least one indexed record read by the processor.

In an eleventh aspect, a method is provided. The method includes determining a unique block identifier corresponding to a block of outcomes being generated for a game associated with a specific game identifier. The method also includes determining a block size corresponding to the block of outcomes. The block size indicates a quantity of indexed records to be contained in the block of outcomes. The method further includes determining, randomly, a set of one or more true outcome records to be contained in the block of outcomes. The method also includes encrypting an identifier of each of the one or more true outcome records to generate an encrypted identifier corresponding to each of the one or more true outcome records. The method further includes playing the game offline to generate a set of non-winning outcomes for a set of non-winning outcome records to be contained in the block of outcomes. The set of non-winning outcomes includes a respective non-winning outcome identifier for each indexed record of the set of non-winning outcome records. The method further includes playing the game offline to generate a set of true outcomes. The set of true outcomes includes a winning or non-winning outcome identifier for each of the one or more true outcome records. Finally, the method includes writing data into a non-transitory computer-readable memory to populate at least a portion of the block of outcomes. The data includes: the unique block identifier, the specific game identifier, the block size, the encrypted identifier corresponding to each of the one or more true outcome records, the set of non-winning outcome identifiers, and the set of true outcome identifiers.

In a twelfth aspect, a computing system is provided. The computing system includes a processor; and a non-transitory computer-readable memory having stored thereon program instructions that, when executed by the processor, cause the computing system to perform functions. The functions include determining a unique block identifier corresponding to a block of outcomes being generated for a game associated with a specific game identifier. The functions also include determining a block size corresponding to the block of outcomes. The block size indicates a quantity of indexed records to be contained in the block of outcomes. The functions further include determining, randomly, a set of one or more true outcome records to be contained in the block of outcomes. The functions also include encrypting an identifier of each of the one or more true outcome records to generate an encrypted identifier corresponding to each of the one or more true outcome records. The functions further include playing the game offline to generate a set of non-winning outcomes for a set of non-winning outcome records to be contained in the block of outcomes. The set of non-winning outcomes includes a respective non-winning outcome identifier for each indexed record of the set of non-winning outcome records. The functions also include playing the game offline to generate a set of true outcomes. The set of true outcomes includes a winning or non-winning outcome identifier for each of the one or more true outcome records. Finally, the functions include writing data into a non-transitory computer-readable memory to populate at least a portion of the block of outcomes. The data includes: the unique block identifier, the specific game identifier, the block size, the encrypted identifier corresponding to each of the one or more true outcome records, the set of non-winning outcome identifiers, and the set of true outcome identifiers.

In a thirteenth aspect, a non-transitory computer-readable memory is provided. The memory having stored therein instructions executable by a processor to cause a computing system to perform functions. The functions include determining a unique block identifier corresponding to a block of outcomes being generated for a game associated with a specific game identifier. The functions also include determining a block size corresponding to the block of outcomes, the block size indicating a quantity of indexed records to be contained in the block of outcomes. The functions further include determining, randomly, a set of one or more true outcome records to be contained in the block of outcomes. The functions also include encrypting an identifier of each of the one or more true outcome records to generate an encrypted identifier corresponding to each of the one or more true outcome records. The functions further include playing the game offline to generate a set of non-winning outcomes for a set of non-winning outcome records to be contained in the block of outcomes. The set of non-winning outcomes includes a respective non-winning outcome identifier for each indexed record of the set of non-winning outcome records. The functions also include playing the game offline to generate a set of true outcomes. The set of true outcomes includes a winning or non-winning outcome identifier for each of the one or more true outcome records. Finally, the functions include writing data into a non-transitory computer-readable memory to populate at least a portion of the block of outcomes. The data includes: the unique block identifier, the specific game identifier, the block size, the encrypted identifier corresponding to each of the one or more true outcome records, the set of non-winning outcome identifiers, and the set of true outcome identifiers.

These aspects, as well as other embodiments, aspects, advantages, and alternatives will become apparent to those of ordinary skill in the art by reading the following detailed description, with reference where appropriate to the accompanying drawings. Further, this overview and other descriptions and figures provided in this disclosure are intended to illustrate embodiments using examples only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE FIGURES

The above, as well as additional, features will be better understood through the following illustrative and non-limiting detailed description of example embodiments, with reference to the appended drawings.

FIG. 8 shows raffle ticket data, in accordance with example embodiments.

FIG. 14 and FIG. 15 show pay tables, in accordance with example embodiments.

FIG. 16 shows a Bronze, Premium Tier pay table, in accordance with example embodiments.

FIG. 17 shows a Silver, Premium Tier pay table, in accordance with example embodiments.

FIG. 18 shows a Gold, Premium Tier pay table, in accordance with example embodiments.

FIG. 19 shows a Black, Premium Tier pay table, in accordance with example embodiments.

FIG. 47, FIG. 48, FIG. 49, FIG. 50, and FIG. 51 show tables containing data, in accordance with the example embodiments.

FIG. 52A, FIG. 52B, FIG. 52C, FIG. 53A, FIG. 53B, and FIG. 53C show views of a GUI, in accordance with example embodiments.

All the figures are schematic, not necessarily to scale, and generally only show parts which are necessary to explain example embodiments, wherein other parts can be omitted or merely suggested.

DETAILED DESCRIPTION

I. Introduction

Aspects of the embodiments described in this disclosure can be suitable for use in the context of playing games (e.g., non-gambling games) over a computer network. As will be appreciated from the following discussion, these aspects can be suitable for use in other environments, including land or ship-based casinos, as well as other types of wagering environments.

Figure 1:
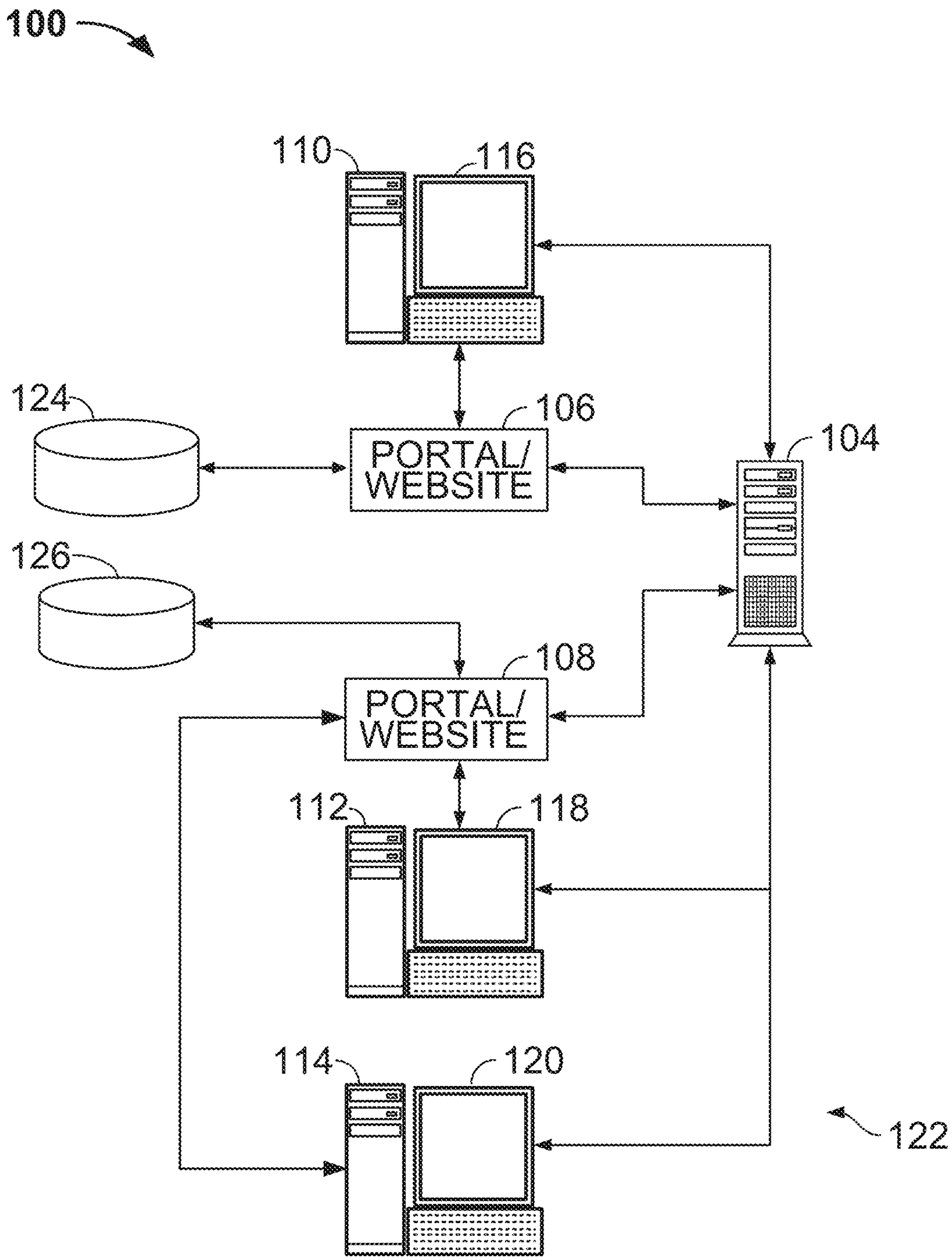
FIG. 1 is an illustration of a gaming environment in which workstations communicate with a gaming sever over a computer network, in accordance with example embodiments.
Figure 2:
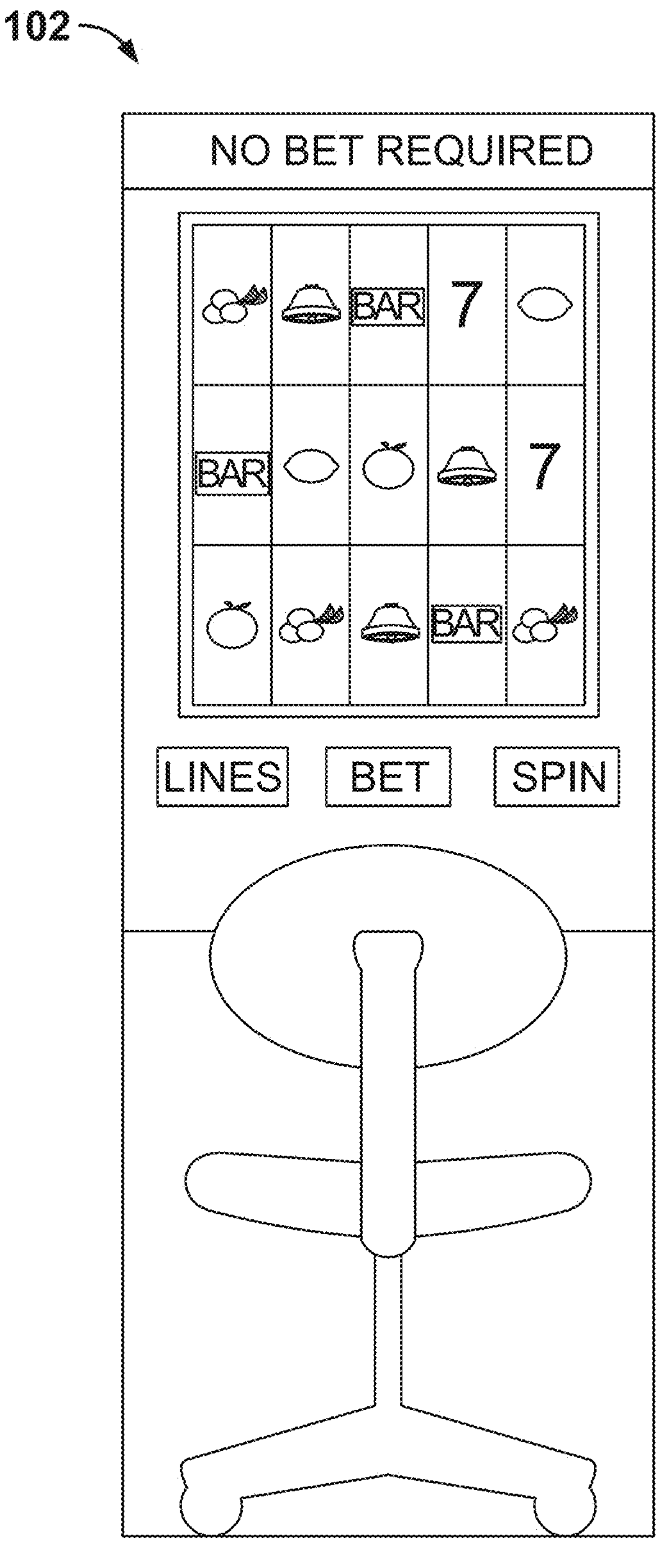
FIG. 2 is a front view of a standalone gaming machine, in accordance with example embodiments.
Figure 3:
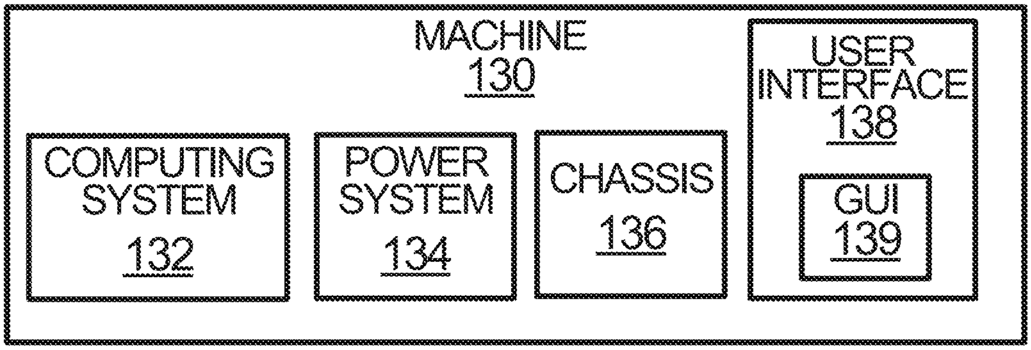
FIG. 3 is a functional, block diagram of a machine, in accordance with example embodiments.
Figure 4:
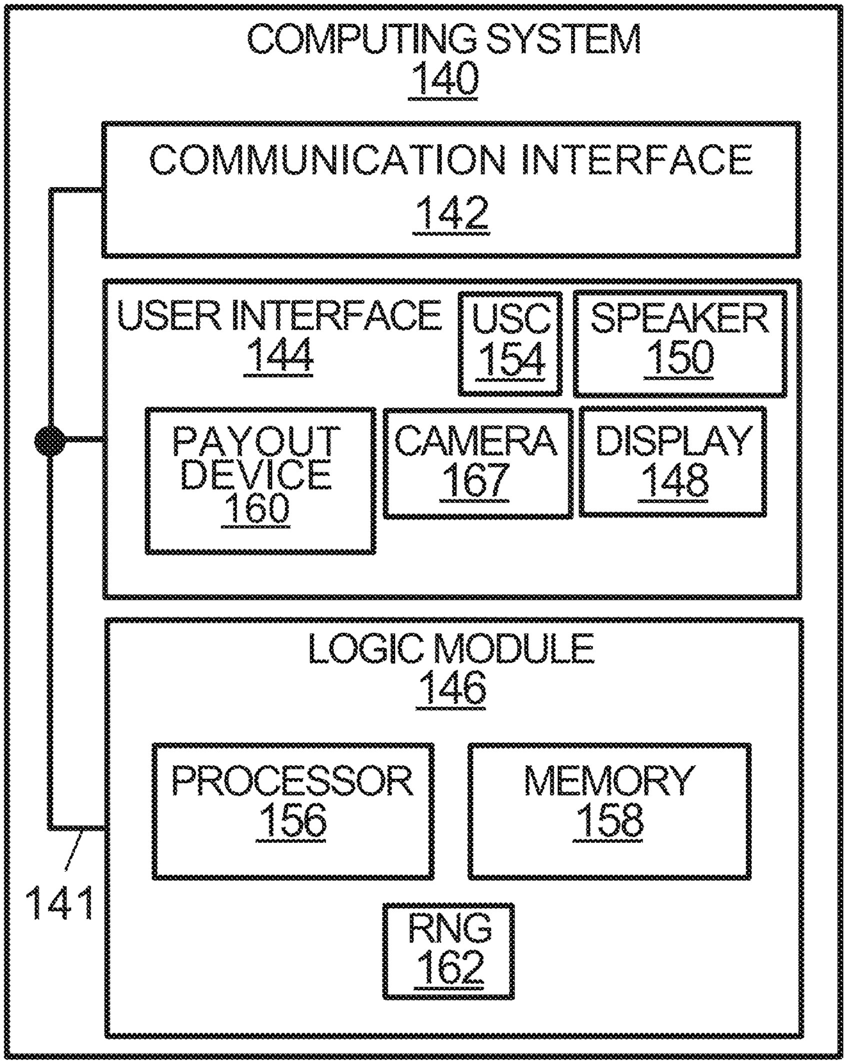
FIG. 4 is a block diagram of a computing system, in accordance with example embodiments.
Figure 5:
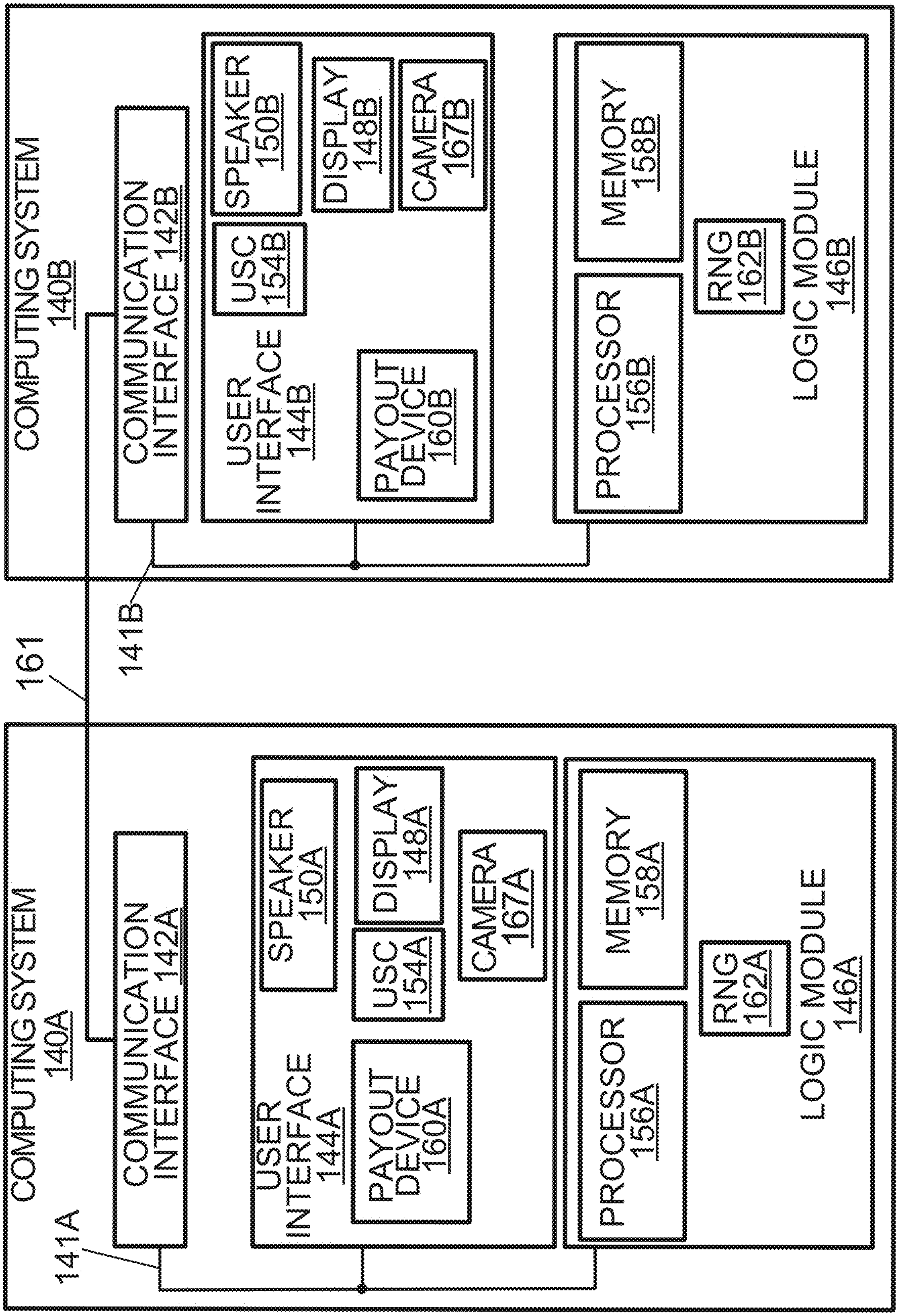
FIG. 5 is a block diagram of two computing systems connected to one another via a computer network, in accordance with example embodiments.

At least some of the embodiments pertain to performing aspects of a game using a computing system (e.g., a gaming system 100 shown in FIG. 1, a standalone gaming machine 102 shown in FIG. 2, a machine 130 shown in FIG. 3, a computing system 140 shown in FIG. 4, a computing system 140A shown in FIG. 5, and/or a computing system 140B shown in FIG. 5). In at least some implementations, the standalone gaming machine 102, 130 includes a dedicated slot machine. The machine can be configured as, or include, a computing system. For purposes of this description, unless the context dictates otherwise, a user device or machine can include or be embodied as a discrete-component computer system, standalone machine, a distributed computing system, or a standalone, integrated computing system.

Turning back to FIG. 1, the gaming system 100 is suitable for use in providing games to workstations operable by players. The gaming system 100 includes a server 104 and a website 106, 108. The server 104 can include one or more servers, each including one or more processors and one or more network interfaces (i.e., communication interfaces) providing connectivity to each other and/or to a communication network, such as the Internet. The website 106, 108 can include a website on the World Wide Web of the Internet. For example, one or more of the websites can include an online casino website hosted on a corresponding server application operable on the server 104. A person having ordinary skill in the art will understand that in some embodiments the gaming system 100 can include a single website, two websites, such as the website 106, 108, or more than two websites. The website 106, 108 can include and/or be accessed via a portal. The website 106, 108 can be served by the server 104. In that regard, the server 104 can include and/or be arranged as a web server. As an example, the server 104 can serve the website 106, 108 to a workstation using Hypertext Transfer Protocol (HTTP) communications or HTTP secure (HTTPS) communications. In at least some embodiments, the portal includes a website of an online casino from which websites for different games (e.g., different wagering or non-wagering games) can be selected and provided to a workstation. As an example, the different wagering or non-wagering games can include a slots game, a roulette game, a scratch-card game, a dominoes game, a card game, or a skills game.

The website 106, 108 can be accessible by an individual player using a gaming workstation 110, 112, 114 in the form of an Internet-enabled computer workstation. In at least some embodiments, the website 106 is logically connected to a gaming workstation 110, whereas the website 108 is logically connected to the gaming workstation 112, 114. It will be appreciated that the website 106, 108 can be logically connected to any desired number of such workstations simultaneously. In at least some embodiments, a website is logically connected to a workstation via one or more of a portal, server or communication network.

The server 104, the website 106, 108, and the gaming workstation 110, 112, 114 are capable of communicating with each other by means of a communication network 122 (such as an open communication network (e.g., the Internet or another type of Internet Protocol (IP) network).

The communication network 122 can include a wired communication network and/or a wireless communication network. In at least some embodiments, the communication network 122 includes a local area network (LAN), such as a LAN located at least partially within a casino. In accordance with those embodiments, the gaming workstation 110, 112, 114 can be dispersed throughout the casino and can communicate with the server 104.

In another example, the communication network 122 can include a wide-area network (WAN), such as an Internet network or a network of the World Wide Web. In such a configuration, the gaming workstation 110, 112, 114 can communicate with the server 104 via a website portal (for a virtual casino) hosted on the server 104. The data described herein as being transmitted by the server 104 to the gaming workstation 110, 112, 114 or by the gaming workstation 110, 112, 114 to the server 104 can be transmitted as datagrams according to the user datagram protocol (UDP), the transmission control protocol (TCP), or another protocol, and/or a file (e.g., an HTTP file) or some other type of file or communication.

The communication network 122 can include any of a variety of network topologies and network devices. The communication network 122 can include a wireless and/or wired network topology and network devices operable on one or both of those network topologies. As an example, the communication network 122 can include a public switched telephone network, a cable network, a cellular wireless network, a wide area network (WAN), a local area network, an IEEE® 802.11 standard for wireless local area networks (wireless LAN) (which is sometimes referred to as a WI-FI® standard) (e.g., 802.11a, 802.11 ac, 802.11ax, 802.11ay, 802.11az, 802.11ba, 802.11bd, 802.11 be, 802.11 g, 802.11n, or 802.11p), and/or a network operating according to a BLUETOOTH® standard (e.g., the BLUETOOTH® standard 5.4 or 6.0) developed by the Bluetooth Special Interest Group (SIG) of Kirkland, Washington.

The website 106, 108 can include and/or operate a player account facility 124, 126, respectively, with a credit account corresponding to each player who participates in a game offered by the website 106, 108. In the illustrated embodiment, therefore, the player account facility 124 has at least one player credit account associated with it, while the player account facility 126 has at least two associated, but separate, player accounts.

The player account facility 124, 126 can include a block of outcomes generated for playing games via the website 106, 108, respectively. As an example, the player account facility 124 can include a block of outcomes for a first type of game, such as a video slots game, and the player account facility 126 can include a block of outcomes for a second type of game, such as a scratch-card game. Either or both of the player account facility 124, 126 can include and/or be referred to as a database.

The following description refers to the gaming workstation 110 and is applicable to one or more of the gaming workstation 112, 114 and/or one or more other workstations. A stored workstation program can be resident in the gaming workstation 110. This program can enable a participating player to browse an online casino website (e.g., the website 106, 108) and to interact with the server 104 to play games such as slot machines (slots), poker, Blackjack, scratch-card games, and wheel games, such as Roulette and a prize wheel game. The stored workstation program can include tools (e.g., modules) for displaying, on the gaming workstation 110, gaming symbols (e.g., slot machine reels, cards, Roulette wheels, etc.), gaming controls by which the player can place wagers, spin the reels, etc., and the results of play. The stored workstation program can also include gaming logic for facilitating the execution of a turn of a game, and communications facilities for communicating player actions to the server 104, and receiving messages (e.g., datagrams) from the server 104 containing results of play. The data representing results of play (i.e., outcomes) can be translated to graphical symbols which are presented on the gaming workstation 110.

In at least some implementations, the gaming workstation 110 includes a personal computer programmed to perform a method according to the example embodiments. In other implementations, the gaming workstation 110 includes a portable computing device programmed to perform a method according to the example embodiments. As an example, the portable computing device can comprise a tablet device, a personal digital assistant, or a smart phone. In still other implementations, the gaming workstation 110 includes an electronic gaming terminal programmed to perform a method according to the example embodiments and/or that is wholly or partially dedicated to playing casino games.

The server 104 can operate under control of a server-stored program that co-operates with the stored workstation program in order to enable a player at the gaming workstation 110 to play a game. As an example, the server-stored program can be contained in a memory 158 shown in FIG. 4 and FIG. 6A, the memory 158A shown in FIG. 5. As another example, the server-stored program can be contained within the application 164 or the program instructions 166, both shown in FIG. 6A. As yet another example, the server-stored program can be contained within modules 203, an application 207, or the program instruction 209, all shown in FIG. 54.

The stored workstation program or application and the corresponding stored server program will be referred to, for convenience, as a client process and a server process, respectively. The server process can generate one or more random events that determine the outcome of turns of the game, such as determining the outcome of spins of the slot machine reels in the various slots games of the participating players. The client process of any particular workstation (such as the gaming workstation 110) can obtain the result of the random events from the server 104 along the communication network 128 and can display the outcome of the game on the gaming workstation 110. For example, the client process can cause the player's set of slots reels to spin and to come to rest at a position corresponding to the outcome.

In order to play the games from any particular workstation, the client process can first be downloaded to that computer workstation from the server 104 or, alternatively, from a separate web server, and then installed on the gaming workstation 110.

A program that is arranged to execute on either the server 104 or the gaming workstation 110 can reside on a non-transitory computer-readable memory, such as random access memory (RAM) or read only memory (ROM), which can encompass magnetic memory, optical memory, and/or additional forms of computer memory. The computer-readable memory can have stored thereon program instructions that, if executed by a computing device (e.g., the server 104 or the gaming workstation 110), cause the computing device to perform operations consistent with any of the embodiments described in this disclosure.

A player wishing to participate in a game can use the gaming workstation 110 to access the website 106, 108 of her or his choice. When the player navigates using a web browser to a home page of a casino, the player can be presented with an icon on the graphical user interface (GUI) of the gaming workstation 110, which the player can activate and/or select to trigger downloading the client process and providing to the casino operator (e.g., to the server 104) information for the casino operator to verify the identity of the player. In at least some embodiments, that information can include at least a portion of registration information previously provided to the casino operator to register the player. Following these tasks, the player can request to play games provided on the casino website by clicking on an appropriate icon or user-selectable control, or taking other similar action.

A computing system and/or a display screen of the computing system can display a variety of symbols during operation of a game or other outcome event. During the turn of a game, an event with an uncertain outcome (such as number generated by a random number generator) becomes certain. A resultant pattern of symbols appearing on the gaming workstation 110 becomes certain after the event occurs (e.g., the number is generated and the resultant pattern of symbols on the display is fixed. In at least some other embodiments, the resultant pattern of symbols appearing on the gaming workstation 110 becomes certain after the event occurs and after a user is permitted to nudge one or more symbols to a new position, a user is permitted to replace a symbol, or a bonus spin of one or more reels occurs.

A wide range of games is available to players. One popular example is a game provided via a slot machine, which can be implemented in a variety of forms. A slot machine can include one or more reels, each of which includes multiple symbols distributed around the circumference of the reel. A computing system that includes a graphical user interface (GUI) that can emulate the physical, spinning wheels of a mechanical slot machine.

In at least some embodiments, a player initiates the turn of game, causing the reels to start spinning. Each reel then comes to rest, typically with either one of the symbols, or a space in between adjacent symbols, in alignment with a payline or payway. According to at least some embodiments, a winning outcome of a game can be based on symbols being displayed according to a predefined pattern of symbols. The pattern can be defined as a payline of a line-type outcome event, or a payway of a ways-type outcome event.

In accordance with the example embodiments, a pattern that results in an award can include one of multiple, particular patterns that starts at either side of a symbol-display portion of a display (e.g., a left side or a right side). Some embodiments utilize multiple, particular patterns.

Free play on a mechanical slot machine can be implemented, of course, by providing physical tokens to a player without charge. A free play on an electronic slot machine can be implemented, for example, by providing virtual tokens (e.g., credits) to a player without charge.

Another popular game is a game that includes spinning a roulette wheel with consecutive integers 1 to 35 with or without a 0 or consecutive integers 1 to 36 with or without a 0. The roulette wheel includes a pocket corresponding to each number on the roulette wheel. A roulette ball (also, known as a pill) can be placed on the roulette wheel while spinning. An outcome of the roulette game is based on the number corresponding to the pocket in which the roulette ball lands and one or more numbers selected by the player before the roulette game starts. A free play on an electronic roulette wheel machine can be implemented, for example, by providing virtual tokens to a player without charge. In such games, the processor may select one or more numbers on a roulette layout while the game is played offline.

Still another popular game is a game that includes spinning a prize wheel and stopping the prize wheel with a particular position on the prize wheel positioned at a prize wheel position indicator. A free play on an electronic prize wheel machine can be implemented, for example, by providing virtual tokens to a player without charge.

In at least some embodiments, an entertainment system (i.e., a gaming system and/or a computing system) using a block system allows players to play free games with an ability to win real cash and prizes. This can be done by a system generating multiple random results (e.g., 100, 10,000 or some other number of results (e.g., outcomes)), which together constitute a block of results. The player then has a chance to play through the results (e.g., outcomes) one after the other, for free. At any time, at no cost, the player can discard any unplayed results (e.g., outcomes) and have a new block generated against which the player can continue playing. To accommodate a large quantity of players and the possibility that only one outcome of a block of outcomes is presented to a player, the blocks of outcomes can be generated, in part, by playing an underlying game in an offline mode In at least some embodiments, registration is not required, and the player is not forced to watch pesky advertisements. Even so, the computing system can request the player to provide registration details when the player wants to redeem a prize so that the prize can be provided to the player. Prior to such redemption, no details are required from the player. Even so, in at least some embodiments the player may be offered free credit(s) (e.g., smartPLAY credits) in return for registration details so the player can be provided with special offers and news updates. But how much and what the player wins is the same regardless of whether the player registers.

To obtain prizes won during game play, the player can provide the computing system with banking details or preferred payment methods which will allow the computing system to make the appropriate transfers to the player. Those banking details and payment methods can be stored in game support data 213 shown in FIG. 54. In at least some embodiments, any winnings are first paid out to the player's credit card or other relevant payment methods that the player may have used to purchase smartPLAY credits or provided during player registration.

The non-gambling game can be played for free and without buying any credits (e.g., smartPLAY credits). How much and what the player wins is the same regardless of whether the player registers or whether the player uses credits (e.g., smartPLAY credits). In at least some embodiments, when the player buys credits (e.g., smartPLAY credits) the player is pre-paying for the use of the smartPLAY services (i.e., play a game in a SmartPlay mode).

The computing system randomly generates the results (e.g., outcomes) (e.g., 100, 10,000 or some other number of results (e.g., outcomes)) of the game and stores the results (e.g., outcomes) in memory as a 'block'. During play of the non-gambling game in a particular play mode, each result (e.g., outcome) is shown to the player. Selecting a user-selectable control (e.g., a SPIN button) will cause, for example, a set of reels, a roulette wheel or a prize wheel to spin and stop at the first result (e.g., first outcome). Selecting the user-selectable control again causes the set of reels, the roulette wheel or the prize wheel to spin again and stop at the second result (e.g., second outcome). And so on until the player plays through all the results (e.g., outcomes), after which a new 'block' will be automatically generated and/or accessed from memory to allow the player to continue playing.

In at least some embodiments a block can be "refreshed." Refreshing a block means that the rest of the existing block of results (e.g., the results that have not been output to the player) is abandoned and a new block of results is created for the player to use.

Refreshing a block is easy and free. For example, a fresh, new block of results can be provided for the player's use in response to selection of a user-selectable control (e.g., a refresh button) available to the player. The refresh button can be output on a display screen. Alternatively, the refresh button can be a hardware button.

A block can be refreshed at any time. Even if the player started using a first new block, selecting the refresh button will abandon the first new block and generate a second new block of results for the player's use.

In at least some embodiments a block can be "discarded." Discarding a block means that the rest of the outcomes in a current block (e.g., the outcomes that have not been output to the player) are abandoned and a new block of outcomes is accessed for the player to use. The new block of outcomes may have been generated and stored in a database before the prior block is discarded.

Discarding a block is easy and free. For example, a fresh, next block of outcomes can be accessed for the player's use in response to a selection of a user-selectable control (e.g., a USC 684 shown in FIG. 64) available to the player. The USC to request access to the next block can be output on a display screen. Alternatively, the USC can be a hardware button of a user interface at the computing system.

A block of outcomes can be discarded at any time during game play. Even if the player started using a first new block, selecting the USC for a new block will cause the computing system to abandon the first new block and access a second new block of outcomes for the player's use.

A prize schedule, sometimes called a prize table, prize list or pay table, includes data displayable to show what a player will win based on achieving various reel combinations, symbols on a scratch-card, roulette numbers, or prizes on a prize wheel in the game. An element of a prize schedule is or can be a particular set of reel combinations, a symbol on a scratch-card, a roulette number, or a prize on a prize wheel.

The player can win prizes or cash as shown on the prize schedule if any of the results (e.g., outcomes) of the spins provides a winning combination of symbols, symbols on a scratch-card, roulette number or prize on the prize wheel, as shown on the prize schedule. In at least some embodiments, a block of results (i.e., a block of outcomes) will generally have prizes of a cumulative value ranging from $0.00 to the sum total of a prize schedule (e.g., $0.95). In at least some embodiments, a block includes no more than a single instance of each element of the prize schedule. In at least some embodiments, a block of outcomes includes no more than a single winning outcome, and some blocks can include zero or more multiple winning outcomes.

All of the results or outcomes of a block are randomly generated and are independent of whether the player has registered, or bought or used smartPLAY credits. In at least some implementations, each block is checked to ensure that any winning combination is unique to that block. If not, a new result will be generated to replace that result so as to ensure a block cannot ever have more than one unique winning combination or combination type. Other games may have a cap on the value which a block can earn in prizes, regardless of the results. This will be displayed on the relevant game or in the help files portion of a game applications. In other embodiments, the block can have more than one winning result.

The outcomes for the block can be generated by a first computing system playing the game offline before a second computing system used by the player requests access to any outcome of the block. When generating the block, the first computing system determines one or more records in the block that will include a true outcome (e.g., a winning or non-winning outcome). All other records in the block will include a non-winning outcome. While playing the game offline, if a winning outcome is determined for a record that is to include a non-winning outcome, the first computing system will discard the winning outcome and play the game again until a non-winning outcome for that record in the block.

The outcomes of a block can include the random number(s) generated during the offline game play, but not the actual prize if the true outcome is a winning outcome. The relevant prize outcome for each winning outcome is only processed by the computing system when the game is played. Only then is the outcome released to the rest of the system to calculate what the correct prize is for that particular outcome and the relevant prize table.

A block includes the results of the random numbers generated, but not the actual prize outcome. The relevant prize outcome for each result is only processed by the computing system when the game is played. Only then is the result released to the rest of the system to calculate what the correct prize is for that particular recorded result and the relevant prize table.

A prize outcome is only allocated to the player when the relevant game to which the result has been attributed is actually played or processed. Once this has been done, the winnings are immediately attributed to the player. Discarding a block of outcomes with a winning outcome before the winning outcome is presented to the player cannot be won by the player after discarding of the block.

The computing system can include an automatic mode, which can be referred to as “smartPLAY.” The automatic mode (i.e., smartPLAY) is an enhancement to the non-gambling game which increases an entertainment value of the non-gambling game by having the computing system process, for the player, all the results in a block to determine the total prize outcome and only show the player a single loss (if there are no winning results in the block) or the relevant wins (if the block includes multiple winning results). The player can thus pay for the smartPLAY service—which includes, among other things, the processing of the results on the computing system and parsing of the relevant data. The use of smartPLAY does not change the results or the outcome of the relevant block.

The computing system can include a SmartPlay mode, which can be referred to as “smartPLAY,” “SmartPlay,” “Quickplay,” or by another term. The SmartPlay mode is an enhancement to the non-gambling game which increases an entertainment value of the non-gambling game by having the computing system process, for the player, all true outcomes in a block to determine the total prize outcome for the block without processing any of the non-winning outcomes for the player as the game was already played offline to determine the non-winning outcomes. The use of SmartPlay (i.e., playing the game in the SmartPlay mode) does not change the end result for playing out the outcomes of the block as compared to the end result that could be achieved if the same block was played out in a SlowPlay mode. Playing out the game in the SlowPlay mode includes playing out each outcome in the block unless a new block is requested. To distinguish between the SmartPlay mode and the SlowPlay mode, those modes can be referred to a “first play mode” and a “second play mode,” respectively, or vice versa.

Credits for the automatic mode (e.g., smartPLAY credits) are pre-payments made by the player for the use of the smartPLAY system. A single smartPLAY credit is used to pay for, among other things, the processing, parsing and displaying of the summary of results (i.e., outcomes) of a whole block to the player. In some embodiments, one SmartPlay credit is required for playing out a single block of outcomes.

In accordance with at least some embodiments, the cost of each credit (e.g., a smartPLAY credit) includes any value added tax (VAT) or goods and services tax (GST) that is required for the purchase of international services. The responsibility for any taxes on prizes, if applicable, will have to be paid by the player.

In at least some embodiments, the player can turn smartPLAY on part way through the block, although a full credit will be used to process the remainder of the block, notwithstanding that it is only a partial block. Alternatively, the player could manually refresh the block (i.e., discard a current block to use a new block) after turning on smartPLAY which will ensure the credit is used for a full block, or the player can go to settings and turn on an ‘Automatically refresh block when smartPLAY is turned back on’ option. Player options can be stored within registration data corresponding to the player. The registration data can be stored in game support data 213 shown in FIG. 54.

The odds of winning are the same, regardless of whether the player is playing with smartPLAY on or off, as the player is playing using the same block. Moreover, the odds are the same regardless of whether the player has registered, purchased smartPLAY credits, or used smartPLAY credits.

The amount the player wins in any given block is the same regardless of whether smartPLAY is on or off. When the player uses the system with smartPLAY on, the player is provided with a summary of all the results of a single block. With smartPLAY off, the player is provided with each single result individually. This will or can naturally result in a different ‘feel’ of how often the player is winning. The mode used to play out each single outcome individually can be referred to as a “SlowPlay” mode.

A game played in the SmartPlay or the SlowPlay mode can further be played in an AutoPlay mode. Auto-play saves the player from having to press the spin button (e.g., a USC 694 shown in FIG. 64) to see each result (i.e., outcome). For each result, when the reels stop, the player is able to review the result for a short time and then the reels will automatically spin again. This will keep happening for a predetermined number of results or until the player selects a stop control or otherwise exits the game. The AutoPlay mode can be toggled on and off via selection of a user-selectable control, such as the USC 690 shown in FIG. 64.

A game played in the SmartPlay or the SlowPlay mode can further be played in an QuickSpin mode. A quick-spin feature reduces the length of time between each spin result. The quick-spin feature can be toggled on and off via selection of a user-selectable control, such as the USC 692 shown in FIG. 64. Auto-play and quick-spin can be made available even if the player has smartPLAY off.

The player can get a refund of credits at any time by "cashing" out any unused smartPLAY credits the player has bought. Likewise, cash prizes that have been provided in the form of smartPLAY credits can also be 'cashed' out. In at least some embodiments, prizes that are in the form of smartPLAY credits only cannot be cashed out. These prizes will be appropriately shown or highlighted on the prize schedule.

A block number is an alphanumeric 'number' given to a set of results which is called a block. The block number is a reference number for the block the player is playing. The full results of each block can be recorded for a particular amount of time (e.g., at least 90 days) and can be used to answer any queries the player may have about the results. The block number can be output on the display of the player's computing system at all times when the block is being played out or at least a portion of the time the block is being played out.

A block identifier (e.g., a block number) can be assigned to each block of outcomes. The block identifier is a reference identifier for the block the player is playing. The end results of each block can be recorded for a particular amount of time (e.g., at least 90 days) and can be used to answer any queries the player may have about the end results. The end results and/or a used block can be stored in portion of memory for arching the results and/or used block. The block identifier can be output on the display of the player's computing system at all times the block is being played out or at least a portion of the time the block is being played out.

The non-gambling games are made for people, not machines. Therefore, in at least some embodiments, the computing system can periodically require a player to prove the player is a human. This is done to ensure that the players are not bots. As an example, the computing system can perform a test by taking a video of the player moving his or her head to prove the player is a human. If the computing system determines a bot is playing a game, the computing system will ban the corresponding computer or mobile phone or the person(s) behind them from participating in the non-gambling game.

The player can be provided with a single block for each smartPLAY credit the player purchases. These block(s) can be made available to the player when the player plays any of the non-gambling games with smartPLAY turned on.

The computing system can include an Alternative Means of Entry (AMOE) which allows the player to receive a block (e.g., access outcomes of a block) with no purchase required. The player can do this by launching the game application or requesting a new block by hitting the refresh button, hitting the New Block button (e.g., the USC 684 shown in FIG. 64), by playing out all outcomes in a block and/or by completing the free spins in a block. A new block of results (e.g., outcomes) will then be generated and/or accessed for the player to play against. The block assigned to the player is randomly generated and is independent of whether the player has registered, bought smartPLAY credits or have smartPLAY turned on.

Throughout this description, the articles "a" or "an" are used to introduce elements of the example embodiments. Any reference to "a" or "an" refers to "at least one" or "one or more," and any reference to "the" refers to "the at least one" or "the one or more," unless otherwise specified, or unless the context clearly dictates otherwise. The intent of using the conjunction "or" within a described list of at least two terms is to indicate any of the listed terms or any combination of the listed terms.

Further, as the present disclosure relates to providing a game, such as a video slot game, without gambling (or placing money at risk), the terms, "bet," and "wager" should be taken to mean a prediction or other choice by a player of what an uncertain outcome will be where the player has not put money at risk.

The use of ordinal numbers such as "first," "second," "third" and so on is to distinguish respective elements rather than to denote a particular order of those elements. For purpose of this description, the terms "multiple" and "a plurality of" refer to "two or more" or "more than one."

Further, unless context suggests otherwise, use of the word "if" can be replaced by "when" or "in response to."

Furthermore, unless context suggests otherwise, the features illustrated in each of the figures can be used in combination with one another. Thus, the figures should be generally viewed as component aspects of one or more overall example embodiments, with the understanding that not all illustrated features are necessary for each embodiment.

II. Example Architecture

FIG. 3 is a generalized, block diagram of a machine 130 in accordance with the example embodiments, including both the gaming system 100 (shown in FIG. 1) and the standalone gaming machine 102 (shown in FIG. 2). The machine 130 includes a computing system 132, a power system 134, a chassis 136, and/or a user interface 138. The machine 130 can be configured to perform a method or at least some functions of a method according to the example embodiments. In at least some embodiments, the computing system 132 can include at least a portion of one or more from among: the power system 134, the chassis 136, or the user interface 138.

The computing system 132 can include a processor and a memory storing program instructions executable by the processor to perform a method or at least some functions of a method according to the example embodiments. As an example, the computing system 132 can be arranged as and/or include components of any computing system described in this description and/or shown in the drawings. In particular, the computing system 132 can be arranged as and/or include components of a computing system 140 shown in FIG. 4, a computing system 140A shown in FIG. 5, or a computing system 140B also shown in FIG. 5.

The power system 134 includes means for powering some portion of the machine 130, such as the computing system 132 and/or the user interface 138. The power system 134 can include a power supply, such as a battery, a generator, a fuel cell, or a solar cell, or some other type of power supply instead or in addition. The power system 134 can include a power circuit for distributing electrical power throughout the machine 130 where needed. The power system 134 can include a connector and/or connection for connecting to another power system, such as a power system within a building and/or a power system of an electrical utility company.

The chassis 136 includes means for supporting and/or protecting other aspects of the machine 130. As an example, the chassis 136 can include a rack for supporting at least portions of the computing system 132, the power system 134, and/or the user interface 138. As another example, the chassis 136 can include a housing in which at least portions of the computing system 132, the power system 134, and/or the user interface 138 reside.

The user interface 138 can include one or more user interface input components configured to receive and/or produce content (e.g., a signal, data, and/or information) based on some action of a player. That content can be provided to the computing system 132. The user interface 138 can include one or more user interface output components (e.g., a GUI 139) for outputting content. That content can be provided by the computing system 132. The player action can occur by use of the user interface 138. The GUI 139 can include any other GUI described in this description and/or any component of a GUI described in this description.

In at least some example embodiments, the user interface 138 also includes a mechanical user interface input component, such as an arm, handle or lever located on a side of the chassis 136 similar to an arm, handle, or lever located on a mechanical slot machine, or a roulette wheel and roulette ball, or a prize wheel. As an example, the mechanical user interface input component can be configured to input a spin request or a start input to the computing system 132.

Also in some example embodiments, the user interface 138 can include a card reader to determine a player using the machine 130. The user interface 138 can also include a payout device, by which a winning player can receive a payout from a successful wager. The user interface 138 can also include a payout device, by which a player can receive a payout for any winning outcome of a block so long as the outcome was processed for the player and not part of a block discarded by the player before being processed for the player. A payout by the device can include, for example, paper money or coins, physical tokens, a raffle ticket payout (e.g., one or physical or virtual raffle tickets), an electronic interface upon which a credit can be uploaded, a receipt that can be exchanged for money, a credit added to the player's account, an increase in to a player's raffle or drawing ticket balance, or an electronic funds transfer. A payout can also include electronically transmitted data to effect a payout to a player. The display can advise a player she or he has received a payout and if any action is required by the player to receive the payout.

In at least some embodiments, the computing system 132 can include at least a portion of the user interface 138. As an example, in embodiments in which the computing system 132 is arranged like the computing system 140, the computing system 140A, or the computing system 140B, the user interface 138 can be arranged like the user interface 144, the user interface 144A, or the user interface 144B, respectively.

Next, FIG. 4 is a block diagram of a computing system 140 in accordance with the example embodiments. As described in the text corresponding to FIG. 1 and FIG. 2, the computing system 140 of example embodiments can be arranged as and/or include a stand-alone computing system (such as shown in FIG. 2), a distributed computing system, a personal computer, a server computing system (or more simply, a "server"), a client computing system (or more simply, a "client" or a "client device"), a portable computing system, a mobile phone, a smartphone, a tablet device, or some other computing device (as set forth throughout the description). The computing system 140 can also be referred to as a user device, a player device, a gaming workstation, or a workstation.

The computing system 140 can include a communication interface 142 (e.g., a network interface), a user interface 144, and a logic module 146, two or more which can be coupled together by a system bus 141 (e.g., a network, or other connection mechanism). The communication interface 142 can include a wired or wireless network communication interface. For purposes of this description, any data described as being provided, sent, or transmitted by the computing system 140 can be data sent by the communication interface 142 over a communication network, such as the communication network 122. In addition, for purposes of this description, any data described as being received by the computing system 140 can be data sent to communication interface 142 over a communication network, such as the communication network 122.

The user interface 144 includes components that can facilitate interaction with a user of the computing system 140. For example, the user interface 144 can include user interface output components, such as a display 148, a speaker 150, a payout device 160 and/or camera 167. As another example, the user interface can include user interface input components, such as a user-selectable control (USC) 154 (e.g., a keypad, a keyboard, or a mouse), or a touch-sensitive screen. The touch-sensitive screen can be part of the display 148, such that the display 148 is operable as both a user interface input component and a user interface output component. The user-selectable control 154 can include one or more user-selectable controls, one or more of which can be implemented on the touch sensitive screen (which can also be referred to as a touch pad). In at least some embodiments, the USC 154 can be used to input a start input. In at least some embodiments, the USC 154 can be used to select a number on a roulette wheel. In at least some embodiments, the USC 154 can be used to select a play mode such as the SmartPlay mode, the SlowPlay mode, the AutoPlay mode, or the QuickSpin Mode. In at least some embodiments, the USC 154 can be used to trigger the camera 167 to capture an image.

The display 148 is configured to display (i.e., visually present and/or show) content. As an example, the content can correspond to an outcome event (e.g., an outcome or result of a block), such as a set of symbols selected for the outcome event, a matrix, a reel, a payline, a payway, an award, an instruction, or a user-selectable control (e.g., a button). As another example, the content can include text, a graphic, a GUI (e.g., the GUI 139), an animation, a video, or some other content as well or instead. As yet another example, the content can include content shown in and/or described with respect to any of the content of FIG. 9A to FIG. 13, FIG. 52A to FIG. 53C, and/or FIG. 58 to FIG. 89. The display 148 can include a display screen (e.g., a display panel or a graphical display unit) including a quantity of pixels. The display can be contained within a smartphone or a tablet device.

Additionally, the display 148 and/or the display screen can include and/or be arranged as a liquid crystal display (LCD), a light emitting diode (LED) display, an organic LED (OLED) display, a quantum-dot light emitting diode (QLED) display, a plasma display or some other type of display. Furthermore, the display 148 can embody the touch sensitive screen noted above such that the display 148 and/or display screen includes and/or is arranged as a touch screen display. Different displays, of course, allow the presentation of graphics of greater or lesser quality.

The camera 167 includes one or more cameras (e.g., one or more visible light cameras and/or one or more infrared cameras). As an example, the camera 167 is connected to the system bus 141 (e.g., a Universal Serial Bus). As another example, the camera is integral to a chassis including the display 148. For instance, the camera 167 can include a front or rear camera of a smart phone or tablet device, or a camera of a monitor connected to a desktop or laptop computer.

The camera 167 can include or more image sensors configured to capture image data. The image data can be stored in the memory 158. The communication interface 142, 142B can be configured to transmit image data to a communication interface of a server (e.g., the communication interface 142A shown in FIG. 5). The image data can include data representing an image to be used for performing a test, such as a test performed by the test module 59 shown in FIG. 7B. The camera 167 can include or more lenses to focus light onto the one or more image sensors. In some embodiments, the processor 156 controls the camera 167 to capture an image during performance of a test without the need for a user to use the USC 154 to capture the image. In some other embodiments, the processor 156 controls the camera to capture an image during performance of a test in response to the user using the USC 154 to capture the image.

The logic module 146 can include and/or be arranged as a processor 156, a memory 158, and/or a random number generator (RNG) 162. The processor 156 can include a general-purpose processor (e.g., a microprocessor) or a special-purpose processor (e.g., a graphics process, a digital signal processor or an application specific integrated circuit) and can be integrated in whole or in part with the communication interface 142 or the user interface 144. Any memory discussed in this description or shown in the drawings can be referred to as a computer-readable memory, data storage, computer-readable data storage, among other names.

The memory 158 can include volatile or non-volatile storage components and can be integrated in whole or in part with the processor 156. The memory 158 can include a register within the processor 156. The memory 158 can take the form of a non-transitory computer-readable memory and can include software program instructions, that when executed by the processor 156, cause the computing system 140 to perform one or more of the functions set forth in this disclosure. Any software program instructions discussed in this description or shown in the drawings can be referred to as computer-readable program instructions, or more simply, program instructions, or a software application. A set of program instructions (e.g., a portion of a software application) can be referred to as a module or a logic module.

As an example, the program instructions can be executable by the processor 156 to perform a method, such as a method including one or more of the functions shown in FIG. 20 to FIG. 46 and FIG. 90 to FIG. 102.

As another example, the program instructions can be executable by the processor 156 to determine an input has been received at the user interface 144 and thereafter allow an outcome (i.e., an outcome of a game) to be output in response to the received input.

The memory 158 can also include operating system software on which the computing system 140 can operate. The memory 158 can include a database (e.g., one or more databases). As an example, the memory 158 can include a database to store blocks of outcomes to play a non-gambling game. As another example, the memory 158 can include a credit account database containing data related to performing an outcome event by a computing system, as well as adjusting account balances (e.g., quantities of credits) associated with client computing systems. In at least some embodiments, the memory 158 includes the player account facility 124, 126. That database can be referred to as game support data. In at least some embodiments, the memory 158 (e.g., the database 211) includes the player account facility 124, 126. The processor 156 can write data into the database and read data within the database.

Next, FIG. 5 is a block diagram of a computing system 140A connected to a computing system 140B over a communication network 161. A configuration of elements including the computing system 140A and the computing system 140B can be referred to as a server-client based configuration. In at least some embodiments, the server 104 can be arranged like the computing system 140A and/or one or more of the gaming workstation 110, the gaming workstation 112, and/or the gaming workstation 114 can be arranged like the computing system 140B.

The components of the computing system 140A and the computing system 140B are shown with corresponding "A" and "B" reference numerals (i.e., suffixes) (i.e., based on the computing system 140). For example, the computing system 140A includes a communication interface 142A, a user interface 144A (which includes a display 148A, a speaker 150A, a user-selectable control (USC) 154A, a payout device 160A and/or a camera 167A), and a logic module 146A (which includes a processor 156A, a memory 158A, and/or an RNG 162A). Likewise, the computing system 140B includes a communication interface 142B, a user interface 144B (which includes a display 148B, a speaker 150B, a user-selectable control 154B, a payout device 160B and/or a camera 167B), and a logic module 146B (which includes a processor 156B, a memory 158B, and/or an RNG 162A). The processor 156, 156A can include or be arranged as a processor 302 shown in FIG. 57.

The computing system 140A is configured to communicate with the computing system 140B over the communication network 161. Likewise, the computing system 140B is configured to communicate with the computing system 140A over the communication network 161. For purposes of this description, any data described as being sent or transmitted by the computing system 140A can include data sent by the communication interface 142A over the communication network 161. Similarly, any data described as being sent or transmitted by the computing system 140B can include data sent by the communication interface 142B over the communication network 161. Furthermore, for purposes of this description, any data described as being received by the computing system 140A can include data the computing system 140A receives from the communication network 161 using communication interface 142A. Similarly, any data described as being received by the computing system 140B can include data the computing system 140B receives from the communication network 161 using the communication interface 142B. The computing system 140, 140B can include and/or be arranged as a client 316 shown in FIG. 57.

In at least some embodiments, the communication network 161 includes a local area network (LAN), such as a LAN located at least partially within a casino. In accordance with those embodiments, multiple instances of the computing system 140B dispersed throughout the casino can communicate with the computing system 140A. In some cases, the computing system 140A can be located within the casino. In some other cases, the computing system 140A can be located away from the casino.

In another example, the communication network 161 can include a wide-area network (WAN), such as an Internet network or a network of the World Wide Web. In such a configuration, the computing system 140B can communicate with the computing system 140A via a website portal (for a virtual casino) hosted on the computing system 140A. The data described in in this disclosure as being transmitted by the computing system 140A to the computing system 140B or by the computing system 140B to the computing system 140A can be transmitted as datagrams according to the user datagram protocol (UDP), the transmission control protocol (TCP), or another protocol, and/or a file (e.g., a hypertext transfer protocol file) or some other type of file or communication.

The communication network 161 can include any of a variety of network topologies and network devices. The communication network 161 can include and/or be part of the communication network 122 (FIG. 1). The examples described herein with respect to the communication network 122 are applicable to the communication network 161.

In at least some embodiments, the computing system 140 (e.g., the payout device 160) can also physically dispense a corresponding award or payout (e.g., cash, raffle tickets, drawing ticket(s)), or otherwise facilitate the payout. In those embodiments, the computing system 140 can include a payout device 160 configured to physically disburse items of value to the payer. Using the payout device 160 to provide item(s) of value can trigger the logic module 146 debiting funds of an electronic account associated with a customer card or transmit data to the player account facility 124, 126 or other player accounts to effect a transfer of value from the account to the payer. As an example, the payout device 160 can include a coin hopper, a coin counter, a coin dispenser, and/or a coin tray. As another example, the payout device 160 can include a ticket roll, a ticket reel configured to hold a ticket roll, a ticket printer, a ticket counter, and/or a ticket dispenser. As yet another example, the payout device 160 can include a bill (i.e., currency) chamber, a bill counter, and/or or a bill dispenser. As still yet another example, the payout device 160 can include a kiosk configured to issue a payout (e.g., a payout based on a ticket voucher (dispensed by the ticket dispenser) corresponding to the payout).

In at least some embodiments, an activity by the payout device 160 can be triggered by a cash out button either on the display 148 or elsewhere on the computing system 140. Additionally, or alternatively to determining the payout amount, the computing system 140 can perform other actions to award the player. For instance, the computing system 140 can display an indication of a tangible prize. Additionally, or alternatively, a payout output by the payout device 160 or another portion of the computing system 140 (e.g., the processor 156 and/or the communication interface 142) can include an electronic funds transfer (EFT). Other types of awards can be used as well.

For purposes of this description, a function that can be performed by the computing system 140, the computing system 140A, or the computing system 140B can be performed, at least in part, by a processor of that computing system executing program instructions and/or a software application. Those program instructions and/or software application can be stored within the memory 158, 158A, or 158B, respectively.

The memory 158, 158A, and 158B can also store data. The memory 158, 158A, 158B can include a global symbol group for an outcome event that includes multiple symbols, such as a reel-based outcome event. Such an image can be arranged according to the Joint Photographic Experts Group (JPEG), Graphics Interchange Format (GIF), or Portable Network Graphics (PNG) encodings, for example.

A memory can include one or more memories. For example, a memory can include the memory 158. As another example, a memory can include the memory 158A and the memory 158B. In accordance with this latter example, a memory can be arranged as a distributed memory. One or more processors can be operatively coupled to a memory. For example, the processor 156 is operatively coupled to the memory 158. As another example, the processor 156A is operatively coupled to the memory 158A, and the processor 156B is operatively coupled to the memory 158B. In accordance with this latter example, a processor can be arranged as a distributed processor.

During the course of an event such as a game operation, various symbol sets can be selected for display. Each selected symbol set can be stored in a table such as a selected symbol set table. Similarly, the payouts associated with various game outcome can be stored in memory as table, such as the pay tables shown in FIG. 14 to FIG. 19.

Figure 6A:
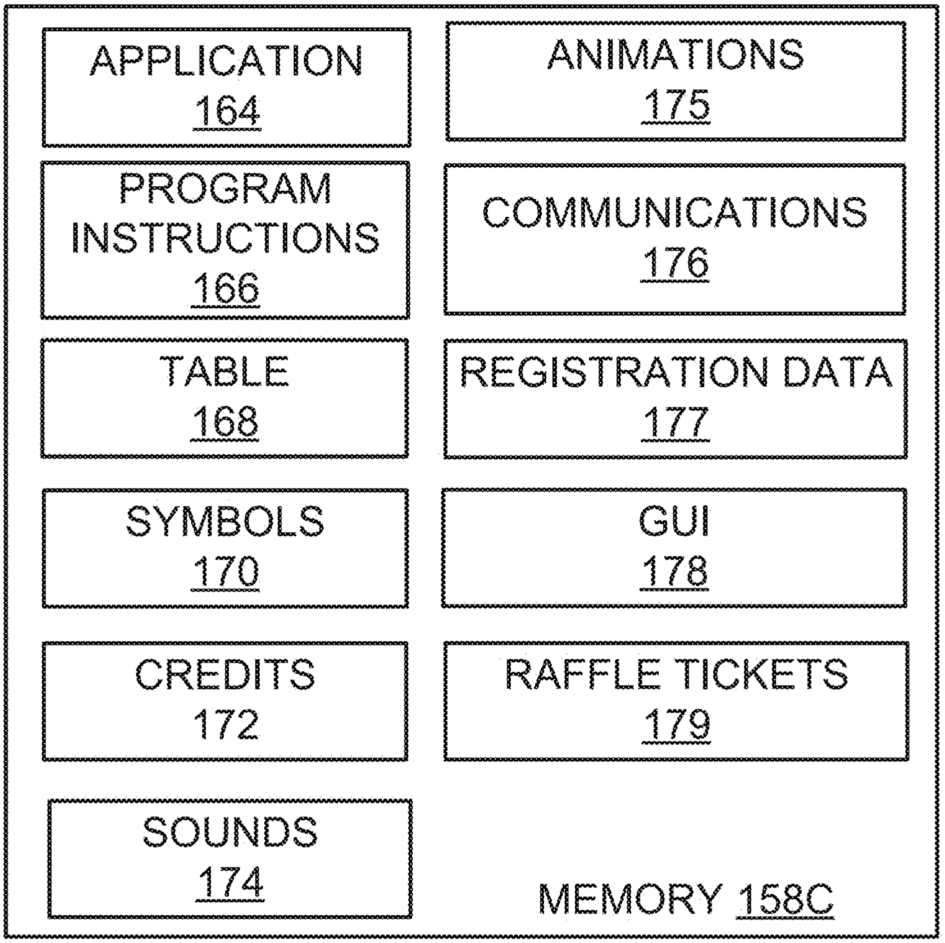
FIG. 6A, FIG. 6B, and FIG. 6C show data stored in a memory, in accordance with example embodiments.

In at least some embodiments, the computing system 140 determines each symbol of a selected symbol set table by randomly selecting any symbol from within the symbols 170 (shown in FIG. 6A). The random selection is enabled by the output of the RNG 162, 162A, 162B in the logic module 146, 146A, 146B, respectively.

Any or all aspects described with respect to the camera 167 are applicable to the camera 167A, 167B.

a. Memory Content

Next, FIG. 6A shows the memory 158C and data that can be stored in the memory in accordance with the example embodiments. The memory 158A (shown in FIG. 5) can contain at least some of the data stored in the memory 158C. Likewise, the memory 158B (shown in FIG. 5) can contain at least some of the data stored in the memory 158C. In at least some embodiments, at least a portion of the memory 158 is embodied as a data register within the processor 156.

As shown in FIG. 6A, the memory 158C can include one or more of the following: an application 164, program instructions 166, a table 168, symbols 170, credits 172, sounds 174, animations 175, communications 176, registration data 177, a GUI 178, or raffle tickets 179.

The application 164 can include any software application discussed in this description. The application 164 can also include an operating system, such as any operating system described in this description. As an example, the application 164 can include a browser application for executing on the computing system 140B. As another example, the application 164 can include an application configured to interface with an application programming interface (API). In accordance with that example, the API can include interface output on the display 148B to allow a user to enter via the user interface 144B data to store within the registration data 177 or data to identify a registered user wishing to play a game via the computing system 140B or to change (e.g., upgrade or downgrade a membership from a first level to a second level).

The program instructions 166 are computer-readable program instructions (e.g., machine readable instructions) executable by one or more processors. The program instructions 166 can be executable to cause a computing system or a component of the computing system to perform any function described in this description. In at least some embodiments, the program instructions include one or more applications of the application 164. One or more application of the program instructions can include any executable module described herein.

The table 168 can include one or more tables, such as one or more pay tables shown in FIG. 14 to FIG. 19, and/or a table shown in FIG. 47 to FIG. 51. In at least some embodiments, the memory 158 can contain any data described as being stored in a table in some manner other than a table. As an example, the memory 158 can store program instructions that include data described as being contained in a table. In at least some embodiments, the table 168 includes one or more tables of a database, such as a table containing at least a portion of the registration data 177. In at least some embodiments, the table 168 includes table including identifiers and corresponding index values, such as quantity N index values and N identifiers, as shown in Table A. As an example, the table of identifiers and index values can include a table of animation identifiers and corresponding index values, a table of sound identifiers and corresponding index values, a table of GUI identifiers and corresponding index values, or a table of reel stop position identifiers and corresponding index values. As shown in Table B discussed with respect to FIG. 13 below, an index value can correspond to multiple identifiers.

TABLE A

| Index value | Identifier |
|---|---|
| 1 | ID-1 |
| 2 | ID-2 |
| 3 | ID-3 |
| 4 | ID-4 |
| 5 | ID-5 |
| N | ID-N |

The symbols 170 can include computer-readable data a processor can read to generate a symbol on a display, a display screen, a graphical display unit, a graphical display interface, or a GUI. As an example, the symbols 170 can include a respective computer-readable file (e.g., a bitmap file) for each symbol. As another example, the symbols 170 can include a computer-readable file a processor can read to generate any symbol required for a game. A table, such as a symbol image table, can include an index value (e.g., a numerical identifier or a file name) corresponding to a symbol in the symbols 170. See Table B below.

The credits 172 can include a number of credits available for a player. The number of credits can be referred to as a credit value. If the credits 172 are stored in the memory 158B, the credits can include a number of credits available for a user of the computing system 140B. If the credits 172 are stored in the memory 158A, the credits can include a respective number of credits available for a user of a respective computing system arranged like the computing system 140B. A processor can update the credits available for each player based on awards earned by use of the computing system by that player. The credit value can be output on the display 148, 148A, 148B. The number of credits can represent a number of sweeps coins. Additionally, or alternatively, the number of credits can represent a number of raffle tickets. Based on that example, the number of credits can represent one or more different types of credits. In at least some embodiments, the credit value can be based upon a quantity of coins (e.g., sweeps coins) or a number of credits based on AMOEs received by a player.

The sounds 174 include audio files (e.g., an audio clip) that the processor 156 can output to a speaker. Outputting an audio file can include outputting a signal that produces a particular sound when the signal passes through a speaker. As an example, the particular sound can include a first particular sound to play when reels are spinning on the display 148B or a second particular sound to play when symbols are being upgraded between outcome events. As another example, the sounds 174 can include an audio file, such as an audio file with one of the following file name extensions: WAV, MP3, MP4, WMA, or some other file name extension. The sounds 174 can include sounds for different tiers, such as sounds for a base tier and sounds for a premium tier. The sounds for a premium tier can include sounds for a first premium tier and other sounds for a second premium tier. The sounds 174 can include sounds corresponding to a roulette wheel or prize wheel spinning.

Each sound in the sounds 174 can correspond to an index value such that the processor 156A can provide the processor 156B with an instruction including a particular index value so that the processor 156B outputs via the speaker 150B an audio file corresponding to the particular index value. Accordingly, the processor 156A does not have to transmit the audio file to the processor 156B each time the audio file is to be output via the speaker 150B.

The animations 175 can include computer-readable files containing animations on a display, such as the display 148, 148A, 148B. As an example, the animations 175 can include animation files, such as an animation file with one of the following file name extensions: GIF, PNG, JPEG, SVG, or some other file name extension. Each animation in the animation 175 can correspond to an index value such that the processor 156A can provide the processor 156B with an instruction including a particular index value so that the processor 156B outputs via the display 148B an animation file corresponding to the particular index value. Accordingly, the processor 156A does not have to transmit the animation file to the processor 156B each time the animation file is to be output via the display 148B.

In at least some embodiments, an animation of the animations 175 is an entire graphical display output on display 148, 148A, 148B. In at least some other embodiments, an animation of the animations 175 is a portion of a graphical display output on the display 148, 148A, 148B. Moreover, in at least some of those latter embodiments, multiple animations of the animations 175 are respective portions of a graphical display output on the display 148, 148A, 148B. The animations 175 can include animations for different tiers, such as animations for a base tier and animations for a premium tier. The animations for a premium tier can include animations for a first premium tier and other animations for a second premium tier. In at least some embodiments, the animations 175 can include an advertisement. In at least some embodiments, the animations 175 can include an animation shows a set of reels spinning and stopping to display a set of symbols on one or more paylines or payways. The animations 175 can include animations to show reels spinning in the symbol-display-portion 182, symbol-display-segment 239, or the symbol-display-segment 539. The animations 175 can include animations to show a wheel spinning in the animation display segment 115.

The communications 176 include one or more communications, such as one or more of the following: a communication sent by the processor 156, a communication generated for transmitting by the processor 156, or a communication received by the computing system 140. As an example, for embodiments in which the communications 176 are stored in the memory 158A, the communications

176 can include a communication sent by the processor 156A to the computing system 140B, a communication generated for transmitting by the processor 156A, or a communication received by the computing system 140A. As another example, for embodiment in which the communications 176 are stored in the memory 158B, the communications 176 can include a communication sent by the processor 156B to the computing system 140A, a communication generated for transmitting by the processor 156B, or a communication received by the computing system 140B.

The registration data 177 can include registration data for one or more players or would-be players of games at or via the computing system 140, 140A, 140B. As an example, the registration data can include a list of relevant information on individual players, including name, contact information, account information, password associated with the player, whether the player has purchased a membership subscription and, if so, the tier. As another example, the registration data can include data regarding a player that had one or more winning results of a block of results and that player requests a payment of any winnings based on those winning result(s). The registration data 177 can include metadata linking a block of results to registration data about the player that played out the block of results. The registration data 177 can include registration data for providing prizes and/or payments won by a player playing out a block of results of a non-gambling game.

The GUI 178 can include one or more GUIs. As an example, the GUI 178 can include a GUI that the computing system 140A transmits to the computing system 140B, and that computing system 140B stores within the memory 158B and displays on the display 148B. As another example, the GUI 178 includes a GUI of an application stored in the application 164 and that is populated within data provided by the computing system 140A. As an example, the data provided by the computing system 140A can include data indicating an outcome of an instance of playing a game (e.g., a game described in this description). As another example, the GUI 178 can include a GUI populated with an animation of the animations 175. As yet another example, the GUI 178 can include field(s) corresponding to registration data required for registering a player and a USC selectable to cause the computing system 140B to transmit a communication with the registration data. As still yet another example, the GUI 178 can include one or more of the GUI 180A shown in FIG. 9A, the GUI 180B shown in FIG. 9B and FIG. 9C, the GUI 180C shown in FIG. 9D and FIG. 9E, the GUI 538 shown in FIG. 52A to FIG. 53C.

The raffle tickets 179 include raffle ticket data generated by a processor of the gaming system 100, the computing system 140, 140A, 140B. The raffle ticket data can include raffle ticket identifiers and player identifiers to whom a raffle ticket was awarded. FIG. 8 shows a raffle ticket pool 163, 165 in accordance with example embodiments. The raffle ticket pool 163, 165 includes player identifiers 151, raffle ticket identifiers 153, and a ticket count 155. As shown in FIG. 8, a raffle ticket pool can include player identifiers for multiple different players. A raffle ticket pool could include a player identifier for a single player. As shown in FIG. 8, a raffle ticket pool can include multiple different raffle ticket identifiers. A raffle ticket pool could a raffle ticket identifier for a single raffle ticket. As shown in FIG. 8, a raffle ticket pool can include a respective integer corresponding to each raffle ticket.

The raffle ticket pool 163 include four play identifiers for a first player "ID 1," a second player "ID 2," a third player "ID3," and a fourth player "ID4." Based on the raffle ticket pool 163, the first player has been awarded seven raffle tickets, the second player has been awarded eight raffle tickets, the third play has been awarded four raffle tickets, and the fourth player has been awarded nine raffle tickets. A total of twenty-eight tickets have been awarded. A person skilled in the art will understand that a raffle ticket pool for a particular raffle can include a different number of raffle tickets for four players or some other numbers of players. A raffle ticket pool can include metadata regarding the raffle ticket pool, such as a time period corresponding to the raffle ticket pool such as a time period including a date, a start time, and an end time (e.g., Jan. 1, 2024, 1:00.00 AM to 1:15:00 AM).

In accordance with at least some of the embodiments, the raffle ticket pool 163 can include raffle ticket identifiers for all raffle tickets awarded by the gaming system 100 during the time period. A processor of the gaming system 100 or the computing system 140, 140A, 140B can select a raffle ticket from the raffle ticket pool 163 as a winning raffle ticket for the time period. In at least some embodiments, the processor can select from among all raffle tickets awarded during the time period multiple winning tickets for a time period. In at least some embodiments, the processor can select a raffle ticket from a raffle ticket pool that is a subset of another raffle ticket pool as a second chance winning raffle ticket. As an example, the raffle ticket pool 165 is a subset of the raffle ticket pool 163. In accordance with at least some embodiments, a subset of another raffle ticket pool can include the raffle tickets awarded to all players subscribing to one or more premium tiers during the time period. As an example, the second and fourth players can be associated with the Gold tier.

The processor 156, 156A, 156B can use the RNG 162, 162A, 162B, respectively, based on the ticket count corresponding to a raffle ticket pool. As an example, to select a winning raffle ticket from the raffle ticket pool 163, the processor can use the RNG to select a number from the range of 1 to 28 listed in the ticket count. Likewise, to select a winning raffle ticket from the raffle ticket pool 165, the processor can use the RNG to select a number from the range of 1 to 17 listed in the ticket count. The selected number corresponds to the winning raffle ticket.

In accordance with at least some embodiments, a raffle can be conducted after a threshold number of raffle tickets have been awarded upon initializing the gaming system 100 or after conducting a previous raffle. Based on the raffle ticket pool 163, the raffle can be conducted after twenty-eight raffle tickets have been awarded. In at least some embodiment, a number of raffle tickets greater than the threshold number can be awarded before the raffle is conducted. For example, the threshold number could be twenty-five tickets and the threshold can be reached upon the raffle ticket having identifiers 1024 to 1027 have been awarded to the second player.

Figure 6B:
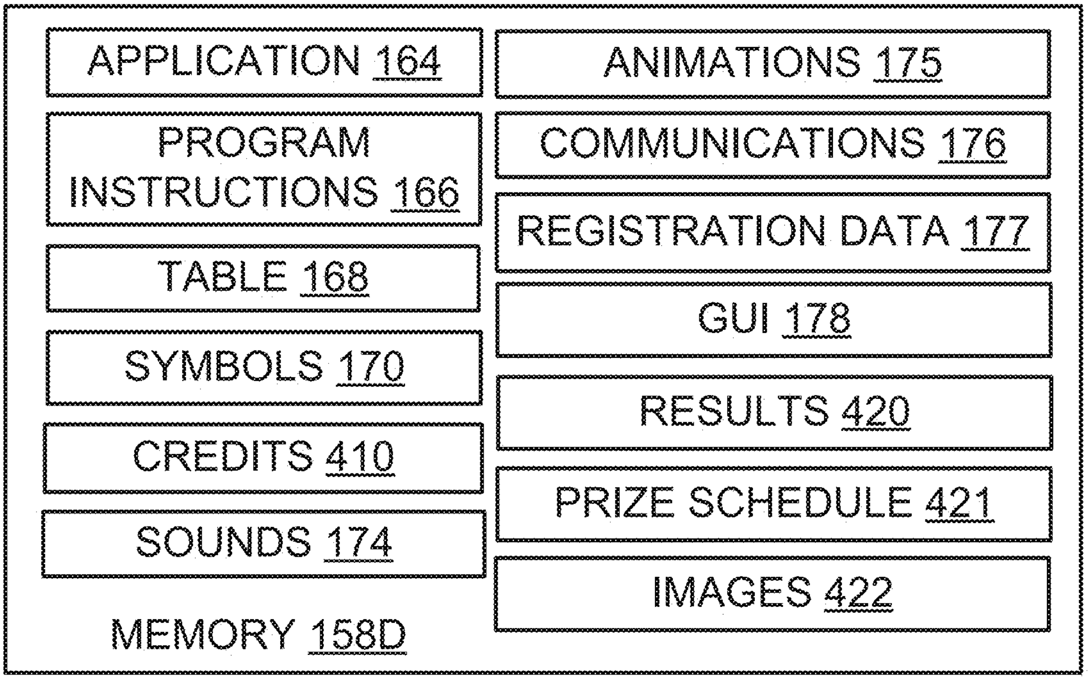

Next, FIG. 6B shows the memory 158D and data that can be stored in the memory in accordance with the example embodiments. The memory 158A (shown in FIG. 5) can contain at least some of the data stored in the memory 158D. Likewise, the memory 158B (shown in FIG. 5) can contain at least some of the data stored in the memory 158D.

As shown in FIG. 6B, the memory 158D can include one or more of the following: an application 164, program instructions 166, a table 168, symbols 170, credits 410, sounds 174, animations 175, communications 176, registration data 177, a GUI 178, results 420, a prize schedule 421, or images 422. Aspects of the description of the application 164, the program instructions 166, the table 168, the symbols 170, the sounds 174, the animations 175, the communications 176, the registration data 177, and the GUI 178 throughout this application are applicable to those same numbered items within the memory 158D.

The credits 410 can include a number of credits available for a player. The number of credits can be referred to as a credit value. If the credits 410 are stored in the memory 158D, the credits can include a number of credits available for a user of the computing system 140B. If the credits 172 are stored in the memory 158A, the credits can include a respective number of credits available for a user of a respective computing system arranged like the computing system 140B. A processor can update the credits available for each player-based prizes awards earned by use of the computing system by that player or credits purchased by the player. The credit value can be output on the display 148, 148A, 148B. The number of credits can represent a number of smartPLAY credits. In at least some embodiments, the credit value can be based upon a quantity of credits based on AMOEs received by a player.

The results 420 include blocks of results generated to play out a non-gambling game in accordance with the example embodiments. The results 420 can include blocks of results that have been played out prior to being discarded (e.g., deleted), blocks of results currently being played out, and/o block of results yet to be played out. The results 420 can include blocks of results that have been abandoned in lieu of a refreshed block of results. The results 420 can include a unique block number corresponding to each block stored in the results 420. The results 420 can include a date corresponding to each block stored in the results 420. As an example, the date can include an expiration date indicating when the block of results can be deleted from the results. As another example, the date can indicate a date when the block of results was played out so that a processor can determine when the block of results can be deleted from the results. As yet another example, the results can include results like the results shown in the table 515, 516, 517 shown in FIG. 49 to FIG. 51.

The prize schedule 421 can include a payout schedule as shown in the payout 228 shown in FIG. 14 to FIG. 19 and/or the payout data 508 shown in FIG. 48. Other examples of a prize schedule are also possible.

The images 422 can include one or more images, such as one or more images captured by the camera 167, 167A, 167B. As an example, the images 422 can include an image captured by the computing system while the non-gambling game is being played. As another example, the images 422 can include an image captured during registration of a player. As yet another example, the images can include biometric data stored for a player and for testing whether the player of the non-gambling game is a human.

Figure 6C:
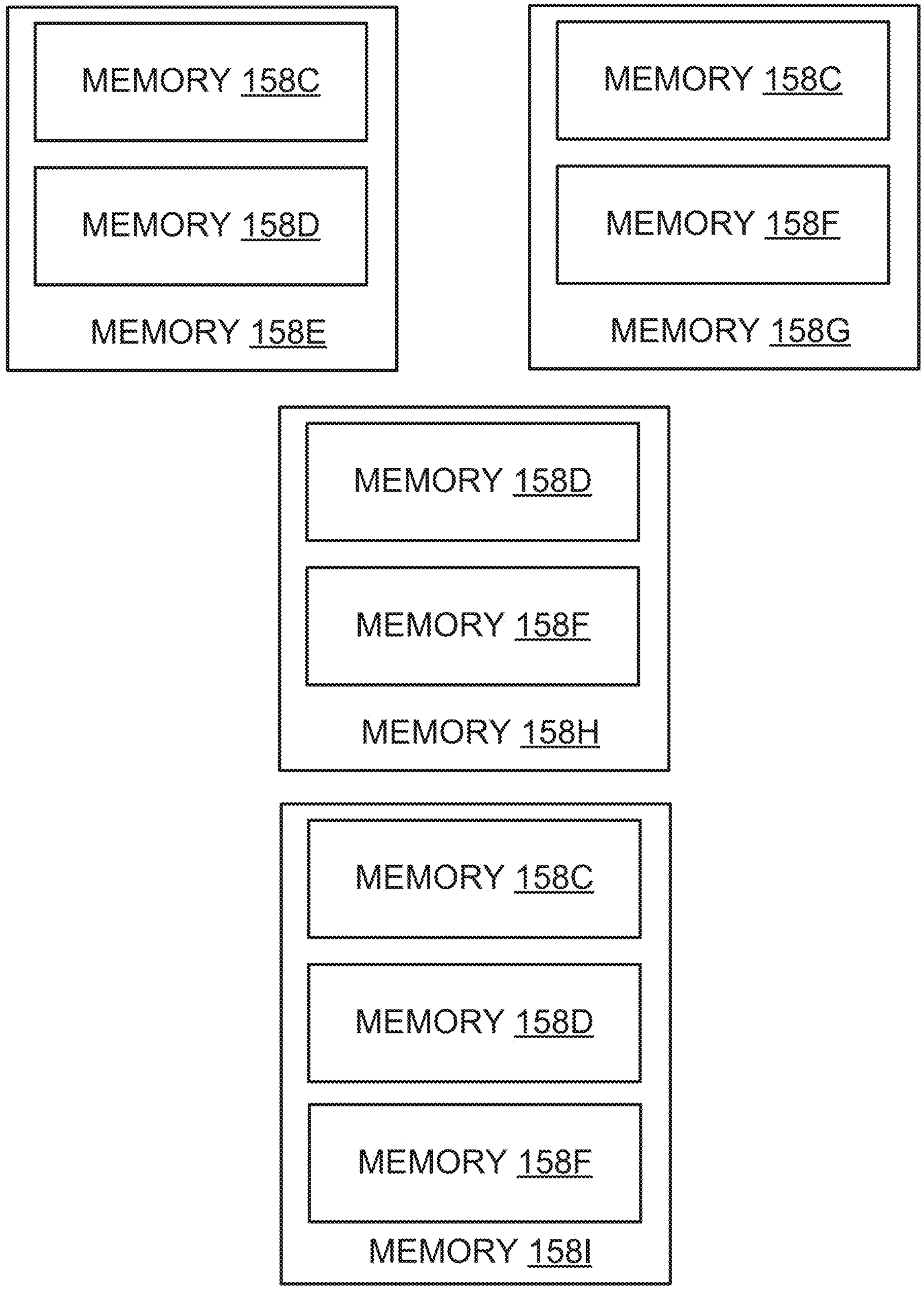

Next, FIG. 6C shows the memory 158E, 158G, 158H, 158I. The memory 158E includes any or all content of the memory 158C (shown in FIG. 6A) and any or all content of the memory 158D (shown in FIG. 6B). In accordance with at least some embodiments, the memory 158E is arranged as and/or or includes a single integrated memory. In accordance with at least some other embodiments, the memory 158E is arranged as and/or or includes a distributed memory comprising two or more distributed memory devices.

Figure 54:
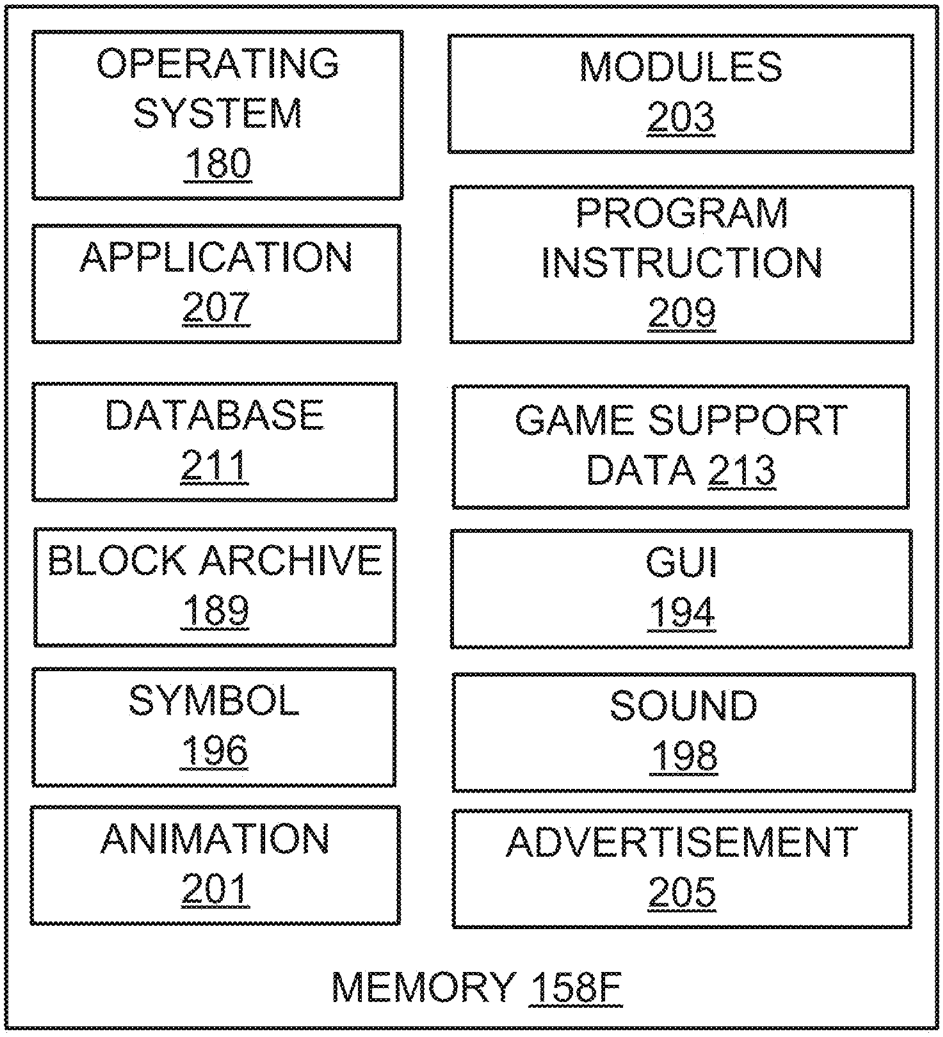
FIG. 54 shows data stored in a memory, in accordance with one or more example embodiments.

The memory 158G includes any or all content of the memory 158C (shown in FIG. 6A) and any or all content of the memory 158F (shown in FIG. 54). In accordance with at least some embodiments, the memory 158G is arranged as and/or or includes a single integrated memory. In accordance with at least some other embodiments, the memory 158G is arranged as and/or or includes a distributed memory comprising two or more distributed memory devices.

The memory 158H includes any or all content of the memory 158D (shown in FIG. 6B) and any or all content of the memory 158F (shown in FIG. 54). In accordance with at least some embodiments, the memory 158H is arranged as and/or or includes a single integrated memory. In accordance with at least some other embodiments, the memory 158H is arranged as and/or or includes a distributed memory comprising two or more distributed memory devices.

The memory 158I includes any or all content of the memory 158C (shown in FIG. 6A), any or all content of the memory 158D (shown in FIG. 6B), any or all content of the memory 158F (shown in FIG. 54). In accordance with at least some embodiments, the memory 158I is arranged as and/or or includes a single integrated memory. In accordance with at least some other embodiments, the memory 158I is arranged as and/or or includes a distributed memory comprising two or more distributed memory devices.

b. Example GUIs

Figure 9A:
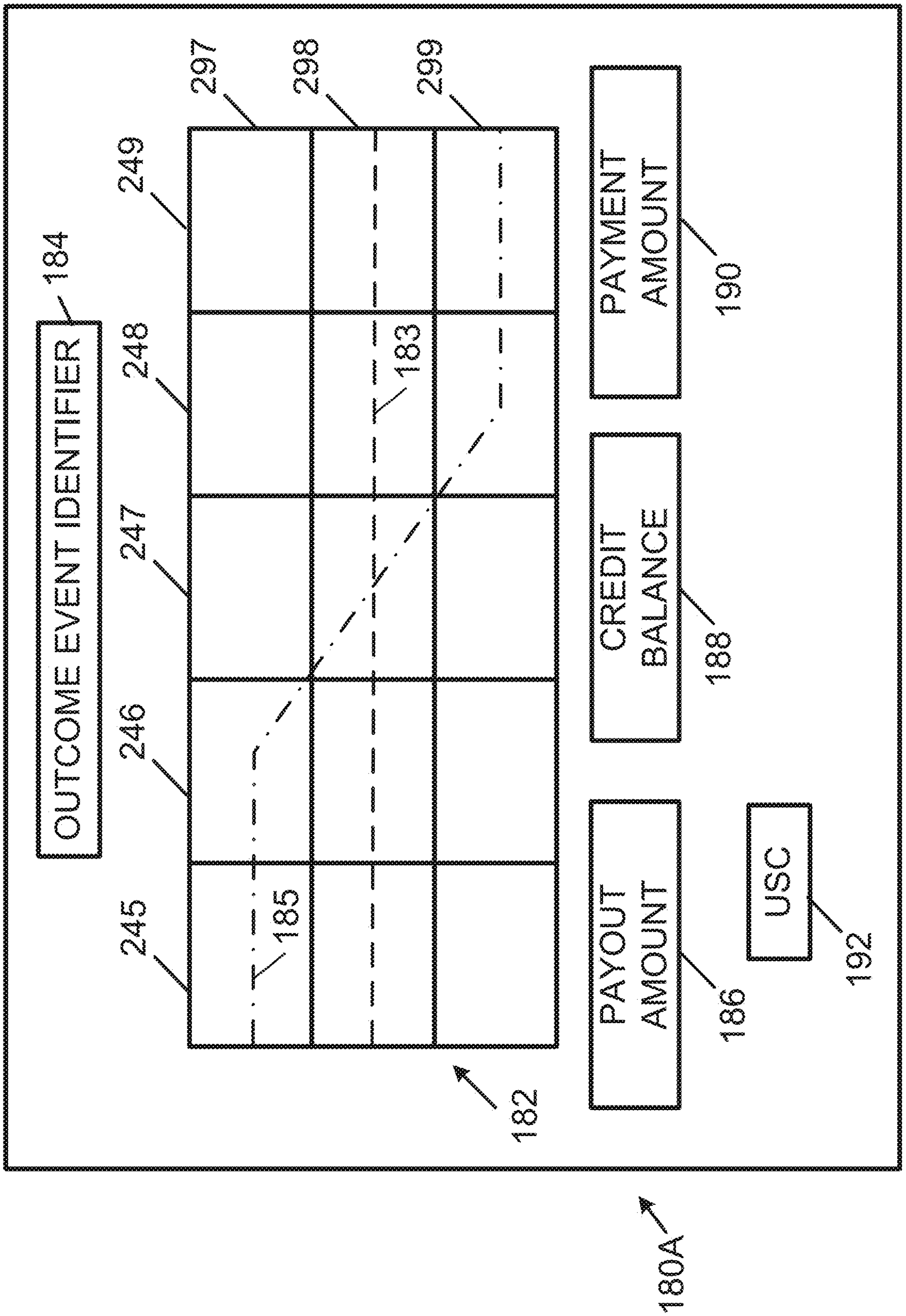
FIG. 9A, FIG. 9B, FIG. 9C, FIG. 9D, and FIG. 9E are simplified illustrations of a graphical user interface (GUI) game page, in accordance with example embodiments.

Next, FIG. 9A depicts a GUI 180A that a computing system (e.g., the computing system 140, 140B) can present on a display (e.g., the display 148, 148B). For purposes of this description, each element of the GUI 180A can be a displayable element of the GUI 180A. One or more of the displayable elements can include a static element that does not change. One or more of the displayable elements can include a dynamic element that is configured to be modified. A processor can determine how the dynamic element is to be changed. In some implementations, a change to the dynamic element can be based on a user input and/or an output of a random number generator.

The GUI 180A includes a symbol-display-portion 182, an outcome event identifier 184, a payout amount indicator 186, a credit balance indicator 188, and a payment amount indicator 190. The GUI 180A can also include one or more user-selectable controls (USCs), such as a USC 192 selectable to input a start input and/or to trigger a spinning of reels represented by the symbol-display-portion 182. A symbol-display-portion can be referred to as a symbol display.

The symbol-display-portion 182 can include multiple symbol-display-segments and multiple symbol positions. As an example, the symbol-display-segments can include vertical symbol-display-segments 297, 298, 299 and/or horizontal symbol-display-segments 245, 246, 247, 248, 249. A person skilled in the art will understand that those symbol-display segments can be configured variety of different ways. The symbol-display-portion 182 can be referred to as a symbol matrix or, more simply, a matrix. Each column of symbol-display segments can be arranged as a respective reel. FIG. 9A depicts a payline/payway 183, 185 in accordance with the example embodiments. In at least some embodiments, a slots game can result in a win if three symbols along a payline/payway match a set of symbols in a pay table. Other examples of paylines or pay way within the symbol-display-portion 182 or examples of winning arrangements of symbols are also possible.

The horizontal symbol-display-segments 245, 246, 247, 248, 249 can be used if reels spin from top-to-bottom or from bottom-to-top. The vertical symbol-display-segments 297, 298, 299 can be used if reels spin from left-to-right or from right to left.

The processor of a computing system described in this disclosure can determine an operating state of the computing system and/or an outcome event that can occur during the determined operating state. In response to making those determination(s), the processor can cause the outcome event identifier 184 to display an identifier of the outcome event (e.g., a loss or a win of one or more raffle tickets) that can occur during the determined state. For example, the outcome event identifier 184 can identify a game outcome event where a previously uncertain event outcome (e.g., a pattern of symbols on a video slot game) has become certain.

The processor of a computing system described in this disclosure can determine one or more of the following: (i) a payment amount (e.g., a quantity of sweeps coins) entered to perform an outcome event, (ii) an award (e.g., a quantify of raffle tickets won during occurrence of an outcome event resulting in a win), or (iii) a credit balance (e.g., a quantity of sweeps coins or raffle tickets) after the turn of a game. The processor can cause the determined payout amount to be displayed by the payout amount indicator 186, the determined credit balance to be displayed by the credit balance indicator 188, and the determined payment amount to be displayed by the payment amount indicator 190.

In at least some embodiments, a memory (e.g., the memory 158, 158A, 158B) can include a pay table. Moreover, in at least some of those embodiments, a processor (e.g., the processor 156, 156A, 156B) can read at least a portion of the pay table within the memory. In at least some embodiments, the processor can output at least a portion of the table on a user interface (e.g., the user interface 144, 144A, 144B). The pay table can indicate various sets or combinations of symbols that are defined as a winning outcome and an award or payout corresponding to each winning outcome.

An award corresponding to one or more of the winning outcomes can include an award of one or more credits (e.g., raffle tickets) added to a credit meter balance (another type of payout device) contained in a memory for a user using the computing system 140B.

The GUI 180A can include one or more user-selectable controls (USCs). Activation of a USC by a player can cause the processor 156B and/or another component of the computing system 140B to perform one or more functions. As an example, selection of the USC 192 can cause the processor 156B to transmit a spin request and/or a communication including a spin request. As another example, selection of the USC 192 can cause the processor 156B to receive a start input to initiate performance of a game. The computing system 140B can perform multiple instances of a game until the processor determines an outcome event for an instance of the game includes a winning combination on a payline or payway.

Figure 9B:
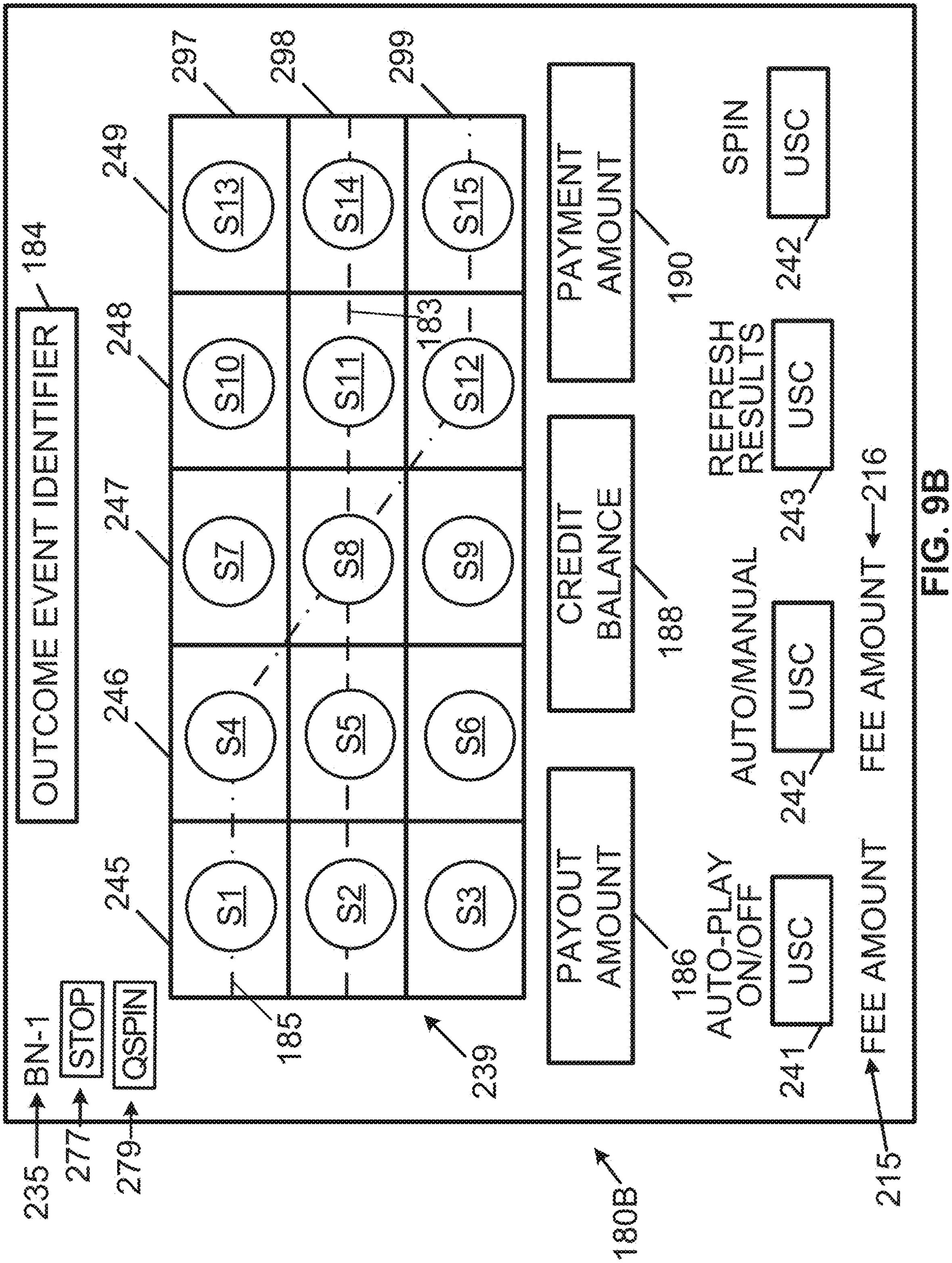

Next, FIG. 9B depicts a GUI 180B that a computing system (e.g., the computing system 140, 140B) can present on a display (e.g., the display 148, 148B). The GUI 180B includes the outcome event identifier 184, the payout amount indicator 186, the credit balance indicator 188, and the payment amount indicator 190. The description of those aspects described with respect to FIG. 9A are applicable to like-numbered aspects in FIG. 9B. Additionally, the GUI 180B includes a symbol-display-segment 239 and a USC 241, 242, 243, 244, 277, 279. The GUI 180B includes a block number 235 corresponding to a block of results selected for computing system to play out the non-gambling game.

The symbol-display-segment 239 is a portion of the GUI 180B at which animations for each played out result of a block of results is displayed. That portion of the GUI 180B can be defined as a quantity of specific pixels corresponding to pixels of the display 148, 148B. The quantity of pixels can be specified using column and row numbers of pixels.

The symbol-display-segment 239 can display an animation for a result of a video slots game. Accordingly, the symbol-display-segment 239 can include and/or be arranged like the symbol-display-portion 182, such that the symbol-display-segment 239 includes the payline/payway 183, 185, the vertical symbol-display-segments 297, 298, 299, and the horizontal symbol-display-segments 245, 246, 247, 248, 249, described above with respect to FIG. 9A.

In accordance with at least some embodiments, the horizontal symbol-display-segments 245, 246, 247, 248, 249 can show reels that spin and then stop for each result. After stopping, the horizontal symbol-display-segments 245 displays a symbol S1, S2, S3, the horizontal symbol-display-segments 246 displays a symbol S4, S5, S6, the horizontal symbol-display-segments 247 displays a symbol S7, S8, S9, the horizontal symbol-display-segments 248 displays a symbol S10, S11, S12, and the horizontal symbol-display-segments 249 displays a symbol S13, S14, S15. As an example, the symbols S1 to S3, the symbols S4 to S6, the symbols S7 to S9, the symbols S10 to S12, and the symbols S13 to S15 for each result can include a subset of symbols on a reel, such as a reel 218, 220, 222 shown in FIG. 13, a reel described with respect to Table B below, or a symbol otherwise selected from the symbols 170.

A person skilled in the art will understand that the symbol-display-segment 239 can include a different quantity of horizontal or vertical symbol display segments. As an example, the symbol-display-segment 239 can include a three-by-three matrix of symbol display segments (e.g., three columns and three rows of display segments) or a three-by-one matrix of display segments (e.g., three columns and one row of display segments).

The USC 241 can be configured to select whether results of a non-gambling game operating in the manual play-out mode is set to auto-play on or auto-play off. When the auto-play is set to on, the results of a block of results can be played out after a single selection of the USC 244. When the auto-play is set to off, each result of a block of results can be played out after each respective selection of the USC 244. In accordance with at least some embodiments, a fee (e.g., a smartPLAY credit) is charged to use the auto-play on mode. Accordingly, a GUI including the USC 241 can include a fee indicator 215 to indicate an amount of that fee. In accordance with at least some other embodiments, no fee is charged to use the auto-play on mode. In such embodiments, the GUI including the USC 241 may not include the fee indicator 215.

The USC 242 can be configured to select whether a non-gambling game is played in a manual mode or an automatic mode. As an example, the USC 242 can be configured to include text or be located proximate to indicate manual mode while the non-gambling game is being performed in the automatic mode and to include text or be located proximate to indicate automatic mode while the non-gambling game is being performed in the manual mode. The payment amount indicator 190 can indicate an amount to be deducted from an amount of credits indicated by the credit balance indicator 188 if the automatic mode is selected using the USC 242. In accordance with at least some embodiments, a fee is charged to use the automatic mode. Accordingly, a GUI including the USC 242 can include a fee indicator 216 to indicate an amount of that fee. In accordance with at least some other embodiments, no fee is charged to use the automatic mode. In such embodiments, the GUI including the USC 242 may not include the fee indicator 216.

The USC 243 can be configured to select a refresh results option. For example, if the non-gambling game is playing out in a manual mode for a block of results, prior to playing out the block of results in its entirety, selection of the USC 243 can cause a processor to generate and/or provide a new block of results for playing out on the computing system 140, 140A, 140B. As an example, the USC 243 can include or be located proximate to text to indicate "refresh results" or some other text or symbol indicative of the refresh results option.

The USC 244 can be configured to select a play option (e.g., a spin option). In response to selecting the USC 244, the processor can output an animation based on one or more results of the block of results.

The USC 277 is selectable to stop play-out of the non-gambling game. In accordance with at least some embodiments, selection of the USC 277 once pauses play-out of the non-gambling game and selection of the USC 277 while play-out is paused ends the non-gambling game. In at least some of those embodiments, ending the non-gambling game stops the application on the computing system.

The USC 279 is selectable to toggle a quick-spin option on or off. With the quick-spin option on, a length of time between each spin result is less than a length of time between each spin result with the quick-spin option off. In accordance with at least some embodiments, the USC 279 can be configured to adjust the length of time between each spin result with the quick-spin option on.

Figure 9C:
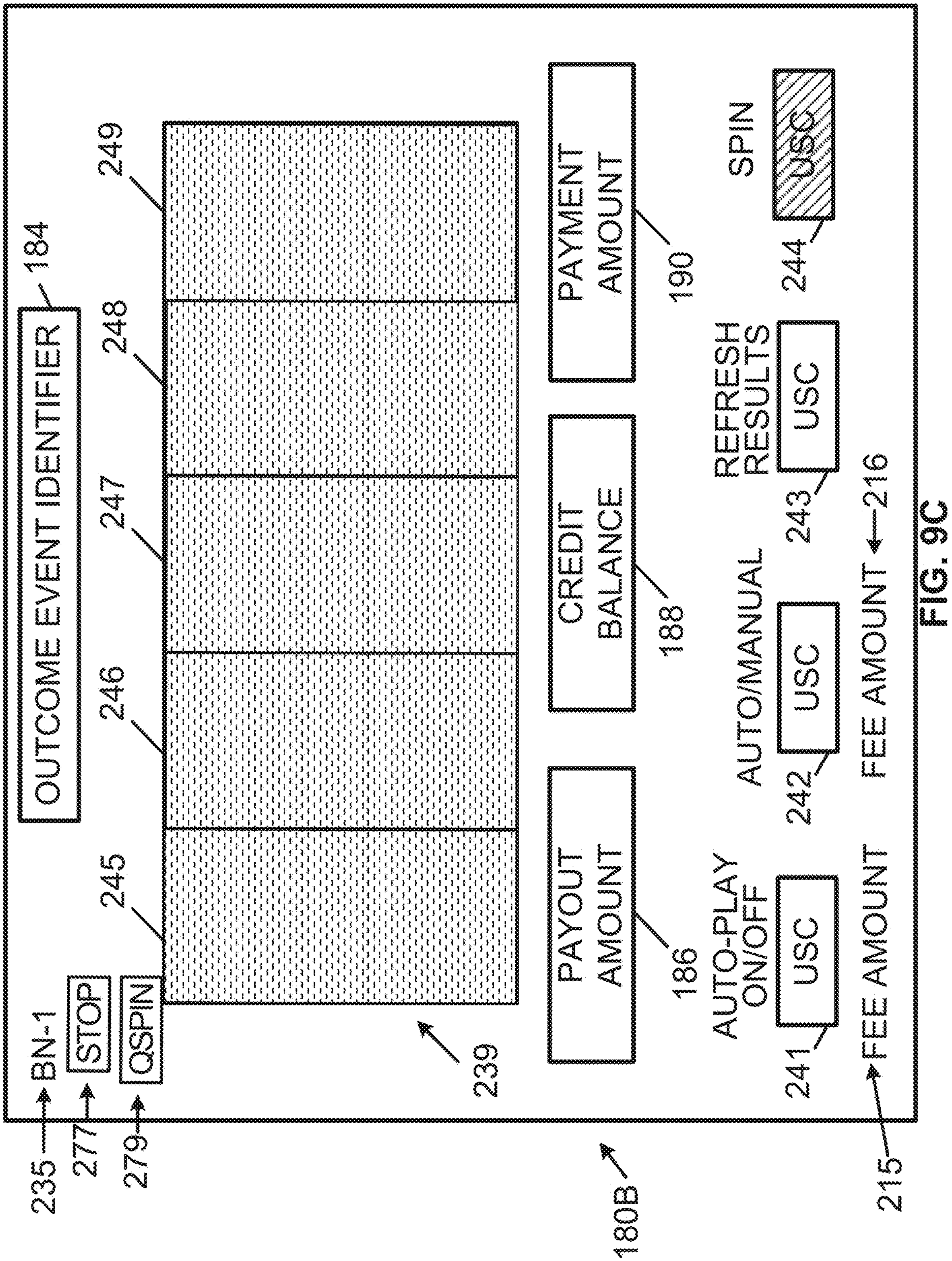

Next, FIG. 9C depicts another view of the GUI 180B. This view represents reels spinning within the horizontal symbol-display-segments 245, 246, 247, 248, 249. In other words, this view represents the GUI 180B displaying an animation, such as an animation of spinning reels. When the reels stop spinning, the GUI 180B can appear as shown in FIG. 9B, although one or more of the symbols S1 to S15 can be different than what was displayed for those one or more symbols before the reels were spun.

Additionally, in FIG. 9C, the USC 244 is shown with shading to represent that the USC 244 is inactive. In some embodiments, the USC 244 is deactivated while the animation of spinning reels is displayed. In some embodiments, the USC 244 can remain deactivated after the animation of spinning reels is displayed for a particular amount of time, such as an amount of time counted by the count module 54 (shown in FIG. 54). In FIG. 9B, the USC 244 is shown without shading to represent the USC 244 is active. When active, the USC 244 can be selected to initiate playout of a next result of a block of results. In at least some embodiments, the particular amount of time can be modified using the USC 279.

Figure 9D:
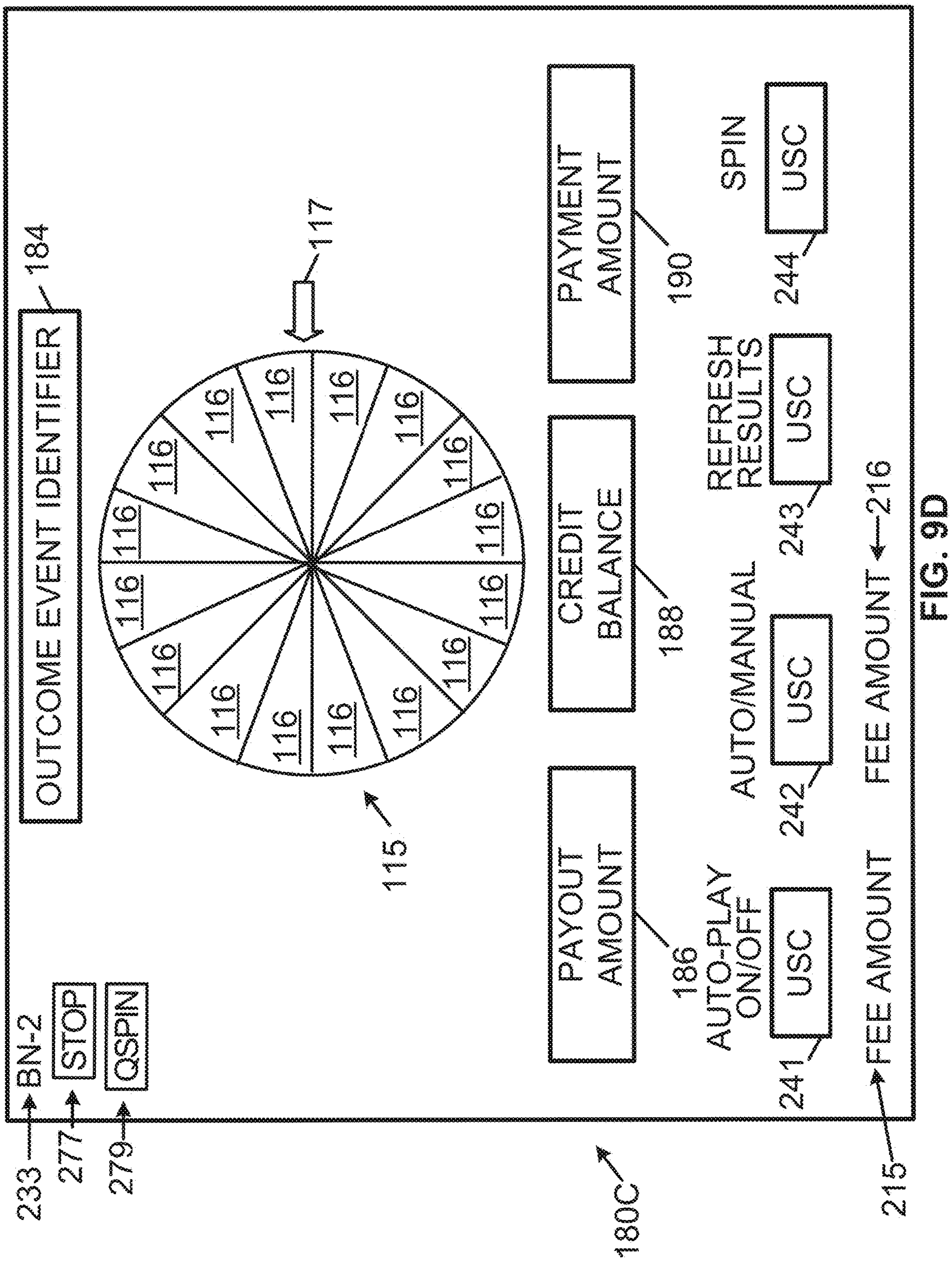

Next, FIG. 9D depicts a GUI 180C that a computing system (e.g., the computing system 140, 140B) can present on a display (e.g., the display 148, 148B). The GUI 180C includes the outcome event identifier 184, the payout amount indicator 186, the credit balance indicator 188, and the payment amount indicator 190. The description of those aspects described with respect to FIG. 9A are applicable to like-numbered aspects in FIG. 9D. The GUI 180C also includes the USC 241, 242, 243, 244, 277, 279. The description of those aspects described with respect to FIG. 9B are applicable to like-numbered aspects in FIG. 9D. Additionally, the GUI 180C includes an animation display segment 115. The GUI 180C includes a block number 233 corresponding to a block of results selected for computing system to play out the non-gambling game.

The animation display segment 115 is a portion of the GUI 180C at which animations for each played out result of a block of results is displayed. That portion of the GUI 180C can be defined as a quantity of specific pixels corresponding to pixels of the display 148, 148B. The quantity of pixels can be specified using column and row numbers of pixels.

The animation display segment 115 can display an animation for a result of a video prize wheel game or a video roulette game. The animation display segment 115 includes multiple instances of an indicator segment 116. FIG. 9D shows sixteen instances of the indicator segment 116. The GUI 180C includes an indicator segment selector 117 to indicate which of the multiple instances of the indicator segment selector 117 is the indicator segment 116 selected for a result of the block of results.

For a video roulette game, a person having ordinary skill in the art will understand that the animation display segment 115 may include an many instances of the indicator segment 116 as needed to show a respective number on a typical roulette wheel, such as a standard European roulette wheel including the numbers 0 to 36 or a standard American roulette wheel including the numbers 0, 00 and 1 to 36.

Likewise, for a video prize wheel game, a person having ordinary skill in the art will understand that the animation display segment 115 may include an many instances of the indicator segment 116 as needed to show a selected quantity of prizes and/or a selected quantity of non-prizes (e.g., a multiplier value, a bankrupt indicator).

Figure 9E:
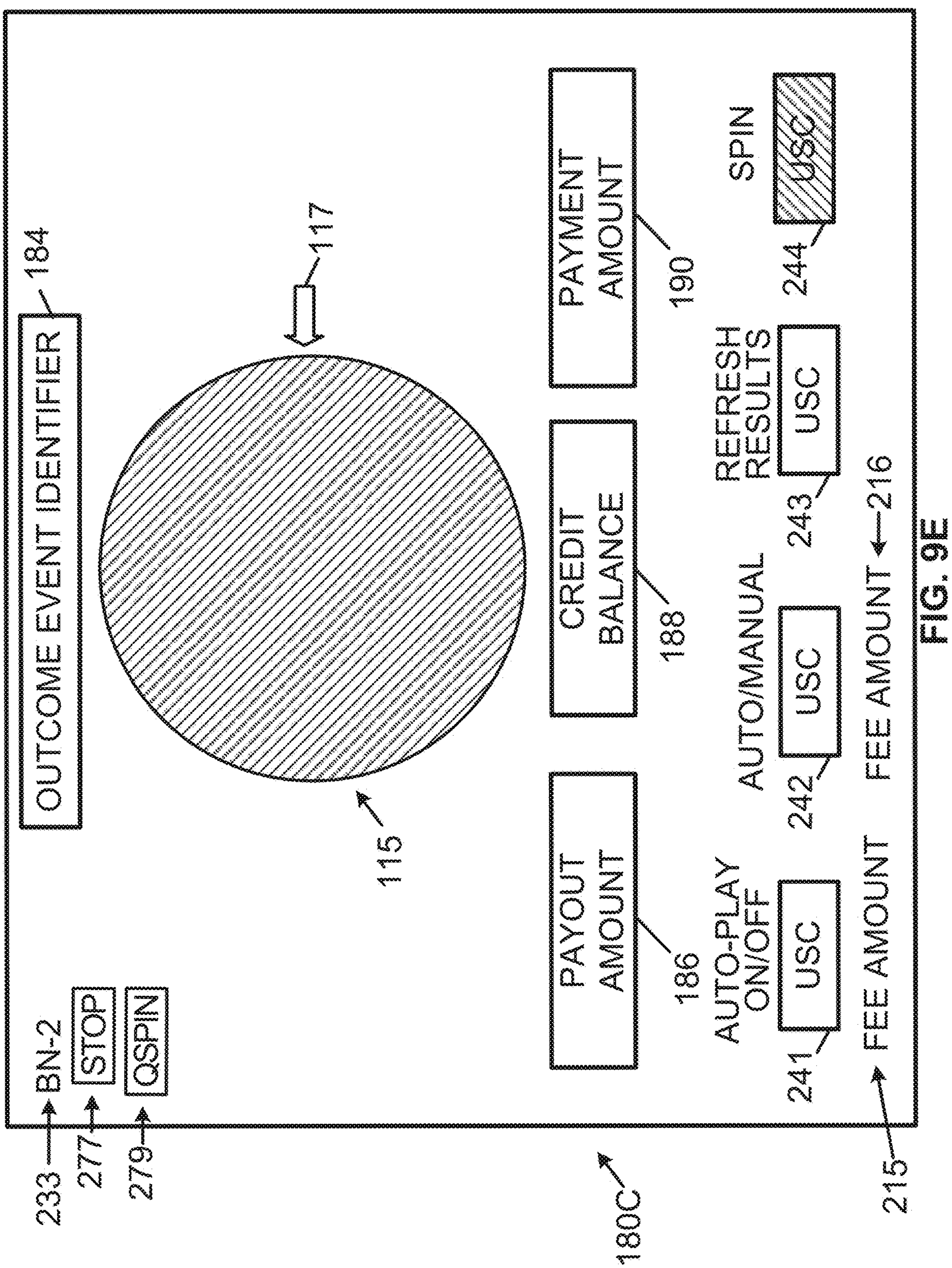
Figure 10:
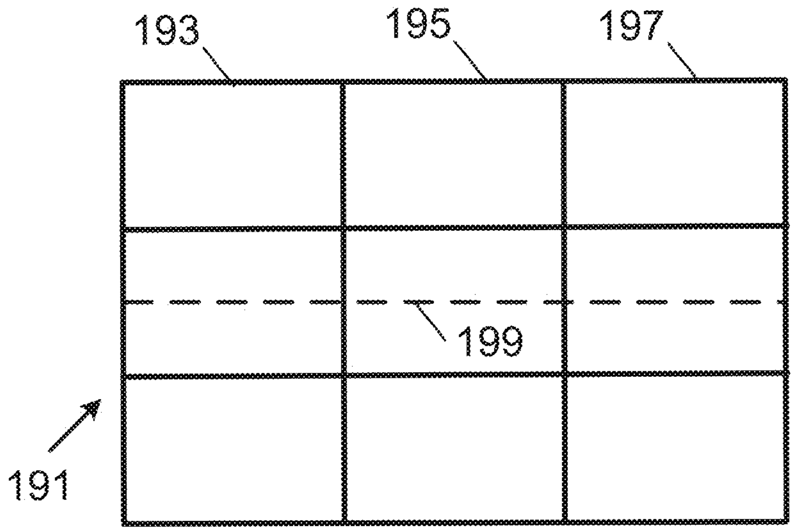
FIG. 10 shows a symbol-display-portion, in accordance with example embodiments.

Next, FIG. 9E depicts another view of the GUI 180C. This view represents a spinning prize or roulette wheel. In other words, this view represents the GUI 180C displaying an animation, such as an animation of a spinning prize or roulette wheel. When the prize or roulette wheel stops spinning, the GUI 180C can appear as shown in FIG. 9D, although the indicator segment 116 adjacent the indicator segment selector 117 can be different than the indicator segment 116 adjacent the indicator segment selector 117 before the prize or roulette wheel was spun.

Additionally, in FIG. 9E, the USC 244 is shown with shading to represent that the USC 244 is inactive. In some embodiments, the USC 244 is deactivated while the animation of spinning prize or roulette wheel reel is displayed. In some embodiments, the USC 244 can remain deactivated after the animation of spinning prize or roulette wheel reel is displayed for a particular amount of time, such as an amount of time counted by the count module 54 (shown in FIG. 54). In FIG. 9D, the USC 244 is shown without shading to represent the USC 244 is active. When active, the USC 244 can be selected to initiate playout of a next result of a block of results.

c. Modules

In at least some embodiments, the program instructions include a module of program instructions or logic executable by the processor 156, 156A, 156B to perform one or more functions of any method described in this description and/or shown in the drawings. As an example, the program instructions 166 can include one or modules of the modules 80A shown in FIG. 7A, one or more modules of the modules 80B shown in FIG. 7B, or one or more modules of the modules 80C, 80D, 80E, 80F discussed with respect to FIG. 7C. In accordance with at least some of the example embodiments, the program instructions and/or a module in the modules 80A, 80B, 80C can be written in an object oriented programming language such as Java, Python, or C++, or a functional programming language, such as the Python programming language, or a procedural programming language, such as the "C" programming language. The Python language supports object-oriented and functional programming.

Any one or more or all modules of the modules 80A can be stored in the memory 158, 158A, 158B. Any one or more or all modules of the modules 80B can be stored in the memory 158, 158A, 158B. Any one or more or all modules of the modules 80C can be stored in the memory 158, 158A, 158B.

The description of the modules refers to the computing system 132, 140, 140A, 140B executing and/or performing the modules. As noted elsewhere in this description, the computing system 140A can be referred to as a server and the computing system 140B can be referred to as a client or a client device.

Figure 7A:
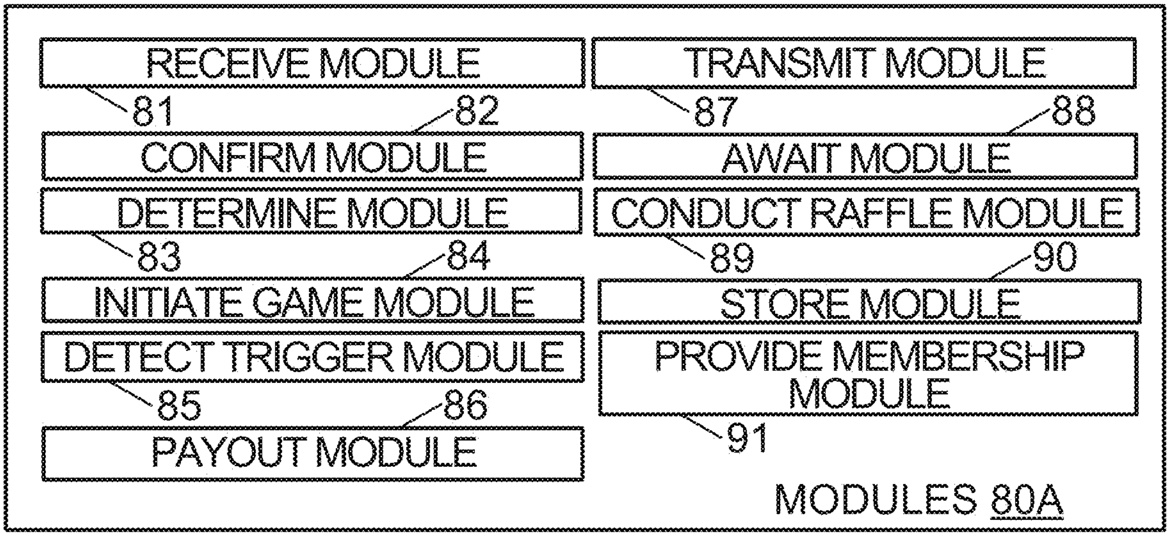
FIG. 7A, FIG. 7B, and FIG. 7C show modules, in accordance with example embodiments.

As shown in FIG. 7A, the modules 80A can include one or more of the following: a receive module 81, a confirm module 82, a determine module 83, an initiate game module 84, a detect trigger module 85, a payout module 86, a transmit module 87, an await module 88, a conduct raffle module 89, a store module 90, or a provide membership module 91. Two or more modules can be executed in combination to carry out one or more functions.

1) Receive Module

The receive module 81 can be configured to receive a communication transmitted over a communication network. The receive module 81 can be configured to receive a communication at the communication interface 142, 142A, 142B and/or at the processor 156, 156A, 156B. The receive module 81 can be configured to receive a communication transmitted over the system bus 141, 141A, 141B.

As an example, the receive module 81 can be configured to receive registration data for an individual player. Examples of the registration data are described throughout this description. The registration data can be received to register a player. The registration data can be received after the player has registered so that the player can modify a registration (e.g., change a subscription) or to notify a computing system that the player is accessing the computing system to perform a game.

As yet another example, the receive module 81 can be configured to receive data (e.g., a digital signal or an analog voltage) indicating a user-selectable control at a computing system (e.g., a USC displayed on the display 148B) has been selected. For instance, the receive module 81 can be configured to receive data indicating the USC 192 has been selected. In particular, the receive module can be configured to receive data indicating a start input has been receive or data indicating a cash-out of an award (e.g., raffle tickets and/or currency) has been selected.

As still yet another example, the receive module 81 can be configured to receive raffle ticket payout information corresponding to a registered player and his or her tier status. For instance, the raffle ticket payout information can include a payout in the payout 228 (shown in FIG. 14 to FIG. 19) corresponding a particular set of symbols that landed on a payline or payway.

As still yet another example, the receive module 81 can be configured to receive a communication including an index value transmitted by the server 104 or the computing system 140, 140A. Examples of the index value are described throughout the description. As noted, receiving an index value can be carried out more efficiently than receiving a larger quantity of data associated with the index value. The data associated with the index value can be stored in the memory 158B.

In accordance with at least some embodiments, the receive module 81 includes the receive module 52 (shown in FIG. 7B) and/or is configured to perform any function described with respect to the receive module 52.

2) Confirm Module

The confirm module 82 can be configured to confirm data received at a computing system. For example, the confirm module 82 can be configured to confirm the validity of the registration data, such as registration data transmitted from the gaming workstation 110, 112, 114 to the server 104 or from the computing system 140B to the computing system 140A. As an example, the confirm module can be configured to determine whether all required aspects of registration data have been received and are sufficient for registering a player with the gaming system 100 and prompting the player to correct or provide further data for registering the player. For instance, if the player omits providing an area or country code associated with the player's smartphone, the confirm module 82 can be configured to prompt the player to provide the omitted data.

As another example, a processor can compare registration data previously stored in the memory to registration received via a communication after the player is registered with the gaming system. For instance, the processor can compare a player name, personal information, a password or some other portion of the registration stored in the memory as the registration data 177 to like types of registration data received via the post-registration communication. provided by the player with the corresponding information held in memory. As another example, the computing system can employ two-factor verification, sending a text message to a mobile phone number found in memory and, upon receiving a responsive affirmation from the mobile phone, confirm the identity of the player.

3) Determine Module

The determine module 83 can be configured to determine whether registration data corresponds to an individual player at a base tier or a premium tier. As an example, the determine module 83 can compare a player identifier for a player requesting to play a game via the computing system to player identifiers in the registration data 177 and upon determining a match, determining which tier corresponds the player identifier in the registration data 177 that matches the player identifier for the player requesting to play the game. If the processor determines the registration data corresponds to the premium tier, the processor determines which premium tier corresponds to the registration data if more than one premium tier is available. Additionally, the determine module 83 can be configured to determine a membership subscription for the player is active and to prompt the player to update the membership subscription (e.g., pay a membership fee) to become active again if the subscription is current inactive.

4) Initiate Game Module

The initiate game module 84 can be configured to initiate a game operation according to an applicable tier status (e.g., a base, bronze, silver, gold, or black tier status corresponding to the individual player). As an example, the game can include a video slot game and initiating the game operation can include spinning reels containing symbols. Subsequently, the initiate game module 84 can cause the reels to stop spinning so that a particular combination of symbols lands on a payline or payway. As another example, the game can include a video roulette game and initiating the game operation can include spinning the roulette wheel. Subsequently, the initiate game module 84 can cause the roulette wheel to stop with a roulette ball located with a pocket of the roulette wheel. As yet another example, the game can include a video prize wheel game and initiating the game operation can include spinning the prize wheel. Subsequently, the initiate game module 84 can cause the prize wheel to stop with a particular position of the prize wheel located at a prize wheel position indicator.

5) Detect Trigger Module

The detect trigger module 85 can be configured to detect a trigger event, wherein an outcome of the event changes from uncertain to certain. As an example, the detect trigger module 85 can be configured to use an RNG to determine an outcome of the game and to select an animation to output on a display to show performance of the game, as well as whether the outcome, once certain, represents a winning outcome. As another example, the detect trigger module 85 can be configured to detect the trigger event by determining a number using the RNG corresponds to a stop position for each reel 218, 220, 222 within the symbol-display-portion 191. As another example, the detect trigger module 85 can be configured to detect the trigger event by detecting a pattern of symbols within the symbol-display-portion 182, 191 has become fixed. As another example, the detect trigger module 85 can be configured to detect the trigger even by determining a number corresponding to a pocket on a roulette wheel in which a roulette ball lands or will land based on an animation selected for a roulette game. As yet another example, the detect trigger module 85 can be configured to detect the trigger event by determining a position of a prize wheel at which the prize wheel will stop in proximity to a prize wheel position indicator.

6) Payout Module

The payout module 86 can be configured to make a payout determination for a game. As an example, the payout module 86 can be configured to determine the payout by referring to a pay table (e.g., a pay table in one of FIG. 14 to FIG. 19) and determining whether the symbols that landed on a payline or payway of a video slot game match an outcome description in the pay table. If the payout module determines a match to the outcome description, the payout module 86 can determine the payout that corresponds to the matching outcome description. As another example, for a video roulette game, the payout module 86 can be configured to determine the payout by referring to a pay table for a roulette game and to one or more numbers on the roulette wheel selected by a player. As yet another example, for a video prize wheel game, the payout module 86 can be configured to determine a payout represented on a prize wheel at a position of the prize wheel that stopped at a prize wheel position indicator.

7) Transmit Module

The transmit module 87 can be configured to transmit a communication over a communication network. The transmit module 87 can be configured to transmit a communication via the communication interface 142, 142A, 142B and/or via the processor 156, 156A, 156B. The transmit module 87 can be configured to transmit a communication over the system bus 141, 141A, 141B. The communication can include data and/or an instruction such that transmitting the communication can be referred to a transmitting data or transmitting an instruction.

As an example, the transmit module 87 can be configured to transmit data on any payout (e.g., a raffle payout) to a payout device, such as the payout device 160, 160A, 160B. In at least some embodiments, the payout for a player having a base tier membership can indicate a quantity of raffle tickets, whereas the payout for a player having a premium tier membership can indicate a quantity of raffle tickets and/or a monetary amount. As an example, the data on the payout can be contained within an HTTP communication.

As still yet another example, the transmit module 87 can be configured to transmit a communication including an index value transmitted to a computing system 140B or the gaming workstation 110, 112, 114. Examples of the index value are described throughout the description. As noted, transmission of an index value can be carried out more efficiently than transmitting a larger quantity of data associated with the index value.

In accordance with at least some embodiments, the transmit module 87 includes the transmit module 64 (shown in FIG. 7B) and/or is configured to perform any function described with respect to the transmit module 64.

8) Await Module

The await module 88 can be configured to await a predetermined interval. The predetermined interval can be temporal, such as a 15, 30, or 60 minute interval. The await module can implement a timer to track an amount of time since the most-recently performed raffle was performed. Alternatively, the predetermined interval can be distribution-based, such as the distribution of a threshold quantity of raffle tickets since the most-recently performed raffle was conducted. The await module 88 can implement a counter to count the distributed threshold tickets. Completion of the time interval or distributing the threshold number of tickets can trigger execution of the conduct raffle module 89.

9) Conduct Raffle Module

The conduct raffle module 89 can be configured to conduct a raffle. As an example, the conduct raffle module 89 can be configured to select one or more raffle tickets from a pool of raffle tickets based on raffle tickets distributed since a prior raffle was conducted. In accordance with the raffle ticket pool 163 shown in FIG. 8, the conduct raffle module 89 can be configured to select one of the raffle ticket 1000 to raffle ticket 1027 as the winning raffle ticket. As another example, the conduct raffle module 89 can be configured to select a winning raffle ticket of a second-chance raffle based on at least a portion of the pool of raffle tickets after a winning raffle ticket has already been selected form the pool as a winning raffle ticket.

In at least some embodiments, the conduct raffle module 89 can use an RNG to select the winning raffle ticket by selecting a ticket count corresponding to the raffle ticket. In at least some other embodiments, the conduct raffle module 89 can use an RNG to select the winning raffle ticket by selecting a raffle ticket identifier from the raffle ticket identifiers for the pool of raffle tickets.

10) Store Module

The store module 90 can be configured to store data into a memory (i.e., write data into the memory 158, 158A, 158B). As an example, the store module 90 can be configured to store data into volatile memory in response to receiving the data and then writing the data into non-volatile memory in response to a USC selectable to save the data. As another example, the store module 90 can be configured to store a tier status associated with the individual player. In accordance with at least some embodiments, storing the tier status can include storing data that indicates the tier status is a base, bronze, silver, gold or black tier status, and storing the tier status can be stored within the registration data 177.

11) Provide Membership Module

The provide membership module 91 can be configured to provide a membership subscription. As an example, the provide membership module 91 can be configured to provide the membership subscription requested by a player. If the requested subscription is a base tier, the provide membership module 91 can provide a base tier level subscription without any payment. Alternatively, if the requested subscription is a premium tier, the provide membership module 91 can provide a premium tier level subscription in response to receiving a proscribed payment. As another example, the provide membership module 91 can be configured to request the store module 90 to store data in the registration data 177 that indicates the player is associated with the applicable membership subscription.

While one or more disclosed functions have been described as being performed by certain computing systems. (e.g., the computing system 140, the computing system 140A, or the computing system 140B), one or more of the functions can be performed by any entity, including but not limited to those described in this disclosure. As such, while this disclosure includes examples in which the computing system 140A performs select functions and sends data to the computing system 140B, such that the computing system 140B can perform complementing functions and receive the data, variations to those functions can be made while adhering to the general server-client dichotomy and the scope of the disclosed machines, computing systems, and methods.

For example, rather than the computing system 140A sending select data (e.g., a symbol set) to the computing system 140B, such that the computing system 140B can generate and display appropriate images, the computing system 140A can generate the images and send them to the computing system 140B for display. Indeed, it will be appreciated by one of ordinary skill in the art that the "break point" between the server computing system's functions and the client computing system's functions can be varied.

As noted above, in at least some embodiments, a slots game can result in a win if three symbols along a payline/payway match a set of symbols in a pay table. In at least some of those embodiments, the slots game can output the symbols in a symbol-display-portion 191 shown in FIG. 10. The symbol-display-portion 191 includes a column 193, 195, 197 for outputting symbols of a reel 218, 220, 222 shown in FIG. 13. The symbol-display-portion 191 includes nine symbol positions and a payline or payway 199. The symbol-display-portion 182 shown in FIG. 9A can be replaced with the symbol-display-portion 191.

Figure 7B:
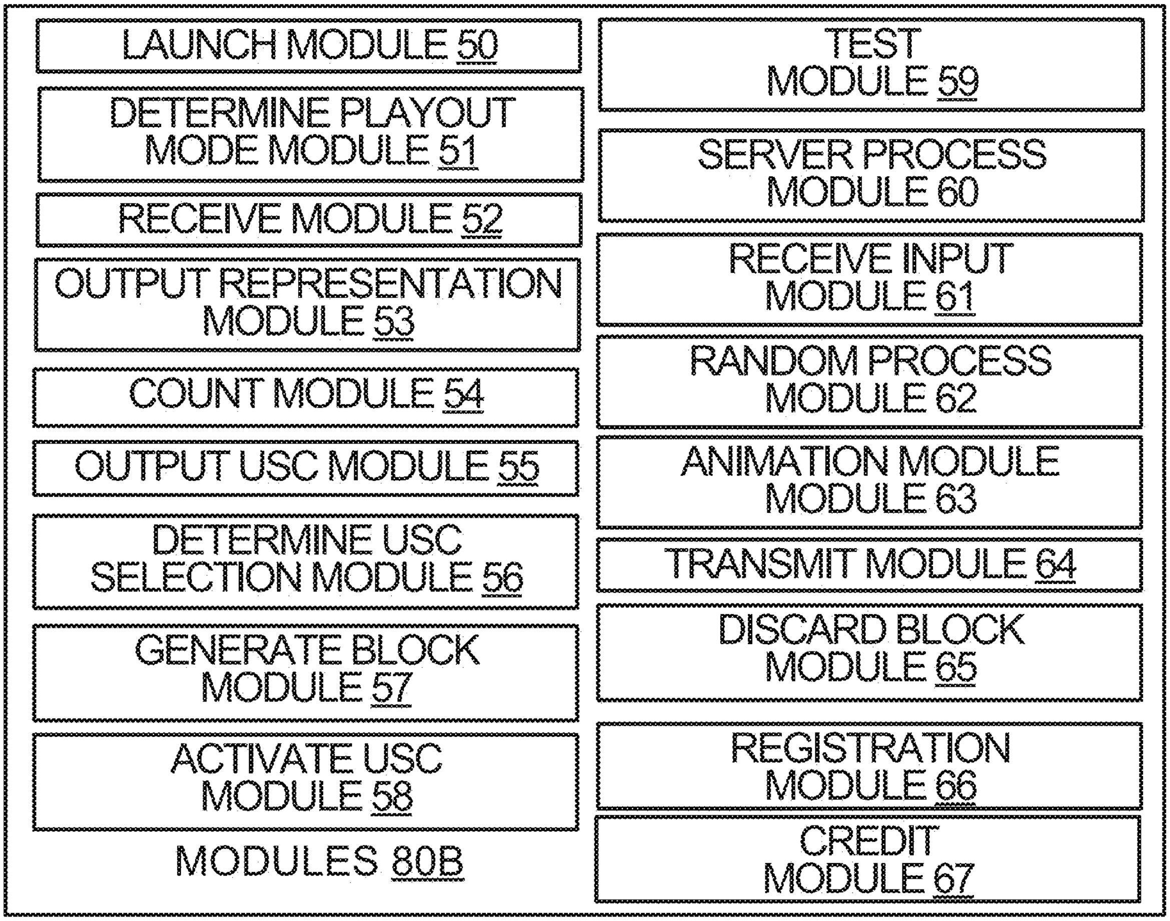

Next, as shown in FIG. 7B, the modules 80B can include one or more of the following: a launch module 50, a determine playout mode module 51, a receive module 52, an output representation module 53, a count module 54, an output USC module 55, a determine USC selection module 56, a generate block module 57, an activate USC module 58, a test module 59, a server process module 60, a receive input module 61, a random process module 62, an animation module 63, a transmit module 64, a discard block module 65, a registration module 66, or a credit module 67. Two or more modules can be executed in combination to carry out one or more functions.

12) Launch Module

The launch module 50 can be configured to launch an application to play a non-gambling game. As an example, the processor 156, 156A, 156B can launch the application. The application can be stored in a memory, such as the memory 158, 158A, 158B, 158C, 158D, 158E. In accordance with at least some embodiments, launching the application results in outputting a USC on a display. In accordance with at least some embodiments, the non-gambling game comprises a video slots game, a video prize wheel game, or a video roulette game.

Launching the application can include loading the application from a memory where the application is stored before being launched into RAM. The application loaded into RAM can include program instructions, static data, and an initial stack space for function calls and local variables. Launching the application can include a shared library or a dynamic link library the application uses during execution. Launching the application can include initiating execution of the program instructions at an entry point of the program instructions. Launching the application can include outputting a GUI (e.g., an initial GUI of the application).

In accordance with at least some embodiments, the launch module 50 can be configured to terminate play of the non-gambling game. As an example, the launch module 50 can terminate play of the non-gambling game in response to the computing system 140B receiving an instruction to end playing the non-gambling game via execution of the transmit module 64. As another example, the launch module 50 can be configured to terminate play of the non-gambling game and then relaunch the application to play the non-gambling game based on a refreshed block of results. As another example, the launch module 50 can be configured to terminate play of the non-gambling game by executing an instruction to close the application.

13) Determine Playout Mode Module

The determine playout mode module 51 can be configured to determine whether a playout mode of the non-gambling game is a manual mode or an automatic mode. In other words, the determine playout mode module 51 can be configured to determine the playout mode of the non-gambling game is the manual mode. Based on that determination, the determine playout mode module 51 can be configured to implicitly determine the playout mode of the non-gambling game is not the automatic mode. Alternatively, the determine playout mode module 51 can be configured to determine the playout mode of the non-gambling game is the automatic mode. Based on that determination, the determine playout mode module 51 can be configured to implicitly determine the playout mode of the non-gambling game is not the manual mode.

In accordance with at least some embodiments, determining whether the playout mode of the non-gambling game is the manual mode or the automatic mode is based on an input the processor receives in response to a use of the user-selectable control, such as the USC 242 shown in FIG. 9B.

In accordance with at least some embodiments, determining whether the playout mode of the non-gambling game is the manual mode or the automatic mode includes determining the playout mode is the automatic mode in response to receipt of a token (e.g., a smartPLAY credit) or a signal indicating user approval to deduct a token from a token account (e.g., a credit account) corresponding to a user.

In accordance with at least some embodiments, the determine playout mode module 51 can be configured to determine whether the playout mode of the non-gambling game has changed.

As an example, the determine playout mode module 51 determines the playout mode is the manual mode. In accordance with this example, the multiple results for the non-gambling game are arranged sequentially and each of the multiple results corresponds to a respective numerical index value. Further, the quantity of results includes an index value corresponding to a result a server determined using a random number generator. Furthermore, the respective animation for the one or more results of the block includes an animation corresponding to the index value corresponding to the result the server determined using the random number generator.

In accordance with at least some embodiments, a default mode of the non-gambling game is the manual mode. In accordance with at least some other embodiments, the default mode of the non-gambling game is the automatic mode. In accordance with at least some embodiments, after playing out a block of results of the non-gambling game in the automatic mode, the application for playing the non-gambling game returns to the manual mode for playing out a next block of results for the non-gambling game.

14) Receive Module

The receive module 52 can be configured to receive (e.g., download) data. For example, the data can include a quantity of results of a block of results, a block size indicator, or data indicating a test result. The received quantity of results can include a portion of the block of results or the entire block of results. For example, portion of the block of results can include results determined using a second random process (e.g., a random process used to determine non-winning results of the non-gambling game). In some embodiments, the received quantity of results includes animations indicative of each result. In some embodiments, the received quantity of results includes index values indicative of each result. In some of those embodiments, the index values indicative of each result includes an index value representative of an animation stored at the computing system configured to display the animation. A processor executing the receive module 52 can obtain data received at a communication interface (e.g., the communication interface 142, 142B) and write the data into a memory (e.g., the memory 158, 158B).

In accordance with at least some embodiments, the receive module 52 can be configured to receive a quantity of results of a block of results. The block of results includes multiple results for the non-gambling game. In accordance with at least some embodiments, the quantity of results is all results of the block of results. In accordance with at least some other embodiments, the quantity of results includes some, but not all results of the block of results (i.e., the quantity of results includes a portion block of results).

In accordance with at least some embodiments, the block of results is exclusive to a client device or to multiple devices corresponding to a user of the client device. The client device includes the processor that launches the application. As an example, the client device can include a mobile phone and the multiple devices can include the mobile phone, a tablet device, and a desktop computer. As another example, the client device can include a mobile phone and the multiple devices can include the mobile phone and a computing game station at a casino when the user is logged onto the computing game station.

In accordance with at least some embodiments, the receive module 52 can be configured to receive a block size indicator indicating a quantity of results contained in the block of results. In accordance with these embodiments, the playout mode is the manual mode, outputting the representation of one or more results of the block includes outputting a quantity of animations showing a non-winning result, and the quantity of animations showing the non-winning result equals the quantity of results indicated by the block size indicator minus a quantity of index values corresponding to a result the server determined using the random number generator. As an example, the block size indicator can indicate the block of results contains 10,000 results, the quantity of index values can include 2 index values, such that the quantity of animations showing the non-winning result includes 9,998 animations. The index values can be the same or different index values. Two or more of the animations can be the same or identical.

In accordance with at least some embodiments, the first block of results includes a first quantity of results. The first quantity equals a sum of a second quantity and a third quantity. The second quantity equals how many results are determined using a first random process and the third quantity equals how many results are determined using a second random process. Each result determined using the first random process is a winning result or a non-winning result. Each result determined using the second random process is a non-winning result. As an example, generating the first block of results is conditioned on use of a third random process, and the third random process includes using a random number generator to determine how many results are contained in either the second quantity or the third quantity. As another example, the second quantity and the third quantity are predetermined without performing any random process.

As an example, the block of results comprising the quantity of results received using the receive module 52 can include a block of results generated by execution of the generate block module 57.

In accordance with at least some embodiments, the receive module 52 can be configured to receive data indicative of each result determined using the second random process. The computing system 140B can execute the receive module 52 to receive data indicative of each result determined using the second random process at the computing system 140A. Alternatively, the computing system 140A can execute the receive module 52 to receive data indicative of each result determined using the second random process at the computing system 140B In accordance with embodiments in which the processor 156B of the computing system 140B executes the receive module 52 to receive data from the computing system 140A, the computing system 140A can execute the receive module 52B to transmit to the computing system 140B the data received by the computing system 140B.

In accordance with at least some embodiments, the receive module 52 can be configured to receive data indicating a test result. The test result can indicate a result of test to determine whether a human is playing the non-gambling game at the computing system 140B. The test result can indicate the test failed, passed, is pending, or is inconclusive.

In accordance with at least some embodiments, the receive module 52 includes the receive module 81 (shown in FIG. 7A) and/or is configured to perform any function described with respect to the receive module 81.

15) Output Representation Module

The output representation module 53 can be configured to output, on a display, a representation of one or more results of the block. The representation can be output on a display, such as the display 148, 148A, 148B. If the playout mode is the manual mode, then outputting the representation includes displaying a respective animation for the one or more results of the block. If the playout mode is the automatic mode, then outputting the representation includes displaying an award amount based on all results of the block without displaying an animation for every individual result of the block.

As an example, outputting the representation of one or more results of the block includes outputting a representation for only some results of the block of results.

In accordance with at least some embodiments, if the determine playout mode module 51 determines the playout mode is the automatic mode and the block includes at least one winning result, then outputting the representation further includes displaying a respective animation corresponding to each winning result of the block. On the other hand, if the playout mode is the automatic mode and the block includes no winning results, then outputting the representation further includes displaying a single animation showing a non-winning result.

In accordance with at least some embodiments, displaying the respective animation for each result of the one or more results of the block occurs after a respective selection of a user-selectable control at the client device. That USC can be output via execution of the output USC module 55. For these embodiments, the playout mode is the manual mode, an auto-play mode available for the manual mode is unselected, and the one or more results of the block include multiple results.

In accordance with at least some embodiments, the playout mode is the manual mode and a first input (e.g., an input determined by the receive input module 61) indicates whether the client device received an input to activate a quick-spin option. If the computing system 140B received the input to activate the quick-spin option, then displaying the respective animation for each result of the one or more results of the block of results (e.g., the first or second block of results) includes pausing between displaying each pair of consecutive animations for a first amount of time. Alternatively, if the client device did not receive the input to activate the quick-spin option, then displaying the respective animation for each result of the one or more results of the block of results includes pausing between displaying each pair of consecutive animations for a second amount of time. The first amount of time is less than the second amount of time.

16) Count Module

The count module 54 can be configured to count an amount of time for use in playing the non-gambling game. The amount of time can equal a default amount of time defined for the non-gambling game. For example, the default amount of time can equal 10.0 seconds or some other amount of time greater than 0.0 seconds.

As an example, the count module 54 can be configured to count an amount of time greater than 0.0 seconds (e.g., 10.0 seconds) between displaying each respective animation for each pair of two consecutive results. The amount of time can be referred to as a delay time displaying each respective animation for each pair of two consecutive results. The computing system can be configured to change (e.g., decrease or increase) the delay time in response to a user input. As an example, entry of the user input can cause the computing to change the delay time to 0.0 seconds.

In accordance with at least some embodiments, the user input for changing the delay time can include an input authorizing use of a credit or paying a fee to change the delay time. The computing system 140 can execute the receive input module 61 to receive the user input for changing the delay time. In accordance with the example in which the default amount of time equals 10.0 seconds, a user input of a first credit or payment amount can result in reducing the amount of time to 5.0 second and a user input of a second credit or payment amount can result in reducing the amount of time to 0.0 seconds, such that the non-gambling game is played out in the automatic mode.

As another example, the count module 54 can be configured to count an amount of time (e.g., 90 days) to determine when a played out block of results can be deleted from memory.

17) Output USC Module

The output USC module 55 can be configured to output a USC. In accordance with at least some embodiments, outputting the USC includes configuring a hardware USC to correspond to a function to perform in response to a selection of the USC. In accordance with at least some other embodiments, outputting the USC includes configuring a graphical USC to correspond to a function to perform in response to a selection of the USC. In accordance with those latter embodiments, outputting the USC can include outputting the graphical USC on a display of a client device. The output USC module 55 can be configured to track a display location indicating an area of the display at which the graphical USC is displayed and to monitor for the area of the display being touched while the graphical display is output on the display. Examples of corresponding function are discussed in the following paragraphs before the discussion of a next module.

As an example, the output USC module 55 can be configured to output a user-selectable control on the display after the playout mode has been determined (e.g., using the determine playout mode module 51) to be the manual mode. In some cases, displaying each respective animation occurs in response to a respective use of the USC. In other cases, displaying each respective animation occurs in response to a single use of the USC.

As another example, the output USC module 55 can be configured to output a USC selectable to refresh a block of results (e.g., a block of results received by execution of receive module 52). In accordance with this example, the processor determines to output the representation for only some results of the block of results in response to a selection of the USC selectable to refresh the block of results. In other words, the processor can terminate performance of the non-gambling game based on a first block of results in response to selection of the USC selectable to refresh a block of results, and then receive a second block of results for performance of the non-gambling game based on the second block of results.

In accordance with at least some embodiments, the processor stores the first block of results at a first portion of a memory and stores the second block of results at the first portion of the memory (i.e., the processor writes over the first block of results with the second block of results). In accordance with at least some other embodiments, the processor stores the first block of results at a first portion of a memory and stores the second block of results at a second portion of the memory. The first and second portions of the memory can include no common portion of the memory. Alternatively, some of the first portion of the memory and some of the second portion of the memory are identical portions.

18) Determine USC Selection Module

The determine USC selection module 56 can be configured to determine a USC at a client device has been selected. The USC selected at the client device can include a hardware USC or a graphical USC output on a display.

As an example, the determine USC selection module 56 can be configured to determine a selection of a USC at a client device (e.g., the computing system 132, 140, 140B). The selection of the USC corresponds to selection of the automatic mode. The selection of the automatic mode can indicate a player at the client device authorized payment of a fee corresponding to selection of the automatic mode or authorized use of a credit earned in response to the client device providing a server with one or more player details.

As another example, when the playout mode is manual mode, the determine USC selection module 56 can be configured to determine a USC at the client device has been selected to select an auto-play mode. Accordingly, when the one or more results of a block include multiple results, displaying animations for the multiple results occurs without needing a USC at the client device to be selected to trigger displaying each animation for the multiple results. In accordance with this example, a selection of the auto-play mode can indicate a player at the client device authorized use of a credit or payment of a fee corresponding to selection of the auto-play mode.

In accordance with at least some embodiments, the computing system 140B can execute the determine USC selection module 56 and responsively transmit to the computing system 140A a communication including data corresponding to the selected USC. For example, as a result of the determine USC selection module 56 determining an USC corresponding to requesting a new block of results is selected, the computing system 140B can transmit to the computing system 140A a communication including a request for generating a new block of results.

19) Generate Block Module

The generate block module 57 can be configured to generate a block of results, such as a block of results for a non-gambling game. One or more of the computing system 132, 140, 140A, 140B can execute the generate block module 57 to generate a particular block of results. As an example, one or more of the processor 156, 156A, 156B can generate the particular block of results by executing the generate block module 57.

In accordance with at least some embodiments, generating a block of results (e.g., the first or second block of results described in the description) is conditioned on use of a third random process. The block of results includes a first quantity of results (i.e., Q1). The first quantity equals a sum of a second quantity (i.e., Q2) and a third quantity (i.e., Q3). The second quantity equals how many results are determined using a first random process and the third quantity equals how many results are determined using a second random process. Each result determined using the first random process is a winning result or a non-winning result. Each result determined using the second random process is a non-winning result. The third random process can include using a random number generator to determine how many results are contained in either the second quantity or the third quantity. A fourth random process can be performed to determine a sequence of results determined using the first and/or second random processes.

In accordance with at least some embodiments, generating a block of results (e.g., a first or second block of results) includes storing data indicative of each result determined using the into a non-transitory computer-readable memory. For example, if the computing system 140A determines Q2 results, the computing system 140A can store the Q2 results in the memory 158A. As another example, if the computing system 140A or the computing system 140B determines Q3 results, the computing system 140A or the computing system 140B can store the Q3 results in the memory 158A or the memory 158B, respectively. Additionally, the computing system 140B can stored within the memory 158B any results communicated to it from the computing system 140A. Likewise, the computing system 140A can stored within the memory 158A any results communicated to it from the computing system 140B.

In accordance with at least some embodiments, the multiple results of a block of results (e.g., a first or second block of results) generated using the generate block module 57 are arranged in a sequence of results. The first quantity of results received using the receive module 52 can include a portion of the sequence of results. For example, the first quantity of results includes an ordered sequence of results. Each result of the ordered sequence corresponds to a numerical index value. Accordingly, outputting data for displaying the representation of one or more results of the first block can include a respective numerical index value corresponding to each result determined using the first random process (discussed above) that is a winning result.

In accordance with at least some embodiments, generating a block of results includes generating a unique alphanumeric block number assigned to the block of results. The block number can be stored within the results 181.

The generate block module 57 can be configured to generate a second block of results. The second block of results includes multiple results of the non-gambling game.

In accordance with at least some embodiments, a block of results (e.g., the first or second block of results) includes between 2 and 9,999 results of the non-gambling game, inclusive. In accordance with at least some embodiments, a block of results (e.g., the first or second block of results) includes 10,000 or more results of the non-gambling game.

In accordance with at least some embodiments, a computing system 132, 140, 140A, 140B can execute the generate block module 57 to generate a block of results (e.g., a first or second block of results) in response to receiving an input (e.g., an input indicating the computing system 140 determined a USC corresponding to requesting a new block of results has been selected). In accordance with these embodiments, the computing system 132, 140, 140A, 140B can generate a respective block of result each time it receives the aforementioned input.

Once a block of results is generated, the generate block module 57 can read the block of results from a memory where the block of results is stored. As an example, the block of results can be read from the memory when the block of results is to be provided to and/or otherwise used for the computing system 140B to play the non-gambling game. As another example, the block of results can be read from the memory when the block of result is requested after the block of results have been used to play the non-gambling game. Such request could occur if there is any question regarding playout of the game. Alternatively, the request could occur if the player wishes to replay the game (without the chance to win any further prize).

20) Activate USC Module

The activate USC module 58 can be configured to activate a USC (e.g., the USC 244) when the following conditions exist: the playout mode is the manual mode, at least one result of a block of results (e.g., the first block or the second block) remains to be displayed, and the client device is not currently displaying an animation for any result of the block of results. The activate USC module 58 can be configured to deactivate the USC (e.g., the USC 244) while displaying the animation for any result of the block of results. The USC activated and/or deactivated by execution of the activate USC module 58 can include a hardware USC or a graphical USC located at a client device. As an example, the USC 244 can include or be located proximate to text stating "SPIN"

and/or an icon indicating a spin of a non-gambling game will commence if the USC 244 is selected when active.

Displaying the animation for any result of the block of results can occur in response to a respective selection of the USC (e.g., the USC 244) while the USC is activated. When the non-gambling game comprises: the video slots game, the video prize wheel game, or the video roulette game, displaying the animation for any result of the first block includes displaying: an animation of a set of reels spinning, an animation of a prize wheel spinning, or displaying a roulette wheel spinning, respectively.

As an example, the activate USC module 58 can be configured to activate, at the client device (e.g., the computing system 140B), a USC (e.g., the USC 244) when the following conditions exist: the playout mode is the manual mode, at least one result of the first block remains to be displayed, and the client device is not currently displaying an animation for any result of the first block, and to deactivate, at the client device, the USC while displaying the animation for any result of the first block. Displaying the animation for any result of the first block can occur in response to a respective selection of the USC while the USC is activated. Additionally, when the non-gambling game comprises: the video slots game, the video prize wheel game, or the video roulette game, displaying the animation for any result of the first block includes displaying: an animation of a set of reels spinning, an animation of a prize wheel spinning, or displaying a roulette wheel spinning, respectively.

21) Test Module

The test module 59 can be configured to perform a test, such as a test to determine whether a human is playing the non-gambling game at the computing system 140B.

Performance of the test and analysis of the test result can ensure that a bot is not controlling the computing system 140 to play the non-gambling game. Passing the test can include determining a human is present at the computing system 140B. Failing the test can include determining a human is not present at the computing system 140B.

The computing system 140, 140A, 140B can determine a test result by performing the test. In at least some embodiments, the computing system 140B transmits to the computing system 140A data captured during performance of the test so that the computing system 140A can determine the test result. In at least some other embodiments, the computing system 140B determines and transmits the test result to the computing system 140A.

As an example, the test to determine whether a human is playing the non-gambling game can include test that activates a camera (e.g., the camera 147B) to capture a video for determining whether a human is detected within the video. In at least some embodiments, the computing system 140B transmits the captured video to the computing system 140A for determining whether a human is detected within the video. In at least some other embodiments, the computing system 140B can determine from the captured video whether a human is detected within the video.

As another example, the test to determine whether a human is playing the non-gambling game can include a test to determine a touch pressure to the display or a particular gesture made on the display (e.g., a pinch-to-zoom gesture). The receive input module 61 can receive an input indicative of the touch pressure or the particular gesture.

As another example, the test to determine whether a human is playing the non-gambling game can include a test to detect presence of a face near the display using a proximity sensor, such as an infrared proximity sensor, an optical proximity sensor, or an ultrasonic proximity sensor.

As another example, the test to determine whether a human is playing the non-gambling game can include a test to detect a human is playing the non-gambling game can include a biometric authentication test, such as a facial recognition test, an iris scan, or a fingerprint recognition test.

As another example, the test to determine whether a human is playing the non-gambling game can include a test to detect a human is playing the non-gambling game can include a voice test, such as a voice recognition test or a voice command recognition test.

As another example, the test to determine whether a human is playing the non-gambling game can include a CAPTCHA challenge test.

For example, the test module 59 can be configured to determine a test to confirm whether a human is playing the non-gambling game at the client device (e.g., a computing system 140B) has failed. In response to that determination, the transmit module 64 can be configured to transmit, from the computing system 140A to the computing system 140B, an instruction for the computing system 140B to end playing the non-gambling game.

In accordance with at least some embodiments, a server (e.g., a computing system 140A) can execute at least a portion of the test module 59. In accordance with those or at least some other embodiments, a client device (e.g., a computing system 140B) can execute at least a portion of the test module 59. For example, the test module 59 can be configured to perform the test at the client device. As another example, the test module 59 can be configured to transmit from the client device to the server data indicating a result of the test (e.g., the test has passed, the test has failed, or the test result is inconclusive). As yet another example, the test module 59 can be configured to receive at the server, the data indicating the result of the test (e.g., the test has passed, the test has failed, or the test result is inconclusive).

22) Server Process Module

The server process module 60 can be configured to perform, at a computing system (e.g., the computing system 140A), a server thread for performance of the non-gambling game based on a block of results of a non-gambling game. The server thread can be performed for multiple instances of the computing system 140B so that multiple users can carry out different instances of the non-gambling game concurrently. The different instances of the non-gambling game can be carried out using different modes (i.e., some instances of the non-gambling game use the manual mode and other instances use the manual mode).

The different instances of the non-gambling game carried out using the manual mode can be at different stages of playing out a block of results. For example, at a given example time, an instance of a game played in the manual mode for a first instance of the computing system 140B can be playing out a first result of a first block of results, an instance of a game played in the manual mode for a second instance of the computing system 140B can be playing out a last result of a second block of results, and an instance of a game played in the manual mode for a third instance of the computing system 140B can be playing out an intermediate result of a third block of results (i.e., a result between first and last results of the third block).

In at least some embodiments, the computing system 140A executes the server process module 60 to perform a single instance of the server thread while an instance of the computing system 140B plays out the non-gambling game for multiple blocks of results sequentially (e.g., the computing system 140B plays out a first block of results and then plays out a second block of results). The server thread allows a block of results to be played out completely (i.e., all results of the block are played out) or to be played out partially (i.e., only some of the results of the block are played out). The server thread allows the non-gambling game to be played out in the automatic mode.

In at least some other embodiments, the computing system 140A executes the server process module 60 to perform a different instance of the server thread for each block of results regardless of whether the block of results is for a single instance of the computing system 140B or different instances of the computing system 140B.

As an example, the server process module 60 can be configured to perform, at the computing system 140A, a server thread for performance of the non-gambling game based on a first block of results. Performing the server thread for performance of the non-gambling game based on the block of results can include determining whether the playout mode of the non-gambling game for a first instance of the computing system 140B is the manual or automatic mode, and outputting data for displaying the representation of one or more results of the first block of results at the first instance of the computing system 140B. In accordance with at least some embodiments, determining whether the playout mode of the non-gambling game for the computing system 140B is the manual or automatic mode can include the computing system 140A or the computing system 140B executing the determine playout mode module 51.

As another example, the server process module 60 can be configured to perform, at the computing system 140A, the server thread for performance of the non-gambling game based on a second block of results. Performing the server thread for performance of the non-gambling game based on the second block of results can include determining whether a playout mode of the non-gambling game for an instance of the computing system 140B is the manual or automatic mode, and outputting data for outputting a representation of one or more results of the second block at the second instance of the computing system 140B.

As yet another example, the server process module 60 can be configured to perform, at the computing system 140A, for the computing system 140B, at least a portion of a server thread for performance of the non-gambling game based on a first block of results. The server process module 60 can be configured to terminate, at the computing system 140A, performance of the non-gambling game based on the first block of results. The server process module 60 can be configured to perform, at the computing system 140A for the computing system 140B, at least a portion of the server thread for performance of the non-gambling game based on a second block of results.

In accordance with at least some embodiments based on the example discussed in the preceding paragraph, performing at least the portion of the server thread for performance of the non-gambling game based on the first block of results includes outputting the data for displaying the representation of one or more results of the first block. Terminating performance of the non-gambling game based on the first block of results occurs in response to receiving an input to terminate the non-gambling game from the client device or after a predetermined amount of time has passed since the server received a communication from the client device. Performing at least the portion of the server thread for performance of the non-gambling game based on the second block of results includes outputting the data for displaying the representation of one or more results of the second block.

In accordance with at least some embodiments, performance of the server thread can include modifying a credit balance, such as a credit balance indicated by the credit balance indicator 188. As an example, the server thread can modify the credit balance based on any winning outcomes played out (automatically or manually) from a block of results. As an example, the server thread can modify the credit balance based on a fee charged to select a particular play mode, such as the automatic mode or the auto-play mode. As yet another example, the server thread can modify the credit balance based on a user requesting to add to or withdrawal from some amount of credits.

As still yet another example, the server process module 60 can be configured to perform, at the computing system 140A, at least a portion of a server thread to end performance of the non-gambling game. For instance, the performance of the server thread to end performance of the non-gambling game can occur in response to determining a human is not playing the non-gambling game at the computing system 140B via a test performed by the test module 59. Alternatively, the performance of the server thread to end performance of the non-gambling game can occur in response to all results of a block of results being played out.

23) Receive Input Module

The receive input module 61 can be configured to receive an input regarding playing the non-gambling game. As an example, the server (e.g., the computing system 140A) can execute the receive input module 61 to receive an input regarding playing the non-gambling game from the client device (e.g., the computing system 140B). As another example, the client device (e.g., the computing system 140B) can execute the receive input module 61 to receive an input regarding playing the non-gambling game from the server (e.g., the computing system 140A). As another example, the processor 156B of the computing system 140B can execute the receive input module 61 to receive an input as a result of a user using the user interface 144B.

As an example, the input regarding playing the non-gambling game can include an input includes a request to generate a block of results (e.g., the first block of results). A processor can generate the block of results by executing the generate block module 57.

As an example, the input regarding playing the non-gambling game can include an input including a request to discard a block of results (e.g., a first block of results) currently in use by server and/or the client device. The input to request the discard the block of results can include an input to terminate the non-gambling game. A processor can discard the block of results by executing the discard block module 65.

As another example, the input regarding playing the non-gambling game can include an input indicating a manual mode of the non-gambling game has been selected. The input can result from selection of a USC, such as the USC 242.

As yet another example, the input regarding playing the non-gambling game can include an input indicating an automatic mode of the non-gambling game has been selected. The input corresponding to selection of the auto-play mode can indicates a player at the second computing system (e.g., a client device or the computing system 140B) authorized: use of a credit or payment of a fee corresponding to selection of the auto-play mode.

As yet another example, the input regarding playing the non-gambling game can include an input to request to use a new block of results. A processor can generate the new block of results by executing the generate block module 57. The request to use a new block of results can include a request to refresh a block of results currently selected for the client device. Accordingly, the input of this example can occur while the client device is displaying a representation of a result of the block of results currently selected for the client device (e.g., the first block of results). A processor can execute the generate block module 57 to generate the new block of results (e.g., a second block of results) in response to receive the input of this example. As an example, the input of this example can result from selection of a USC, such as the USC 243 shown in FIG. 9B to FIG. 9E.

As yet another example, the input regarding playing the non-gambling game can indicate a USC at the second computing system (e.g., a client device or the computing system 140B) was selected to request a spin of: a set of reels displayed for the video slots game, a prize wheel displayed for the video prize wheel game, or a roulette wheel displayed for the video roulette game.

As yet another example, the input regarding playing the non-gambling game can indicate whether a second computing system (e.g., a second instance of a client device or the computing system 140B) received an input to activate a quick-spin option. For instance, that input can indicate the second computing system received an input to activate a quick-spin option or that the second computing system has not received an input to activate a quick-spin option.

As still yet another example, the receive input module 61 can be configured to receive from a second client device (e.g., a second instance of the computing system 140B) an input regarding playing the non-gambling game. The input can include data having a request to carry out the non-gambling game for the second client device.

24) Random Process Module

The random process module 62 can be configured to perform a random process for the non-gambling game. Execution of the random process module 62 can include calling a random number generator to generate one or more random numbers. Execution of the random process module 62 can include determining a random number for use in determining data to output on a display to indicate a winning result or a non-winning result. The computing system 140, 140A, 140B can execute the random process module 62.

As discussed elsewhere in this description, a block of results can include a first quantity of results. The first quantity can equal a sum of a second quantity and a third quantity. In accordance with at least some embodiments, the second quantity equals how many results are determined using a first random process and the third quantity equals how many results are determined using a second random process.

As an example, the random process module 62 can be configured to perform the first random process for the second quantity of results of the block of results and the second random process for the third quantity of results of the block of results. In accordance with this example, each result determined using the first random process is a winning result or a non-winning result, and each result determined using the second random process is a non-winning result.

In accordance with at least some embodiments, performing the first random process can include using a random number generator to generate one or more random numbers corresponding to a set of symbols for a particular winning result and symbols for a particular non-winning result.

In accordance with at least some embodiments, performing the second random process can include using a random number generator to generate one or more random numbers corresponding to a set of symbols for a particular non-winning result.

In accordance with at least some embodiments, the computing system 140A performs the first random process and the computing system 140B performs the second random process. Based on these embodiments, the computing system 140A performs any and all winning results to avoid having to pay out for a winning result determined by the computing system 140B (as such a winning result could indicate tampering has occurred at the computing system 140B). Additionally, the computing system 140A can communicate with the computing system 140B to indicate how many and/or which results of the block of results are non-winning results without having to communicate which data to output on a display to indicate the non-winning results.

As another example, the random process module 62 can be configured to perform a third random process. Performing the third random process can include using a random number generator to determine how many results are contained in either the second quantity or the third quantity. For instances, if a block of results includes a first quantity of results (i.e., Q1 results), performing the third random process can include determining the second quantity of results (i.e., Q2 results) or a third quantity of results (i.e., Q3 results). As an example, Q2 can equal one, two, three, four or some other quantity less than or equal to Q1. After determining Q2 or Q3, a processor can determine the other of Q2 or Q3 by determining the difference between Q1 and Q2 or Q1 and Q3, respectively. As another example, if Q1 equals 10,000 and if Q2 equals 1, then the processor can determine Q3 equals 9,999 results (i.e., 10,000 results minus 1 result). Upon determining Q2, the random process module 62 can be executed to determine the second quantity of results (i.e., the winning and/or non-winning result(s)). Upon determining Q3, the random process module 62 can be executed to determine the third quantity of results (i.e., the non-winning results). The computing system 140A can communicate to the computing system 140B Q1 using a first index value, Q2 using a second index value, and/or Q3 using a third index value.

In accordance with at least some embodiments, the values of Q1, Q2, and Q3 are predetermined without performing any random process. For example, Q1 can be predetermined to be 10,000, Q2 can be predetermined to be 1, and Q3 can be predetermined to be 9,999. In accordance, with that example, the first random process of the random process module 62 can be executed or performed 1 time to generate a winning result and the second random process of the random process module 62 can be executed or performed 9,999 times to generate non-winning results.

In accordance with at least some embodiments, the non-gambling game comprises a video slots game. In accordance with these embodiments, performing the second random process includes using a random number generator to generate one or more random numbers corresponding to a set of symbols for a particular non-winning result. The set of symbols is displayable at the client device (e.g., the computing system 140B) to represent stopped positions of one or more virtual reels (e.g., reels displayable at the horizontal symbol-display-segments 245, 246, 247, 248, 249 shown in FIG. 9A and FIG. 9B or the column 193, 195, 197 shown in FIG. 10) of the video slots game for the particular non-winning result. Data for displaying the representation of one or more results of the first block includes one or more of the following: the one or more random numbers, the set of symbols, an identifier of the set of symbols, or identifiers of symbols within the set of symbols. As an example, the set of symbols can include and/or be contained within the symbols 170. As another example, the virtual reels can be configured like the reel 218, the reel 220, the reel 222 shown in FIG. 13.

As another example, the random process module 62 can be configured to perform a fourth random process. Performing the fourth random process can include using a random number generator to determine a sequence of winning and non-winning results of a block or results. Based on the previous example, performing the fourth random process can include placing the 1 winning result and the 9,999 non-winning results at random positions within the block of 10,000 results.

25) Animation module

The animation module 63 can be configured to determine, at the computing system 132, 140, 140A, 140B, a particular animation. The output representation module 53 can output a particular animation determined by the animation module 63. As an example, the computing system 140B can execute the animation module 63 to determine a particular animation corresponding to a respective numerical index value (e.g., an index value transmitted to the computing system 140B from the computing system 140A). As another example, the computing system 132, 140, 140A, 140B can execute the animation module 63 to determine a particular animation or an index value corresponding to a random number selected using random process module 62. The computing system 132, 140, 140A, 140B can execute the animation module 63 when the playout mode is the manual mode.

In accordance with embodiments in which a block of results are arranged according to an ordered sequence, displaying a respective animation for each result of the one or more results of a block of results (e.g., the first or second block of results) includes displaying the particular animation corresponding to the respective numerical index value when the respective numerical index value within the ordered sequence of results is reached during playout of block of results according to the ordered sequence of results.

In accordance with at least some embodiments, the output representation module 53 can be configured to display at least some of the particular animations determined via execution of the animation module 63. In that regard, only some of the particular animations may be displayed if execution of the receive input module 61 determines an input requesting discarding a block of results is received before all of the particular animations are output on the display.

In at least some embodiments, the particular animation shows a set of reels, a roulette wheel, or a prize wheel spinning and then coming to a stop. After stopping the particular animation shows a particular set of reel symbols, or a particular portion of the roulette or prize wheel proximate the indicator segment selector 117.

26) Transmit Module

The transmit module 64 can be configured to transmit a communication over a communication network. The transmit module 64 can be configured to transmit a communication via the communication interface 142, 142A, 142B and/or via the processor 156, 156A, 156B. The transmit module 64 can be configured to transmit a communication over the system bus 141, 141A, 141B. The communication can include data and/or an instruction such that transmitting the communication can be referred to a transmitting data or transmitting an instruction.

As an example, the transmit module 64 can be configured to transmit, from the server (e.g., the computing system 140A) to the client device (e.g., the computing system 140B), an instruction for the client device to end playing the non-gambling game. In accordance with at least some embodiments, transmitting the instruction can occur in response to the server terminating a server thread or as part of executing the server thread via the server process module 60.

As an example, the transmit module 64 can be configured to transmit, from the server (e.g., the computing system 140A) to the client device (e.g., the computing system 140B), data for displaying a representation of one or more results of the second block at the client device in the manual mode. As an example, the data for displaying the representation can include one or more index values, such as a numerical index value corresponding to a result determined using the first random process that is a winning or non-winning result. As another example, the data for displaying the representation can include one or more random numbers, a set of symbols, an identifier of the set of symbols, or identifiers of symbols within the set of symbols. The random number(s) can correspond to identifier(s) of symbols within the set of symbols. As another example, the data for displaying the representation can include an identifier of animation of the animations 175 or a GUI of the GUI 178.

As another example, the transmit module 64 can be configured to transmit data indicating whether a test to detect whether a human is playing the non-gambling game at the second computing system performed using the test module 59 has failed, passed, is pending, or is inconclusive.

In accordance with at least some embodiments, the transmit module 64 includes the transmit module 87 (shown in FIG. 7A) and/or is configured to perform any function described with respect to the transmit module 87.

27) Discard Block Module

The discard block module 65 can be configured to discard any unplayed results of a block of results in response to receiving an input, such as input indicating the USC 243 (shown in FIG. 9B) to refresh the results.

As an example, the discard block module 65 can be configured to discard, in response to receiving an input (e.g., an input including a request to use a new block of results and/or an input of the USC 243), any unplayed results of a block of results (e.g., the first or second block of results described in in this description).

Discarding unplayed results can prevent the unplayed results from being played at the client device. In at least some implementations, unplayed results of a block of results are overwritten with unplayed results of another block of results. In accordance with those implementations, played results of the block of results can also be overwritten with unplayed results of the other block of results.

The discard block module 65 can be configured to discard a block of results after any portion of the block has been played out. As an example, after playing out a block of result and a predetermined amount of time (e.g., 90 days) has passed since the block of results was played out, the discard block module 65 can be executed to delete the block of results from the results 181, overwrite the block of results within the results, or mark the block of results for future reuse.

28) Registration Module

The registration module 66 can be configured to register a player of a computing system (e.g., the computing system 140B). In at least some embodiments, the player can play the non-gambling game using the computing system 140B without having to register. In accordance with at least some of those embodiments, the registration module 66 does not have to be executed until such time that the player requests payment of any winnings.

As an example, the registration module 66 can be configured to register a player by providing a GUI for entry of information needed to provide the player with the payment. For example, the information may include one or more of: a player name, a player address, a bank account number, or a tax payer identification number. Any registration number received via execution of the registration module 66 can be stored in the registration data 177. Execution of the registration module 66 can be configured to call the transmit module 64 to transmit to the computing system 140B a GUI including fields corresponding to requested registration data, and to call the receive module 52 to process registration data entered within the GUI displayed at the second computing system. The registration module 66 can be configured to store the received registration data within the registration data 177.

29) Credit Module

The credit module 67 can be configured to administer credit accounts corresponding to players of the non-gambling game that voluntarily establish a credit account. Administration of each credit account can include modifying a credit balance of the account, adding credits to the account, and/or deducting credits from the account. A credit balance can be stored within the credits 172. The credit module 67 can be configured to generate a quantity of credits to add to a credit account based on a payment made by a player using, for example, cash, tokens, a payment card, or crypto currency. The credit module 67 can be configured to deduct a quantity of credits to from a credit account based on a payment request by a player or a based on a game selection made by the player (e.g., a game selection to use the automatic mode of the non-gambling game). In response to the payment request, the credit module 67 can perform and/or initiate a payment using, for example, cash, tokens, a payment card, or crypto currency.

In accordance with at least some embodiments, a quantity of credits (e.g., a single credit) is used to pay for processing, parsing, and displaying, on a display, a summary of results of an entire block of results (e.g., for performing the non-gambling game in the automatic mode).

In accordance with at least some embodiments, a credit available for use with respect to the non-gambling game can be referred to as a "smartPLAY" credit or by some other name.

Figure 7C:
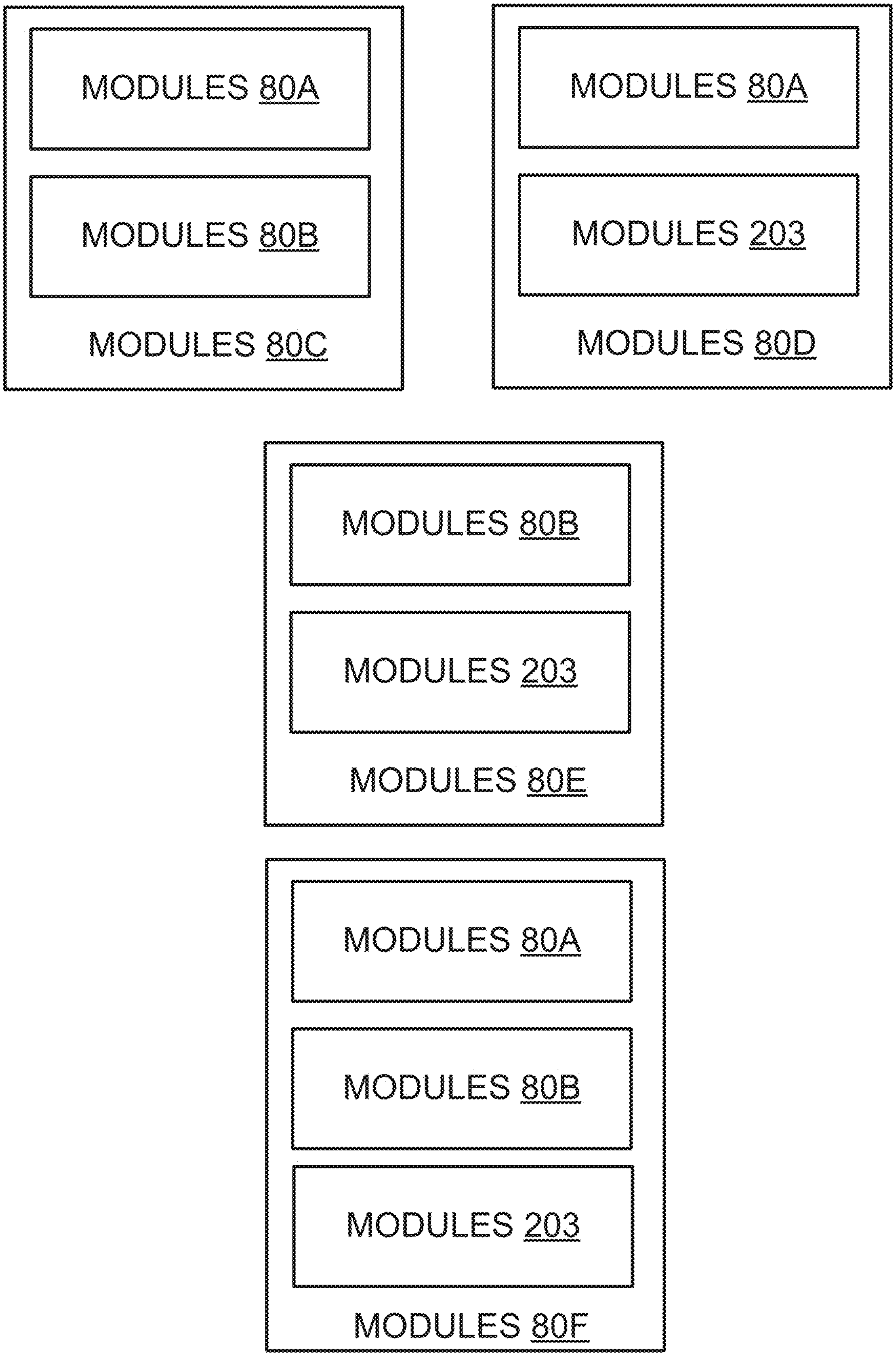

Next, FIG. 7C shows the modules 80C, 80D, 80E, 80F. The modules 80C can include any one or more modules of the modules 80A (shown in FIG. 7A) and any one or more modules of the modules 80B (shown in FIG. 7B). The modules 80D can include any one or more modules of the modules 80A (shown in FIG. 7A) and any one or more modules of the modules 203 (shown in FIG. 56). The modules 80E can include any one or more modules of the modules 80B (shown in FIG. 7B) and any one or more modules of the modules 203 (shown in FIG. 56).

Figure 56:
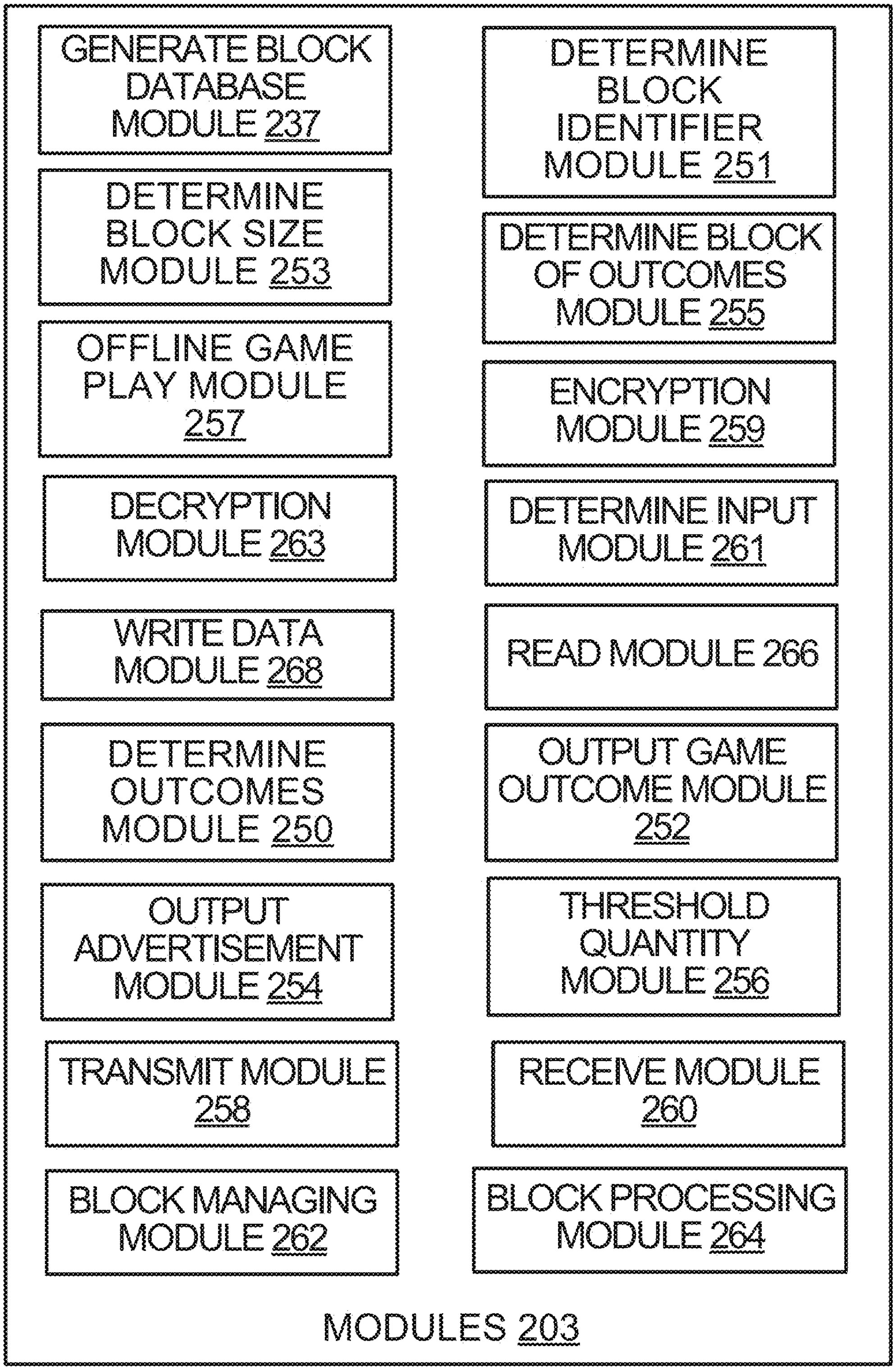
FIG. 56 shows modules, in accordance with one or more example embodiments.

The modules 80F can include any one or more modules of the modules 80A (shown in FIG. 7A), any one or more modules of the modules 80B (shown in FIG. 7B), and any one or more modules of the modules 203 (shown in FIG. 56). Two or more modules can be executed in combination to carry out one or more functions.

III. Video Slot Game Example a. Registration

The computing system 140 (or the computing system 140A and the computing system 140B) can be provisioned, for example, as one or more virtual slots rooms where slots are the only game available to would-be players, or one where a variety of different games, including arcade games, are offered to the players.

Figure 11A:
FIG. 11A is a simplified illustration of a GUI home page for a website, in accordance with example embodiments.

When a player clicks on or navigates to one of the casino websites, she or he can be presented with a "home page" that contains information about the casino and its features. FIG. 11A is a simplified illustration of a home page 200 of a casino website. When, e.g., a workstation logs on to the home page 200 of the website, the workstation can receive a message inviting the player to register with the casino operator and to games hosted by the casino operator's website. The particular layout of the home page and the invitation can vary widely.

In the example of FIG. 11A, the home page 200 includes an invitation for a player to register. To proceed in some embodiments, the player can click on the user-selectable control 202 and follow the instructions to begin playing a game. In other embodiments, the player is prompted to first click on a registration user-selectable 204, receive the client process and register as a player. The player uploads identifying information for registering with the game provider (such as a casino website operator). In at least some embodiments, the player can perform the registration via a first workstation/computing system and select and play the game via a second workstation/computing system.

Figure 11B:
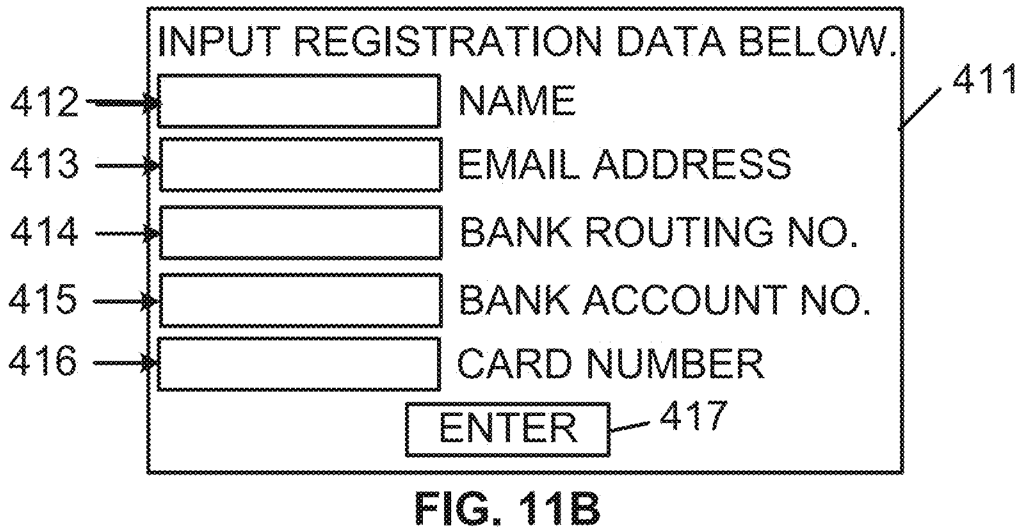
FIG. 11B is a GUI for entering registration date, in accordance with the example embodiments.

FIG. 11B shows a GUI 411 for entry of registration data. The GUI 411 can be output on a display in response to selection of the registration user-selectable control 204. The GUI 411 includes a field 412, 413, 414, 415, 416 for entry of a player name, an e-mail address, a bank routing number, a bank account number, and a card number, respectively. The card number can be a credit or debit card. The GUI 411 can include different fields and/or additional fields for entry of other registration data. The GUI 411 includes a user-selectable control 417 to cause transmission of the registration data entered into the field(s) to a server for registering a player.

The registration data for the player can be sufficient to identify the player as an entity that has previously purchased a membership subscription for the casino. The website (by way of the computing system 140, 140A can ask for a player's password or otherwise authenticate the identity of the player. Further, the website (by way of the computing system 140, 140A) can ask for such data such that the player can purchase a membership subscription from the game provider. The player, however, is not required to have, or acquire, the membership subscription to play the game.

After the player receives the client process and registers with the casino, the player can select a game they wish to play. It is assumed in this example that the player selects to play a 3-reel video slot game or another game described in this description.

b. Game Operation

Figure 12:
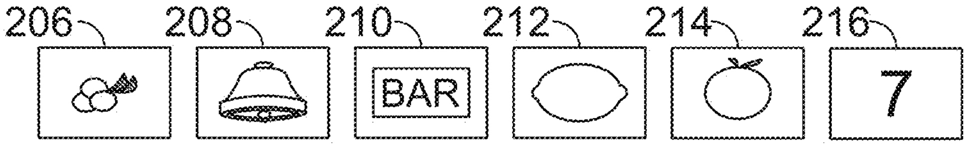
FIG. 12 depicts a set of reel symbols used in a three-reel video slot game, in accordance with example embodiments.
Figure 13:
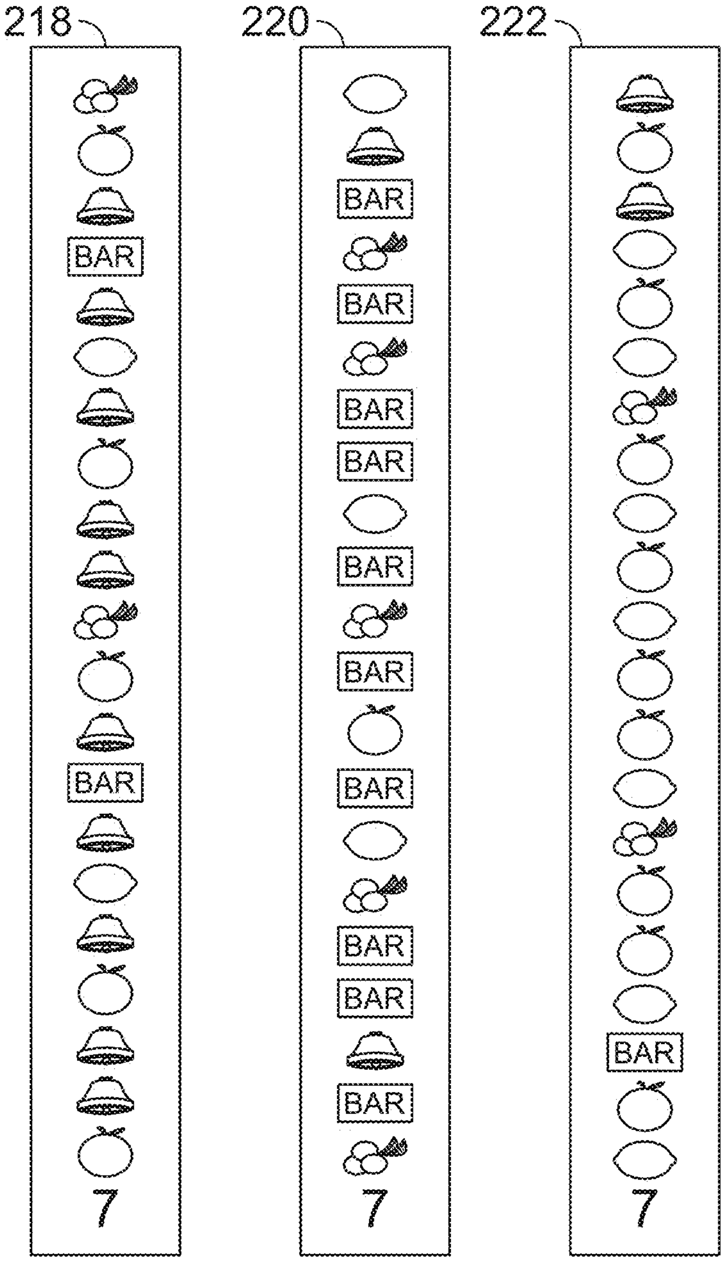
FIG. 13 depicts an arrangement of reel symbols used in a three-reel video slots game, in accordance with example embodiments.

As an example, aspects of a three-reel video slot game are illustrated in FIG. 12 and FIG. 13. FIG. 12 shows a set of six different reel symbols used in the game, namely cherries ("cherry") 206, a bell 208, a bar 210, a lemon 212, a plum 214, and a seven 216. Each example reel of the video slot game contains 22 reel symbols drawn from the reel symbol set of FIG. 12. This means that there are 10,648 possible outcomes for each turn of the game. Alternatively, a different number of reel symbols per set, different types of reel symbols, a different number of reel symbols per reel, and/or a different number of reels per game can be used.

The arrangement of the symbols on three reels 218, 220, and 222 is illustrated in FIG. 13. During play, the player can initiate the game event video slot game (i.e., execute a turn of the slot game) by means of the user interface 144B. The reels 218, 220, and 222 can spin and come to rest in a randomly chosen position. For example, the rest position of the reels can be determined in the server 104 or the computing system 140A and sent in the form of a datagram to a gaming workstation 110, 112, 114 or the computing system 140B for display. The set of symbols showing the at-rest position of the reels constitutes an "outcome" of the turn, also referred to in this disclosure as an event outcome or game outcome. The player wins if the outcome corresponds to a winning combination in a pay table associated with the game. The award for a winning outcome can be determined by the processor based on a pay table for the particular player and particular game. The pay table can be contained in the game support data 213 (shown in FIG. 54).

In accordance with at least some embodiments, the server 104 or the computing system 140A can communicate the rest positions of the reels 218, 220, 222 by transmitting a tuple of index numbers corresponding to reel positions of the reels 218, 220, 222, e.g., (index value for reel 1, index value for reel 2, index value for reel 3) indicated in Table B. For example, the processor can be configured to use the RNG 162 to select three index numbers within Table B and send a tuple including those index values, for example (7, 12, 18) such that the reel 218, 220, 222 stop on a payline such that the bell 208, the bar 210, and the lemon 212 are shown on the payline. Transmission of index values across a communication network can be less burdensome on the network than transmitting an animation file showing spinning reels or transmitting file names corresponding to symbols of the symbols 170 or symbols of the symbol 196 shown in FIG. 54.

TABLE B

| Reel position | Reel 1 symbol | Reel 2 symbol | Reel 3 symbol |
|---|---|---|---|
| 1 | 206 | 212 | 208 |
| 2 | 214 | 208 | 214 |
| 3 | 208 | 210 | 208 |
| 4 | 210 | 206 | 214 |
| 5 | 208 | 210 | 212 |
| 6 | 212 | 206 | 214 |
| 7 | 208 | 210 | 206 |
| 8 | 214 | 210 | 214 |
| 9 | 208 | 212 | 212 |
| 10 | 208 | 210 | 214 |
| 11 | 206 | 206 | 212 |
| 12 | 214 | 210 | 214 |
| 13 | 208 | 214 | 214 |
| 14 | 210 | 210 | 212 |
| 15 | 208 | 212 | 206 |
| 16 | 212 | 206 | 214 |
| 17 | 208 | 210 | 214 |
| 18 | 214 | 210 | 212 |
| 19 | 208 | 208 | 210 |
| 20 | 208 | 210 | 214 |
| 21 | 214 | 206 | 212 |
| 22 | 216 | 216 | 216 |

Next, FIG. 14 shows a pay table 224 for a three-reel slot game with a wager is illustrated in FIG. 14. Each entry in the pay table includes an outcome description 226 and a corresponding, payout 228 awarded to the player per wager credit, and the probability 230 of any particular outcome event for a turn of the game. Generally, however, a non-gambling game using the pay table of FIG. 14, providing monetary payouts to players with no return to game provider, may not always be a sustainable endeavour.

IV. Premium Tier Membership Subscriptions

In an example embodiment, the game is a video slot game which has a conventional pay table, such as the pay table 224 illustrated in FIG. 14. In at least some alternative embodiments, all of the payouts are so-called "raffle tickets," as reflected in the payout table 232 illustrated in FIG. 15. In yet another alternative, example embodiment, the top payout(s) is a monetary prize while the remaining payouts are so-called "raffle tickets." Examples of a payout table used in this embodiment are shown in FIG. 16 to FIG. 19.

Based on a pay table including raffle ticket prizes, the gaming system 100 can periodically (such as, for example, every 15 minutes, or every hour, or once a day) conduct a raffle drawing. The drawing can be performed, for example by the computing system 140 or by a separate computer or by a hand, where a winning ticket is manually pulled from a container of physical tickets. The raffle tickets won by players since the last drawing are eligible to win a prize. The prize is awarded to the one or more players who have the raffle ticket(s) selected.

The prizes can include, for example:

a monetary award, a physical prize, another item of monetary value, a pass to play, at no cost, another arcade game at the casino hosting the video slot game, or a pass to play another video slot game, at no cost, at the casino hosting the video slot game.

The raffle tickets provided upon the detection of a winning game are considered Restricted Award because they have no redeemable value. Thus, for example, a raffle ticket can be only useful for entry into a single future raffle (e.g., a particular, future raffle held by the gaming system 100 and/or a game provider).

In example embodiments, the gaming system 100 and/or the game provider of the video slot game can offer players a membership subscription for purchase. Without a membership subscription, the player and her or his registration information will denote a Base Tier. Upon purchasing a membership subscription, however, the player will have a Premium Tier status, which can be reflected in her or his registration data or otherwise stored in a memory. Upon determining that the player's registration data reflects a premium tier, the computing device can provide the game to the player with an enhanced mode of operation. Upon determining that the player's registration data reflects a base tier, the computing device can provide the game to the player with a base mode of operation. The mode of operation reflects the payout determination or the attributes of game play or both.

A player that does not acquire membership in the relevant action can still play the games, at no cost and whenever, and for as long as, the player wishes to do so.

The game provider is able to quantify the expected cost of offering, e.g., a video slot game for play. For example, a processor can determine the expected cost can be based on variables such as a definable time, (e.g., six seconds, per spin of the reels) plus the cost of a raffle prize at predefined intervals, plus the cost of any monetary awards allowed. Accordingly, the provider can determine, in advance, the average cost of providing the game for a set period of time (e.g., a day). The provider can thus, set the cost of the premium membership may be set at a level that covers the cost of offering the non-gaming video slot game.

In an example embodiment, however, a player can purchase, one of four different levels of membership subscription: Bronze Tier level, Silver Tier level, Gold Tier level, and Black Tier level. Each of these different membership levels is a premium tier, but each has different benefits. In particular, for a Bronze Tier level, the computing system 140 will perform the game at a first mode of operation; for a Silver Tier level, the computing system 140 will perform the game at a second mode of operation; for a Gold Tier level, the computing system 140 will perform the game at a third mode of operation; and for a Black Tier level, the computing system 140 will perform the game at a fourth mode of operation. As a whole, the first, second, third, and fourth modes of operations function differently from one another, although some functions of two or more of those modes of operation can be identical. The first, second, third, and fourth modes of operation can be different than a mode of operation corresponding to a Base Tier level. A person having ordinary skill in the art will understand that labels besides Bronze, Silver, Gold, and Black can be associated with the different premium tiers discussed above. The skilled person will also understand that a quantity of premium tier levels other than four premium tier levels can be used for a game provided by the gaming system 100.

In an example embodiment, different tier levels reflect different pay tables. For example, the table 168 can include a payout table 232 shown in FIG. 15 for a base tier, a payout table 234 shown in FIG. 16 for a Bronze premium tier, a payout table 236 shown in FIG. 17 for a Silver premium tier, a payout table 238 shown in FIG. 18 for a Gold premium tier, and a payout table 240 shown in FIG. 19 for a Black premium tier. In at least some embodiments, the different tiers are defined according to a hierarchy, such a hierarchy in which the Silver Tier is a higher than the Bronze Tier, the Gold Tier is higher than the Silver Tier, and the Black Tier is higher than the Gold Tier.

As indicated by the example pay tables, the higher the tier, generally, the larger the raffle ticket prizes are that are awarded to winners. Of course, the pay tables shown are only an example. The pay table of FIG. 16 can be used as a base pay table, with Bronze premium pay table further enhanced so as to differentiate it from the Base Tier pay table.

As shown in the pay tables, additional, monetary prizes are available to be won by higher tiers. For example, only the top payout is a monetary prize for Bronze members; the top two payouts are monetary prizes for Silver members; the top three payouts are monetary prizes for Gold members; and the top four payout are monetary prizes for Black tier memberships.

As indicated above, a raffle ticket payout is a restricted payout: it can only be used in a raffle hosted by the game provider. Any prize or other award for the winner of the raffle is determined the game provider. An unrestricted award, as can be provided to premium tier members, can be used freely by the player: unrestricted awards include money or vouchers redeemable for money.

In yet another, alternative, example embodiment, the payout tickets for Gold and Black Tier members are for a drawing separate from the raffle drawing for Base, Bronze, and Silver Tier memberships. The drawing for the Gold and Black drawing has more desirable prizes and/or larger monetary awards than those provided to the winners of the Base, Bronze, and Silver Tier raffles.

In still another, alternative, example embodiment, the pay table for one or more of the premium tier memberships includes payouts of guaranteed prize tokens. Accordingly, upon accumulating sufficient guaranteed prize tokens after one or more turns of the game, a player having a premium membership will be awarded a prize. Again, the prize can be a monetary award or another item of value.

In still another, alternative, example embodiment, the pay table for one or more of the premium tier memberships includes a payout of passes for the player to play, at no cost, various arcade games of the casino providing the video slot games. Alternatively, the pay table for one or more of the premium tier memberships includes payouts of passes for the player to play, at no cost, various other video slot games of the casino.

In still other example embodiments, the mode of operation of the game for premium tiers enhances the play of the game, in addition to, or instead of, enhancing the pay tables. For example, as noted above, the computing system 140 can display visual advertisements and/or play audio advertisements before, during and/or after the operation of a game. In example embodiments, no advertisements are presented to, for example, players having Black Tier memberships. Fewer or less intrusive advertisements can be provided to player having other premium tier memberships.

In another embodiments, a speed of play of the game (e.g., a video slot game) is altered (e.g., increased) for one or more tiers of memberships. In another example embodiment, players for one or more tiers of memberships are allowed to select the speed of the game.

In still other embodiments, higher quality video displays and/or audio presentations are provided to one or more premium tier member during the operation of the games. In other embodiments, one or more premium tiers are provided with means to a videoconference or otherwise confer with other individuals during the operation of a game.

As before, because there is a definable time for the spin of the reels, and the cost of a raffle prizes, plus the cost of monetary awards allowed at each tier level are known, the game provider can determine, in advance, the average cost of providing the game for a set period of time. Accordingly, the game provider can set the cost of the various premium membership tiers so as cover the cost of offering the game at the different tier levels.

According to one aspect of the example embodiments, the game play does not involve the making of a wager (i.e., putting money or other payment of consideration in order to place a wager on the outcome of an uncertain event). Accordingly, a player is not participating in an activity that can be considered illegal gambling in some jurisdictions.

According to another aspect of example embodiments, no consideration is required from a player: play of the game is free for everyone. As a consequence, there is no requirement for an Alternative Means of Entry for the game in jurisdictions where only free-play games are allowed. Further, without the requirement of an AMOE in such jurisdictions, there is no requirement for everyone to win the same prizes, and the multi-tiered membership subscription described in this disclosure remains proper.

V. Example Operation a. First Operational Aspects

Figure 20:
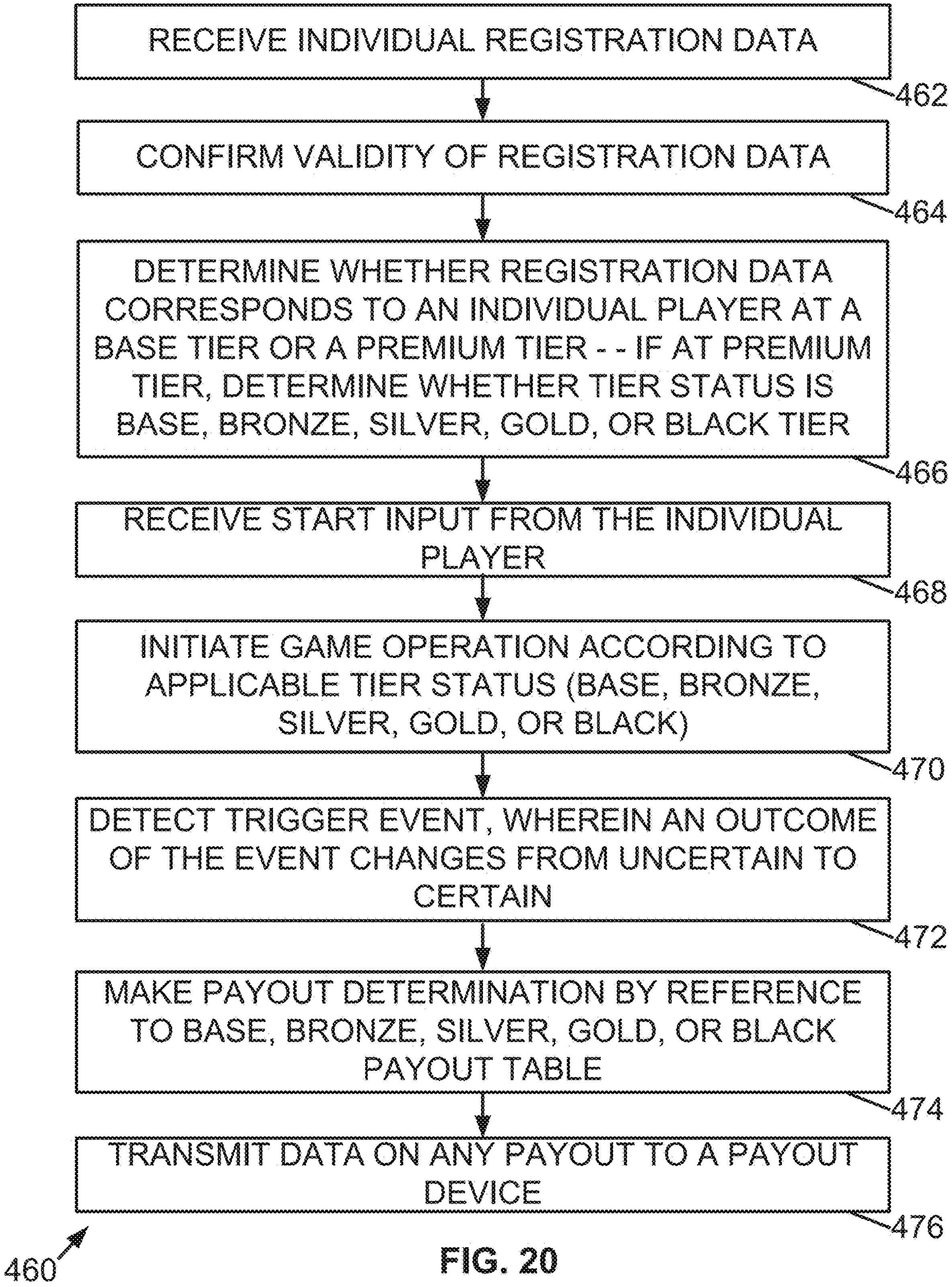
FIG. 20 is a flow chart showing functions of a method for a non-gambling gaming machine, in accordance with example embodiments.

FIG. 20 is a flow chart 460 showing functions of an example embodiment that can be carried out using a computing system, such as the gaming system 100 of FIG. 1, the computing system 140 of FIG. 4, the computing system 140A of FIG. 5, and/or the computing system 140B of FIG. 5. For example, a server device can conduct a game with a client device. The server device can be, for example, a server hosted and/or controlled by an online casino operator (e.g., the server), and the client device can be, for example, a personal computer, laptop computer, tablet computer, or cell phone that allows a player to access the server device and the game thereon.

Block 462 includes receiving registration data for an individual player. Receiving the registration data can occur at a computing system, such as the computing system 140, 140A, 140B, the server 104, or the gaming workstation 110, 112, 114. As an example, the registration data can be entered via the user interface 144 and transmitting from one computing system to another computing system (e.g., transmitting the registration data from the computing system 140B to the computing system 140A). A computing system that receives the registration data can store the registration data in a memory, such as the memory 158, 158A, 158B. In at least some embodiments, receiving the registration data can include receiving the registration data to register the individual player with the gaming system 100. Additionally, or alternatively, receiving the registration data can include receiving the registration data to verify the individual player is registered with the gaming system 100. Examples of the registration data are discussed elsewhere in this description.

The function(s) of block 462 can be performed by a processor (e.g., one or more hardware processors) configured by machine-readable instructions including a module that is the same as or similar to the receive module 81, in accordance with the example embodiments. The function(s) of block 462 can include one or more of the functions described with respect to the receive module 81. As an example, the processor can receive registration data for an individual player, as discussed in connection with the receive module 81 shown in FIG. 7A.

Next, block 464 includes confirming the validity of the registration data. As an example, a computing system that confirms the registration data is valid by seeking to match the name, personal information, and password provided by the player with the corresponding information held in memory. The function(s) of block 464 can be performed by a processor (e.g., one or more hardware processors) configured by machine-readable instructions including a module that is the same as or similar to the confirm module 82, in accordance with the example embodiments. The function(s) of block 272 can include one or more of the functions described with respect to the confirm module 82. As an example, the processor can confirm the validity of the registration data, as discussed in connection with the confirm module 82 shown in FIG. 7A.

Next, block 466 includes determining whether registration data corresponds to an individual player (e.g., the first, second, third, or fourth player discussed in this description) at a baser tier or a premium tier. If the determination indicates the registration data corresponds to a premium tier, a processor further includes determining a tier status of the premium tier (e.g., Bronze, Silver, Gold or Black) Such a determination can include an inquiry whether membership subscription payments are current, with the player being denied premium tier benefits if her or his account payments are overdue. The computing system can also accept registration data from a Base Tier player. The function(s) of block 466 can be performed by a processor (e.g., one or more hardware processors) configured by machine-readable instructions including a module that is the same as or similar to the determine module 83, in accordance with the example embodiments. The function(s) of block 466 can include one or more of the functions described with respect to the determine module 83. As an example, the processor can determine whether registration data corresponds to an individual player at a baser tier or a premium tier, as discussed in connection with the determine module 83 shown in FIG. 7A.

Next, block 468 includes receiving a start input from the individual player. As an example receiving the start input can include the individual player selecting a user-selectable control (e.g., the USC 189 shown in FIG. 9A) corresponding to the start input at the computing system 140B and transmitting a communication including the start input from the computing system 140A via the communication network 161, or from the gaming workstation 110, 112, 114 to the server 104. The function(s) of block 468 can be performed by a processor (e.g., one or more hardware processors) configured by machine-readable instructions including a module that is the same as or similar to the receive module 81, in accordance with the example embodiments. The function(s) of block 468 can include one or more of the functions described with respect to the receive module 81. As an example, the processor can receive a start input from the individual player, as discussed in connection with the receive module 81 shown in FIG. 7A.

Next, block 470 includes initiating game operation according to an applicable tier status (e.g., a base, bronze, silver, gold, or black tier status corresponding to the individual player). As an example, initiating the game operation can include using an RNG (e.g., the RNG 162, 162A, 162B to select one or more numbers corresponding to the game, such as a number corresponding to a set of symbols to output in a symbol-display-portion, a number on a roulette wheel, or a particular position of a prize wheel. In at least some embodiments, a mode of the game can be adjusted according to the applicable tier status. As an example, adjusting the mode of the game can include selecting a set of reels or reels symbols applicable to the tier status or selecting a set of prizes on a prize wheel. The function(s) of block 470 can be performed by a processor (e.g., one or more hardware processors) configured by machine-readable instructions including a module that is the same as or similar to the initiate game module 84, in accordance with the example embodiments. The function(s) of block 470 can include one or more of the functions described with respect to the initiate game module 84. As an example, the processor can initiate game operation according to an applicable tier status, as discussed in connection with the initiate game module 84 shown in FIG. 7A.

Next, block 472 includes detecting a trigger event, wherein an outcome of the event changes from uncertain to certain. As an example, the event can be uncertain while the reels of a video slot game, a roulette wheel of a video roulette game, or a prize wheel of a prize wheel game is/are spinning and the event can be certain once the reels or wheel stops spinning. The function(s) of block 472 can be performed by a processor (e.g., one or more hardware processors) configured by machine-readable instructions including a module that is the same as or similar to the detect trigger module 85, in accordance with the example embodiments. The function(s) of block 472 can include one or more of the functions described with respect to the detect trigger module 85. As an example, the processor can detect a trigger event, wherein an outcome of the event changes from uncertain to certain, as discussed in connection with the detect trigger module 85 shown in FIG. 7A.

Next, block 474 includes making a payout determination by reference to a payout table (e.g., a base, bronze, silver, gold, or black payout table or the payout table 232, 234, 236, 238, 240). As an example, the computing system 140, 140A, 140B can determine whether any payout is due to the player as a result of the event outcome (game result). For instance, if the applicable payout table is the payout table 236 of FIG. 17 and outcome includes the following sequence of symbols: the plum 214, the plum 214, and the bar 210, by referring to the payout table 236, the computing system can determine the payout is 200 raffle tickets. The function(s) of block 474 can be performed by a processor (e.g., one or more hardware processors) configured by machine-readable instructions including a module that is the same as or similar to the payout module 86, in accordance with the example embodiments. The function(s) of block 474 can include one or more of the functions described with respect to the payout module 86. As an example, the processor can make a payout determination by reference to a payout table, as discussed in connection with the payout module 86 shown in FIG. 7A.

Next, block 476 includes transmitting data on any payout to a payout device. As an example, the payout device can include the payout device 160, 160A, 160B. The payout device can transfer funds (e.g., sweeps coins, raffle tickets and/or currency to a player). A processor can update the payout amount indicator 186 based on the payout determined by reference to a payout table and/or the symbols landing on a payline or payway. A processor can update the payout amount indicator 186 based on the payout indicated on a prize wheel. A processor can update the payout amount indicator 186 based on the payout determined by reference to a payout table, a number on a roulette wheel selected by a user, and a number on a roulette wheel selected via a spin of the roulette wheel. The processor can update the credit balance indicator 188 and/or the player account facility 124, 126 based on the payout. The function(s) of block 476 can be performed by a processor (e.g., one or more hardware processors) configured by machine-readable instructions including a module that is the same as or similar to the transmit module 87, in accordance with the example embodiments. The function(s) of block 476 can include one or more of the functions described with respect to the transmit module 87. As an example, the processor can transmit data on any payout to a payout device, as discussed in connection with the transmit module 87 shown in FIG. 7A.

Figure 21:
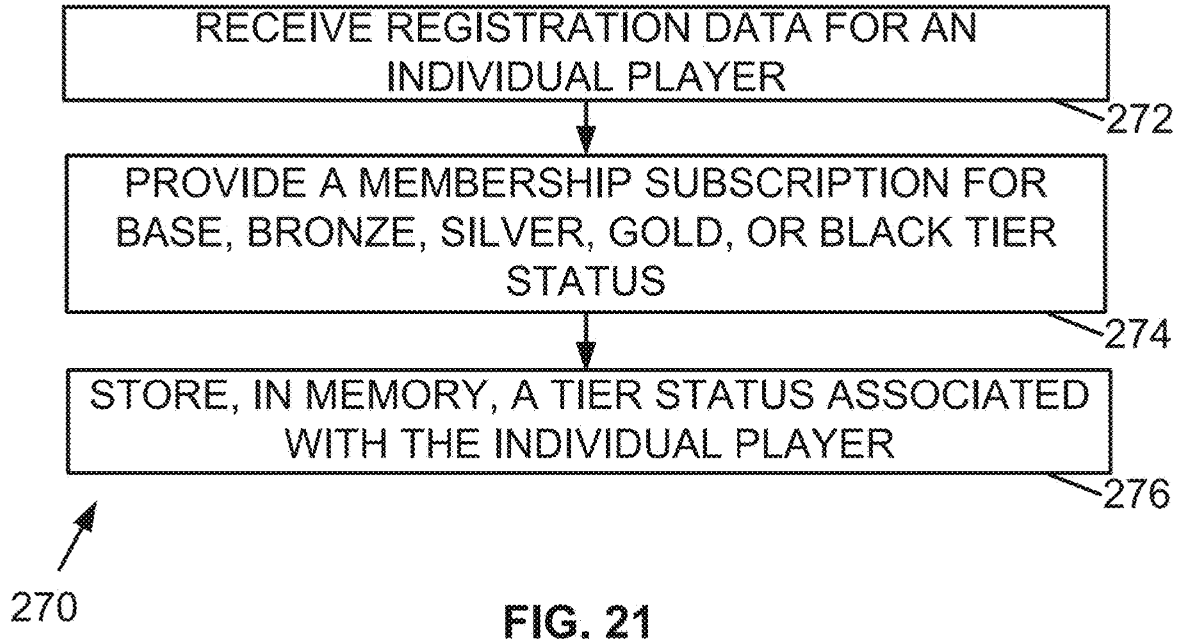
FIG. 21 is a flow chart showing a method for an individual player to register for a Premium Tier status, in accordance with example embodiments.

Next, FIG. 21 is a flow chart 270 showing functions of an example embodiment that can be carried out using a computing system, such as the gaming system 100 of FIG. 1, the computing system 140 of FIG. 4, the computing system 140A of FIG. 5, and/or the computing system 140B of FIG. 5. For example, a server device can conduct a game with a client device. The server device can be, for example, a server hosted and/or controlled by an online casino operator (e.g., the server), and the client device can be, for example, a personal computer, laptop computer, tablet computer, or cell phone that allows a player to access the server device and the game thereon. As an example, the functions of the flow chart 270 can be carried out for a player to register with a casino operator to obtain premium tier status. One or more functions shown in the flow chart 270 can be carried out in combination with one or more functions of the flow chart 460 shown in FIG. 20.

Block 272 includes receiving registration data for an individual player. As an example, a computing system can receive information regarding the individual player, such as a name, an address, an account information (e.g., a payment card identifier to pay for a premium tier subscription), a password, and/or a user name. The computing system can prompt the individual player to provide any information required for registering the player. The function(s) of block 272 can be performed by a processor (e.g., one or more hardware processors) configured by machine-readable instructions including a module that is the same as or similar to the receive module 81, in accordance with the example embodiments. The function(s) of block 272 can include one or more of the functions described with respect to the receive module 81. As an example, the processor can receive registration data for an individual player, as discussed in connection with the receive module 81 shown in FIG. 7A.

Next, block 274 includes providing a membership subscription for a base, bronze, silver, gold or black tier status. The provision of the membership can be based on a membership request, and if applicable a payment corresponding to the requested membership. A person having ordinary skill in the art will understand the various membership subscriptions can be identified via different identifiers and a different quantity of memberships can be available for a subscription. The function(s) of block 274 can be performed by a processor (e.g., one or more hardware processors) configured by machine-readable instructions including a module that is the same as or similar to the provide membership module 91, in accordance with the example embodiments. The function(s) of block 274 can include one or more of the functions described with respect to the provide membership module 91. As an example, the processor can provide a membership subscription for a base, bronze, silver, gold or black tier status, as discussed in connection with the provide membership module 91 shown in FIG. 7A.

Next, block 276 includes storing, in a memory (e.g., the memory 158, 158A, 158B), a tier status associated with the individual player. As an example, the tier status can indicate the tier status for the membership subscription provided at block 274. The function(s) of block 276 can be performed by a processor (e.g., one or more hardware processors) configured by machine-readable instructions including a module that is the same as or similar to the store module 90, in accordance with the example embodiments. The function(s) of block 272 can include one or more of the functions described with respect to the store module 90. As an example, the processor can store, with a memory, a tier status associated with an individual player, as discussed in connection with the store module 90 shown in FIG. 7A.

Figure 22:
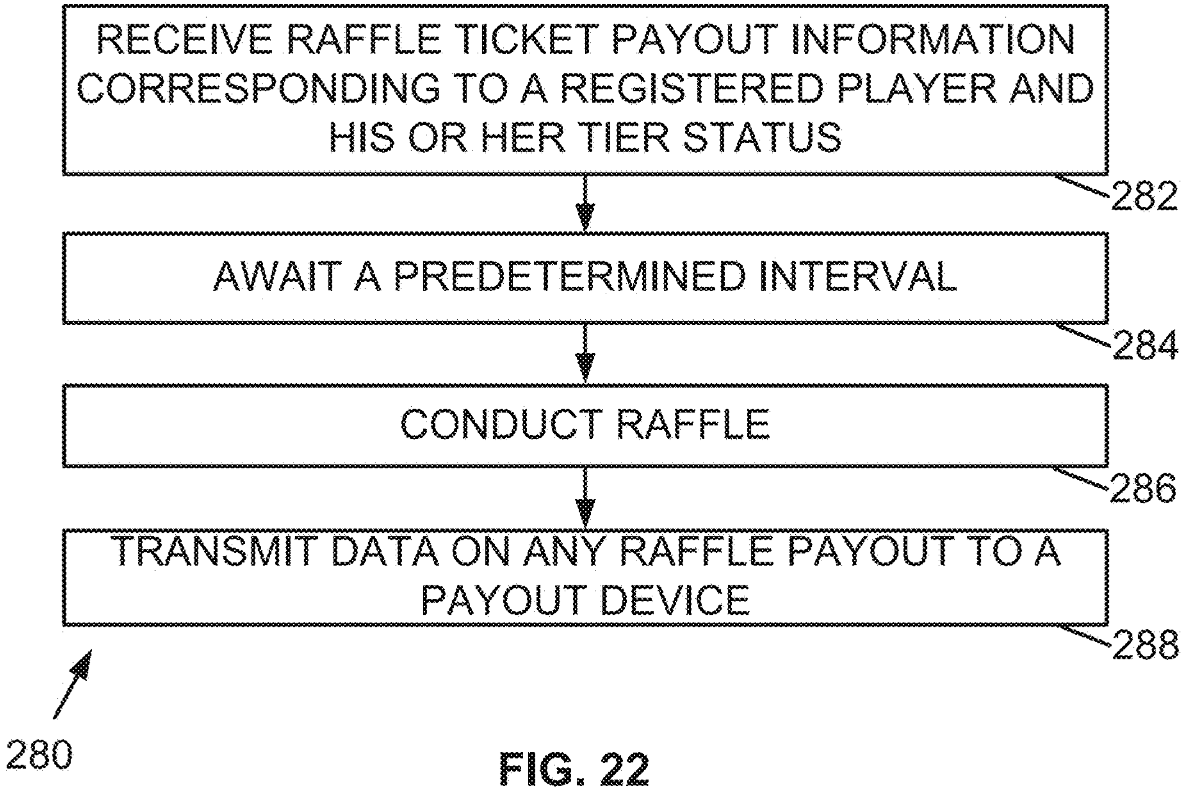
FIG. 22 is a flow chart showing a method for a raffle, in accordance with example embodiments.

Next, FIG. 22 is a flow chart 280 showing functions of an example embodiment that can be carried out using a computing system, such as the gaming system 100 of FIG. 1, the computing system 140 of FIG. 4, the computing system 140A of FIG. 5, and/or the computing system 140B of FIG. 5. For example, a server device can conduct a game with a client device. The server device can be, for example, a server hosted and/or controlled by an online casino operator (e.g., the server), and the client device can be, for example, a personal computer, laptop computer, tablet computer, or cell phone that allows a player to access the server device and the game thereon. As an example, the functions of the flow chart 280 can be carried out for a gaming system and/or a game provider to conduct a raffle. One or more functions shown in the flow chart 280 can be carried out in combination with one or more functions of the flow chart 460 shown in FIG. 20 and/or one or more functions of the flow chart 270 shown in FIG. 21.

Block 282 includes receiving raffle ticket payout information corresponding to a registered player and his or her tier status. As an example, the computing system can receive data identifying every raffle ticket won by any player since the last raffle. The function(s) of block 282 can be performed by a processor (e.g., one or more hardware processors) configured by machine-readable instructions including a module that is the same as or similar to the receive module 81, in accordance with the example embodiments. The function(s) of block 282 can include one or more of the functions described with respect to the receive module 81. As an example, the processor can receive raffle ticket payout information corresponding to a registered player and his or her tier status, as discussed in connection with the receive module 81 shown in FIG. 7A.

Next, block 284 includes awaiting a predetermined interval. As indicated above, the interval can be a predetermined period of time, such as 15 minutes, an hour, or a day. Alternatively, the internal can be based on a variable factor. For example, a raffle can be held promptly after a specific number of raffle tickets have been won by players. The function(s) of block 284 can be performed by a processor (e.g., one or more hardware processors) configured by machine-readable instructions including a module that is the same as or similar to the await module 88, in accordance with the example embodiments. The function(s) of block 284 can include one or more of the functions described with respect to the await module 88. As an example, the processor can await a predetermined interval, as discussed in connection with the await module 88 shown in FIG. 7A.

Next, block 286 includes conducting a raffle. Where every ticket has been assigned a unique number, the raffle can involve entail choosing, at random, one ticket out all the tickets won since the last raffle. Alternatively, if raffle ticket number are randomly assigned, the raffle can entail choosing a number at random and checking to see whether any raffle ticket number corresponds to the randomly chosen number in the raffle. If one or more such tickets are found, the computing system designates that ticket or those tickets as winning. The function(s) of block 286 can be performed by a processor (e.g., one or more hardware processors) configured by machine-readable instructions including a module that is the same as or similar to the conduct raffle module 89, in accordance with the example embodiments. The function(s) of block 286 can include one or more of the functions described with respect to the conduct raffle module 89. As an example, the processor can conduct a raffle, as discussed in connection with the conduct raffle module 89 shown in FIG. 7A.

Next, block 288 includes transmitting data on any raffle payout to a payout device. As discussed, a payout can be transmitted to a payout device in use by a player holding (physically or virtually) a raffle-winning ticket. The function(s) of block 288 can be performed by a processor (e.g., one or more hardware processors) configured by machine-readable instructions including a module that is the same as or similar to the transmit module 87, in accordance with the example embodiments. The function(s) of block 288 can include one or more of the functions described with respect to the transmit module 87. As an example, the processor can transmit data on any raffle payout to a payout device, as discussed in connection with the transmit module 87 shown in FIG. 7A.

b. Second Operational Aspects

Figure 23:
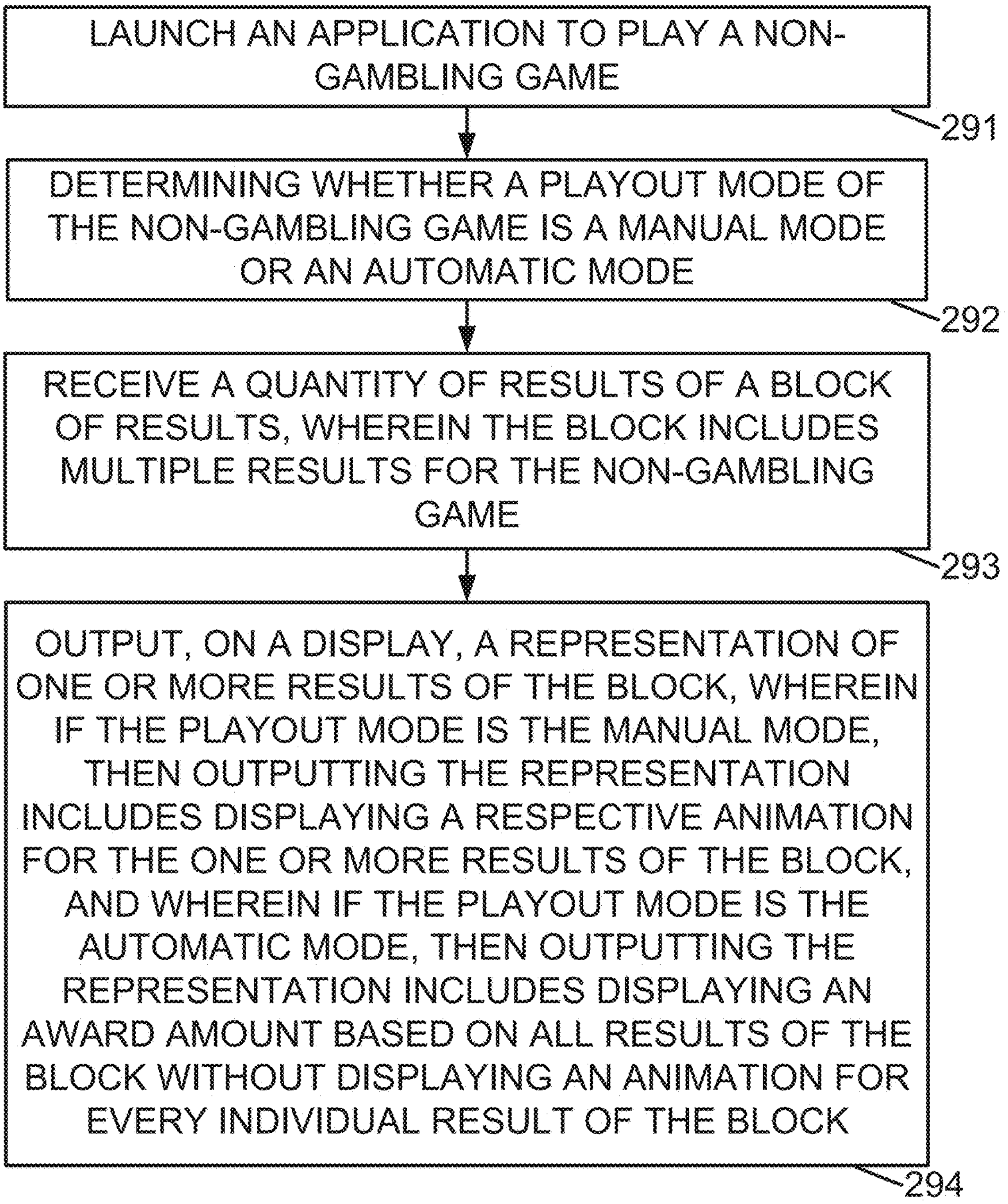
FIG. 23 is a flow chart showing functions of a method corresponding to playing a non-gambling game, in accordance with example embodiments.

Next, FIG. 23 is a flow chart 290 showing functions of an example embodiment that can be carried out using a computing system, such as the gaming system 100 of FIG. 1, the computing system 132 of FIG. 3, the computing system 140 of FIG. 4, the computing system 140A of FIG. 5, and/or the computing system 140B of FIG. 5. For example, a server device can conduct a game with a client device. The server device can be, for example, a server hosted and/or controlled by an online casino operator (e.g., the server), and the client device can be, for example, a personal computer, laptop computer, tablet computer, or cell phone that allows a player to access the server device and the game thereon.

Block 291 includes launching an application to play a non-gambling game. The processor 156, 156A, 156B can launch the application. The function(s) of block 291 can be performed by a processor (e.g., one or more hardware processors) configured by machine-readable instructions including a module that is the same as or similar to the launch module 50, in accordance with the example embodiments. The function(s) of block 291 can include one or more of the functions described with respect to the launch module 50. As an example, the processor can launch an application to play a non-gambling game, as discussed in connection with the launch module 50 shown in FIG. 7B.

Next, block 292 includes determining whether a playout mode of the non-gambling game is a manual mode or an automatic mode. The function(s) of block 292 can be performed by a processor (e.g., one or more hardware processors) configured by machine-readable instructions including a module that is the same as or similar to the determine playout mode module 51, in accordance with the example embodiments. The function(s) of block 292 can include one or more of the functions described with respect to the determine playout mode module 51. As an example, the processor can determine whether a playout mode of the non-gambling game is a manual mode or an automatic mode, as discussed in connection with the determine playout mode module 51 shown in FIG. 7B.

Next, block 293 includes receiving a quantity of results of a first block of results. The first block of results includes multiple results for the non-gambling game. The function(s) of block 293 can be performed by a processor (e.g., one or more hardware processors) configured by machine-readable instructions including a module that is the same as or similar to the receive module 52, in accordance with the example embodiments. The function(s) of block 293 can include one or more of the functions described with respect to the receive module 52. As an example, the processor can receive a quantity of results of a block of results (e.g., the first block of results), as discussed in connection with the receive module 52 shown in FIG. 7B.

Next, block 294 includes outputting, by the processor on a display, a representation of one or more results of the block. If the playout mode is the manual mode, then outputting the representation includes displaying a respective animation for the one or more results of the block. If the playout mode is the automatic mode, then outputting the representation includes displaying an award amount based on all results of the block without displaying an animation for every individual result of the block. The function(s) of block 294 can be performed by a processor (e.g., one or more hardware processors) configured by machine-readable instructions including a module that is the same as or similar to the output representation module 53, in accordance with the example embodiments. The function(s) of block 294 can include one or more of the functions described with respect to the output representation module 53. As an example, the processor can output, by the processor on a display, a representation of one or more results of the block, as discussed in connection with the output representation module 53 shown in FIG. 7B.

Figure 24:
FIG. 24, FIG. 25, FIG. 26, FIG. 27, FIG. 28, FIG. 29, FIG. 30, FIG. 31, FIG. 32, FIG. 33, FIG. 34, FIG. 35, FIG. 36, and FIG. 37 show additional functions corresponding to the functions shown in FIG. 23, in accordance with example embodiments.

Turning to FIG. 24, a flow chart 295 including block 296 is shown. A method including one or more functions described with respect to the flow chart 290 shown in FIG. 23 or the flow chart 365 shown in FIG. 38 can also include one or more functions described with respect to the flow chart 295.

Block 296 includes determining whether the playout mode of the non-gambling game has changed. The function(s) of block 296 can be performed by a processor (e.g., one or more hardware processors) configured by machine-readable instructions including a module that is the same as or similar to the determine playout mode module 51, in accordance with the example embodiments. The function(s) of block 296 can include one or more of the functions described with respect to the determine playout mode module 51.

Figure 25:
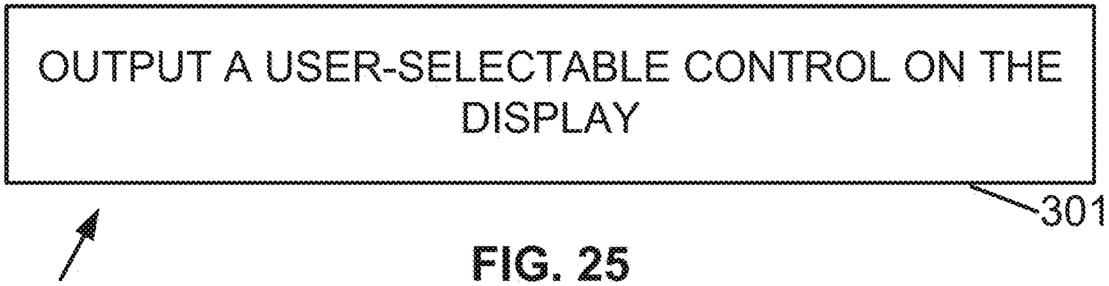

Turning to FIG. 25, a flow chart 430 including block 301 is shown. A method including one or more functions described with respect to the flow chart 290 shown in FIG. 23 or the flow chart 365 shown in FIG. 38 can also include one or more functions described with respect to the flow chart 430.

Block 301 includes outputting a USC on the display. The function(s) of block 301 can be performed by a processor (e.g., one or more hardware processors) configured by machine-readable instructions including a module that is the same as or similar to the output USC module 55, in accordance with the example embodiments. The function(s) of block 301 can include one or more of the functions described with respect to the output USC module 55.

As an example, outputting the USC on the display can include outputting the USC 192 shown in FIG. 9A, one or more of the USC 241, 242, 243, 244, 277, 279 shown in FIG. 9B to FIG. 9E and FIG. 52A to FIG. 53C, one or more of the USC 202 or the registration USC 204 shown in FIG. 11A, or the USC 217 shown in FIG. 11B.

In accordance with at least some embodiments in which the USC 244 is output on the display, displaying each respective animation for a block of results occurs in response to a respective use of the USC 244. In accordance with at least some other embodiments in which the USC 244 is output on the display, displaying each respective animation for a block of results occurs in response to a single use of the user-selectable control.

Figure 26:
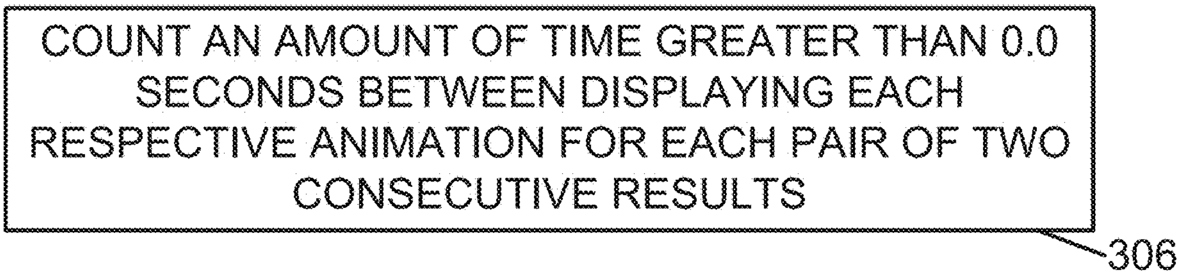

Turning to FIG. 26, a flow chart 305 including block 306 is shown. A method including one or more functions described with respect to the flow chart 290 shown in FIG. 23 or the flow chart 365 shown in FIG. 38 or the flow chart 365 shown in FIG. 38 can also include one or more functions described with respect to the flow chart 305.

Block 306 includes counting an amount of time greater than 0.0 seconds between displaying each respective animation for each pair of two consecutive results. The function(s) of block 306 can be performed by a processor (e.g., one or more hardware processors) configured by machine-readable instructions including a module that is the same as or similar to the count module 54, in accordance with the example embodiments. The function(s) of block 306 can include one or more of the functions described with respect to the count module 54.

Figure 27:
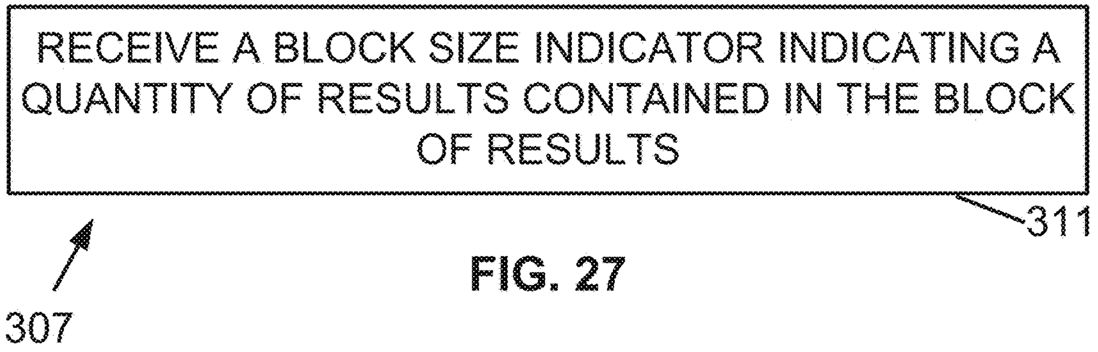

Turning to FIG. 27, a flow chart 307 including block 311 is shown. A method including one or more functions described with respect to the flow chart 290 shown in FIG. 23 or the flow chart 365 shown in FIG. 38 can also include one or more functions described with respect to the flow chart 307.

Block 311 includes receiving a block size indicator indicating a quantity of results contained in the block of results. The function(s) of block 311 can be performed by a processor (e.g., one or more hardware processors) configured by machine-readable instructions including a module that is the same as or similar to the receive module 52, in accordance with the example embodiments. The function(s) of block 311 can include one or more of the functions described with respect to the receive module 52.

Figure 28:
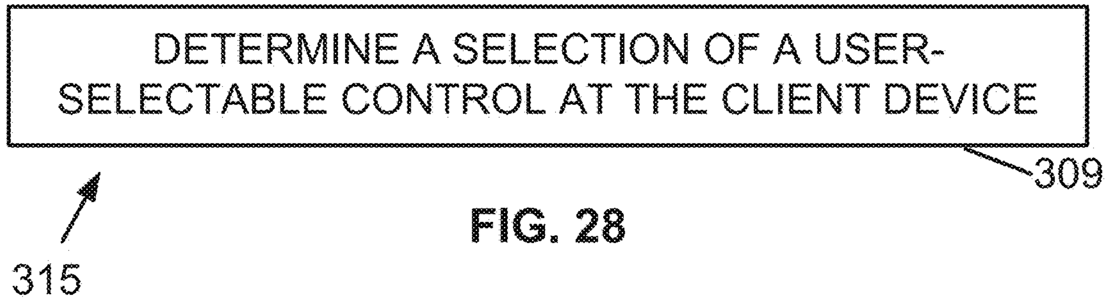

Turning to FIG. 28, a flow chart 315 including block 309 is shown. A method including one or more functions described with respect to the flow chart 290 shown in FIG. 23 or the flow chart 365 shown in FIG. 38 can also include one or more functions described with respect to the flow chart 315.

Block 309 includes determining a selection of a USC at the client device (e.g., the computing system 140B). The function(s) of block 309 can be performed by a processor (e.g., one or more hardware processors) configured by machine-readable instructions including a module that is the same as or similar to the determine USC selection module 56, in accordance with the example embodiments. The function(s) of block 309 can include one or more of the functions described with respect to the determine USC selection module 56. The USC at the client device can include any USC shown in a drawing or any USC described in this description.

Figure 29:
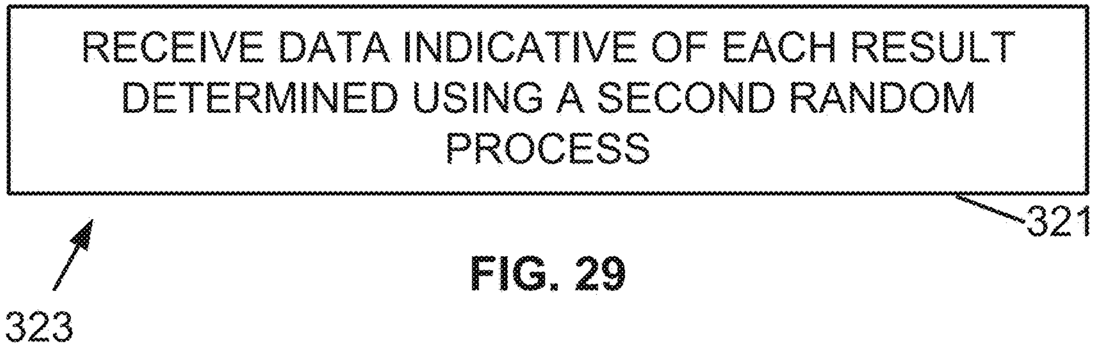

Turning to FIG. 29, a flowchart 323 including block 321 is shown. A method including one or more functions described with respect to the flow chart 290 shown in FIG. 23 or the flow chart 365 shown in FIG. 38 or the flow chart 365 shown in FIG. 38 can also include one or more functions described with respect to the flow chart 323.

Block 321 includes receiving, at a server (e.g., the computing system 140A) from the client device (e.g., the computing system 140B), data indicative of reach result using a second random process. The function(s) of block 321 can be performed by a processor (e.g., one or more hardware processors) configured by machine-readable instructions including a module that is the same as or similar to the receive module 52, in accordance with the example embodiments. The function(s) of block 321 can include one or more of the functions described with respect to the receive module 52.

As an example, the server (e.g., the computing system 140A) can receive the data indicative of reach result using a second random process from the client device (e.g., the computing system 140B). In accordance with that example, the second random process is performed at the client device. As another example, the client device (e.g., the computing system 140B) can receive the data indicative of reach result using a second random process from the server (e.g., the computing system 140A). In accordance with that example, the second random process is performed at the computing system 140A.

Figure 30:
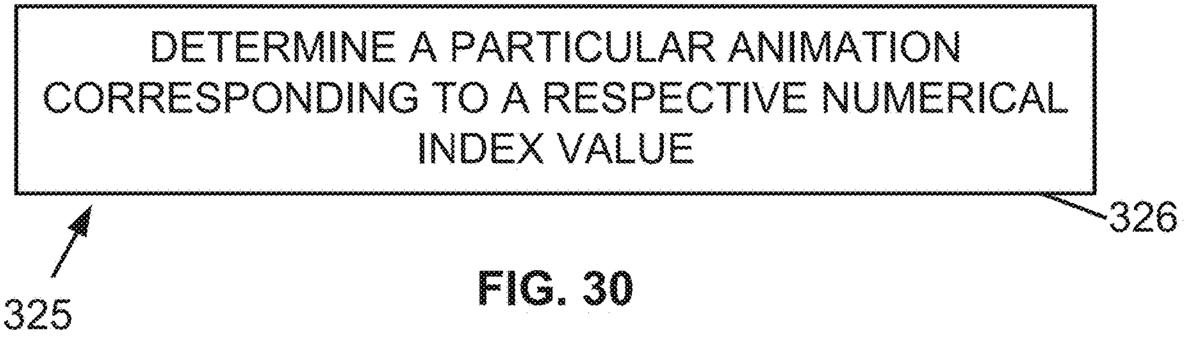

Turning to FIG. 30, a flow chart 325 including block 326 is shown. A method including one or more functions described with respect to the flow chart 290 shown in FIG. 23 or the flow chart 365 shown in FIG. 38 can also include one or more functions described with respect to the flow chart 325.

Block 326 includes determining a particular animation corresponding to a respective numerical index value. The function(s) of block 326 can be performed by a processor (e.g., one or more hardware processors) configured by machine-readable instructions including a module that is the same as or similar to the animation module 63, in accordance with the example embodiments. The function(s) of block 326 can include one or more of the functions described with respect to the animation module 63.

Figure 31:
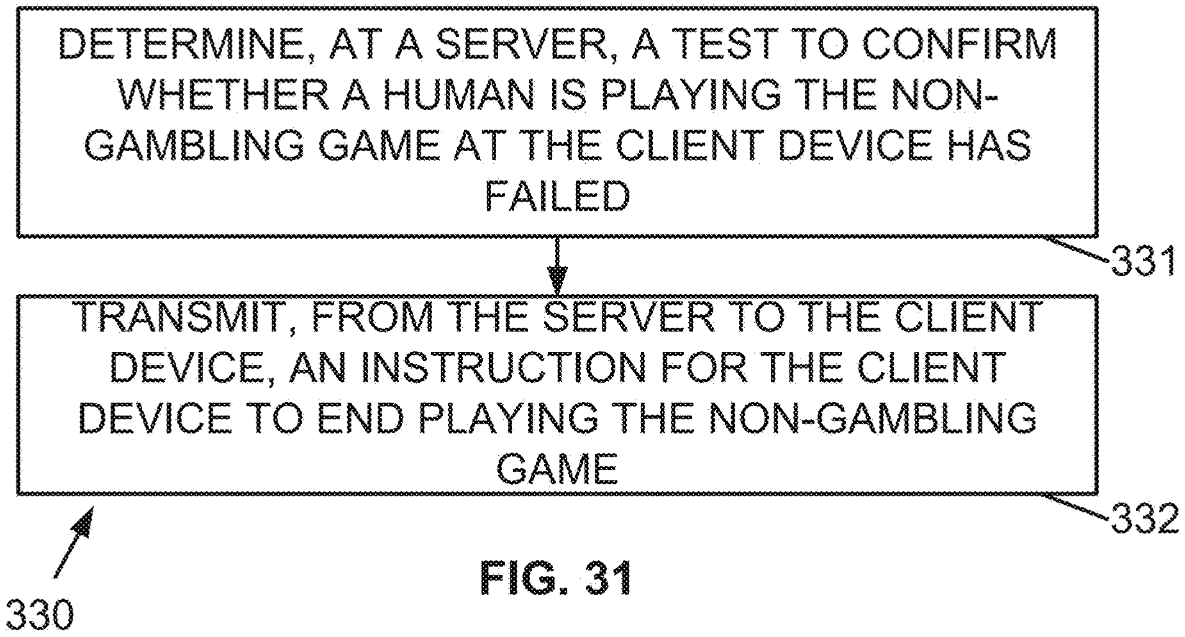

Turning to FIG. 31, a flow chart 330 including block 331, 332 is shown. A method including one or more functions described with respect to the flow chart 290 shown in FIG. 23 or the flow chart 365 shown in FIG. 38 can also include one or more functions described with respect to the flow chart 330.

Block 331 includes determining, at a server (e.g., the computing system 140A), a test to confirm whether a human playing the non-gambling game at a client device (e.g., the computing system 140B) has failed. The function(s) of block 331 can be performed by a processor (e.g., one or more hardware processors) configured by machine-readable instructions including a module that is the same as or similar to the test module 59, in accordance with the example embodiments. The function(s) of block 331 can include one or more of the functions described with respect to the test module 59.

Next, block 332 includes transmitting, from the server (e.g., the computing system 140A) to the client device, an instruction for the client device (e.g., the computing system 140B) to end playing the non-gambling game. The function(s) of block 332 can be performed by a processor (e.g., one or more hardware processors) configured by machine-readable instructions including a module that is the same as or similar to the transmit module 64, in accordance with the example embodiments. The function(s) of block 332 can include one or more of the functions described with respect to the transmit module 64.

Figure 32:
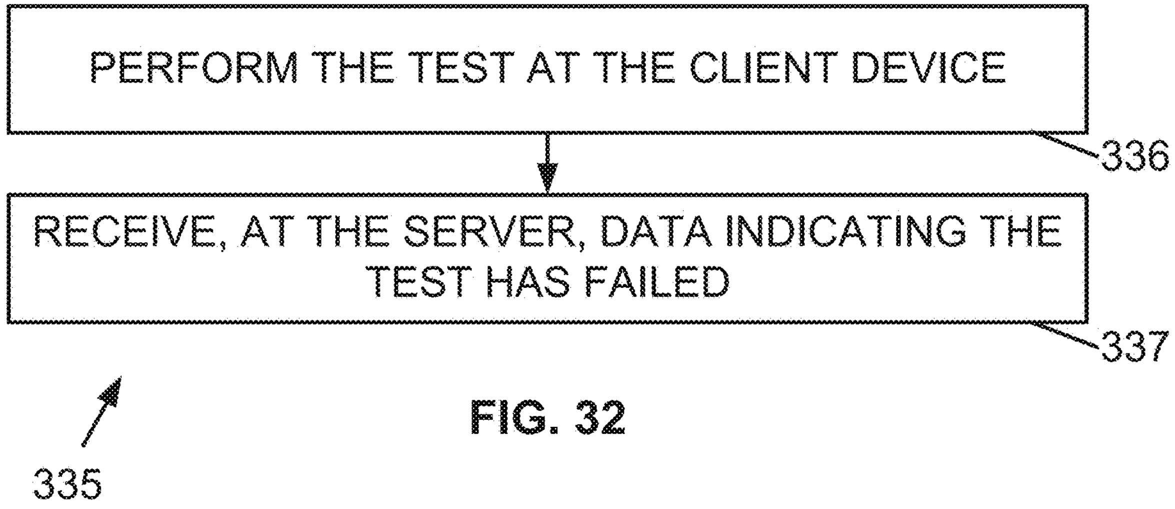

Turning to FIG. 32, a flow chart 335 including block 336, 337 is shown. A method including one or more functions described with respect to the flow chart 290 shown in FIG. 23 or the flow chart 365 shown in FIG. 38 can also include one or more functions described with respect to the flow chart 335.

Block 336 includes performing the test at the client device (e.g., the computing system 140B). The test is the test to confirm whether a human playing the non-gambling game at a client device. The function(s) of block 336 can be performed by a processor (e.g., one or more hardware processors) configured by machine-readable instructions including a module that is the same as or similar to the test module 59, in accordance with the example embodiments. The function(s) of block 336 can include one or more of the functions described with respect to the test module 59.

Next, block 337 includes receiving, at the server (e.g., the computing system 140A), data indicating the test has failed. The function(s) of block 337 can be performed by a processor (e.g., one or more hardware processors) configured by machine-readable instructions including a module that is the same as or similar to the receive module 52, in accordance with the example embodiments. The function(s) of block 336 can include one or more of the functions described with respect to the receive module 52.

Figure 33:
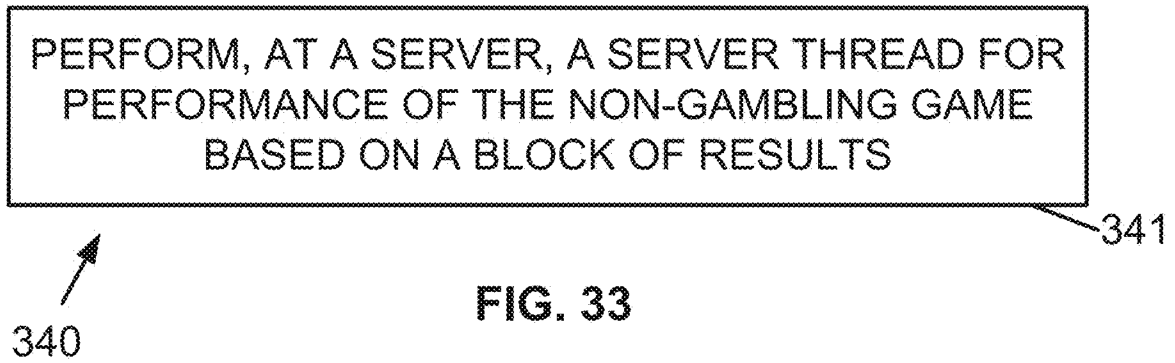

Turning to FIG. 33, a flow chart 340 including block 341 is shown. A method including one or more functions described with respect to the flow chart 290 shown in FIG. 23 or the flow chart 365 shown in FIG. 38 can also include one or more functions described with respect to the flow chart 340.

Block 341 includes performing, at a server (e.g., the computing system 140A), a server thread for performance of the non-gambling game based on a block of results (e.g., a first or second block of results). Performing the server thread for performance of the non-gambling game based on the block of results can include determining whether the playout mode of the non-gambling game for the client device is the manual mode or the automatic mode, and outputting data for displaying the representation of one or more results of the first block at the client device. The function(s) of block 341 can be performed by a processor (e.g., one or more hardware processors) configured by machine-readable instructions including a module that is the same as or similar to the server process module 60, in accordance with the example embodiments. The function(s) of block 341 can include one or more of the functions described with respect to the server process module 60.

Figure 34:
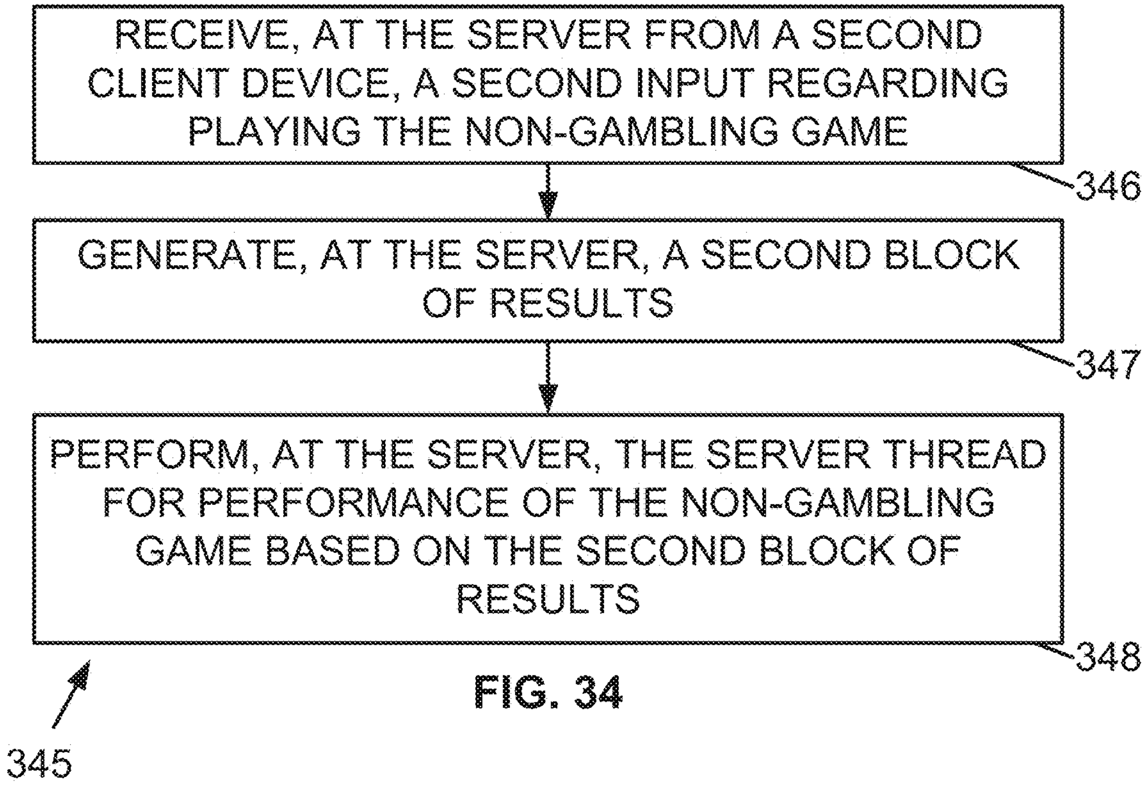

Turning to FIG. 34, a flow chart 345 including block 346, 347, 348 is shown. A method including one or more functions described with respect to the flow chart 290 shown in FIG. 23 or the flow chart 365 shown in FIG. 38 can also include one or more functions described with respect to the flow chart 345.

Block 346 includes receiving, at the server from a second client device (e.g., a second instance of the computing system 140B), a second input regarding playing the non-gambling game. The function(s) of block 346 can be performed by a processor (e.g., one or more hardware processors) configured by machine-readable instructions including a module that is the same as or similar to the receive input module 61, in accordance with the example embodiments. The function(s) of block 346 can include one or more of the functions described with respect to the receive input module 61.

Next, block 347 includes generating, at the server, a second block of results. The function(s) of block 347 can be performed by a processor (e.g., one or more hardware processors) configured by machine-readable instructions including a module that is the same as or similar to the generate block module 57, in accordance with the example embodiments. The function(s) of block 347 can include one or more of the functions described with respect to the generate block module 57. The second block of results includes multiple results of the non-gambling game.

Next, block 348 includes performing, at the server, the server thread for performance of the non-gambling game based on the second block of results. The function(s) of block 348 can be performed by a processor (e.g., one or more hardware processors) configured by machine-readable instructions including a module that is the same as or similar to the server process module 60, in accordance with the example embodiments. The function(s) of block 348 can include one or more of the functions described with respect to the server process module 60.

Performing the server thread for performance of the non-gambling game based on the second block of results can include determining whether a playout mode of the non-gambling game for the second client device is the manual mode or the automatic mode, and outputting data for outputting a representation of one or more results of the second block at the second client device.

Figure 35:
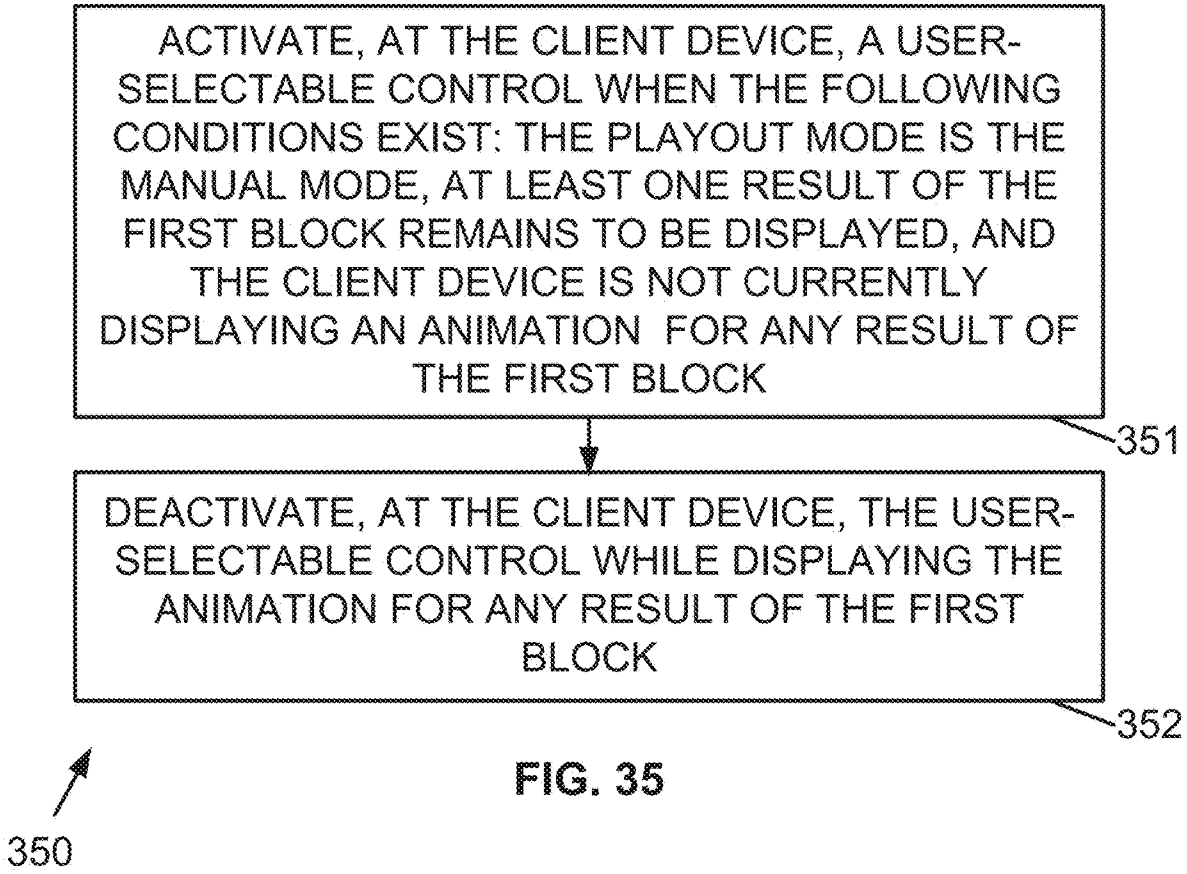

Turning to FIG. 35, a flow chart 350 including block 351, 352 is shown. A method including one or more functions described with respect to the flow chart 290 shown in FIG. 23 or the flow chart 365 shown in FIG. 38 can also include one or more functions described with respect to the flow chart 350.

Block 351 includes activating a USC (e.g., the USC 244) when the following conditions exist: the playout mode is the manual mode, at least one result of a block of results remains to be displayed, and the client device (e.g., the computing system 140B) is not currently displaying an animation for any result of the first block. The function(s) of block 351 can be performed by a processor (e.g., one or more hardware processors) configured by machine-readable instructions including a module that is the same as or similar to the activate USC module 58, in accordance with the example embodiments. The function(s) of block 351 can include one or more of the functions described with respect to the activate USC module 58.

Next, block 352 includes deactivating, at the client device, the USC (e.g., the USC 244) while displaying the activation for any result of the first block. The function(s) of block 352 can be performed by a processor (e.g., one or more hardware processors) configured by machine-readable instructions including a module that is the same as or similar to the activate USC module 58, in accordance with the example embodiments. The function(s) of block 352 can include one or more of the functions described with respect to the activate USC module 58.

Figure 36:
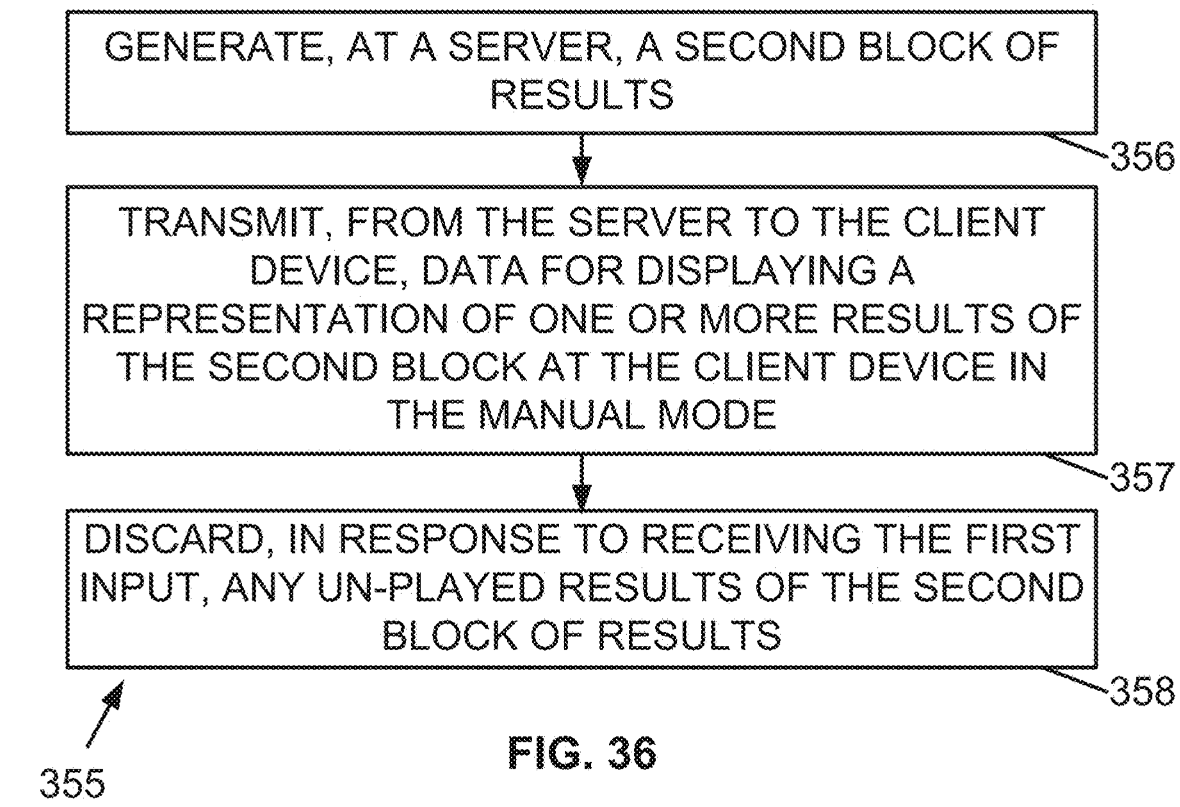

Turning to FIG. 36, a flow chart 355 including block 356, 357, 358 is shown. A method including one or more functions described with respect to the flow chart 290 shown in FIG. 23 or the flow chart 365 shown in FIG. 38 can also include one or more functions described with respect to the flow chart 355.

Block 356 includes generating, at a server (e.g., the computing system 140A), a second block of results. The function(s) of block 356 can be performed by a processor (e.g., one or more hardware processors) configured by machine-readable instructions including a module that is the same as or similar to the generate block module 57, in accordance with the example embodiments. The function(s) of block 356 can include one or more of the functions described with respect to the generate block module 57.

Next, block 357 includes transmitting, from the server (e.g., the computing system 140A) to the client device (e.g., the computing system 140B), data for displaying a representation of one or more results of the second block at the client device in the manual mode. The function(s) of block 357 can be performed by a processor (e.g., one or more hardware processors) configured by machine-readable instructions including a module that is the same as or similar to the transmit module 64, in accordance with the example embodiments. The function(s) of block 357 can include one or more of the functions described with respect to the transmit module 64.

Next, block 358 includes discarding, in response to receiving the first input, any unplayed results of the second block of results. The function(s) of block 358 can be performed by a processor (e.g., one or more hardware processors) configured by machine-readable instructions including a module that is the same as or similar to the discard block module 65, in accordance with the example embodiments. The function(s) of block 358 can include one or more of the functions described with respect to the discard block module 65.

Figure 37:
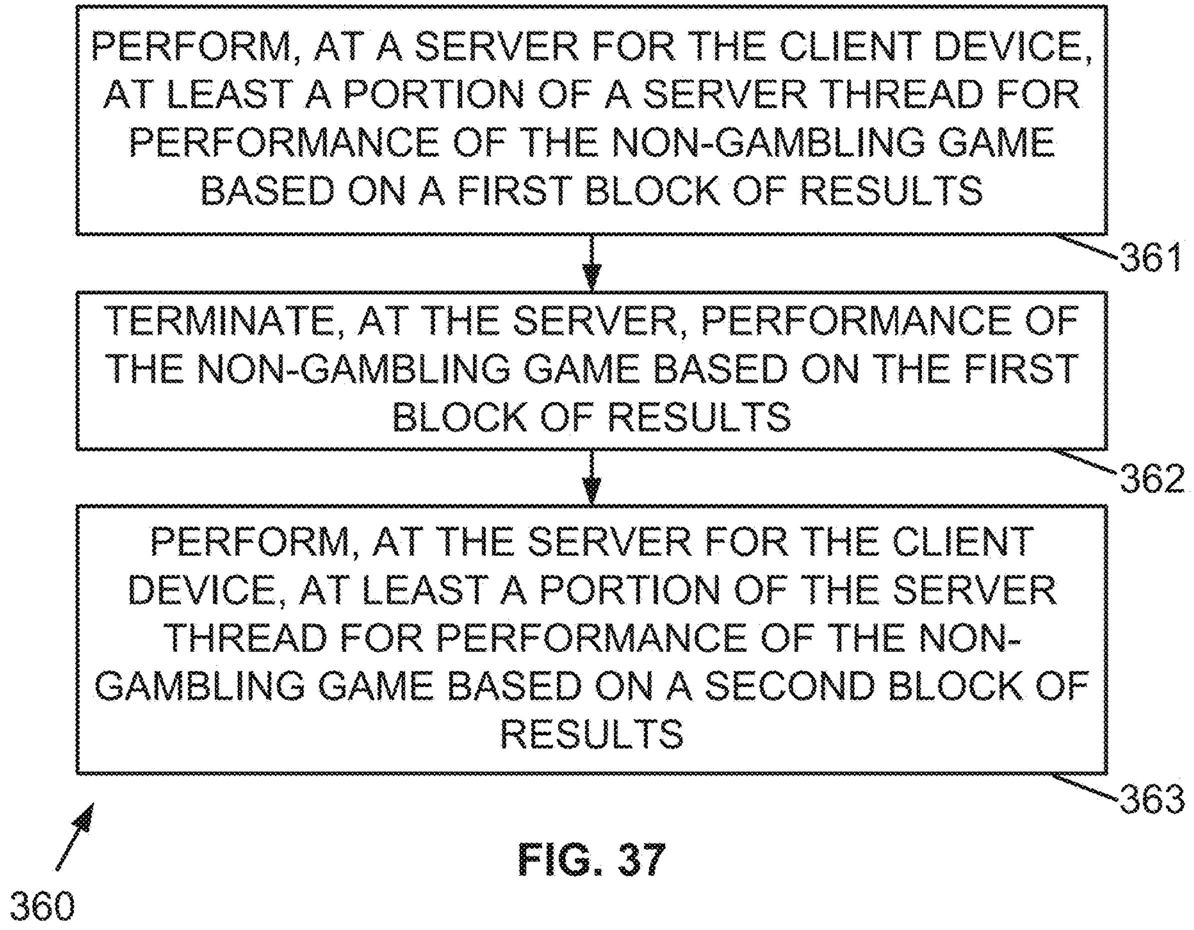

Turning to FIG. 37, a flow chart 360 including block 361, 362, 363 is shown. A method including one or more functions described with respect to the flow chart 290 shown in FIG. 23 or the flow chart 365 shown in FIG. 38 can also include one or more functions described with respect to the flow chart 360.

Block 361 includes performing, at a server (e.g., the computing system 140A) for the client device (e.g., the computing system 140B), at least a portion of a server thread for performance of the non-gambling game based on a first block of results. The function(s) of block 361 can be performed by a processor (e.g., one or more hardware processors) configured by machine-readable instructions including a module that is the same as or similar to the server process module 60, in accordance with the example embodiments. The function(s) of block 361 can include one or more of the functions described with respect to the server process module 60.

Performing the thread in its entirety can include playing a complete block of results for the non-gambling game, or a playing a portion of the block of results and then requesting a refreshed block of results. In some embodiments, performing only a portion of the server thread may occur if the player stops playing the non-gambling game by selecting a user-selectable control to stop playing the game or if a test to determine whether a human is playing the game fails.

Next, block 362 includes terminating, at the server, performance of the non-gambling game based on the first block of results. The function(s) of block 362 can be performed by a processor (e.g., one or more hardware processors) configured by machine-readable instructions including a module that is the same as or similar to the server process module 60, in accordance with the example embodiments. The function(s) of block 362 can include one or more of the functions described with respect to the server process module 60.

Next, block 363 includes perform, at the server for the client device, at least a portion of the server thread for performance of the non-gambling game based on a second block of results. The function(s) of block 363 can be performed by a processor (e.g., one or more hardware processors) configured by machine-readable instructions including a module that is the same as or similar to the server process module 60, in accordance with the example embodiments. The function(s) of block 363 can include one or more of the functions described with respect to the server process module 60.

Figure 38:
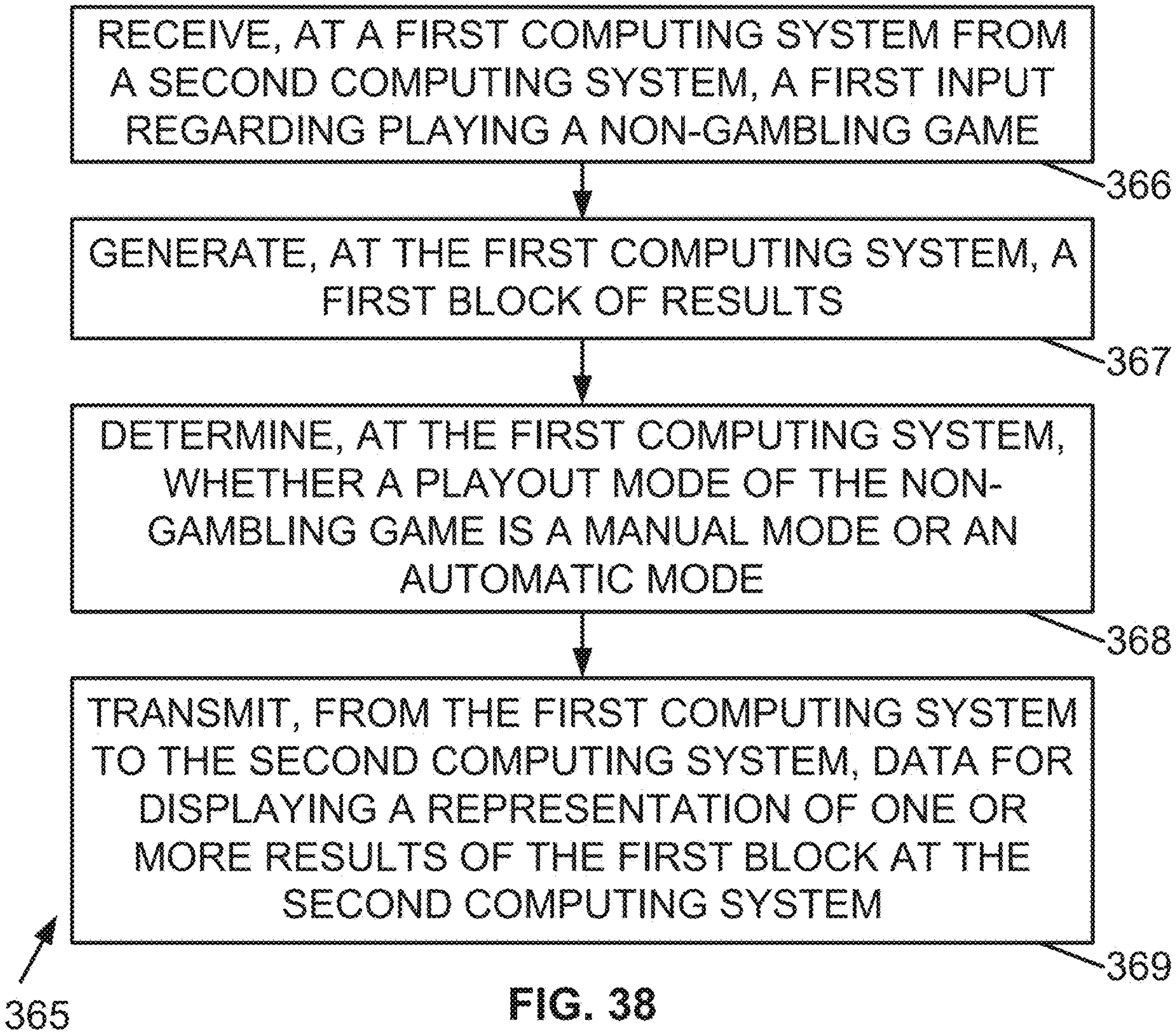
FIG. 38 is a flow chart showing functions of a method corresponding to playing a non-gambling game, in accordance with example embodiments.

Next, FIG. 38 is a flow chart 365 showing functions of an example embodiment that can be carried out using a first computing system, such as the gaming system 100 of FIG. 1, the computing system 132 of FIG. 3, the computing system 140 of FIG. 4, the computing system 140A of FIG. 5, and/or the computing system 140B. The flow chart 365 includes block 366, 367, 368, 369.

Block 366 includes receiving, at a first computing system (e.g., the computing system 140A) from a second computing system (e.g., the computing system 140B), a first input regarding playing a non-gambling game. The function(s) of block 366 can be performed by a processor (e.g., one or more hardware processors) configured by machine-readable instructions including a module that is the same as or similar to the receive module 52, in accordance with the example embodiments. The function(s) of block 366 can include one or more of the functions described with respect to the receive module 52.

Next, block 367 includes generating, at the first computing system, a first block of results. The function(s) of block 367 can be performed by a processor (e.g., one or more hardware processors) configured by machine-readable instructions including a module that is the same as or similar to the generate block module 57, in accordance with the example embodiments. The function(s) of block 367 can include one or more of the functions described with respect to the generate block module 57.

Next, block 368 includes determining, at the first computing system, whether a playout mode of the non-gambling game is a manual mode or an automatic mode. The function(s) of block 368 can be performed by a processor (e.g., one or more hardware processors) configured by machine-readable instructions including a module that is the same as or similar to the determine playout mode module 51, in accordance with the example embodiments. The function(s) of block 368 can include one or more of the functions described with respect to the determine playout mode module 51.

Next, block 369 includes transmitting, from the first computing system to the second computing system, data for displaying a representation of one or more results of the first block at the second computing system. The function(s) of block 369 can be performed by a processor (e.g., one or more hardware processors) configured by machine-readable instructions including a module that is the same as or similar to the transmit module 64, in accordance with the example embodiments. The function(s) of block 369 can include one or more of the functions described with respect to the transmit module 64.

Figure 39:
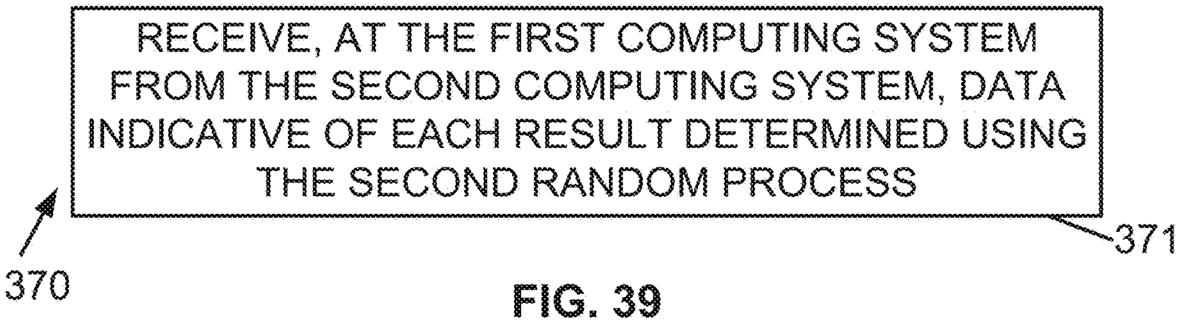
FIG. 39, FIG. 40, FIG. 41, FIG. 42, FIG. 43, FIG. 44, FIG. 45, and FIG. 46 show additional functions corresponding to the functions shown in FIG. 38, in accordance with example embodiments.

Turning to FIG. 39, a flow chart 370 including block 371 is shown. A method including one or more functions described with respect to the flow chart 365 shown in FIG. 38 or the flow chart 290 shown in FIG. 23 can also include one or more functions described with respect to the flow chart 370.

Block 371 includes receiving, at the first computing system from the second computing system, data indicative of each result determined using the second random process. The function(s) of block 371 can be performed by a processor (e.g., one or more hardware processors) configured by machine-readable instructions including a module that is the same as or similar to the receive module 52, in accordance with the example embodiments. The function(s) of block 371 can include one or more of the functions described with respect to the receive module 52.

Figure 40:
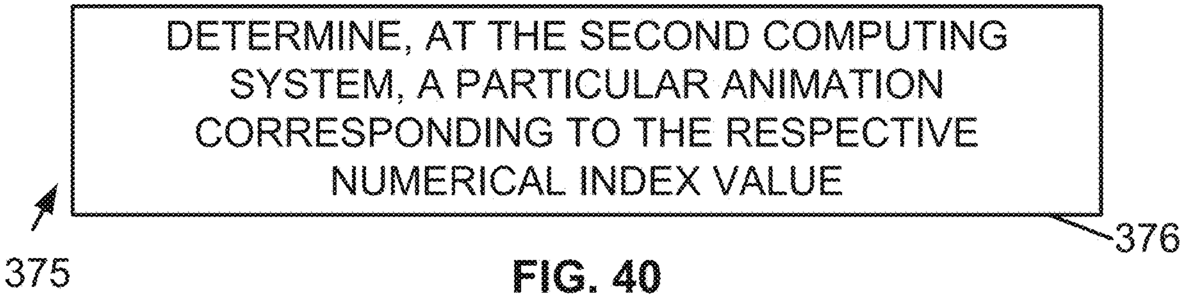

Turning to FIG. 40, a flow chart 375 including block 376 is shown. A method including one or more functions described with respect to the flow chart 365 shown in FIG. 38 or the flow chart 290 shown in FIG. 23 can also include one or more functions described with respect to the flow chart 375.

Block 376 includes determining, at the second computing system, a particular animation corresponding to the respective numerical index value. The function(s) of block 376 can be performed by a processor (e.g., one or more hardware processors) configured by machine-readable instructions including a module that is the same as or similar to the animation module 63, in accordance with the example embodiments. The function(s) of block 376 can include one or more of the functions described with respect to the animation module 63.

Figure 41:
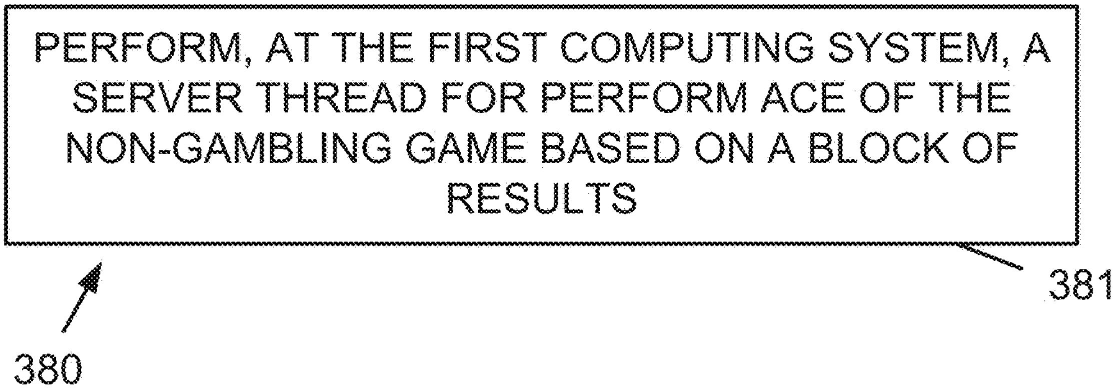

Turning to FIG. 41, a flow chart 380 including block 381 is shown. A method including one or more functions described with respect to the flow chart 365 shown in FIG. 38 or the flow chart 290 shown in FIG. 23 can also include one or more functions described with respect to the flow chart 380.

Block 381 includes performing, at the first computing system (e.g., the computing system 140A), a server thread for performance of the non-gambling game based on a block of results (e.g., the first or second block of results). The function(s) of block 381 can be performed by a processor (e.g., one or more hardware processors) configured by machine-readable instructions including a module that is the same as or similar to the server process module 60, in accordance with the example embodiments. The function(s) of block 381 can include one or more of the functions described with respect to the server process module 60.

As an example, performing the server thread for performance of the non-gambling game based on the block of results includes determining whether the playout mode of the non-gambling game for the second computing system is the manual mode or the automatic mode, and outputting the data for displaying the representation of one or more results of the block of results at the second computing system.

Figure 42:
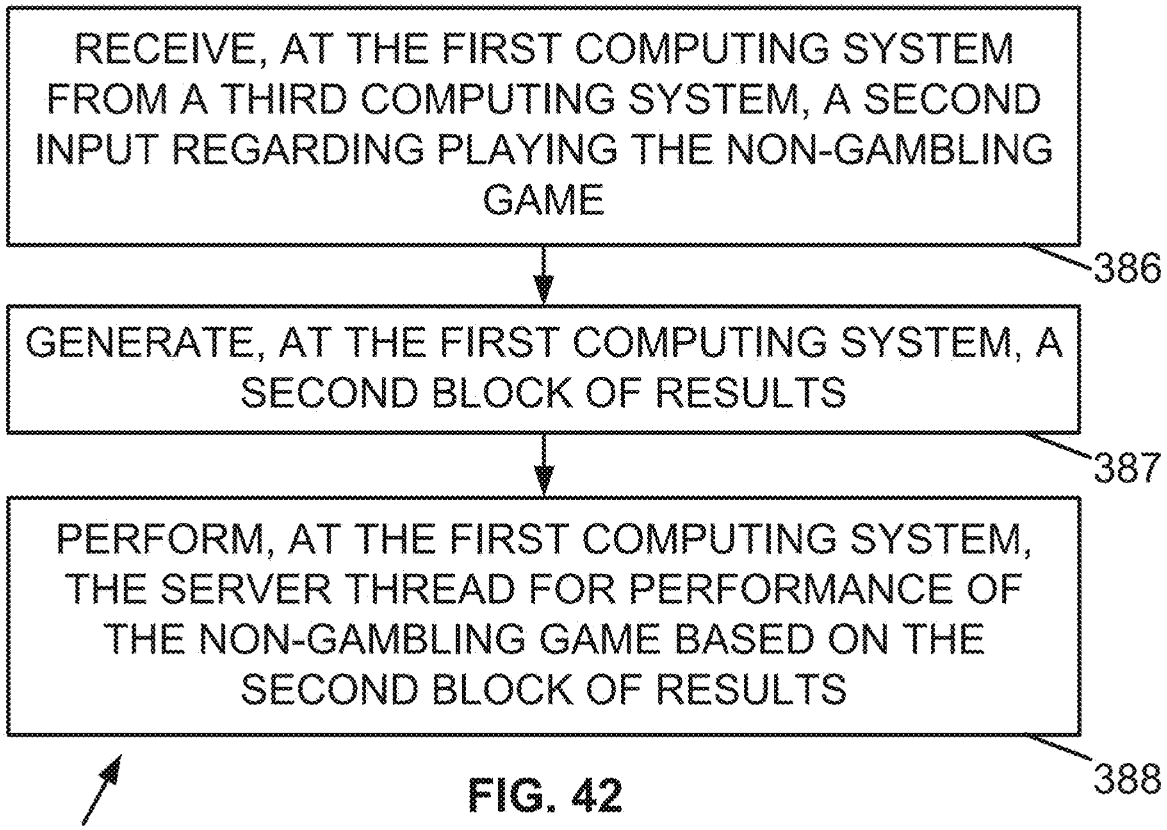

Turning to FIG. 42, a flow chart 385 including block 386, 387, 388 is shown. A method including one or more functions described with respect to the flow chart 365 shown in FIG. 38 or the flow chart 290 shown in FIG. 23 can also include one or more functions described with respect to the flow chart 385.

Block 386 includes receiving, at the first computing system (e.g., the computing system 140A) from a third computing system (e.g., a second instance of the computing system 140B), a second input regarding playing the non-gambling game. The function(s) of block 386 can be performed by a processor (e.g., one or more hardware processors) configured by machine-readable instructions including a module that is the same as or similar to the server process module 60, in accordance with the example embodiments. The function(s) of block 386 can include one or more of the functions described with respect to the server process module 60. As an example, the second input can include an input received in response selection of a USC, such as the USC 243 prior to all results of a block of results being played out, or the USC 244 after all results of a block of results have been played out.

Next, block 387 includes generating, at the first computing system (e.g., the computing system 140A), a second block of results. The function(s) of block 387 can be performed by a processor (e.g., one or more hardware processors) configured by machine-readable instructions including a module that is the same as or similar to the generate block module 57, in accordance with the example embodiments. The function(s) of block 387 can include one or more of the functions described with respect to the generate block module 57. The second block of results includes multiple results of the non-gambling game. For example, the second block of results can include 2 or more results (e.g., 10,000 results).

Block 388 includes performing, at the first computing system (e.g., the computing system 140A), the server thread for performance of the non-gambling game based on the second block of results. The function(s) of block 388 can be performed by a processor (e.g., one or more hardware processors) configured by machine-readable instructions including a module that is the same as or similar to the server process module 60, in accordance with the example embodiments. The function(s) of block 388 can include one or more of the functions described with respect to the server process module 60. Performing the server thread for performance of the non-gambling game based on the second block of results can include determining whether a playout mode of the non-gambling game for the third computing system is the manual mode or the automatic mode, and outputting data for outputting a representation of one or more results of the second block at the third computing system. As an example, performing the server thread can include calling for execution of and/or executing the determine playout mode module 51 and calling for execution of and/or executing the output representation module 53. Performing a server thread can include performing only a portion of the server thread.

Figure 43:
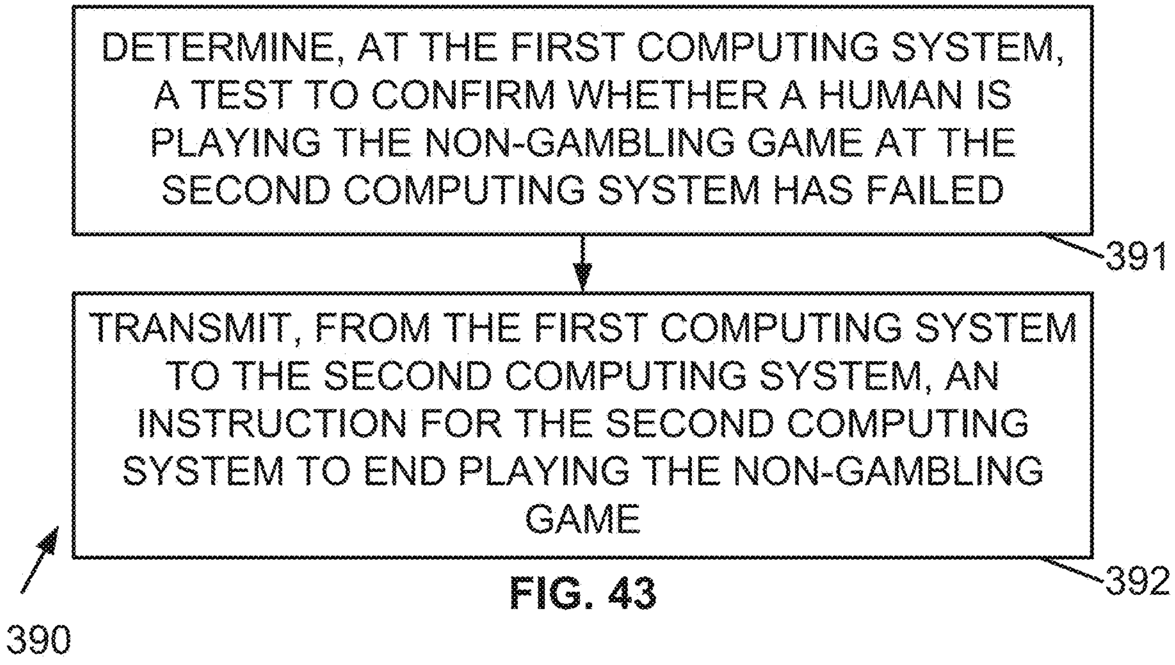

Turning to FIG. 43, a flow chart 390 including block 391, 392 is shown. A method including one or more functions described with respect to the flow chart 365 shown in FIG.

38 or the flow chart 290 shown in FIG. 23 can also include one or more functions described with respect to the flow chart 390.

Block 391 includes determining, at the first computing system, a test to confirm whether a human is playing the non-gambling game at the second computing system has failed. The function(s) of block 391 can be performed by a processor (e.g., one or more hardware processors) configured by machine-readable instructions including a module that is the same as or similar to the test module 59, in accordance with the example embodiments. The function(s) of block 391 can include one or more of the functions described with respect to the test module 59.

Next, block 392 includes transmitting, from the first computing system to the second computing system, an instruction for the second computing system to end playing the non-gambling game. The function(s) of block 392 can be performed by a processor (e.g., one or more hardware processors) configured by machine-readable instructions including a module that is the same as or similar to the transmit module 64, in accordance with the example embodiments. The function(s) of block 392 can include one or more of the functions described with respect to the transmit module 64.

Figure 44:
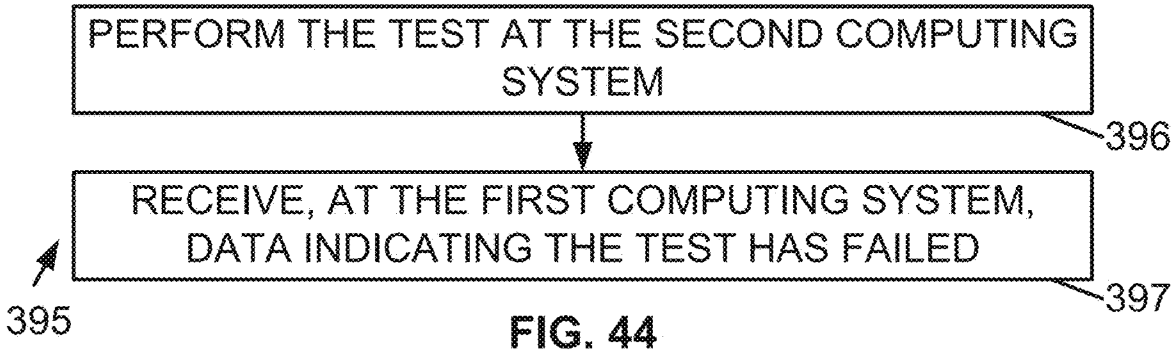

Turning to FIG. 44, a flow chart 395 including block 396, 397 is shown. A method including one or more functions described with respect to the flow chart 365 shown in FIG. 38 or the flow chart 290 shown in FIG. 23 can also include one or more functions described with respect to the flow chart 395.

Block 396 includes performing the test at the second computing system. The function(s) of block 396 can be performed by a processor (e.g., one or more hardware processors) configured by machine-readable instructions including a module that is the same as or similar to the test module 59, in accordance with the example embodiments. The function(s) of block 396 can include one or more of the functions described with respect to the test module 59.

Next, block 397 includes receiving, at the first computing system, data indicating the test has failed. The function(s) of block 397 can be performed by a processor (e.g., one or more hardware processors) configured by machine-readable instructions including a module that is the same as or similar to the receive module 52, in accordance with the example embodiments. The function(s) of block 397 can include one or more of the functions described with respect to the receive module 52.

Figure 45:
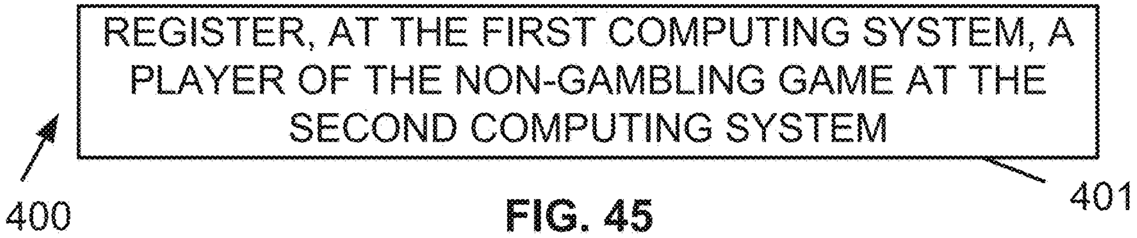

Turning to FIG. 45, a flow chart 400 including block 401 is shown. A method including one or more functions described with respect to the flow chart 365 shown in FIG. 38 or the flow chart 290 shown in FIG. 23 can also include one or more functions described with respect to the flow chart 400.

Block 401 includes registering, at the first computing system, a player of the non-gambling game at the second computing system. The function(s) of block 401 can be performed by a processor (e.g., one or more hardware processors) configured by machine-readable instructions including a module that is the same as or similar to the registration module 66, in accordance with the example embodiments. The function(s) of block 401 can include one or more of the functions described with respect to the registration module 66.

Figure 46:

Turning to FIG. 46, a flow chart 405 including block 406 is shown. A method including one or more functions described with respect to the flow chart 365 shown in FIG. 38 or the flow chart 290 shown in FIG. 23 can also include one or more functions described with respect to the flow chart 405.

Block 406 includes modifying, at the first computing system, a credit account. The function(s) of block 406 can be performed by a processor (e.g., one or more hardware processors) configured by machine-readable instructions including a module that is the same as or similar to the credit module 67, in accordance with the example embodiments. The function(s) of block 406 can include one or more of the functions described with respect to the credit module 67.

c. Example Blocks and Random Numbers

As discussed, a block of multiple results can include two or more results (e.g., 10,000 results). Now, for simplicity, examples of blocks of results with 100 results are described. By coincidence, a random number generator (RNG) described with respect to these examples generates random numbers between the range 1 to 100, inclusive. Execution of the random process module 62 can occur to perform any selection of a random number corresponding to these examples.

FIG. 47 shows a table 440 that includes the numbers 1 to 100 that can be selected by the RNG. The data also shows whether a win or loss corresponds to each of the numbers 1 to 100. For example, the number 1 corresponds to win W1, the numbers 2, 3 correspond to win W2, the numbers 4, 5 correspond to win W3, the numbers 6, 7, 8 correspond to W4, the numbers 9, 10, 11 correspond to win W5, and the numbers 12 to 100 correspond to losses (i.e., non-wins). The symbols described with respect to these examples correspond to the symbols shown in FIG. 13.

Next, FIG. 48 shows a table 505 that includes win/loss data 506, symbol combination data 507, payout data 508, and probability data 509. As an example, the table 505 represents that an animation played out for any loss results in displaying a non-winning combination of symbols and results in no payout (i.e., 0) and the probability for achieving a non-winning combination or loss is 89%. As another example, the table 505 represents that an animation played out for a win W4 or the win W5 results in displaying combination of symbols that result in a $2.00 payout and the probability for achieving each of those wins is 3%. As yet another example, the table 505 represents that an animation played out for a win W3 or the win W2 results in displaying combination of symbols that result in a $5.00 payout and the probability for achieving each of those wins is 2%. As still yet another example, the table 505 represents that an animation played out for a win W1 results in displaying combination of symbols that result in a $10.00 payout and the probability for achieving each of those wins is 1%.

In accordance with these examples, the non-winning combination indicated in the symbol combination data 507 can include any combination of one symbol from each of reel 218, 220, 222 that does not result in the win W1, W2, W3, W4, W5.

Next, FIG. 49, FIG. 50, and FIG. 51 show a table 515, a table 516, and a table 517, respectively. The table 515, 516, 517 show data of a respective block of results containing one hundred results. The table 515, 516 include both winning and non-winning results. The table 517 includes non-winning results only (i.e., no winning results). As an example, the first block of results described elsewhere in this description can include the data shown in the table 515, and the second block of results described elsewhere in this description can include the data shown in the table 516 or the table 517. In other words, the first block of results can include winning and non-winning results. As an example, the first block of results described elsewhere in this description can include the data shown in the table 517, and the second block of results described elsewhere in this description can include the data shown in the table 515 or the table 516. In other words, the first block of results can include only losing results.

Figure 52A:
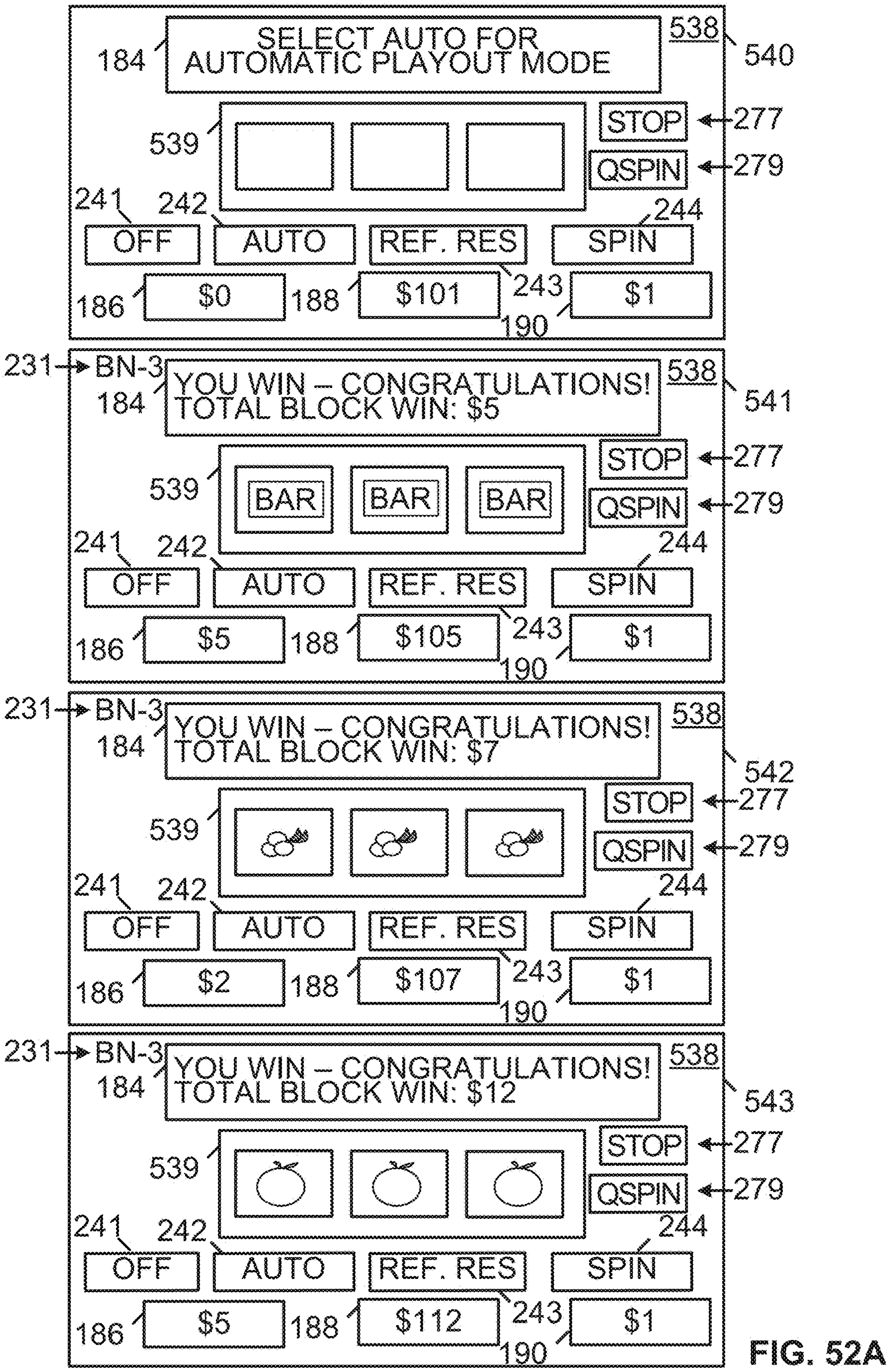
Figure 52C:
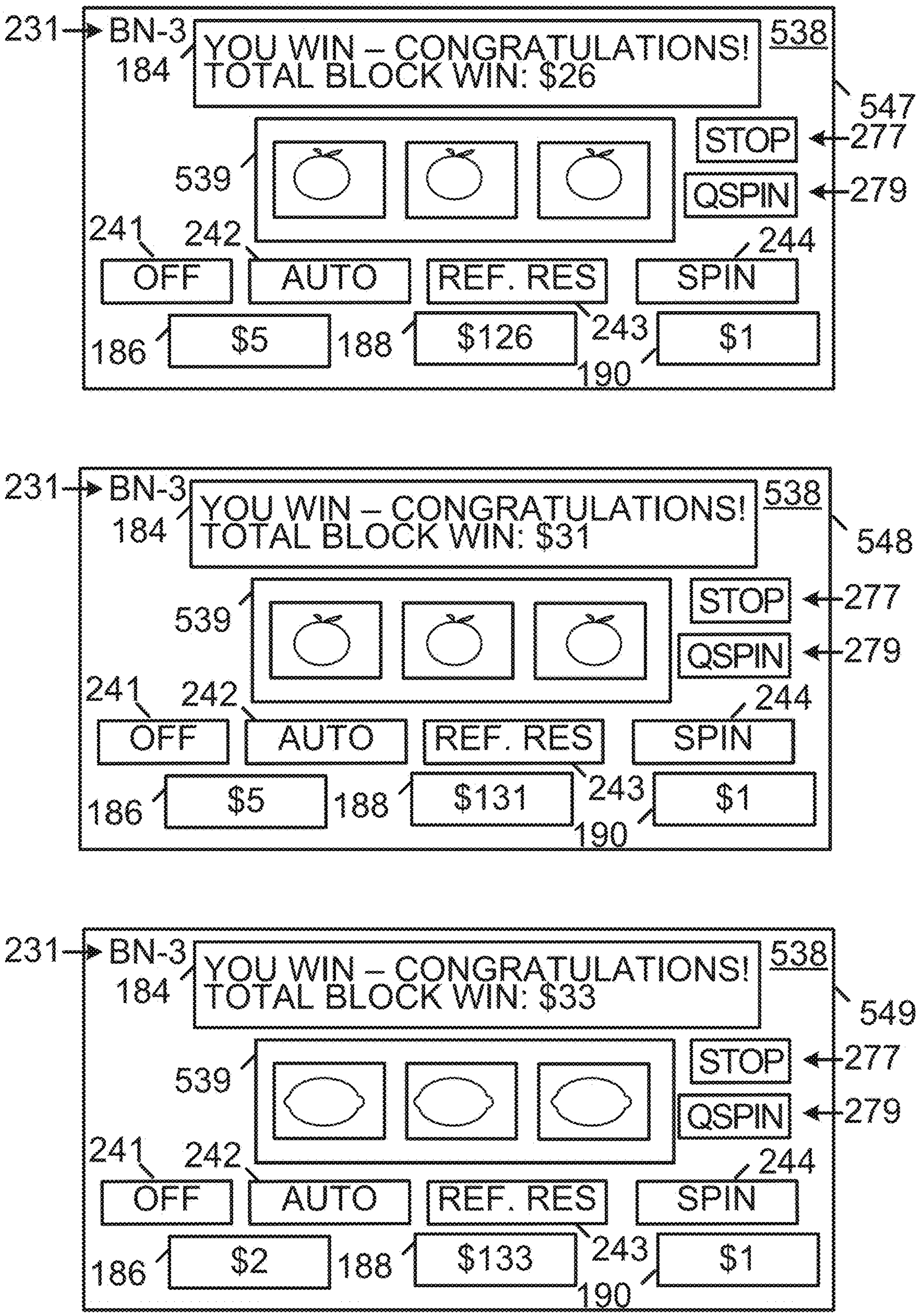

Next, FIG. 52A, FIG. 52B, and FIG. 52C show various views (i.e., a view 540, 541, 542, 543, 544, 545, 546, 547, 548, 549) of a GUI 538 that includes aspects of the GUI 180B shown in FIG. 9B. For example, the GUI 538 includes the outcome event identifier 184, the payout amount indicator 186, the credit balance indicator 188, the payment amount indicator 190, and the USC 241, 242, 243, 244. The GUI 538 includes a symbol-display-segment 539 configured to show animations of three spinnable reels. Results of a block of results can be output within the symbol-display-segment 539. The results shown in the various views in FIG. 52A to FIG. 52C are from the table 515. The view 541, 542, 543, 544, 545, 546, 547, 548, 549 includes a block number 231 corresponding to a block of results generated for playing out the game as shown in those views.

The view 540 shows the GUI 538 before playing the non-gambling game for a first block of results (i.e., a block of results shown in the Table 515) in the automatic playout mode. The outcome event identifier 184 includes guidance for a player regarding having the computing system to play the non-gambling game in the automatic playout mode. The payment amount indicator 190 indicates the fee to play the non-gambling game in the automatic playout mode is $1. Prior to selecting the automatic playout mode using the USC 242, a credit balance indicated by the credit balance indicator 188 is $101.

The view 541 shows the GUI 538 after selection of the USC 242 and the USC 244, and after the computing system has played out at least the results R1 to R7 of the block of results. Since the automatic playout mode has been selected, the results R1 to R6, which are non-winning results are not output within the GUI 538. The symbol-display-segment 539 shows symbols selected for result R7, a winning result. The outcome event identifier 184 indicates an amount of the total block win for the played out results is $5. The payout amount indicator 186 shows the $5 win. The credit balance indicator 188 indicates the modified credit balance of $105 (which results from subtracting $1 for selecting the automatic playout mode and adding the $5 win).

The view 542 shows the GUI 538 after the computing system has further played out at least the results R8 to R26 of the block of results. Since the automatic playout mode has been selected, the results R8 to R25, which are non-winning results are not output within the GUI 538. The symbol-display-segment 539 shows symbols selected for result R26, a winning result. The outcome event identifier 184 indicates an amount of the total block win for the played out results is $7. The payout amount indicator 186 shows the $2 win. The credit balance indicator 188 indicates the modified credit balance of $107 (which results from adding the $2 win).

The view 543 shows the GUI 538 after the computing system has further played out at least the results R27 to R35 of the block of results. Since the automatic playout mode has been selected, the results R27 to R34, which are non-winning results are not output within the GUI 538. The symbol-display-segment 539 shows symbols selected for result R35, a winning result. The outcome event identifier 184 indicates an amount of the total block win for the played out results is $12. The payout amount indicator 186 shows the $5 win. The credit balance indicator 188 indicates the modified credit balance of $112 (which results from adding the $5 win).

The view 544 shows the GUI 538 after the computing system has further played out at least the results R36 to R50 of the block of results. Since the automatic playout mode has been selected, the results R36 to R49, which are non-winning results are not output within the GUI 538. The symbol-display-segment 539 shows symbols selected for result R50, a winning result. The outcome event identifier 184 indicates an amount of the total block win for the played out results is $17. The payout amount indicator 186 shows the $5 win. The credit balance indicator 188 indicates the modified credit balance of $117 (which results from adding the $5 win).

The view 545 shows the GUI 538 after the computing system has further played out at least the results R51 to R62 of the block of results. Since the automatic playout mode has been selected, the results R51 to R61, which are non-winning results are not output within the GUI 538. The symbol-display-segment 539 shows symbols selected for result R62, a winning result. The outcome event identifier 184 indicates an amount of the total block win for the played out results is $19. The payout amount indicator 186 shows the $2 win. The credit balance indicator 188 indicates the modified credit balance of $119 (which results from adding the $2 win).

The view 546 shows the GUI 538 after the computing system has further played out at least the results R63 to R64 of the block of results. Since the automatic playout mode has been selected, the result R63, which is a non-winning result is not output within the GUI 538. The symbol-display-segment 539 shows symbols selected for result R64, a winning result. The outcome event identifier 184 indicates an amount of the total block win for the played out results is $21. The payout amount indicator 186 shows the $2 win. The credit balance indicator 188 indicates the modified credit balance of $121 (which results from adding the $2 win).

The view 547 shows the GUI 538 after the computing system has further played out at least the result R65 of the block of results. The symbol-display-segment 539 shows symbols selected for result R65, a winning result. The outcome event identifier 184 indicates an amount of the total block win for the played out results is $26. The payout amount indicator 186 shows the $5 win. The credit balance indicator 188 indicates the modified credit balance of $126 (which results from adding the $5 win).

The view 548 shows the GUI 538 after the computing system has further played out at least the results R66 to R77 of the block of results. Since the automatic playout mode has been selected, the results R66 to R76, which are non-winning results are not output within the GUI 538. The symbol-display-segment 539 shows symbols selected for result R77, a winning result. The outcome event identifier 184 indicates an amount of the total block win for the played out results is $31. The payout amount indicator 186 shows the $5 win. The credit balance indicator 188 indicates the modified credit balance of $131 (which results from adding the $5 win).

The view 549 shows the GUI 538 after the computing system has further played out at least the results R78 to R85 of the block of results. Since the automatic playout mode has been selected, the results R78 to R84, which are non-winning results are not output within the GUI 538. The symbol-display-segment 539 shows symbols selected for result R85, a winning result. The outcome event identifier 184 indicates an amount of the total block win for the played out results is $33. The payout amount indicator 186 shows the $2 win. The credit balance indicator 188 indicates the modified credit balance of $133 (which results from adding the $2 win).

Figure 53A:
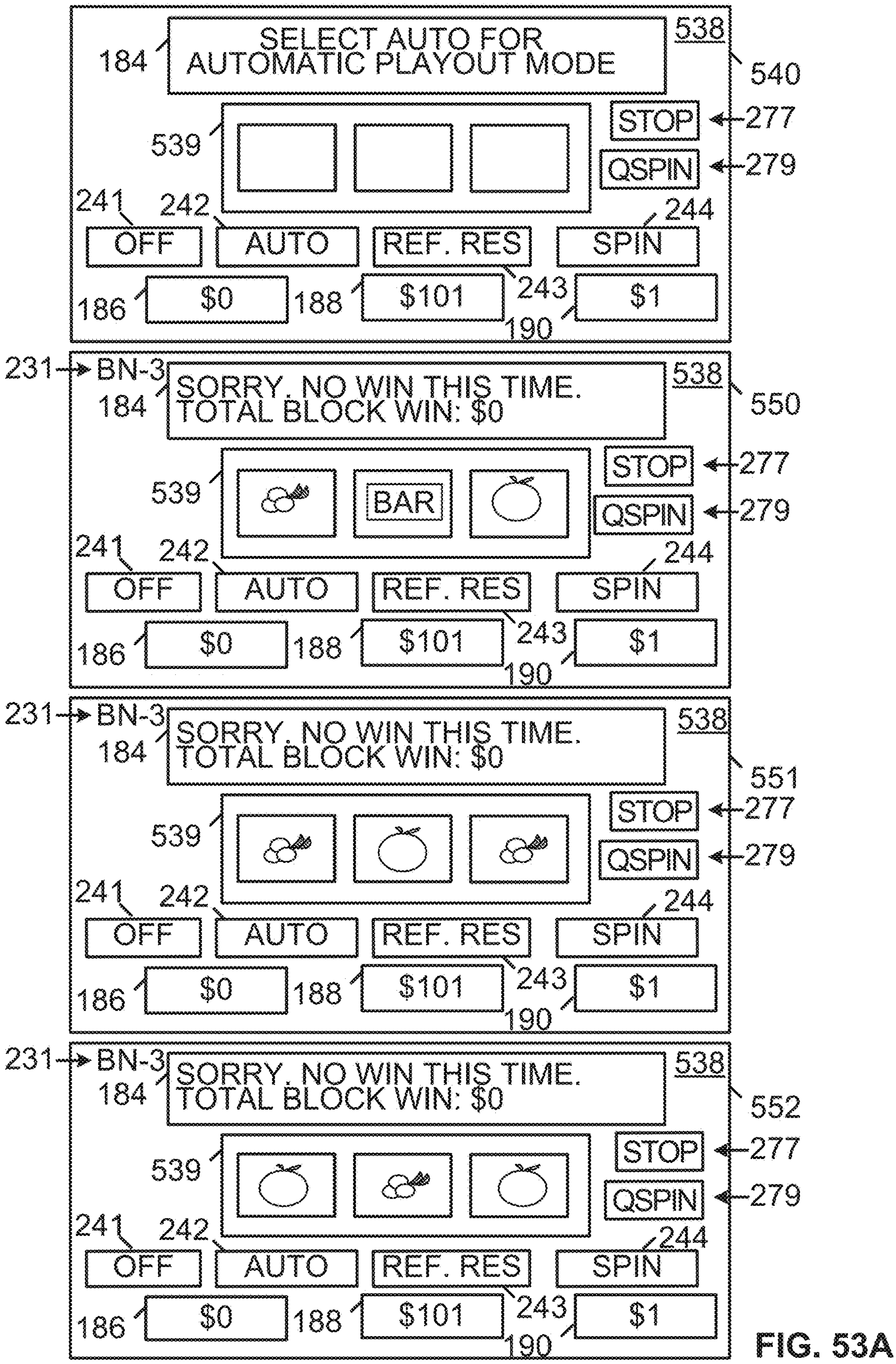
Figure 53B:
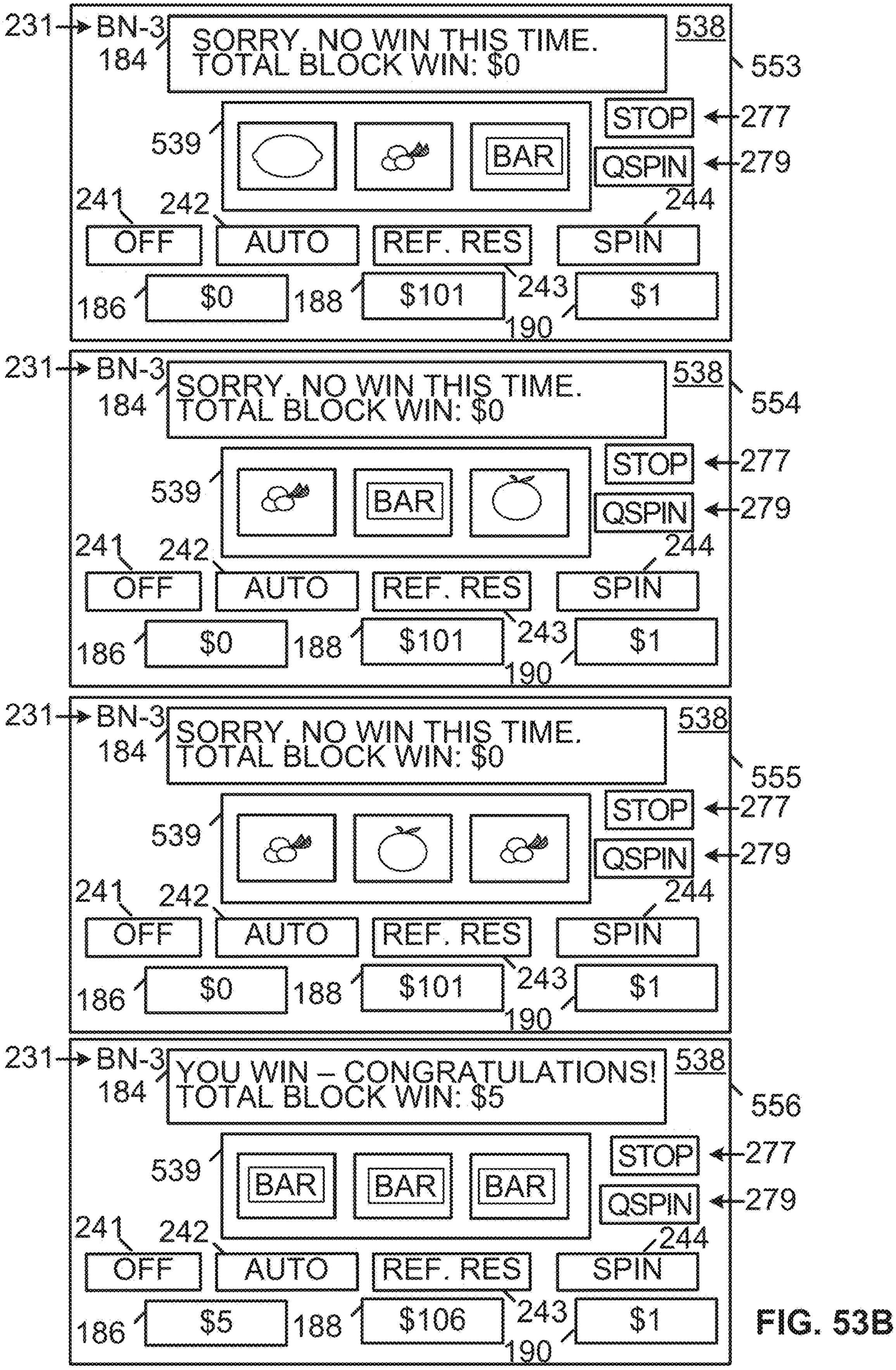
Figure 53C:
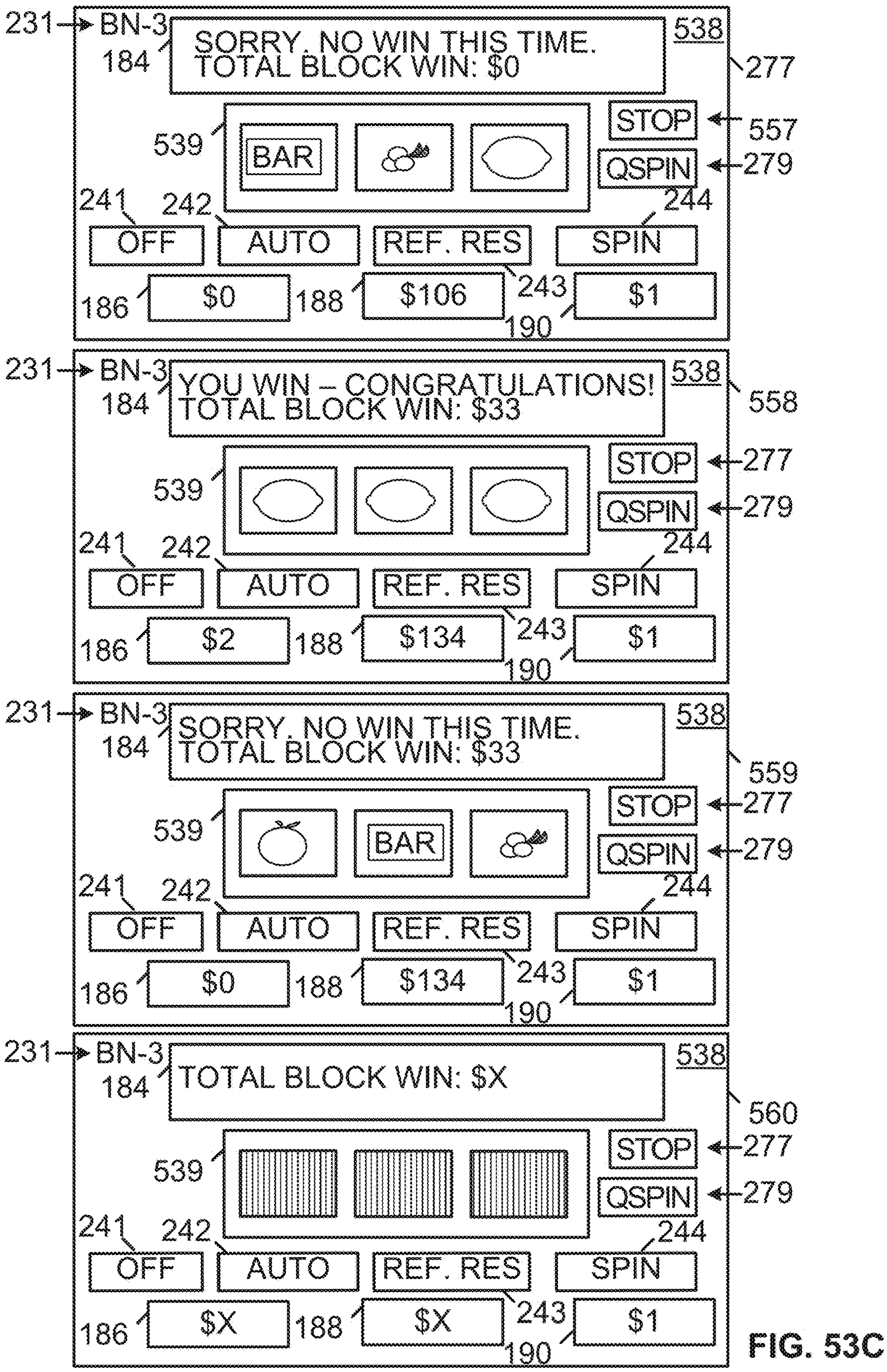

Next, FIG. 53A, FIG. 53B, and FIG. 53C show various views (i.e., a view 540, 550, 551, 552, 553, 554, 555, 556, 557, 558, 559, 560) of the GUI 538 that includes aspects of the GUI 180B shown in FIG. 9B. The view 540 in FIG. 53A is identical to the view 540 shown in FIG. 52A. The results shown in the various views in FIG. 53A to FIG. 53C are from the table 515. The view 550, 551, 552, 553, 554, 555, 556, 557, 558, 559, 560 includes the block number 231 corresponding to a block of results generated for playing out the game as shown in those views.

The view 550 shows the GUI 538 after selection of the USC 244 (without selecting the USC 242 to select the automatic playout mode or after selecting the USC 242 to switch from the automatic to manual playout mode), and after the computing system has played out at least result R1 of the block of results. The symbol-display-segment 539 shows symbols selected for result R1, a non-winning result. The outcome event identifier 184 indicates an amount of the total block win for the played out results is $0. The payout amount indicator 186 shows the $0 non-win. The credit balance indicator 188 indicates the credit balance remains at $101.

The view 551 shows the GUI 538 after the computing system has further played out at least result R2 of the block of results. The symbol-display-segment 539 shows symbols selected for result R2, a non-winning result. The outcome event identifier 184 indicates an amount of the total block win for the played out results is $0. The payout amount indicator 186 shows the $0 non-win. The credit balance indicator 188 indicates the credit balance remains at $101.

The view 552 shows the GUI 538 after the computing system has further played out at least result R3 of the block of results. The symbol-display-segment 539 shows symbols selected for result R3, a non-winning result. The outcome event identifier 184 indicates an amount of the total block win for the played out results is $0. The payout amount indicator 186 shows the $0 non-win. The credit balance indicator 188 indicates the credit balance remains at $101.

The view 553 shows the GUI 538 after the computing system has further played out at least result R4 of the block of results. The symbol-display-segment 539 shows symbols selected for result R4, a non-winning result. The outcome event identifier 184 indicates an amount of the total block win for the played out results is $0. The payout amount indicator 186 shows the $0 non-win. The credit balance indicator 188 indicates the credit balance remains at $101.

The view 554 shows the GUI 538 after the computing system has further played out at least result R5 of the block of results. The symbol-display-segment 539 shows symbols selected for result R5, a non-winning result. The outcome event identifier 184 indicates an amount of the total block win for the played out results is $0. The payout amount indicator 186 shows the $0 non-win. The credit balance indicator 188 indicates the credit balance remains at $101.

The view 555 shows the GUI 538 after the computing system has further played out at least result R6 of the block of results. The symbol-display-segment 539 shows symbols selected for result R6, a non-winning result. The outcome event identifier 184 indicates an amount of the total block win for the played out results is $0. The payout amount indicator 186 shows the $0 non-win. The credit balance indicator 188 indicates the credit balance remains at $101.

The view 556 shows the GUI 538 after the computing system has further played out at least result R7 of the block of results. The symbol-display-segment 539 shows symbols selected for result R7, a winning result. The outcome event identifier 184 indicates an amount of the total block win for the played out results is $5. The payout amount indicator 186 shows the $5 win. The credit balance indicator 188 indicates the modified credit balance of $106 (which results from adding the $5 win).

The view 557 shows the GUI 538 after the computing system has further played out at least result R7 and up to result R25 of the block of results. The symbol-display-segment 539 shows symbols selected for one of the results R7 to R25, a non-winning result. The outcome event identifier 184 indicates an amount of the total block win for the played out results is $5. The payout amount indicator 186 shows the $0 non-win. The credit balance indicator 188 indicates the credit balance remains at $106.

The view 558 shows the GUI 538 after the computing system has further played out at least result R85 of the block of results. Since the non-gambling game is being played out in the manual mode, the computing system would have displayed the results R26 to R84 after displaying the result R25 as shown in the view 557 and before displaying the result R85 as shown in the view 558. The symbol-display-segment 539 shows symbols selected for result R85, a winning result. The outcome event identifier 184 indicates an amount of the total block win for the played out results is $33. The payout amount indicator 186 shows the $2 win. The credit balance indicator 188 indicates the modified credit balance of $134 (which results from adding the wins for results R26, R35, R50, R62, R65, R77, and R85).

The view 559 shows the GUI 538 after the computing system has further played out at least result R86 and up to result R100 of the block of results. The symbol-display-segment 539 shows symbols selected for one of the results R86 to R100, each of which is a non-winning result. The outcome event identifier 184 indicates an amount of the total block win for the played out results is $33. The payout amount indicator 186 shows the $0 non-win. The credit balance indicator 188 indicates the credit balance remains at $134.

The view 560 shows the GUI 538 while an animation showing the reels within the symbol-display-segment 539 are spinning. The view 560 can be visible before displaying each result of the results shown in the table 515. If the auto-play mode active, then the view 560 can occur without requiring the user to select the USC 244 to show each result. If the auto-play mode is inactive, the view 560 is shown after selecting the USC 244 before the first result and each subsequent result is output on the display. In at least some embodiments in which the manual mode is selected, the USC 244 may be disabled for a predetermined amount of time while each result is displayed.

Furthermore, as noted, the table 517 includes non-winning results only (i.e., no winning results). Therefore, referring to FIG. 53A, if a player selected the automatic playout mode via the USC 242 from the GUI 538 as shown in the view 540 and then the USC 244, the computing system will show a single non-winning result of the block of results shown in the table 517, such as the non-winning result indicated in the view 550 shown in FIG. 53A except that the block number 231 would be different than "BN-3" and the credit balance indicator 188 would indicate the modified credit balance of $100 (which results from subtracting $1 for selecting the automatic playout mode). As an example, the block number 231 could indicate a block number, such as BN-4 or some other block number.

On the other hand, referring to FIG. 53A, if a player begins playing the block of results shown in the table 517 by selecting the USC 244 without selecting the automatic playout mode, then the computing system will show the 100 results of the block of results shown in the table 517 (so long as the player does not request refreshing of the block or does not stop playing the game). As an example, each of the results played out from the table 517 can look like the non-winning result indicated in the view 550 shown in FIG. 53A except that the block number 231 would be different than "BN-3," and the symbols shown in the symbol-display-segment 539 would contain a non-winning combination of symbols, such as the combination symbols shown in the view 550, 551, 552, 553, 554, 555, 557, 559 or some other non-winning combination of symbols. As an example, the block number 231 could indicate a block number, such as BN-4 or some other block number.

VI. Additional Example Memory Content

Next, FIG. 54 shows the memory 158F and data (e.g., content) that can be stored in a memory (e.g., the memory 158 shown in FIG. 4) in accordance with the example embodiments. The memory 158A (shown in FIG. 5) can contain any or all of the data shown in FIG. 54 and/or other data. Likewise, the memory 158B (shown in FIG. 5) can contain any or all of the data shown in FIG. 54 and/or other data. In at least some embodiments, data shown in FIG. 54 can also or alternatively be contained (at least temporarily) within a data register of the processor 156, 156A, 156B.

As shown in FIG. 54, the memory 158F can include: an operating system 180, modules 203, an application 207, a program instruction 209, a database 211, game support data 213, a block archive 189, a GUI 194, a symbol 196, a sound 198, an animation 201, and/or an advertisement 205. Any aspect shown in FIG. 54 and listed in singular form can include multiple instances of such aspect. For example, the program instruction can include multiple program instructions.

The operating system 180 can include an operating system executable on a computing system. The processor 156A of the computing system 100A can execute an operating system, such as a Linux-based operating system, a Windows server operating system, or a Unix-based operating system operable. The processor 156B of the computing system 100B can execute an operating system, such a smart phone operating system (e.g., an iPhone Operating System (iOS) available from Apple Inc. of Cupertino, California, or an Android operating system available from Google, LLC of Mountain View, California), or a desktop or laptop computer operating system, such as a Microsoft Windows operating system available from the Microsoft Corporation operable on the computing system 100B. Other examples of the operating system 180 are also possible. The processor 156 of the computing system 140 can execute one of the example operating systems listed above or another operating system.

The operating system 180 can launch an application to play a non-gambling game, such as a video slots game, a video scratch-card game, a video prize wheel game, or a video roulette game. Launching the application can occur in response to a processor determining a user-selectable control corresponding to the application has been selected. For example, the processor can determine a USC 606 shown in FIG. 58 has been selected and responsively launch an application corresponding to a game G1.

Launching the application can include loading the application from a memory where the application is stored before being launched into RAM. The application loaded into RAM can include program instructions, static data, and an initial stack space for function calls and local variables. Launching the application can include a shared library or a dynamic link library the application uses during execution. Launching the application can include initiating execution of the program instructions at an entry point of the program instructions. Launching the application can include outputting a GUI (e.g., an initial GUI of the application, such as GUI 614 shown in FIG. 59).

The modules 203 can include one or more modules executable by a processor. A module of the modules 203 can be embodied within an application of the application 207. A module of the modules 203 can include a program instruction of the program instruction 209. Example modules that can be contained within the modules 203 are shown in FIG. 56. The modules 203 can include a software module. The aspects described with respect to one or more of the example modules shown in FIG. 56 can be embodied in a hardware logic module within the logic module 146, 146A, 146B.

The application 207 can include any software application discussed in this description. As an example, the application 207 can include a browser application for executing on the computing system 140B. As another example, the application 207 can include an application the computing system 140 B executes to establish a WebSocket with the computing system 140A to allow a player to play rounds of a non-gambling game based on one or more outcomes of a block of outcomes. As another example, the application 207 can include an application configured to interface with an application programming interface (API). In accordance with that example, the API can include an interface output on the display 148B to allow a user to enter via the user interface 144B data to store within the game support data 213. An application within the application 207 can be configured to stop playing the game if the processor executing the application receives data indicating a test to detect whether a human is playing a game has failed. A benefit of this functionality is that the application can prevent bots from playing the game.

The program instruction 209 can include one or more computer-readable program instructions (e.g., machine readable instructions) executable by one or more processors. The program instructions 166 can be executable to cause a computing system or a component of the computing system to perform any function described in this description. In at least some embodiments, the program instructions are arranged as an application of the application 164 or as a module of the modules 203. As an example, the program instructions can be written in an object oriented programming language such as Java, Python, or C++, or a functional programming language, such as the Python programming language, or a procedural programming language, such as the "C" programming language.

The database 211 includes a database for storing blocks of outcomes of a non-gambling game. For embodiments in which a computing system is configured to play a single type of game, the database 211 can include blocks of outcomes for the single type of game. For embodiments in which a computing system is configured to play multiple types of game, the database 211 can be arranged as a single database with blocks of outcomes for the different games, such as two hundred blocks of outcomes for a first non-gambling game (e.g., a video slots game), and three hundred blocks of outcomes for a second non-gambling game (e.g., a scratch-card game). Alternatively, the database 211 can comprise multiple databases, such as a first database for the blocks of outcomes for the first non-gambling game and a second database for blocks of outcomes for the second non-gambling game. The database 211 can include a block database 318 shown in FIG. 57.

The database 211 can include data other than blocks of outcomes. For example, the database 211 can include one or more databases containing any of the game support data 213, the block archive 189, the GUI 194, the symbol 196, the sound 198, the animation 201, the advertisement 205, or any other data (e.g., content) used by a computing system described herein.

The game support data 213 can include data (i.e., content) a processor uses and/or refers to while executing the operating system 180, the modules 203, the application 207, and/or the program instruction 209.

As an example, the game support data 213 can include a threshold, such as a threshold quantity of unused blocks of outcomes stored in the memory (e.g., within the database 211).

As another example, the game support data 213 can include summarizing data based on use of the computing system to play games. For instance, the summarizing data can include data indicating how many unused blocks of outcome remain in the database 211, how many blocks of outcomes within the database 211 (now and/or in the past) have been used.

As another example, the game support data 213 can include registration data for one or more players or would-be players of games at or via the computing system 140, 140A, 140B. The registration data can include a list of relevant information regarding individual players, including name, contact information, account information, password associated with the player, and/or payment account or payment card information (e.g., a player account facility identifier). The registration data can include data regarding payment(s) to players corresponding to one or more winning outcomes of a game, such as a non-gambling game.

As yet another example, the game support data 213 can include data indicating a number of credits available for a player. The number of credits can be referred to as a credit value. A processor can update the credits available for each player based on awards earned by playing a game with a winning outcome and/or by charging a payment account or payment card corresponding to the player. The credit value can be displayed on the display 148, 148A, 148B. Credits available to a player can be used to select the computing system to play games in a SmartPlay mode. A request to output outcomes of the game during a time period according to the SmartPlay mode can be accompanied by or is associated with a payment. Credits available to a player can be redeemed (e.g., transferred to the player's payment account or an account associated with the player's payment card). In at least some embodiments, the number of credits can be based on AMOEs received by a player.

As still yet another example, the game support data 213 can include a communication and/or data contained within a communication, such as a communication transmitted by a processor, a communication generated for transmitting by a processor, or a communication received by the processor. The communication can include an instruction, such as a spin instruction transmitted by the computing system 140B, or an outcome, such as an outcome transmitted by the computing system 140A in response to receiving the spin instruction.

The block archive 189 is a portion of the memory for storing a block of outcomes after the block of outcomes has been used completely or discarded by a player requesting a new block before the block of outcomes has been used completely. A block of outcomes within the block archive 189 can be referred to as an "archived block of outcomes" and/or an "archived block." An archived block can include a result, such as the result 530 shown in FIG. 55. The result 530 can include metadata corresponding to data contained in the game support data 213. Additionally, or alternatively, the result 530 can include data regarding use of the block of outcomes, such as a player identifier corresponding to the player that played the game using the block of outcomes, a mode identifier indicating whether the outcomes of the block were played out using the SmartPlay or SlowPlay mode, a date identifier indicating when the block was used, time identifiers indicating or useable to determine how much time the block of outcomes was in use, address information indicating an IP address used by the computing system to play the game, a sum of winning outcomes of the block that were processed for the player, or redemption information regarding any payment made for any winning outcomes of the block. Other examples of information contained within the result 530 or otherwise in the block archive are also possible. The block archive 189 can comprise a block archive 320 shown in FIG. 57.

The GUI 194 can include one or more GUIs. As an example, the GUI 194 can include a GUI that the computing system 140A transmits to the computing system 140B, and that computing system 140B stores within the memory 158B and displays on the display 148B. As another example, the GUI 194 includes a GUI of an application stored in the application 207 and that is populated with data provided by the computing system 140A. As an example, the data provided by the computing system 140A can include data indicating an outcome of an instance of playing a game (e.g., a game described in this description). As another example, the GUI 194 can include a GUI populated with the animation 201. As yet another example, the GUI 194 can include field(s) corresponding to registration data required for registering a player and a USC selectable to cause the computing system 140B to transmit a communication with the registration data. As still yet another example, the GUI 194 can include one or more of the GUIs shown in FIG. 58 to FIG. 89.

The symbol 196 can include computer-readable data a processor can read to generate a symbol on a display, a display screen, a graphical display unit, a graphical display interface, or a GUI. As an example, the symbol 196 can include a respective computer-readable file (e.g., a bitmap file) for each symbol. As another example, the symbol 196 can include a computer-readable file a processor can read to generate any symbol required for a game. The symbol 196 shown in FIG. 54 can include computer-readable data representing the symbols shown in FIG. 6. The symbol 196 can include computer-readable data representing the set of reels shown in FIG. 7.

The sound 198 can include an audio file a processor can output to a speaker. Outputting an audio file can include outputting a signal that produces a particular sound when the signal passes through a speaker. The audio file can include an audio file with one of the following file name extensions: WAV, MP3, MP4, WMA, or some other file name extension. As an example, the particular sound can include a first particular sound to play when reels of a video slot game are spinning on the display 148B, a second particular sound to play when an animation showing a scratch-card being scratched to reveal symbols is output on the display 148B, or a third particular sound when a wheel (e.g., a roulette or prize wheel) is spinning on the display 148B.

Each sound in the sounds 198 can correspond to a pointer such that the processor 156A can provide the processor 156B with an instruction including a particular pointer so that the processor 156B outputs via the speaker 150B an audio file corresponding to the particular pointer. Accordingly, the processor 156A does not have to transmit the audio file to the processor 156B each time the audio file is to be output via the speaker 150B.

The animation 201 can include one or more computer-readable files (i.e., an animation) displayable on a display, such as the display 148, 148A, 148B. As an example, the animation 201 can include a file with one of the following file name extensions: GIF, PNG, JPEG, MPEG, SVG, or some other file name extension. Each animation can represent a change or motion over time, such as an animation showing virtual reels spinning, scratch-cards being scratched, or a wheel spinning. Each animation can correspond to a pointer such that the processor 156A can provide the processor 156B with an instruction including a particular pointer so that the processor 156B outputs via the display 148B an animation file corresponding to the particular pointer. Accordingly, the processor 156A does not have to transmit the animation file to the processor 156B each time the animation file is to be output via the display 148B.

An animation of the animation 201 can cover an entire graphical display output on display 148, 148A, 148B. Alternatively, an animation of the animation 201 can cover only a portion of a graphical display output on the display 148, 148A, 148B. Multiple animations of the animation 201 can cover respective portions of a graphical display output on the display 148, 148A, 148B. The animation 201 can include an advertisement of the advertisement 205. The animation 201 can include an animation to show a set of reels spinning and stopping to display a set of symbols on one or more paylines or payways. The animation 201 can include an animation to show a scratch-card being scratched. The animation 201 can include an animation to show a wheel spinning and stopping to display where a roulette ball landed or with a particular wheel position adjacent to a pointer. The animation 201 can include computer-readable data representing the set of reels shown in FIG. 7.

The advertisement 205 can include one or more advertisements. As an example, the advertisement 205 can include a video file a processor can output to a display device and a speaker. As another example, the advertisement 205 can include an audio file a processor can output to a speaker. As yet another example, the advertisement 205 can include an image file a processor can output to a display device. The advertisement 205 can include metadata describing the advertisement. The metadata can include metadata a processor can use to determine an advertisement includes content targeted for a particular type of player indicated by player account data stored in the game support data 213. As an example, the type of player can be a male player in the age group 30-45, a male player in age group 45-60, a female player in the age group 30-45, or a female player in age group 45-60. Other examples of a type of player or characteristics of a type of player are also possible.

VII. Additional Example Blocks of Outcomes

Figure 55:
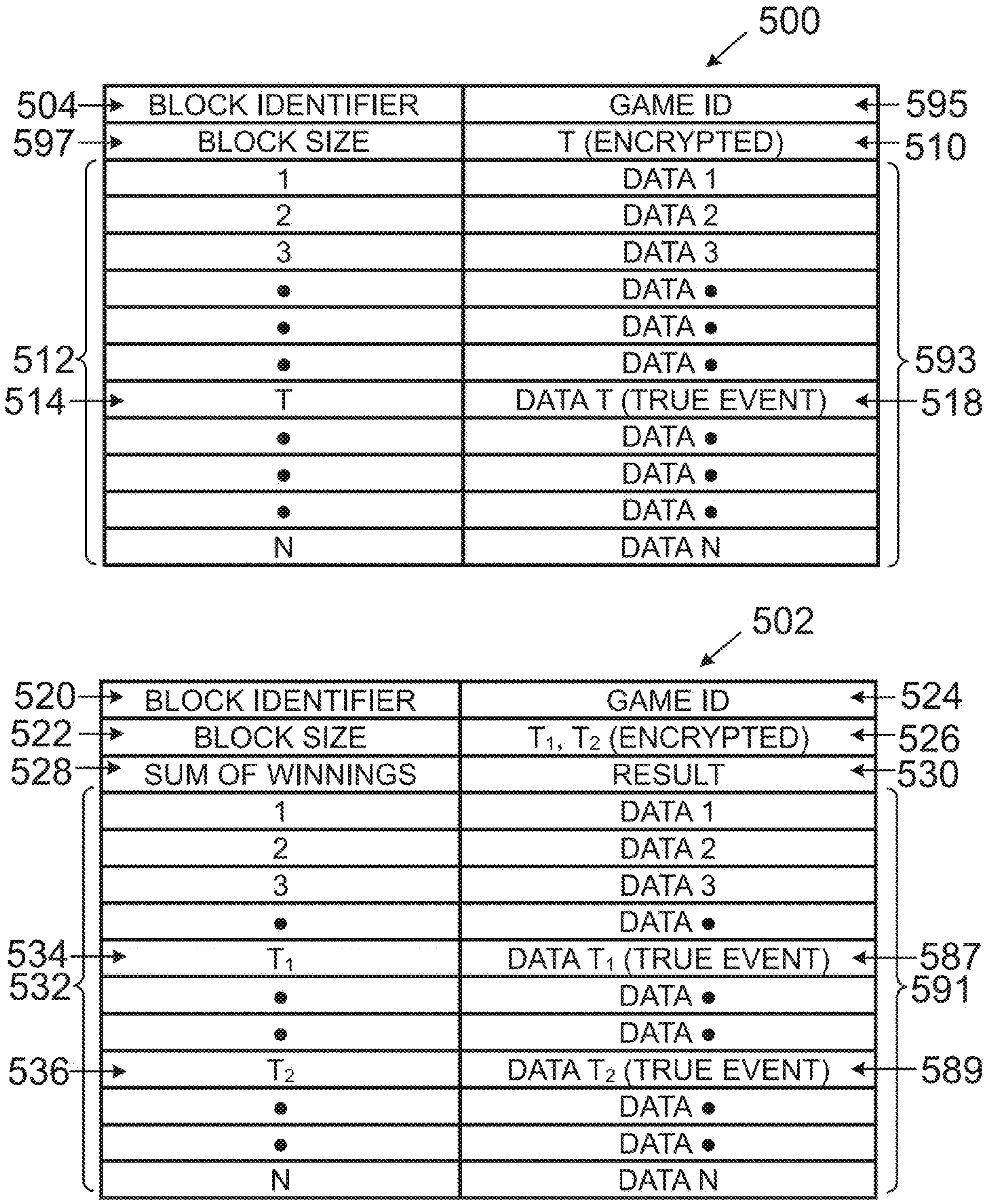
FIG. 55 shows blocks of outcomes, in accordance with one or more example embodiments.

Next, FIG. 55 shows blocks of outcomes in accordance with one or more example embodiments. In particular, FIG. 55 shows a block of outcomes 500 (i.e., a block) including a block identifier 504, a block size 597, a game identifier 595, an encrypted record identifier 510, and index numbers 512 (i.e., index positions) corresponding to outcome records 593. The index numbers 512 include an index number 514 corresponding to an outcome record 518 for a true outcome record and the encrypted record identifier 510. The block of outcomes 500 include N outcome records. In accordance with at least some embodiments, the index numbers 512 are implicit based on an order of outcome records within the outcome records 593.

FIG. 55 also shows a block of outcomes 502 (i.e., a block) including a block identifier 520, a block size 522, a game identifier 524, an encrypted record identifier 526, a sum of winnings 528, a result 530, and index numbers 532 (i.e., index positions) corresponding to outcome records 591. The index numbers 532 include an index number 534, 536 corresponding to an outcome record 587, 589, respectively, for a true outcome record and the encrypted record identifier 526. The block of outcomes 502 include N outcome records. In accordance with at least some embodiments, the index numbers 532 are implicit based on an order of outcome records within the outcome records 591. The encrypted record identifier 526 can include a single identifier corresponding to multiple outcome records for true outcomes, or multiple identifiers (one identifier for each outcome record for a true outcome).

The result 530 can include data summarizing use of the block of outcomes (i.e., game play summary). As an example, the game play summary of the result 530 can include a player identifier, one or more dates and times when outcomes of the block were used during game play, a total play time indicating how long a player used the block of outcomes, a quantity of outcomes used during game play. The result 530 and/or the game play summary can be used during an audit of game play via the computing system.

VIII. Additional Example Modules

As noted, a memory of the example embodiments can include the modules 203. The modules 203 are executable by a processor to perform one or more functions of any method described in this description and/or shown in the drawings. An application of the applications 184 can include one or modules of the modules 203. The program instruction 209 can include program instructions that are arranged as a module of the modules 203.

The modules 203 can include one or more of the modules shown in FIG. 56. In accordance with one or more of the example embodiments, a module in the modules 203 can be written in an object oriented programming language such as Java, Python, or C++, or a functional programming language, such as the Python programming language, or a procedural programming language, such as the "C" programming language. The Python language supports object-oriented and functional programming.

As shown in FIG. 56, the modules 203 can include a generate block database module 237, a determine block identifier module 251, a determine block size module 253, a determine block of outcomes module 255, an offline game play module 257, an encryption module 259, a decryption module 263, a determine input module 261, a write data module 268, a read module 266, a determine outcomes module 460, an output game outcome module 462, an output advertisement module 464, a threshold quantity module 466, a transmit module 468, a receive module 470, a block managing module 472, and/or a block processing module 474. Two or more modules can be executed in combination to carry out one or more functions. A module can call one or more other modules to receive data and/or instructions for performing its own functions.

1. Generate Block Database Module

The generate block database module 237 can be configured to generate one or more blocks of outcomes within a database, such as the database 211 and/or the block database 318.

For example, the generate block database module 237 can be configured to generate multiple blocks of outcomes within a block database. The multiple blocks of outcomes can include a first block of outcomes, a second block of outcomes, and/or any other block of outcomes described in this description. Each block of outcomes among the multiple blocks of outcomes can include a unique block identifier, a game identifier, a number indicating a quantity of outcomes within the block, a quantity of indexed records, an index identifier corresponding to an indexed record of the block that corresponds to a true game outcome determined for the block. The game identifier within the first block can identifies the game performed during the first time period, discussed in other examples. Likewise, the game identifier within the second block identifies the game performed during the first or second time period, discussed in other examples.

A block of outcomes can include a single true outcome record. Alternatively, a block of outcomes can include multiple true outcomes. In some embodiments, the blocks of outcomes generated for a particular game includes blocks with only a single true outcome. In other embodiments, the blocks of outcomes generated for the particular game includes blocks with multiple true outcomes. In other embodiments, the blocks of outcomes generated for the particular game include some blocks with a single true outcome and some blocks with multiple true outcomes.

For blocks that include multiple true outcome records, the identifier of each of the one or more true outcome records can include, and each indexed record of the set of non-winning outcome records can correspond to, a respective index position identifier. The index position identifier can be numeric. The set of non-winning outcomes and the set of true outcomes can be written into the non-transitory computer-readable memory sequentially based on an order of determination and into an ordered sequence of positions corresponding to the index position identifiers. The block of outcomes can include encrypted versions of the index position identifier(s) corresponding to a true outcome to make it harder for a hacker to determine which indexed positions include the true outcome(s).

In accordance with at least the aforementioned example, the multiple blocks of outcomes within a block database can include a first set of outcome blocks and a second set of outcome blocks. The game identifier within each block of outcomes in the first set of outcome blocks identifies the game performed during the first time period or another time period. The game identifier within each block of outcomes in the second set of outcome blocks can identify a game different than the game performed during the first time period. As an example, a game associated with the game identifier can comprise a video slots game, a video scratch card game, or a video wheel game (e.g., a video roulette game or a video prize wheel game).

In some cases, the game associated with the specific game identifier includes the video slots game. In such cases, the respective non-winning outcome identifier for each indexed record of the block of outcomes other than the one or more true outcome records and any non-winning outcome identifier of the set of true outcomes can indicate a set of symbols, displayable on a virtual set of reels for the video slots game, without any winning symbol or combination of winning symbols. Moreover, any winning outcome identifier of the set of true outcome identifiers can indicate a set of symbols, displayable on the virtual set of reels for the video slots game, with a winning symbol or combination of winning symbols.

In some other cases, the game associated with the specific game identifier includes the video scratch card game. In such cases, the respective non-winning outcome identifier for each indexed record of the block of outcomes other than the one or more true outcome records and any non-winning outcome identifier of the set of true outcomes can indicate a set of symbols, displayable on a virtual scratch card for the video scratch card game, without any winning symbol or combination of winning symbols. Moreover, any winning outcome identifier of the set of true outcome identifiers can indicate a set of symbols, displayable on a virtual scratch card for the video scratch card game, with a winning symbol or combination of winning symbols that match one or more game symbols on the scratch-card.

In still other cases, the game associated with the specific game identifier includes the video roulette game. In such cases, the respective non-winning outcome identifier for each indexed record of the block of outcomes other than the one or more true outcome records and any non-winning outcome identifier of the set of true outcomes can indicate a position on a roulette wheel that does not match a processor-selected player number. Moreover, any winning outcome identifier of the set of true outcome identifiers can indicate a position on the roulette wheel that matches a processor-selected player number.

In still other cases, the game associated with the specific game identifier includes the video prize wheel game. In such cases, the respective non-winning outcome identifier for each indexed record of the block of outcomes other than the one or more true outcome records and any non-winning outcome identifier of the set of true outcomes can indicate a position on a prize wheel that corresponds to a non-winning position. Moreover, any winning outcome identifier of the set of true outcome identifiers can indicate a position on the prize wheel that indicates a winning position corresponding to a prize.

The generate block database module 237 can be configured to generate a block of outcomes (e.g., a first block of outcomes) in response to determining less than the threshold quantity of unused blocks of outcomes are stored in memory (e.g., the database 211 and/or the block database 318). The block of outcomes generated by the generate block database module 237 can be stored in the memory (e.g., the database 211 and/or the block database 318).

The generate block database module 237 can be configured to call for execution of other modules described herein and/or receive data from the execution of the other modules. For example, the determine block identifier module 251 can be called to obtain a block identifier for a block of outcomes being generated, the determine block size module 253 can be called to obtain a block size for a block or blocks of outcomes being generated, the offline game play module 257 can be called to play the game offline to determine outcomes for the block or blocks of outcomes being generated, and the encryption module 259 can be called to encrypt an index value corresponding to a true outcome determined for a block of outcomes being generated.

In accordance with at least some embodiments, the data written into a non-transitory computer-readable memory to populate at least a portion of the block of outcomes further includes a quantity of unique index position identifiers. The quantity of unique index position identifiers equals the quantity of indexed records. Each record of the set of one or more true outcome records and each record of the set of non-winning outcome records corresponds to a respective one of the unique index position identifiers. The quantity of unique index position identifiers is arranged in an ordered sequence of position identifiers. The unique index position identifiers can be numeric.

Additionally or alternatively, the winning or non-winning outcome identifier for each of the one or more true outcome records and the respective non-winning outcome identifier for each indexed record of the set of non-winning outcome records are written into the non-transitory computer-readable memory sequentially based on an order of determination and according to the ordered sequence of position identifiers. The encrypted identifier of each of the one or more true outcome records includes an encrypted version of a unique index position identifier corresponding to each of the one or more true outcome records.

2. Determine Block Identifier Module

The determine block identifier module 251 can be configured to determine a unique block identifier corresponding to a block of outcomes being generated for a game associated with a specific game identifier. As an example, the unique block identifier can be a binary and/or hexadecimal value that has not previously been assigned to a block of outcomes. FIG. 55 shows a block identifier 504, 520 within a block of outcomes 500, 502, respectively.

Execution of the determine block identifier module 251 can cause a processor to refer to data that identifies a next unique block identifier to assign to a block of outcomes or data that identifies a most-recently assigned block identifier. In the latter case, the processor can determine the unique block identifier by reading the data that identifies a most-recently assigned block identifier and incrementing the read block identifier. As an example, the data that identifies the next unique block identifier and/or the data that identifies the most-recently assigned block identifier can be contained in the game support data 213 or another part of the memory 158.

For an embodiment in which the processor reads the data that identifies the next unique block identifier to assign to a block of outcomes, the processor can increment the data that identifies the next unique block identifier to assign to a block of outcomes after reading the data that identifies the next unique block identifier and assigns the read block identifier to a block of outcomes.

Figure 58:
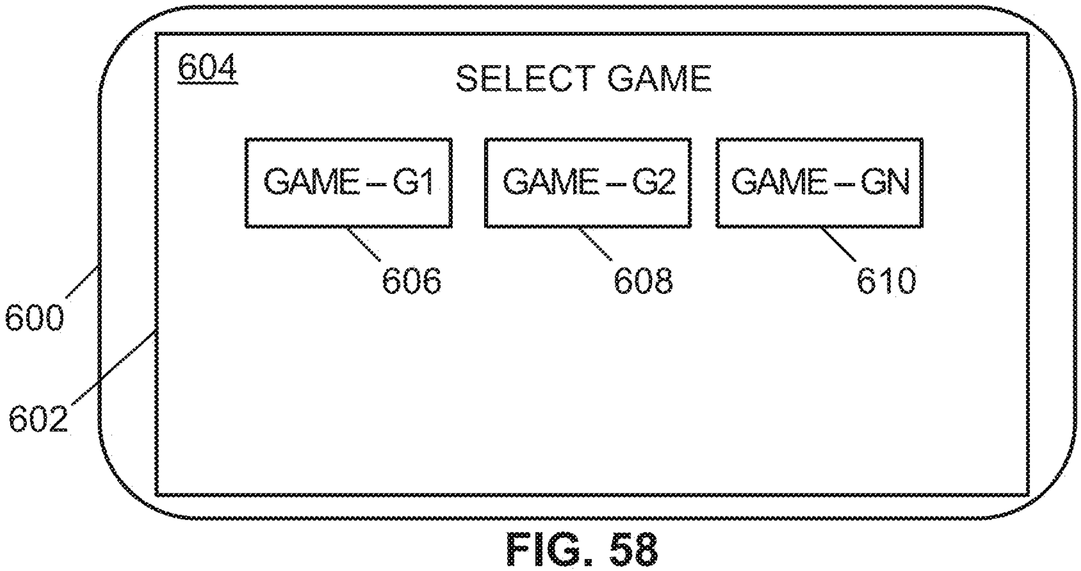
FIG. 58, FIG. 59, FIG. 60, FIG. 61, FIG. 62, FIG. 63, FIG. 64, FIG. 65, FIG. 66, FIG. 67, FIG. 68, FIG. 69, FIG. 70, FIG. 71, FIG. 72, FIG. 73, FIG. 74, FIG. 75, FIG. 76, FIG. 77.

The specific game identifier can be a binary and/or hexadecimal value corresponding to a game. The specific game identifier can be mapped to a game. As an example, the games mapped to a respective game identifier can include a video slots game, a scratch card game, or a wheel game (e.g., a roulette game or a prize wheel game). FIG. 58 shows user-selectable controls corresponding to N quantity games referred to as G1, G2, and GN. Each of those games can be mapped to a specific game identifier. FIG. 55 shows a game identifier 595, 524 within a block of outcomes 500, 502, respectively.

3. Determine Block Size Module

The determine block size module 253 can be configured to determine a block size corresponding to the block of outcomes. The block size indicates a quantity of indexed records to be contained in the block of outcomes. FIG. 55 shows a block size 597, 522 within a block of outcomes 500, 502, respectively.

In accordance with one or more embodiments, the block size corresponding to the block of outcomes is a fixed block size that matches the block size of other blocks of outcomes. As an example, the other blocks of outcomes can be all blocks of outcomes for a particular game, such as game G1, G2, or GN. As another example, the other blocks of outcomes can be all blocks of outcomes for multiple different games, such as game G1, G2, and GN. A benefit of determining a fixed block size is that the processor does not need to call an RNG to determine a block size.

In accordance with one or more embodiments, the block size corresponding to the block of outcomes is a randomly determined block size. The randomly determined block size can be a block size within a range of block sizes (e.g., 1,000 to 10,000 indexed records). A benefit of determining the block size randomly is more variability in game play for the SlowPlay mode. In other words, it would be more challenging for a player playing a game in SlowPlay mode to guess the size of any block of outcomes.

4. Determine Block of Outcomes Module

The determine block of outcomes module 255 can be configured to be determine a block of outcomes to use for player requesting to play a game. The block of outcomes can correspond to the requested game and a game identifier within the block of outcomes. In some cases, the block of outcomes is a new block of outcomes. The new block can be determined because the player completed playing a prior block of outcomes, requested a new block of outcomes, or is requesting to play the game for the first time. In other cases, the block of outcomes is a partially-used block of outcomes. The partially-used block of outcomes can be determined an interruption in game play (e.g., because the player stopped playing, loss of Internet connection or the like) and the player wants to resume playing games using the partially-used block of outcomes.

The determine block of outcomes module 255 can be executed at times when the computing system has been playing out the games in the SmartPlay mode or in the SlowPlay mode. For example, the player may have been playing out games in the SmartPlay mode during a first time period, and then switch from or switch to playing out games in the SlowPlay mode. As another example, the player may have been playing out games in the SlowPlay mode during a first time period, and then switch from or switch to playing out games in the SmartPlay mode.

As a first example for this section, the determine block of outcomes module 255 can be configured to determine a first block of outcomes to use during the first time period. The first block includes indexed records for multiple outcomes of the game determined while playing the game offline. The multiple outcomes of the first block include a mix of true and non-winning game outcomes. Each true game outcome of the first block is either a winning or non-winning game outcome. Each indexed record of the first block corresponds to a respective index identifier from among a first sequential order of index identifiers and includes one true or non-winning game outcome of the first block.

In accordance with at least the first example for this section, the mix of true and non-winning game outcomes can include multiple true game outcomes and multiple non-winning game outcomes. The multiple true game outcomes can be contained within particular indexed records of the first block. The first block can include encrypted data representing an index identifier corresponding to each particular indexed record of the first block.

In another case and accordance with at least the first example for this section, the mix of true and non-winning game outcomes can include a single true game outcome. The single true game outcome can be contained within a particular indexed record of the first block. The first block can include encrypted data representing an index identifier corresponding to the particular indexed record.

In accordance with at least the first example for this section, the first time period can end after outputting a last outcome of the block of outcomes, receiving a request to use a different block of outcomes, or receiving an instruction to output outcomes of the game to the display device in a second mode different than the first mode.

The determine block of outcomes module 255 can be configured to determine a second block of outcomes to use during the first time period. The second block includes indexed records for multiple outcomes of the game determined while playing the game offline. The multiple outcomes of the second block include a mix of true and non-winning game outcomes. Each true game outcome of the second block is either a winning or non-winning game outcome. Each indexed record of the second block corresponds to a respective index identifier from among a second sequential order of index identifiers and includes one true or non-winning game outcome of the second block. The first sequential order of index identifiers can be identical to the second sequential order of index identifiers.

In accordance with at least some embodiments, the determine block of outcomes module 255 can be configured to determine one or more blocks of outcomes to use during the first time period. Each block of outcomes includes indexed records for multiple outcomes of the game determined while playing the game offline. The multiple outcomes of each block include a mix of true and non-winning game outcomes. Each true game outcome is either a winning or non-winning game outcome. Each indexed record of each block corresponds to a respective index identifier from among sequential orders of index identifiers and includes one true or non-winning game outcome. Each block further includes encrypted data representing the respective index identifier corresponding to each indexed record of the block that includes a true game outcome. Each block can include a single true game outcome or multiple true game outcomes.

For cases in which the block includes a single true game outcome are played out in the SmartPlay mode, playing each round of the game can include decrypting the encrypted data within the single block to determine a respective index identifier corresponding to the single true game outcome of the single block, reading the at least one indexed record includes reading the indexed record corresponding to the single true game outcome of the single block, and causing the display device to output the true game outcome includes causing the display device to output the single true game outcome of the single block. Determining the one or more blocks of outcomes to use during the first time period can include determining a next block of outcomes for each subsequent round of the game performed during the time period while using the SmartPlay mode.

For cases in which the block includes multiple true game outcomes are played out in the SmartPlay mode, the particular block of outcomes can be used during a particular round of the game performed during the first time period, and for the particular round of the game, the display device outputs the true game outcome corresponding to the at least one indexed record read by the processor includes outputting a single true winning outcome of the particular block and a sum of awards corresponding to the multiple true game outcomes. Alternatively, the display device outputs each true winning outcome of the particular block and a sum of awards corresponding to the multiple true game outcomes.

During a second time period, a processor can determine an input to the processor includes a request for the processor to output outcomes of the game to the display device during a second time period according to a second mode (e.g., the Smart Play mode or the SlowPlay mode). The determine block of outcomes module 255 can be configured to determine a first block of outcomes to use during a second time period. The first block includes indexed records for multiple outcomes of the game determined while playing the game offline. The multiple outcomes of the first block include a mix of true and non-winning game outcomes. Each true game outcome of the first block is either a winning or non-winning game outcome. Each indexed record of the first block corresponds to a respective index identifier from among a first sequential order of index identifiers and includes one true or non-winning game outcome of the first block.

In accordance with at least some embodiments in which a block of outcomes is determined for a first bock of outcomes, the determine block of outcomes module 255 can be configured to determine a second block of outcomes to use during a second time period. The second block includes indexed records for multiple outcomes of the game determined while playing the game offline. The multiple outcomes of the second block include a mix of true and non-winning game outcomes. Each true game outcome of the second block is either a winning or non-winning game outcome. Each indexed record of the second block corresponds to a respective index identifier from among a second sequential order of index identifiers and includes one true or non-winning game outcome of the second block. A processor can be configured to read indexed records of the second block for the second mode according to the second sequential order of index identifiers, and read the respective indexed record includes the processor reading at least one respective indexed record from the first block of outcomes and at least one respective indexed record from the second block of outcomes.

In accordance with at least some embodiments, the computing system can determine a sum of winnings corresponding to each winning outcome within a block of outcomes. The sum of winnings can be written into the block of outcomes corresponding to the sum of winnings, such as the sum of winnings 528 shown in FIG. 55. The sum of winnings 528 can be referred to as an "additional indexed record" or vice versa. A block of outcomes can have zero, one, or more than one (i.e., multiple) winning outcomes. The sum of all winning outcomes for a block with zero winning outcomes is 0.00. The sum of all winning outcomes for a block of outcomes with one winning outcome can be a trivial sum equal to the winnings of that one winning outcome. The computing system can use the sums of winnings for multiple blocks of outcomes to determine an average Return-to-Player (RTP) value. The computing system can modify any of a variety of aspects of a game to increase or decrease the RTP.

5. Offline Game Play Module

The offline game play module 257 can be configured to play a game offline. A benefit of playing the game offline is that a computing system, such as the computing system 140A, can play the game at the computing system 140A to determine game outcomes to write into a block of outcomes before any client computing system, such as the computing system 140B requests to play the game based on an outcome of the block of outcomes. Another benefit of playing the game offline is that a winning outcome resulting from playing the game offline can be discarded if the winning outcome is determined for an indexed record of a block of outcomes other than an indexed record of the block reserved for storing a true game outcome.

The offline game play module 257 can be configured to play the game offline to generate a set of non-winning outcomes for a set of non-winning outcome records to be contained in a block of outcomes. The set of non-winning outcomes can include a respective non-winning outcome identifier for each indexed record of the set of non-winning outcome records. Playing the game offline to generate the set of non-winning outcomes can include playing the game offline for at least one indexed record of the set of non-winning outcome records one or more times with winning outcomes before generating the identifier of a non-winning outcome for the at least one indexed record of the set of non-winning outcome records. The offline game play module 257 can be configured to discard a winning outcome if the winning outcome was determined for an indexed record other than an indexed record reserved for storing a true game outcome.

The offline game play module 257 can be configured to determine, randomly, a set of one or more true outcome records to be contained in the block of outcomes. The offline game play module 257 can be configured to playing the game offline to generate a set of true outcomes. The set of true outcomes can include a winning or non-winning outcome identifier for each of the one or more true outcome records.

As an example, the offline game play module 257 can be configured to play the game offline to determine multiple outputs of a game before a processor receives an input including a request for the processor to output outcomes of the game to a display device during a first time period according to a mode (e.g., the SmartPlay mode or the SlowPlay mode).

As another example, the offline game play module 257 can be configured to play the game offline to determine multiple outputs of the game during a time period in which a computing system (e.g., the computing system 140B) is playing the game according to a mode (e.g., the SmartPlay mode or the SlowPlay mode).

The offline game play module 257 can be configured to perform a random process for a game, such as a non-gambling game. Performing the random process can include calling an RNG (e.g., the RNG 162, 162A) to generate one or more random numbers for use in determining data to output on a display to indicate a winning result or a non-winning result.

In accordance with at least some embodiments, performing the random process can include using an RNG to generate a random number corresponding to a set of symbols and/or an animation for a particular winning or non-winning result. Data for displaying a representation of an outcome of a block of outcomes can include one or more of the following: the one or more random numbers, a set of symbols, an identifier of the set of symbols, identifiers of symbols within the set of symbols, or an animation. As an example, the set of symbols can include and/or be contained within the symbol 196.

For a video slots game, the set of symbols and/or animation is displayable at the client device (e.g., the computing system 140B) to represent spinning and stopped positions of one or more virtual reels of the video slots game for the particular winning or non-winning result. As another example, the virtual reels can be configured like a reel shown in FIG. 64 to FIG. 71.

For a scratch-card game, the set of symbols and/or animation is displayable at the client device (e.g., the computing system 140B) to represent covered and uncovered symbols on a virtual scratch-card for the particular winning or non-winning result. A virtual scratch-card be arranged like a virtual scratch card shown in FIG. 82 to FIG. 87.

For a wheel game, the set of symbols and/or animation is displayable at the client device (e.g., the computing system 140B) to represent spinning of a virtual wheel (e.g., a virtual roulette or prize wheel) and a stopped position of the virtual wheel for a particular winning or non-winning result. A virtual wheel can be arranged like a virtual wheel shown in FIG. 82 to FIG. 89. For a wheel game having a roulette wheel, the RNG can be used to determine the player's number(s) on the roulette betting layout 718 and a number on the roulette wheel where the roulette ball will land. For a wheel game having a prize wheel, the RNG can be used to determine the position of the prize wheel that will stop at the pointer 714.

6. Encryption Module

The encryption module 259 can be configured to encrypt an identifier of each of the one or more true outcome records to generate an encrypted identifier corresponding to each of the one or more true outcome records. A benefit of encrypting the identifier of each of the one or more true outcome records is that a person hacking into a computing system including a block of outcomes will not know which outcome record(s) is a true outcome record by merely looking at the outcome records. On the other hand, if the blocks of outcomes include a single true outcome record and if a player playing a game knows which indexed record includes a true outcome, then the player could play rounds of the game until a round of the game including the true outcome record is played and then request another block of outcomes so that the player could get to a next true outcome record sooner than if all outcome records are played out.

The encrypted identifier of each of the one or more true outcome records can be referred to as an "encrypted record identifier." An encrypted record identifier can represent a single record identifier or multiplier identifiers. The encrypted record identifier 510 shown in FIG. 55 represents a single record identifier. The encrypted record identifier 526 shown in FIG. 55 represents multiple record identifiers. A block of outcomes including multiple true outcome records can include multiple encrypted record identifiers, such as a respective encrypted record identifier for each true outcome record.

The encrypted identifier can be within the range of block records. For instance, if the block size is 10,000 records, the encrypted identifier can be or be equal to a decimal value within the range 0000 to 9999. In other words, the encryption module 259 can generate the encrypted identifier using format-preserving encryption.

Alternatively, the encrypted identifier can be padded with a quantity of digits. For instance, if the block size is 10,000 records such that the block identifier can be represented by 14 binary digits (i.e., bits), the block identifier can be padded with 114 bits such that the encrypted identifier is 128 bits. As an example, the encryption module 259 can be arranged according to a National Institute of Standards Technology standard referred to as Federal Information Processing Standards Publication 197.

The encryption module 259 can also be configured to encrypt a sum of all winnings corresponding to each winning outcome of the multiple outcomes of the game within a block of outcomes. If a block of outcomes includes a single true outcome record, the encrypted sum of all winnings for that block of outcomes equals any winning corresponding to the single true outcome record of that block of outcomes. If a block of outcomes includes multiple true outcome records, the encrypted sum of all winnings for that block of outcomes equals all winnings corresponding to the multiple true outcome records of that block of outcomes. A benefit of encrypting the sum of all winnings is that a hacker accessing the block of outcomes cannot determine the sum of all winnings by reading the sum unless the player can decrypt the encrypted value of the sum. On the other hand, if a player is able to determine the sum of winnings for a block of outcomes, the player can be compelled to request a new block of outcomes if the sum does not equal or exceed an amount of winnings desired by the player.

The encryption module 259 can be configured to encrypt data (such as any described above in this section) for any block described in this description, such as a first block of outcomes, a second block of outcomes, or another block of outcomes.

Figure 57:
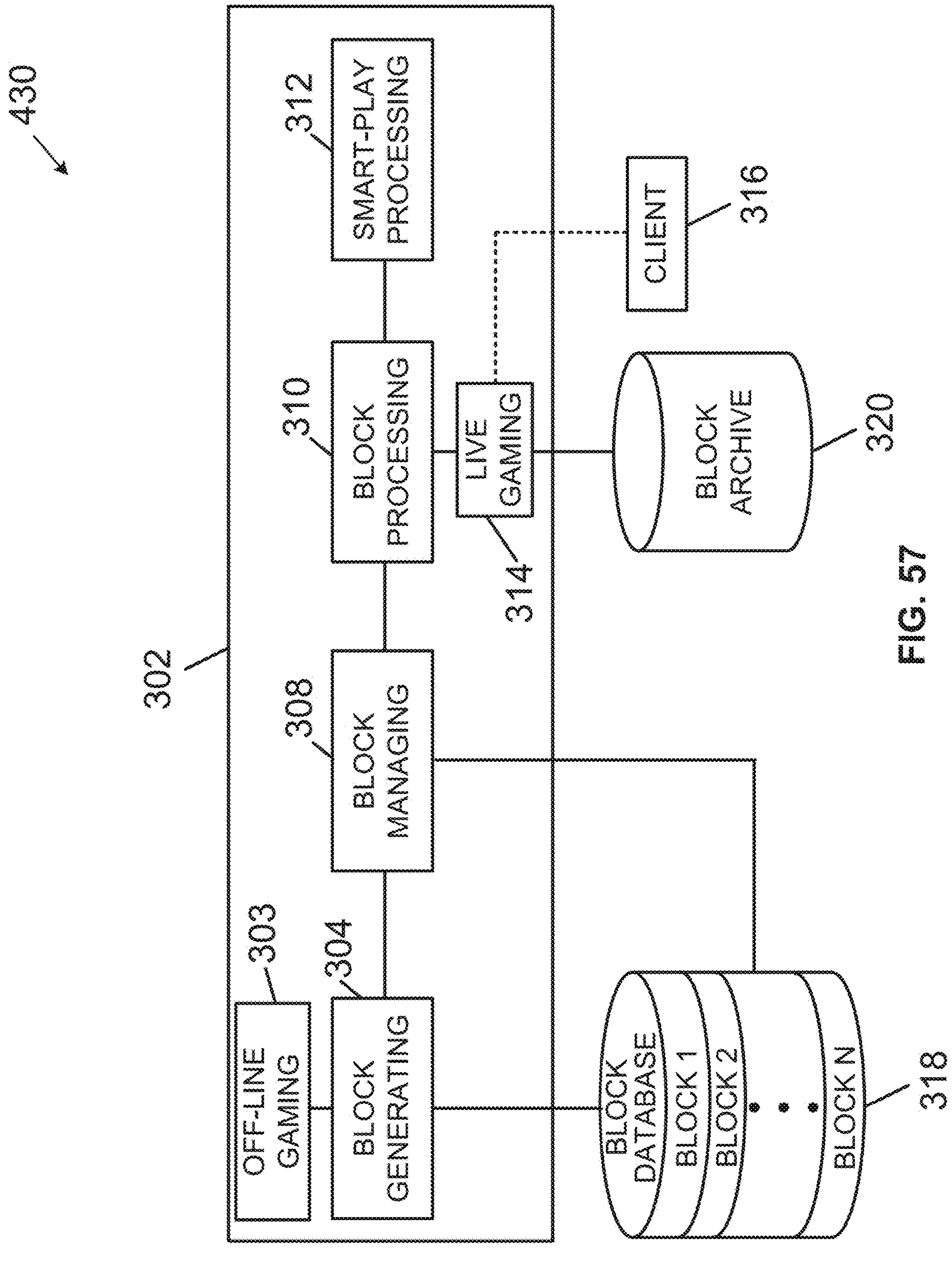
FIG. 57 is a functional, block diagram of a system, in accordance with one or more example embodiments.

The encryption module 259 can be part of the SmartPlay processing 312 shown in FIG. 57.

7. Decryption Module

The decryption module 263 can be configured to decrypt any data encrypted for carrying out a game described in this description. For example, the decryption module 263 can decrypt an encrypted identifier of each of the one or more true outcome records within a block of outcomes to recover a decrypted identifier corresponding to each of the one or more true outcome records. The encrypted identifier can include and/or be arranged like the encrypted record identifier 510 or the encrypted record identifier 526 shown in FIG. 8. As another example, the decryption module 263 can decrypt an encrypted sum of all winnings corresponding to each winning outcome of the multiple outcomes of the game within a block of outcomes.

The decryption module 263 can decrypt encrypted data to determine a respective index identifier corresponding to at least one indexed record that includes a true game outcome. Such decryption can occur for each round of the game performed during a particular time period (e.g., a time period when the computing system is operating the SmartPlay mode). In some embodiments, the true game outcome is the only true game outcome in a block of outcomes. Accordingly, the decryption module 263 can decrypt encrypted data to determine a respective index identifier corresponding to a single true game outcome of a block of outcomes.

The decryption module 263 can decrypt data encrypted data using format-preserving encryption or the Federal Information Processing Standards Publication 197, or data encrypted according to another format.

The decryption module 263 can be configured to decrypt data (such as any described above in this section) for any block described in this description, such as a first block of outcomes, a second block of outcomes, or another block of outcomes.

The decryption module 263 can be part of the SmartPlay processing 312 shown in FIG. 57.

8. Determine Input Module

The determine input module 261 can be configured to determine inputs to a processor. The inputs to the processor can include external inputs, such as inputs from components connected to pins of the processor. The components connected to the processor 156 can include the communication interface 142, the user interface 144, the memory 158, and/or the RNG 162. With respect to the user interface 144, an input received at the user interface 144 can include an input resulting from a player contacting a user-selectable control or entering data into a data field within a GUI. The inputs to the processor can include internal inputs, such as inputs provided by execution of modules by the processor.

The determine input module 261 can be configured to determine a USC at a client (e.g., the computing system 140B) has been selected. The USC selected at the client can include a hardware USC or a graphical USC output on a display. A server (e.g., the computing system 140A) can determine the input occurred via a data transmission from the client.

As an example, the determine input module 261 can determine an input (e.g., a first input) to the processor includes a request for the processor to output outcomes of a game to a display device during a time period (e.g., a first time period) according to a first mode (e.g., the SmartPlay mode or the SlowPlay mode). Each outcome of the game corresponds to a respective round of the game. In accordance with at least some embodiments, the processor of a server receives the first input and the respective input to initiate each round of the game from the client device via a WebSocket connection. In accordance with at least some embodiments, the processor receives the first input and the respective input to initiate each round of the game from a client device via the requests sent to an application programming interface at a server.

As another example, the determine input module 261 can determining a second input to the processor includes a request for the processor to output outcomes of the game to the display device during a second time period according to a second mode. The second time period can occur before the first time period or after the first time period. In one case, the first mode is the SmartPlay mode and the second mode is the SlowPlay mode. In that case, second input can result from a selection of the USC 702 shown in FIG. 69, the USC 582 shown in FIG. 78, or the USC 742 shown in FIG. 87. In another case, the first mode is the SlowPlay mode and the second mode is the SmartPlay mode. In that case, second input can result from a selection of the USC 686 shown in FIG. 64, the USC 561 shown in FIG. 72, or the USC 726 shown in FIG. 82.

As yet another example, the determine input module 261 can determine a respective input is received at the processor to initiate each round of the game. The input can result from selection of a USC, such as the USC 694 shown in FIG. 64, the USC 568 shown in FIG. 72, or the USC 734 shown in FIG. 82. In a first case and accordance with this example, the processor is contained within a server device, the display device is contained within a client device, the client device initiates a WebSocket connection with the server device, and the server receives the first input and the respective input to initiate each round of the game from the client device via the WebSocket connection. In a second case and accordance with this example, the processor is contained within a server device, the server device includes an API executable by the processor, the display device is contained within a client device, the client device includes an application configured to send requests to the API, and the processor receives the first input and the respective input to initiate each round of the game from the client device via the requests sent to the API.

Figure 60:
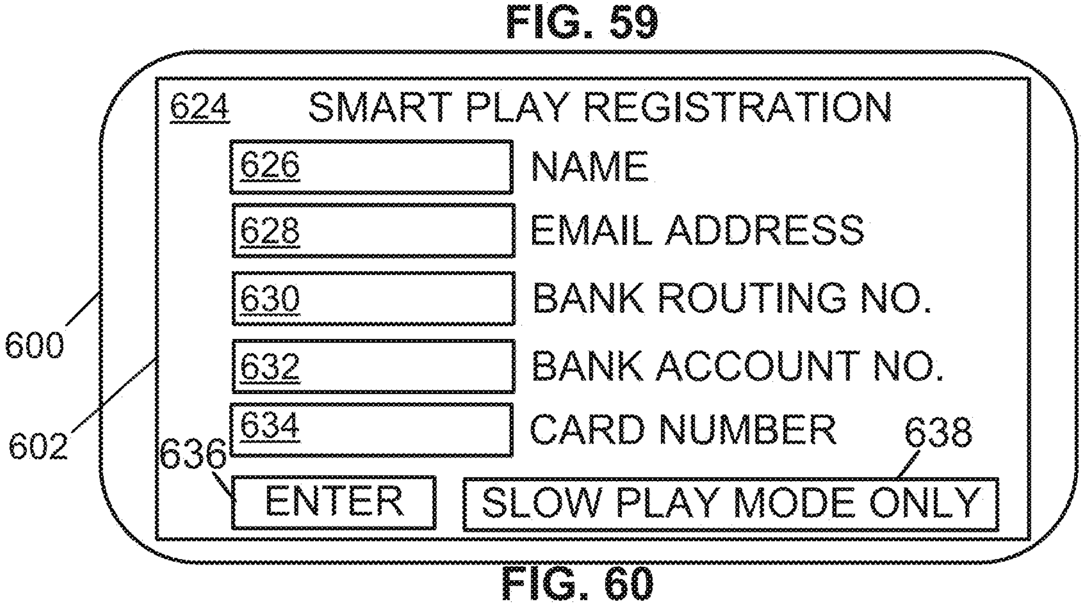
Figure 61:
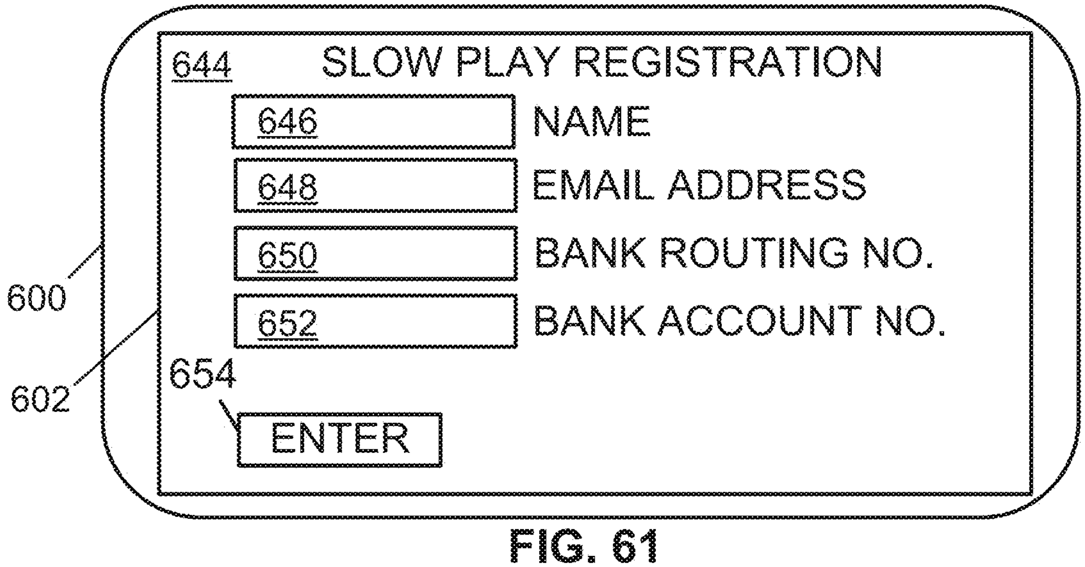

As still yet another example, the determine input module 261 can be configured to determine inputs into a field of a GUI, such as the field shown in FIG. 60 or the field 646, 648, 650, 652 shown in FIG. 61. Such data input can be used to register a player of a computing system (e.g., the computing system 140B). In at least some embodiments, the player can play the non-gambling game using the computing system 140B without having to register. In accordance with at least some of those embodiments, the player does not have to input data until such time that the player requests payment of any winnings. The input data can include information needed to provide the player with the payment, such as a player name, a player address, a bank account number, or a tax payer identification number. Any registration data received by the determine input module 261 can be stored in the game support data 213.

The determine input module 261 can be configured to determine an input indicating an automatic mode of the non-gambling game has been received. As an example, that input can be received in response to a selection of a USC 690 shown in FIG. 64, a USC 564 shown in FIG. 72, or a USC 730 shown in FIG. 82.

The determine input module 261 can be configured to determine an input indicating a request for a new block of results has been received. As an example, that input can be received in response to a selection of a USC 684 shown in FIG. 64, a USC 563 shown in FIG. 72, or a USC 724 shown in FIG. 82.

The determine input module 261 can be configured to determine an input indicating a request to use a QuickSpin or a QuickScratch mode of the non-gambling game has been received. As an example, that input can be received in response to a selection of a USC 692 shown in FIG. 64, a USC 566 shown in FIG. 72, or a USC 732 shown in FIG. 82.

The determine input module 261 can be configured to determine an input indicating a request to a spin of a set of reels, display a next scratch-card, or a spin of a wheel. As an example, that input can be received in response to a selection of a USC 694 shown in FIG. 64, a USC 568 shown in FIG. 72, or a USC 734 shown in FIG. 82.

9. Write Data Module

The write data module 268 can be configured to write data into a memory, a buffer, or a register. The data can include data read from another portion of the memory, the buffer, or the register, data received in a communication, and/or data determined by execution of another module. The writing of data can be referred to as storing data. The writing of data into the non-transitory computer-readable memory can includes writing the data into a computer-readable file. In accordance with at least some embodiments, the computer-readable file includes a Java Script Object Notation (JSON) file or an eXtensible Markup Language (XML) file.

As an example, the write data module 268 can data into a memory to populate at least a portion of the block of outcomes. The block of outcomes can be contained in the database 211 or the block database 318. In accordance with at least some embodiments, the data includes: a unique block identifier, a specific game identifier, a block size, an encrypted identifier corresponding to each of the one or more true outcome records, a set of non-winning outcome identifiers, and a set of true outcome identifiers. In accordance with at least some embodiments, the data includes any of the data (or types of data) shown in FIG. 55. The write data module 268 can write data for each outcome according to a sequence in which the outcomes are to be outcome if the computing system operates in the SlowPlay mode.

As an example, the write data module 268 can, after performing each round of the game during a particular time period, write a block of outcomes used for that round of the game into a portion of computer-readable memory designated as a block archive (e.g., the block archive 189, 320). The particular time period can be a time period when the computing system operates in the SmartPlay mode or the SlowPlay mode.

As an example, the write data module 268 can, after performing each round of the game during a particular time period, data into a computer-readable memory to classify the block of outcomes used for that round of the game as a block archive. The particular time period can be a time period when the computing system operates in the SmartPlay mode or the SlowPlay mode.

10. Read Data Module

The read module 266 can be configured to read data, such as data within a memory, a buffer, or a register. The data can include data received in communication and stored in a buffer or register. The data within a memory can include data within a database (e.g., the database 211 or the block database 318 shown in FIG. 57).

The read module 266 can be configured to read a respective indexed record. The respective indexed record read for each round of the game is based on an index identifier corresponding to the respective indexed record.

In the SmartPlay mode, the index identifier is determined by decrypting an encrypted version of the index identifier. The read module 266 can reading a particular indexed record (corresponding to the decrypted index identifier) to determine a first true game outcome.

In the SlowPlay mode, the indexed records can be read sequentially within a block of outcomes. The read module can read indexed records for outcomes than a true outcome without having decrypted the encrypted data (e.g., the encrypted version of the index identifier). The read module 266 can be configured to read at least one respective indexed record from a first block of outcomes and at least one respective indexed record from a second block of outcomes as those blocks are used during a time period while operating in the SlowPlay mode.

The read module 266 can be configured to read a respective indexed record for each round of the game output during a first time period in response to determining the respective input is received for that round of the game. The input can be received to initiate each round of the game. The first time period can refer to the first time period discussed with respect to the determine block of outcomes module 255. The respective index identifier can include a respective numeric index identifier.

The read module 266 can be configured to read at least one respective indexed record from a first block of outcomes and at least one respective indexed record from a second block of outcomes. Reading the record from the second block can occur after a complete reading of the first block or after the first block is discarded before a complete reading of the first block. The second time period can refer to the second time period discussed with respect to the determine block of outcomes module 255.

11. Determine Outcomes Module

The determine outcomes module 460 can be configured to determine outcomes from for a block of outcomes being generated. The determine outcomes module 460 can call for (and/or receive data from) the execution of the offline game play module 257. The outcomes determined by the determine outcomes module 460 correspond to a game identified by a game identifier within the block of outcomes. As an example, that game can be a video slots game, a video scratch-card game, or a video wheel game.

In accordance with at least some embodiments, the determine outcomes module 460 can call a random process to determine all outcomes of each block of outcome. The random process can be part of the offline game play module 257. The determine outcomes module 460 can discard winning outcomes if the winning outcome was determined for a record of the block to contain a non-winning outcome.

In accordance with at least some embodiments, the determine outcomes module 460 can call a first random process to determine all non-winning outcomes of each block of outcome, and a second random process to determine all true outcomes. Configuring the first random process so that it cannot determine a winning outcome eliminates the need to discard any outcome determined by either the first or second random process. The first and second random processes can be part of the offline game play module 257.

In accordance with at least some embodiments, the determine outcomes module 460 can use another random process for each block of outcomes to determine how many true outcomes are to be included in within that block.

The determine outcomes module 460 can be configured to make a payout determination for a game. As an example, the determine outcomes module 460 can be configured to determine the payout by referring to a pay table (e.g., a pay table stored in the game support data 213) and determining whether a combination of symbols and payline corresponding to an outcome of a video slots game match a combination and payline in the pay table. If the determine outcomes module 460 determines a match, the determine outcomes module 460 can determine a payout that corresponds to the combination and payline. As another example, for a video roulette game, the determine outcomes module 460 can be configured to determine the payout by referring to a pay table for a roulette game and to one or more numbers on the roulette wheel selected for a player. As yet another example, for a video prize wheel game, the determine outcomes module 460 can be configured to determine a payout represented on a prize wheel at a position of the prize wheel that stopped at a pointer. As still yet another example, for a scratch-card game, the determine outcomes module 460 can be configured to determine a payout for a game symbol that matches a winning symbol on a scratch-card. The payout information can be used for confirming the determine outcomes module 460 is determining outcomes that match a required and/or desired Return-to-Player value.

12. Output Game Outcome Module

The output game outcome module 462 can be configured to perform the live gaming 314 shown in FIG. 57. Performing the live gaming at the client can include executing an application or portions of an application that output a GUI on a display device at the client to display game play at the client. Displaying the game play can include displaying aspects of the GUIs shown in FIG. 57 to FIG. 89. Those aspects include game outcomes. Besides a result of a game (e.g., a win, lose or tie), outputting a game output can include displaying animation(s) that show progress of the game as it proceeds from being initiated to being complete.

Stated another way, the output game outcome module 462 can be configured to output game outcomes to a display device. For example, the computing system 140A can output the game outcomes to the computing system 140B and it display 148B over the communication network 161. As another example, the computing system 140, 140B can output the game outcomes to the display 148, 148B, respectively.

The output game outcome module 462 can be configured to output a game outcome for each round of the game while the game is played in the SmartPlay mode or the SlowPlay mode. As an example, for each round of the game, the output game outcome module 462 can be configured to output, to the display device, the outcome of the game corresponding to the respective indexed record.

The output game outcome module 462 can be configured to cause a display device (e.g., the display 148, 148A, 148B) to display a game outcome. As an example, the output game outcome module 462 can provide instruction(s) (e.g., pixel data) to the display device to cause the display device to display the game outcome. As another example, the output game outcome module 462 can provide the display device with a symbol of the symbol 196, an animation of the animation 201, and/or a GUI of the GUI 194 for displaying the game outcome using the symbol, the animation, and/or the GUI.

In accordance with at least some embodiments, causing the display device to output the outcome of the game corresponding to the respective indexed record includes the processor instructing the display device to output one or more of the multiple true game outcomes in response to the processor reading one or more of the particular indexed records without having decrypted the encrypted data.

In accordance with at least some embodiments, causing the display device to output the outcome of the game corresponding to the respective indexed record includes: decrypting, at the processor, the encrypted data to determine an index identifier corresponding to a first particular indexed record, reading the first particular indexed record to determine a first true game outcome, instructing the display device to output the first true game outcome read from the first particular indexed record. The output game outcome module 462 can call the decryption module 263 to receive the index identifier. The output game outcome module 462 can call the read module 266 to determine the first true game outcome.

In accordance with at least some embodiments, causing the display device to output the outcome of the game corresponding to the respective indexed record includes the processor instructing the display device to output the single true game outcome in response to the processor reading the particular indexed record without having decrypted the encrypted data.

In accordance with at least some embodiments, causing the display device to output the outcome of the game corresponding to the respective indexed record includes: decrypting, at the processor, the encrypted data to determine the index identifier corresponding to the particular indexed record, reading the particular indexed record to determine the single true game outcome, and instructing the display device to output the single true game outcome read from the particular indexed record.

In the SmartPlay mode, the output game outcome module 462 can be configured to output one or more of the true outcomes within a block of outcomes without outputting any other outcome of the block. If the block includes a single true outcome, the output game outcome module 462 outputs the single true outcome. If the block includes multiple true outcomes, the output game outcome module 462 can output only one of the true outcomes or multiple true outcomes (e.g., all true outcomes of the block). As an example, the output game outcome module 462 can output a single true winning outcome of the particular block and a sum of awards corresponding to the multiple true game outcomes.

The output game outcome module 462 can be configured to output outcomes in an automatic play mode (i.e., an AutoPlay mode). Such outputting can occur in response to a selection of a USC, such as USC 690 shown in FIG. 64, the USC 564 shown in FIG. 72, or the USC 728 shown in FIG. 82. In the AutoPlay mode, the output game outcome module 462 can output outcomes onto a display (e.g., within a GUI) without the need for the player to select a USC, such as a USC 694 shown in FIG. 64, the USC 568 shown in FIG. 72, or the USC 734 shown in FIG. 82. The computing system can occasionally perform a test to confirm a player is present at the computing system during the AutoPlay mode. The computing system may require the player to re-initiate the AutoPlay mode each time playing out of a block of outcomes is complete.

The output game outcome module 462 can be configured to output outcomes of some games (e.g., a video slots game or a video wheel game) in a quick spin mode. While operating in the quick spin mode, an amount of time it takes to spin the reels or wheel of the game can be less than an amount of time to spin the reels or wheel when the quick spin mode is not functioning. Additionally, or alternatively, while operating in the quick spin mode, an amount of time occurring between a spin the reels or wheel of the game can be less than an amount of time between a spin of the reels or wheel when the quick spin mode is not functioning. The output game outcome module 462 can be configured to output different animations depending on whether the quick spin mode is active. The animation played out with the quick spin mode active is shorter than an animation played out with the quick spin mode inactive.

The output game outcome module 462 can be configured to output outcomes of some games (e.g., a scratch-card game) in a quick scratch mode. While operating in the quick scratch mode, an amount of time it takes to scratch symbols on a scratch-card can be less than an amount of time to scratch symbols on a scratch-card when the quick scratch mode is not functioning. Additionally, or alternatively, while operating in the quick scratch mode, an amount of time occurring between scratching of a scratch-card can be less than an amount of time between scratching of a scratch-card when the quick scratch mode is not functioning. The output game outcome module 462 can be configured to output different animations depending on whether the quick scratch mode is active. The animation played out with the quick scratch mode active is shorter than an animation played out with the quick scratch mode inactive.

The output game outcome module 462 can be configured to output a particular animation corresponding to each outcome. For example, the computing system 140B can execute the output game outcome module 462 to determine the particular animation corresponding to a respective numerical index value (e.g., an index value transmitted to the computing system 140B from the computing system 140A) within the block of outcomes being played out. In at least some embodiments, the particular animation shows a set of reels, a roulette wheel, or a prize wheel spinning and then coming to a stop. After stopping the particular animation shows a particular set of reel symbols, a roulette ball stopped at a particular portion of the roulette, or pointer 714 pointing to a particular position on a wheel 712.

As noted, the output game outcome module 462 can be configured to output an outcome within a GUI. The output game outcome module 462 can be configured to output a USC (i.e., one or more USCs) within the GUI. In accordance with at least some embodiments, outputting the USC includes configuring a graphical USC to correspond to a function to perform in response to a selection of the USC. In accordance with those latter embodiments, outputting the USC can include outputting the graphical USC on a display of a client device. The output game outcome module 462 can be configured to track a display location indicating an area of the display at which the graphical USC is displayed and to monitor for the area of the display being touched while the graphical display is output on the display. In accordance with at least some other embodiments, outputting the USC includes configuring a hardware USC to correspond to a function to perform in response to a selection of the USC.

The output game outcome module 462 can perform live gaming 314 shown in FIG. 57.

13. Output Advertisement Module

The output advertisement module 464 can be configured to output and advertisement to the user interface (e.g., the display device and/or a speaker). A processor executing the output advertisement module 464 can read the advertisement to be output from the advertisement 205. A processor of a computing system including the display device can output the advertisement to the display device over a local data bus. A processor of a server computing system can transmit the advertisement to a client computing system including the display device over a communication network.

In accordance with at least some embodiments, the output advertisement module 464 is configured to output the advertisement to the display device during a time period in which a computing system including the display device is operating in the SlowPlay mode. The aforementioned time period can be referred to as a "second time period" if the computing system including the display is operating in the SlowPlay mode during the second time period. In accordance with that example, a first time period can be a time period in which the computing system operates in the SmartPlay mode. The output advertisement module 464 can be configured so that the processor does not output any advertisement to the display device during the first time period.

A server computing system can serve games to multiple client computing systems as users play games via the multiple client computing systems simultaneously. A first group of the client computing systems can play games in the SlowPlay mode while a second group of the client computing systems can play games in the SmartPlay mode. The server can execute the output advertisement module 464 to output advertisements to the first group of client computing systems without outputting advertisements to the second group of client computing systems.

The output advertisement module 464 can be configured to determine when to output an advertisement to a client computing system. As an example, the output advertisement module 464 can be configured to determine when a threshold quantity (e.g., thirty) of rounds-of-the-game have been played out at the client computing system. As another example, the output advertisement module 464 can be configured to determine when a threshold amount game play has occurred since an advertisement has been output to the client computing system. As yet another example, the output advertisement module 464 can be configured to determine the client computing system has just logged onto the server computing system such that an advertisement can be output to the client computing system upon logging on (before a first round of the game is played after the log on event).

14. Threshold Quantity Module

The threshold quantity module 466 can be configured to compare data to threshold data stored within the memory 158. As an example, the game support data 213 can include a threshold quantity of unused blocks of outcomes are stored in memory (e.g., within the database 211).

The threshold quantity module 466 can determine that less than a threshold quantity of unused blocks of outcomes is stored in memory 158 (e.g., within the database 211) or within the block database 318. Such determination can trigger the generate block database module 237 to generate additional blocks of outcomes for storing in in the database 211 or the block database 318. Such determination can occur repeatedly as the blocks are used in playing out games for the player(s).

15. Transmit Module

The transmit module 468 can be configured to transmit a communication over a communication network. The transmit module 468 can be configured to transmit a communication via the communication interface 142, 142A, 142B and/or via the processor 156, 156A, 156B. The transmit module 468 can be configured to transmit a communication over the system bus 141, 141A, 141B. A communication transmitted by the transmit module 470 can include data and/or an instruction such that transmitting the communication can be referred to as transmitting data or transmitting an instruction. As an example, an instruction can include a spin instruction in response to selection of a user-selectable control (e.g., a USC 694 shown in FIG. 64). As another example, an instruction can include a scratch action for revealing a symbol on a scratch card.

As an example, the transmit module 468 can be configured to transmit payout data (e.g., data regarding an award won during a round of a game) to a payout device, such as the payout device 160, 160A, 160B. The payout data can be contained within an HTTP communication.

As another example, the transmit module 468 can be configured to transmit a communication including pointer to a computing system 140B or the gaming workstation 110, 112, 114. Examples of the pointer are described throughout the description. As noted, transmission of a pointer can be carried out more efficiently than transmitting a larger quantity of data associated with the pointer. As an example, the pointer can include data for displaying a game outcome, a set of symbols with the symbol 196, or an animation within the animation 201.

As yet another example, the transmit module 468 can be configured to transmit data indicating whether a test to detect whether a human is playing a game in the SlowPlay mode at the client computing system 140B has failed, passed, is pending, or is inconclusive. In accordance with at least some embodiments, the aforementioned test is performed only while the computing system 140B is playing games in the SlowPlay mode. In accordance with at least some other embodiments, the aforementioned test is performed while the computing system 140B is playing games in the SlowPlay mode as well as in the SmartPlay mode.

16. Receive Module

The receive module 470 can be configured to receive a communication transmitted over a communication network. The receive module 470 can be configured to receive a communication at the communication interface 142, 142A, 142B and/or at the processor 156, 156A, 156B. The receive module 470 can be configured to receive a communication transmitted over the system bus 141, 141A, 141B.

As an example, the receive module 470 can be configured to receive data (e.g., a digital signal or an analog voltage) indicating a user-selectable control at a computing system (e.g., a USC displayed on the display 148B) has been selected. For instance, the receive module 470 can be configured to receive data indicating a USC within a GUI shown in FIG. 58 to FIG. 89 has been selected. Receiving data can be referred to as "downloading data."

The receive module 470 can be configured to receive registration data or payment data for an individual player. The registration data can be received to register the player. The payment data can be received to allow a player to select playing a game using the SmartPlay mode.

The receive module 470 can be configured to receive a communication including a pointer transmitted by the computing system 104A to the computing system 140B. Examples of the pointer are described throughout the description. As noted, receiving a pointer can be carried out more efficiently than receiving a larger quantity of data associated with the pointer. The data associated with the pointer can be stored in the memory 158B.

The receive module 470 can be configured to receive data indicating whether a test to detect whether a human is playing a game in the SlowPlay mode at the client computing system 140B has failed, passed, is pending, or is inconclusive.

The receive module 470 (e.g., executed at the computing system 140B) can be configured to receive a quantity of outcomes of a block of outcomes for a non-gambling game. The quantity of outcomes can include a portion of the block of outcomes or the entire block of outcomes. For example, the portion of the block of outcomes can include just a true outcome of the block if the computing system 140B is playing the game in the SmartPlay mode. In accordance with at least some embodiments, the received outcomes include animation(s) indicative of each outcome. In accordance with at least some embodiments, the received outcomes include pointer(s) indicative of each outcome. A pointer indicative of an outcome can include a pointer representative of an animation in the animation 201.

In accordance with at least some embodiments, the receive module 470 (executed at the computing system 140A) can be configured to receive data indicating a test result. The test result can indicate a result of test to determine whether a human is playing the non-gambling game at the computing system 140B. The test result can indicate the test failed, passed, is pending, or is inconclusive.

The receive module 470 can be configured to receive an input regarding playing the non-gambling game. As an example, the receive module 470 (executed at the computing system 140A) can be executed to receive an input regarding playing the non-gambling game from the client device (e.g., the computing system 140B). As another example, the receive module 470 (executed at the computing system 140B) can be executed to receive an input regarding playing the non-gambling game from the server (e.g., the computing system 140A).

17. Block Managing Module

The block managing module 472 can be configured to manage blocks within the database 211. The block managing module 472 can perform the block managing 308 described with respect to FIG. 57. The block managing module 472 can include an API for responding to requests for a block and/or data within a block of outcomes.

The block managing module 472 can read a block or outcomes of the block and pass the block or the outcomes to the block processing module 474.

The block processing module 474 can discard a block of outcomes currently in use by the block processing module 474 and after any portion of the block has been played out (e.g., processed by the block processing module 474). Discarding the block can include discarding any unplayed outcomes of a block. Discarding the unplayed outcomes can include archiving the block into the block archive 189, 320 before the unplayed outcomes are played.

The block processing module 474 can discard a block of outcomes in response to the computing system 140A receiving from the computing system 140B an input requesting a new block and/or to discard a current block (e.g., discard unused outcomes of the current block). As an example, the input can be generated and/or received in response to a selection of a USC, such as the USC 684 shown in FIG. 64, a USC 563 shown in FIG. 72, or a USC 724 shown in FIG. 82.

The block processing module 474 can be configured to remove a block of outcomes from the block archive 189, 320 after a predetermined amount of time (e.g., 90 days) has passed since the block was archived. Removing the block from the block archive 189, 320 can occur by deleting the block from the block archive 189, 320 or overwriting the block.

18. Block Processing Module

The block processing module 474 can be configured to process data within a block of outcomes within the database 211. The block processing module 474 can perform the block processing 310 described with respect to FIG. 57. The block processing module 474 can access an API within the block managing module 472 to request a block and/or data within a block of outcomes.

The block processing module 474 (e.g., at the computing system 140A) can obtain outcomes from a block of outcomes and provide the outcome to the computing system 140B. In the SmartPlay mode, the block processing module 474 can output at least one or each true game outcome corresponding to the indexed record holding a true outcome in the block. In the SlowPlay mode, the block processing module 474 can output at least one or each game outcome within the block of outcomes.

The block processing module 474 can determine when a player has completed play of a block (e.g., by playing out all outcomes in the block or by requesting to discard the block) and request storage of the bock within the block archive 189. The block processing module 474 can call the write data module 268 to write the block into the block archive 189.

The block processing module 474 can discard outcomes of a block. Discarding outcomes of the block can occur by requesting a new block or outcomes of a new block from the block managing module 472 or directly from a source of the block or outcomes (e.g., the database 211 or the block database 318). Discarding outcomes of the block can include not requesting and/or not outputting any other outcome of the block to be discarded.

The block processing module 474 can be configured to perform, at a computing system (e.g., the computing system 140A), a server thread for performance of the non-gambling game based on a block of outcomes of a non-gambling game. The server thread can be performed for multiple instances of the computing system 140B so that multiple users can carry out different instances of the non-gambling game concurrently. The different instances of the non-gambling game can be carried out using different modes (i.e., some instances of the non-gambling game use the SmartPlay mode and other instances use the SlowPlay mode).

The different instances of the non-gambling game carried out using the SmartPlay or SlowPlay modes can be at different stages of playing out a block of outcomes. For example, at a given example time, an instance of a game played in the SmartPlay mode for a first instance of the computing system 140B can be playing out a first result of a first block of outcomes, an instance of a game played in the SlowPlay mode for a second instance of the computing system 140B can be playing out a last result of a second block of outcomes, and an instance of a game played in the SmartPlay or SlowPlay mode for a third instance of the computing system 140B can be playing out an intermediate result of a third block of outcomes (i.e., a result between first and last outcomes of the third block). Other examples are possible.

In at least some embodiments, the block processing module 474 performs a single instance of the server thread while an instance of the computing system 140B plays out the non-gambling game for multiple blocks of outcomes sequentially (e.g., the computing system 140B plays out a first block of outcomes and then plays out a second block of outcomes). The server thread allows a block of outcomes to be played out completely (i.e., all outcomes of the block are played out) or to be played out partially (i.e., only some of the outcomes of the block are played out). The server thread can allow the non-gambling game to be played out in the automatic play mode.

In at least some other embodiments, the block processing module 474 performs a different instance of the server thread for each block of outcomes regardless of whether the block of outcomes is for a single instance of the computing system 140B or different instances of the computing system 140B.

IX. Additional Example Graphical User Interfaces

Next, Next, FIG. 58 to FIG. 89 show a graphical user interface (GUI). Some of those figures show different views of the same GUI. Any computing system described in this description can output and/or display any GUI (or any portion of the content shown in a GUI) shown in FIG. 58 to FIG. 89. The GUI 194 shown in FIG. 54 can include a computer-readable file for outputting any GUI (or any portion of the content shown in a GUI) shown in FIG. 58 to FIG. 89.

FIG. 58 to FIG. 89 show a computing system 600 having a display 602 configured for displaying a GUI in accordance with the example embodiments. Like other computing systems described herein, the computing system 600 includes a user interface with user-selectable controls. In at least some embodiments, one or more of those user-selectable controls can comprise a hardware button, such as a reconfigurable hardware button. In at least some embodiments, one or more of the user-selectable controls comprises a user-selectable control output on the display 602. For convenience, FIG. 58 to FIG. 89 show the user-selectable controls on the display 602. A person having ordinary skill in the art will understand that any user-selectable control described as being and/or shown on the display 602 can, additionally or alternatively, be embodied in a hardware button of the computing system 600. The computing system 600 can be arranged as the computing system 140, 140B or another computing system described in this description. The display 602 can be arranged as the display 148, 148B or another display described in this description.

In particular, FIG. 58 shows a GUI 604 including a user-selectable control (USC) 606, 608, 610 selectable by a user to cause the computing system 600 to generate a signal corresponding to a game the user wishes to play. In accordance with at least some embodiments, the USC 606, 608, 610 corresponds to a respective application the computing system 600 launches in response to receiving the signal generated by selection of the USC 606, 608, 610. In accordance with at least some other embodiments, the USC 606, 608, 610 corresponds to a game available to be played by an application already launched and executing on the computing system 600.

In particular, the USC 606 corresponds to a game G1, the USC 608 corresponds to a game G2, and the USC 610 corresponds to a game GN. The "N" represents a variable integer to indicate some number of games available to be selectable via a USC using the GUI 604. For example, "N" could be 3, 4, or 5 to indicate the GUI 604 can include 3, 4, or 5 USC to select one of 3, 4, or 5 games to play. "N" can be larger than 5. As an example, the game G1 can be a video slots game, G2 can be a scratch-card game, and GN can be a wheel game, such as a prize wheel game or a roulette wheel game. The available games can include more than one of those types of games, such as first video slots game with a first theme (e.g., a fruit theme), a second video slots game with a second theme (e.g., ancient civilization), and a third video slots game with a third theme (e.g., Greek mythology).

Figure 59:
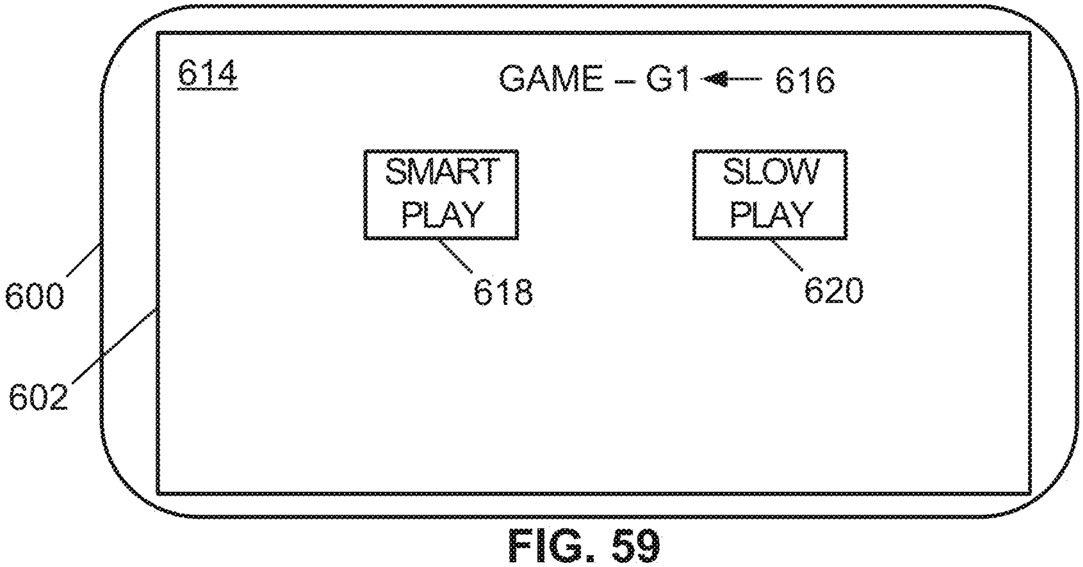

Next, FIG. 59 shows a GUI 614 with a game identifier 616 identifying a previously-selected game (e.g., a game selected via the USC 606 in the GUI 604). The GUI 614 includes a USC 618 selectable to select a Smart Play option, and a USC 620 selectable to select a Slow Play Option. The computing system 600 can automatically configure itself for playing the Smart Play or Slow Play option. The computing system 600 can output a signal to a server to indicate which play option has been selected.

Next, FIG. 60 shows a GUI 624 for entry of registration data for a player to be eligible for Smart Play. The GUI 624 can be output on a display in response to a selection of the USC 618 shown in FIG. 59. The GUI 624 includes a field 626, 628, 630, 632, 634 for entry of a player name, an e-mail address, a bank routing number, a bank account number, and a card number, respectively. The card number can be a credit or debit card. The GUI 624 can include different fields and/or additional fields for entry of other registration data. The GUI 624 includes a user-selectable control 636 to cause transmission of the registration data entered into the field(s) to a server for registering a player. The GUI 624 can include a USC 638 to close the GUI 624 before completing Smart Play registration if the player wants to use the Slow Play option only.

The GUI 624 can be displayed on the display 602 in response to events other than selection of the USC 618 for Game G1. For example, the computing system 600 can display a GUI like the 614 for games other than G1. Selection of a USC to select a Smart Play option for a different game is possible. If the player is not already registered to use the Smart Play option for the different games, the computing system can output the GUI 624 for the different games. As another example, the GUI 624 can be displayed on the display 602 in response to launching an application for playing games having a Smart Play option before the player can select one of those games to play. In that regard, the computing system 600 can display the GUI 624 before displaying the GUI 604 if the player has not yet registered for using the Smart Play option. In accordance with at least some embodiments, a player registering for the Smart Play option automatically includes registering for the Slow Play option.

Next, FIG. 61 shows a GUI 644 for entry of registration data for a player to be eligible for Slow Play. The GUI 644 can be output on a display in response to a selection of the USC 620 shown in FIG. 59. The GUI 644 includes a field 646, 648, 650, 652 for entry of a player name, an e-mail address, a bank routing number, a bank account number, respectively. The card number can be a credit or debit card. The GUI 644 can include different fields and/or additional fields for entry of other registration data. The GUI 644 includes a user-selectable control 654 to cause transmission of the registration data entered into the field(s) to a server for registering a player. The field 650 and the field 652 can be provided so that any monetary awards earned playing a game using the Slow Play option can be transferred to a player account external to computing systems used to carry out a game. The GUI 644 can include a field, like the field 634 shown in FIG. 60, to allow a player to enter a card number, such as a credit or debit card number if computing system carrying out the game can transfer awards to an enterprise that issued the credit or debit card.

The GUI 644 can be displayed on the display 602 in response to events other than selection of the USC 620 for Game G1. For example, the computing system 600 can display a GUI like the 644 for games other than G1. Selection of a USC to select a Slow Play option for a different game is possible. If the player is not already registered to use the Slow Play option for the different games, the computing system can output the GUI 644 for the different games. As another example, the GUI 644 can be displayed on the display 602 in response to launching an application for playing games having a Slow Play option before the player can select one of those games to play. In that regard, the computing system 600 could display the GUI 644 before displaying the GUI 604 if the player has not yet registered for using the Slow Play option. In accordance with at least some embodiments, a player registering for the Slow Play option automatically includes registering for the Smart Play option.

Figure 62:
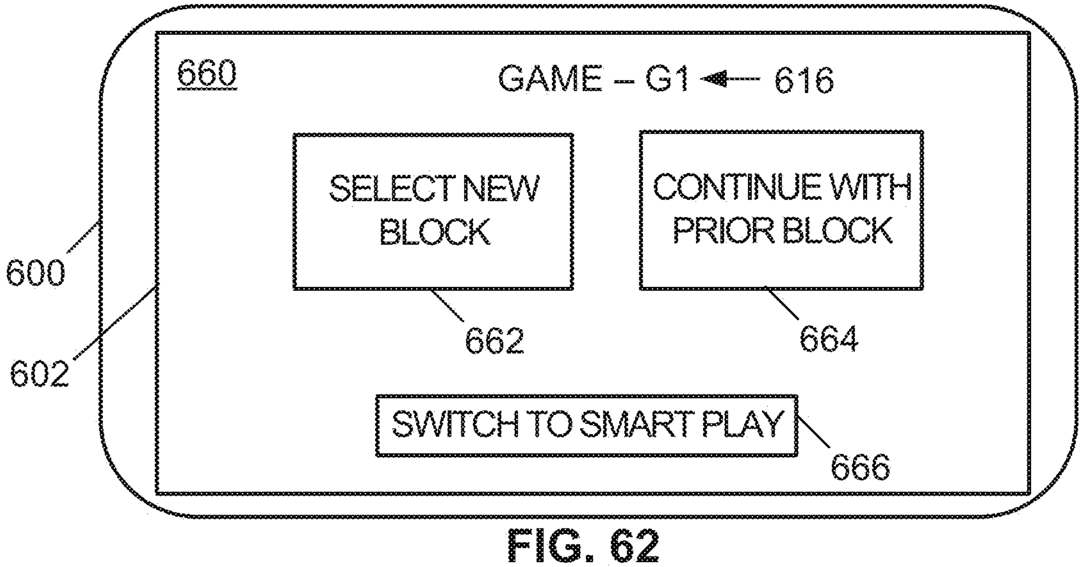

Next, FIG. 62 shows a GUI 660 for entry of a user selection with respect to the Slow Play mode. As an example, the GUI 660 can be output on the display 602 in response to a selection of the USC 606 shown in FIG. 58 if the player is registered for the Slow Play option only, or the USC 620 shown in FIG. 59, or the USC 654 shown in FIG. 61. Other triggers causing display of the GUI 660 are also possible. The GUI 660 includes a USC 662 selectable to cause the computing system 600 to play out the game G1 using a new block of outcomes. The GUI 660 includes a USC 664 selectable to cause the computing system 600 to play out the game GI using outcomes that remain in a partially used block of outcomes. The GUI 660 includes a USC 666 to trigger switch the computing system 600 from a mode to play the game GI using the Slow Play option to a mode to play the game G1 using the Smart Play option.

Figure 63:
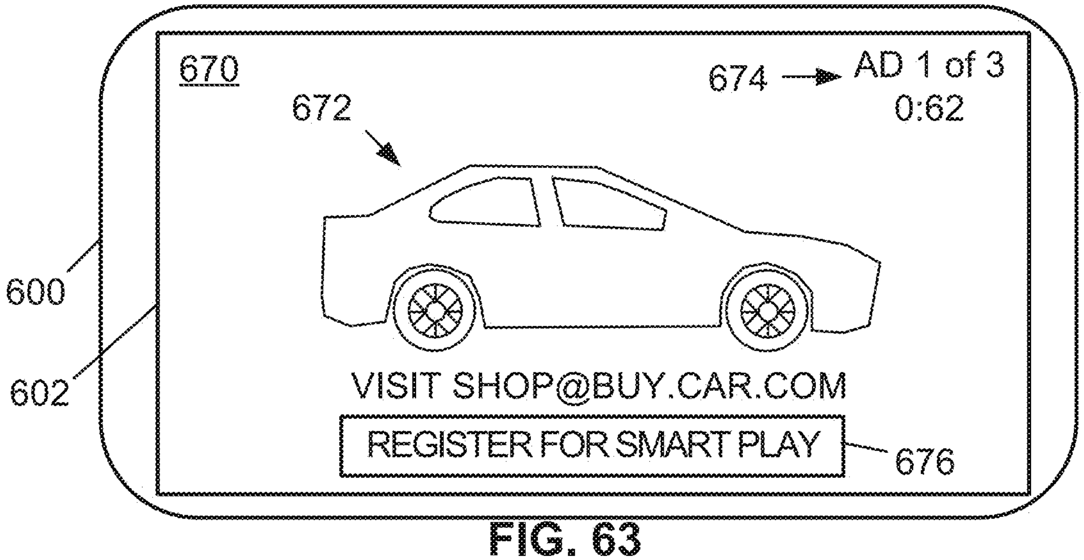

Next, FIG. 63 shows a GUI 670 for displaying an advertisement 672. The GUI 670 can include an advertisement counter 674. As an example, the advertisement counter 674 can include an indicator of how many advertisements have been played since starting out of how many advertisements are to be played out before the game can be played again. The advertisement counter 674 can include a countdown clock showing how many more seconds the advertisements will be displayed before the game can be played again. The guidance provided by the advertisement counter 674 may prompt a player to register for the Smart Play option. The GUI 670 can include a USC 676 selectable to trigger the computing system 600 to display a GUI (e.g., the GUI 624 shown in FIG. 60) by which the player can register to use the Smart Play option.

As an example, the computing system 600 can output the GUI 670 in response to receiving a selection to play the game using the Slow Play option before any round of the game is played out after the selection to play the game is entered. As another example, the computing system 600 can output the GUI 670 after the player has played out M rounds of the game using the Slow Play mode. M, for instance, can equal 25, 35, 50 or another quantity of rounds of the game.

As yet another example, the computing system 600 can output the GUI in response to receiving a selection of a USC to trigger the computing system to begin using a new block of outcomes. The USC 684 shown in FIG. 64 is an example of such USC.

Figure 64:
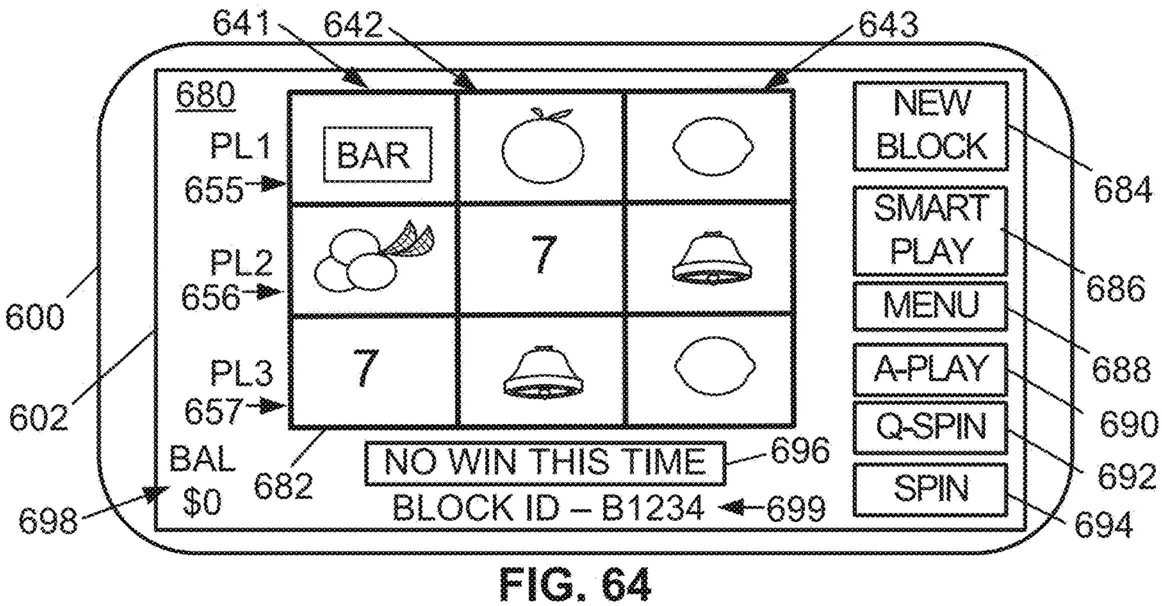

Next, FIG. 64 shows a GUI 680 for playing and displaying outcomes of a non-gambling video slots game in the SlowPlay mode. This game can correspond to the game identifier G1. The GUI 680 includes a symbol display portion 682 (i.e., e.g. a reel display). The symbol display portion 682 includes a column 641, 642, 643 and a row 655, 656, 657. The column 641, 642, 643 can correspond to first, second, and third reel (e.g., the reel 218, 220, 220, respectively, shown in FIG. 7). The row 655, 656, 657 can correspond to payline PL1, PL2, PL3, respectively. Other examples of paylines or payways based on combination of symbol positions within the symbol display portion 682 are possible.

The GUI 680 includes a USC 684, 886, 688, 690, 692, 694. The USC 684 is selectable to request a new block of outcomes for use in the game. The USC 684 is shown to include text "New Block," but could include other text, such as "Discard Block." The USC 686 is selectable to indicate to a processor that the player wants to switch to the SmartPlay mode. The USC 688 is selectable to cause a processor to output a menu on the display 602. The USC 690 is selectable to indicate to a processor that the player wants to have the game played out in AutoPlay mode and/or to toggle between a manual play mode and the AutoPlay mode. The USC 692 is selectable to indicate to a processor that the player wants to have the game played out in QuickSpin mode and/or to toggle between a default (normal) speed mode and the QuickSpin mode. The USC 694 is selectable to trigger spinning the reels within the symbol display portion 682. The USC 694 can be disabled if the game is being played in the AutoPlay mode.

The GUI 680 includes a notification 696. The notification 696 can be displayed within a notification container (i.e., a portion of the GUI 680 designated for displaying notifications (i.e., messages). The notification 696 can be dynamic. The computing system 600 can modify the notification 696 to provide the user with guidance regarding playing the game. As shown in FIG. 64, the notification 696 indicates "No win this time" (i.e., the current outcome played out did not result in a win).

The GUI 680 includes a balance indicator 698. The balance indicator can indicate, for example, an amount of SmartPlay credits remaining in the player's account or an amount of winnings available to be paid out. Other examples of balances that can be indicated by the balance indicator 698 are also possible. The GUI 680 includes a block identifier 699. The same block identifier can be output on the display 602 until such time that a new block of outcomes with a different block identifier is being processed for the computing system 600.

Figure 65:
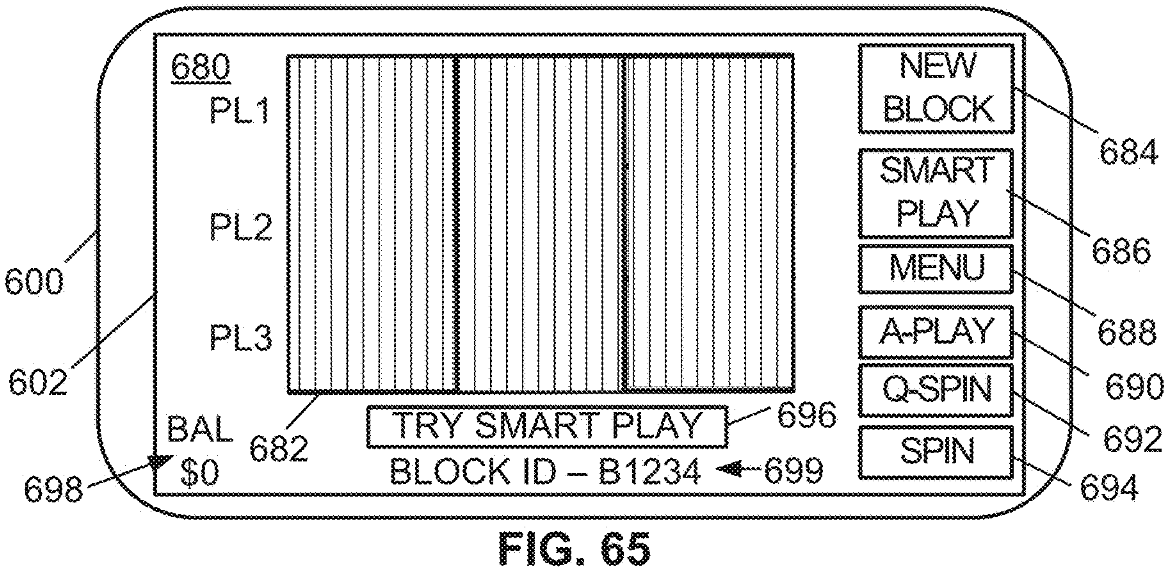

Next, FIG. 65 shows another view of the GUI 680. In this view, the GUI 680 is displaying an animation (e.g., one or more animations) in the symbol display portion 682. The animation(s) can be integrated within the GUI 680 or can be retrieved from memory (e.g., the animation 201) and populated into the GUI 680. The animation(s) can show the reels spinning then stopping. As shown in FIG. 65, the notification 696 indicates "Try Smart Play." This represents the notification 699 is dynamic. The notification 696 shown in FIG. 65 can prompt a player to use the SmartPlay mode.

The view of the GUI 680 shown in FIG. 65 can result from a selection of the USC 694. Alternatively, the view of the GUI 680 shown in FIG. 65 can result automatically if the game is being played out in the AutoPlay mode in response to a prior selection of the USC 688 and after the view of the GUI 680 shown in FIG. 64 is output on the display 602 for a pre-determined amount of time.

Figure 66:
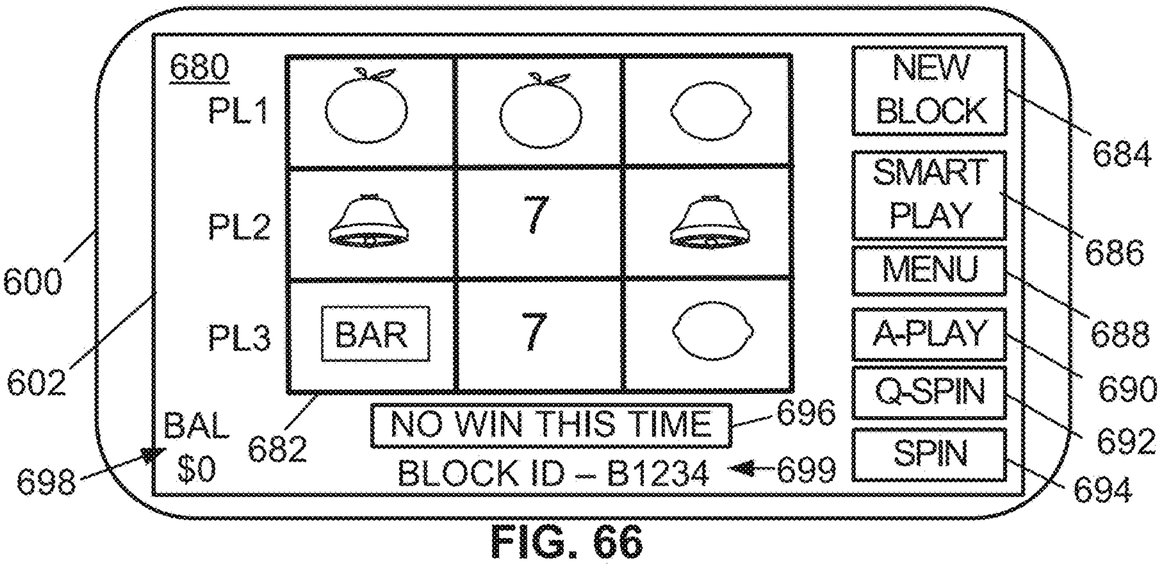

Next, FIG. 66 shows another view of the GUI 680. In this view, the GUI 680 is displaying a combination of symbols in the symbol display portion 682 after the animation(s) discussed with respect to FIG. 65 show the reels stopped. As shown in FIG. 66, the notification 696 indicates "No win this time."

Figure 67:
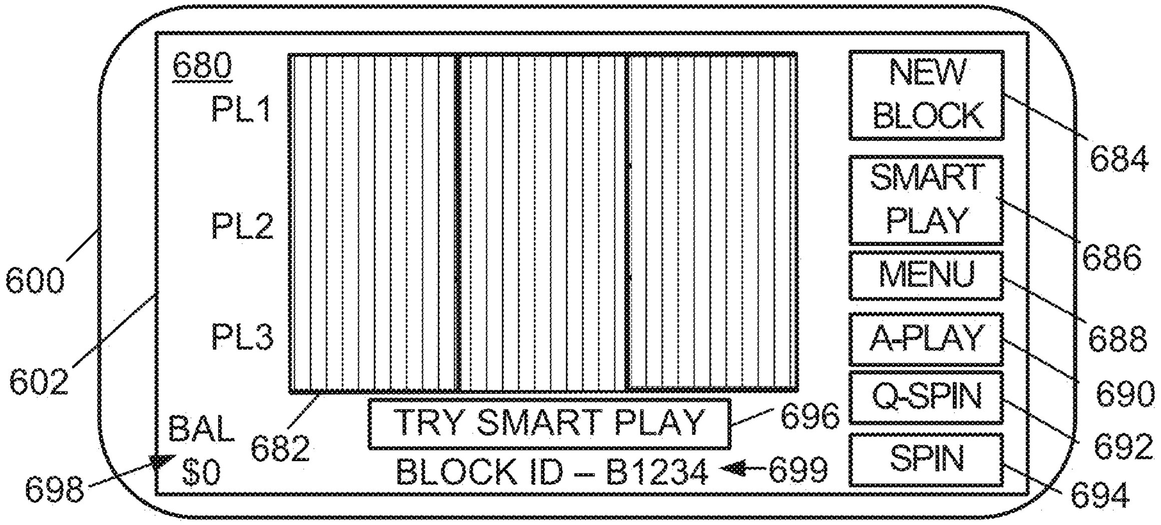

Next, FIG. 67 shows another view of the GUI 680. In this view, the GUI 680 is displaying an animation (e.g., one or more animations) in the symbol display portion 682. The animation(s) can show the reels spinning then stopping. As shown in FIG. 67, the notification 696 indicates "Try Smart Play." The view of the GUI 680 shown in FIG. 67 can result from a selection of the USC 694 while the GUI 680 is output as shown in FIG. 66. Alternatively, the view of the GUI 680 shown in FIG. 67 can result automatically if the game is being played out in the AutoPlay mode in response to a prior selection of the USC 688 and after the view of the GUI 680 shown in FIG. 66 is output on the display 602 for a pre-determined amount of time.

Figure 68:
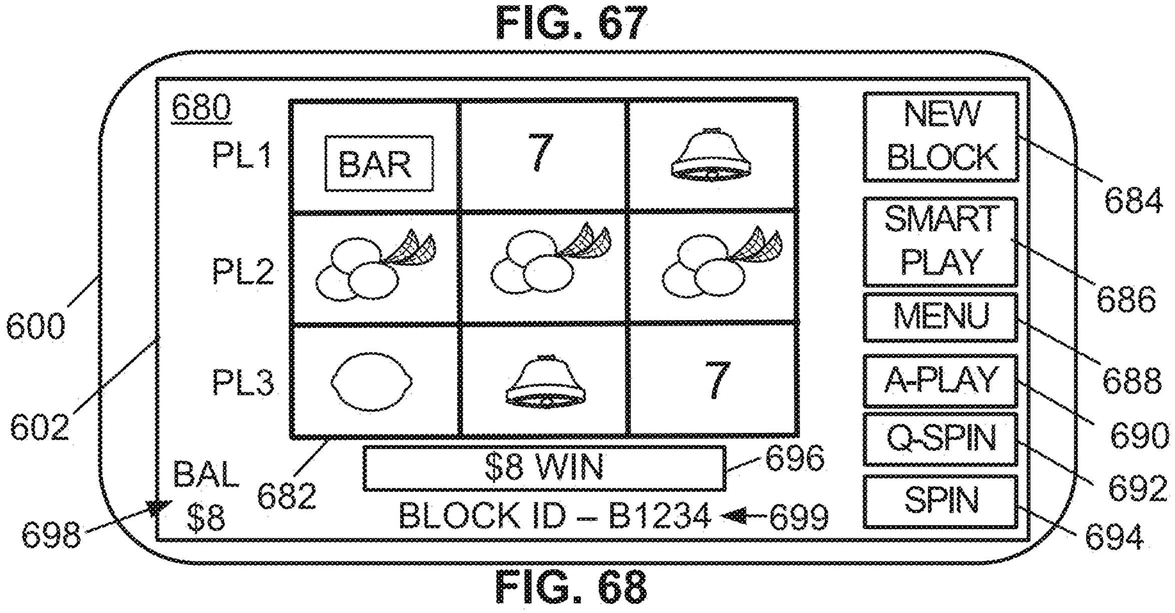

Next, FIG. 68 shows another view of the GUI 680. In this view, the GUI 680 is displaying a combination of symbols in the symbol display portion 682 after the animation(s) discussed with respect to FIG. 67 show the reels stopped. As shown in FIG. 68, the notification 696 indicates "$8 Win," and the balance indicator 698 has been increased by the amount of the win.

As shown in FIG. 64 to FIG. 68, the block identifier 699 is the same in all views of the 680, and animations showing reels in the symbol display portion 682 are shown in between displaying each outcome of the identified block. Additional outcomes of the identified block can be output on the display 602 prior to the outcome shown in FIG. 64 and/or after the outcome shown in FIG. 68. Animation(s), like those shown in FIG. 65 and FIG. 67 can be displayed before each of those additional outcomes. The block identifier 699 shown in FIG. 67 and FIG. 68 could be different than B1234 if a new block of outcomes was requested by a selection of the USC 684 while the view of the GUI 680 shown in FIG. 66 was output on the display 602. A GUI showing an advertisement, such as the GUI 670 in FIG. 63, can be output on the display 602 in between two views of the GUI 680 shown in FIG. 64 to FIG. 20.

Figure 69:
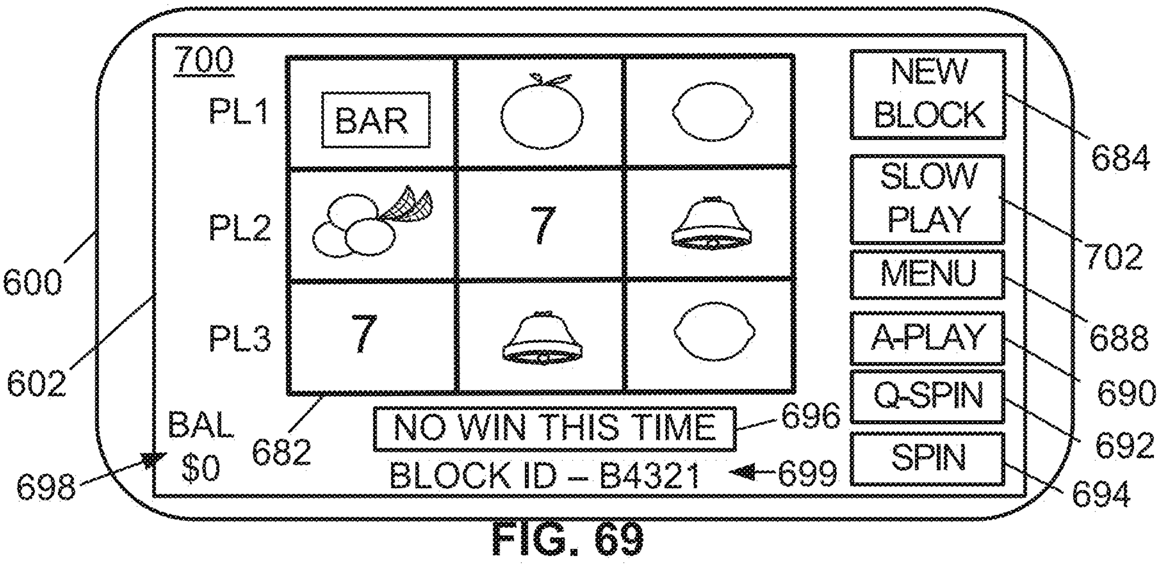
Figure 70:
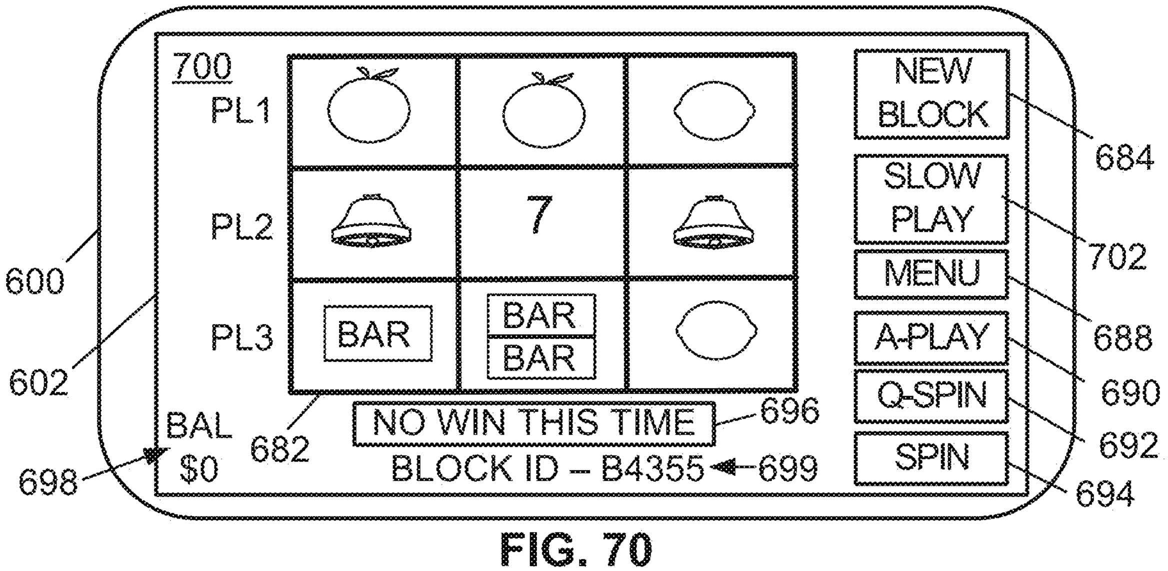
Figure 71:
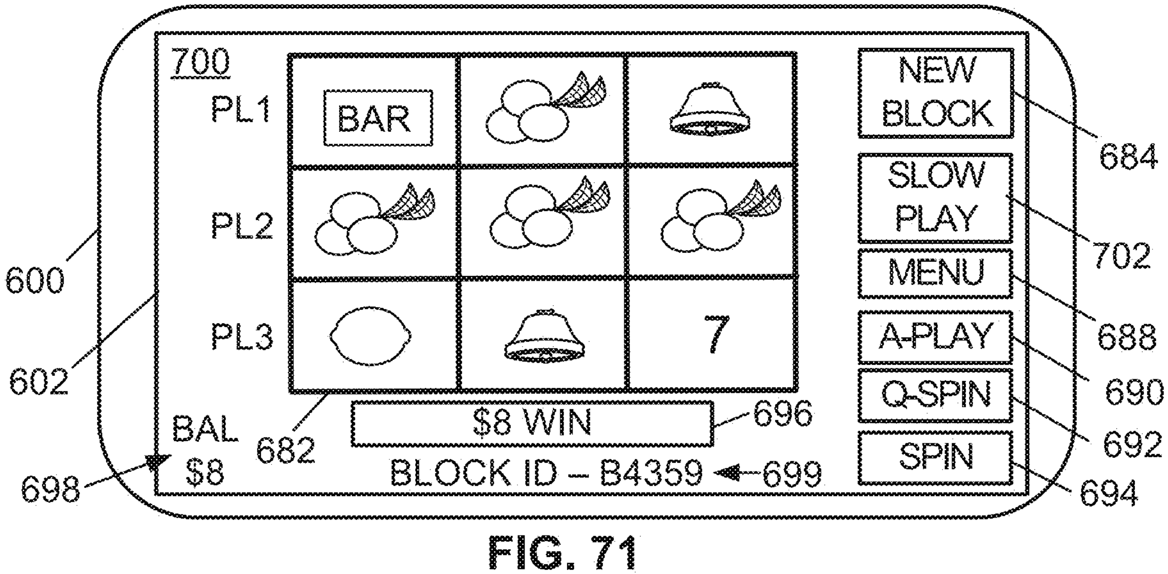

Next, FIG. 69 to FIG. 71 show a GUI 700 displaying different outcomes of a non-gambling slots game in the SmartPlay mode. This game can correspond to the game identifier G1. The GUI 700 includes a symbol display portion 682 (i.e., e.g. a reel display). The symbol display portion 682 includes a column 641, 642, 643 and a row 655, 656, 657. The column 641, 642, 643 can correspond to first, second, and third reel (e.g., the reel 218, 220, 220, respectively, shown in FIG. 7). The row 655, 656, 657 can correspond to payline PL1, PL2, PL3, respectively. The descriptions of like-numbered aspects in the GUI 680 are applicable to the aforementioned aspects in the GUI 700.

The GUI 670 includes the USC 684, 688, 690, 692, 694. The descriptions of like-numbered USC in the GUI 680 are applicable to the aforementioned USC in the GUI 700. The GUI 700 also includes a USC 702 selectable to indicate to a processor that the player wants to switch to the SlowPlay mode.

The GUI 700 includes the notification 696. The notification 696 in the GUI 700 can include notifications applicable to game play in the SmartPlay mode. The GUI 700 includes the balance indicator 698. The balance indicator can indicate balances applicable to game play in the SmartPlay mode, such as an amount of SmartPlay credits remaining in the player's account or an amount of winnings available to be paid out. The GUI 700 includes the block identifier 699. As shown in FIG. 69 to FIG. 71, the block identifier 699 can change for each outcome displayed in the GUI 700. In such case, the block of outcomes including the outcome shown in FIG. 69 to FIG. 71 includes a single true outcome. In FIG. 69 and FIG. 70, the true outcome is a non-winning outcome, whereas in FIG. 71, the true outcome is a winning outcome.

Additional outcomes of different block(s) of outcomes can be output on the display 602 prior to the outcome shown in FIG. 69 and/or after the outcome shown in FIG. 71. Animation(s), like those shown in FIG. 65 and FIG. 67, are not displayed while playing the game in the SmartPlay mode.

Figure 72:
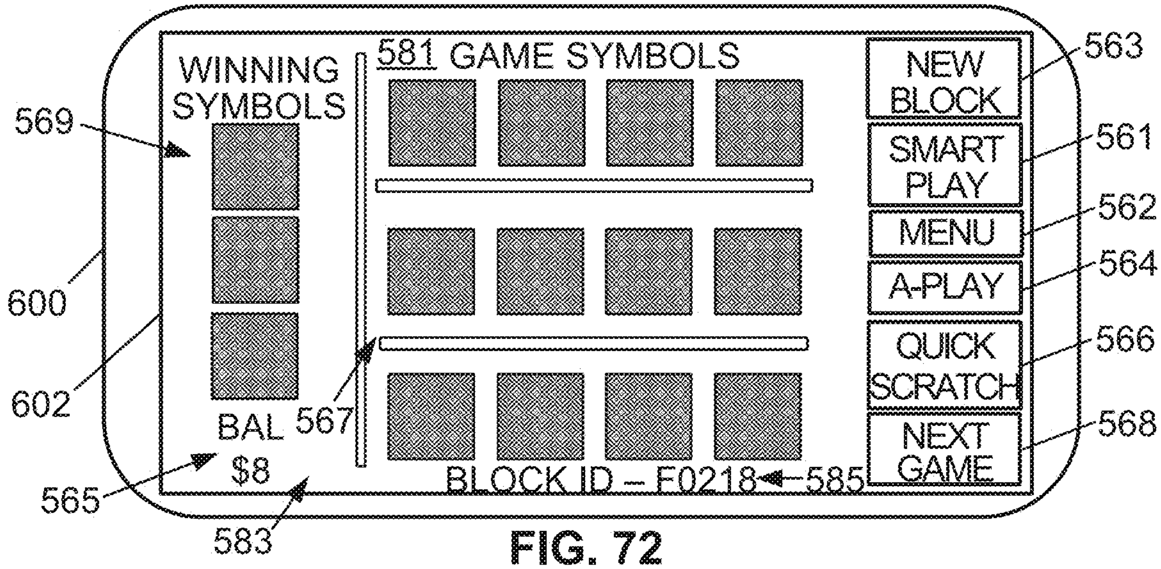

Next, FIG. 72 shows a GUI 581 for playing and displaying outcomes of a non-gambling scratch-card game in the SlowPlay mode. This game can correspond to the game identifier G2. FIG. 72 shows the GUI 581 output on the display 602 of the computing system 600. The GUI 581 includes a scratch-card 583 (i.e., a virtual scratch-card) including winning symbols 569 and game symbols 567. An object of the scratch-card game is to reveal one or more of the winning symbols 569 among the game symbols 567. The GUI 581 shows the scratch-card 583 having three winning symbols and twelve game symbols. Other quantities of those symbols on a virtual scratch-card are possible. In some embodiments, the winning symbols 569 can represent winnable awards.

In FIG. 72, all of the winning symbols 569 and all of the game symbols 567 are covered (i.e., not revealed). Playing the game in the SlowPlay mode requires the player or the computing system 600 to perform a scratch action to reveal each winning symbol and each game symbol. As an example, the scratch action can include a player contacting the display 602 at and/or in proximity to each covered symbol. As another example, the scratch action can include using a pointing device (e.g., a computer mouse) to point a cursor at the covered symbol and click pointing device.

The GUI 581 includes a USC 563, 561, 562, 564, 566, 568. The USC 658 is selectable to request a new block of outcomes for use in the game. The USC 561 is selectable to indicate to a processor that the player wants to switch to the SmartPlay mode. The USC 562 is selectable to cause a processor to output a menu on the display 602. The USC 564 is selectable to indicate to a processor that the player wants to have the game played out in AutoPlay mode and/or to toggle between a manual play mode and the AutoPlay mode. The USC 566 is selectable to indicate to a processor that the player wants to have the game played out in QuickScratch mode and/or to toggle between a default (normal) scratch mode and the QuickScratch mode. The USC 568 is selectable to cause the computing system 600 to output a next scratch-card on the display. The USC 568 can be disabled if the game is being played in the AutoPlay mode.

As an example, the Quick-scratch mode can allow the player to reveal symbols on scratch card with fewer scratch actions than symbols on the scratch card. For example, the player can touch the scratch-card once to reveal all symbols. As another example, the player can touch the one of the winning symbols to reveal all winning symbols and touch the game symbols to reveal all game symbols. Other examples of the scratch actions for the Quick-Scratch mode are also possible.

The GUI 581 includes a balance indicator 565. The balance indicator can indicate, for example, an amount of SmartPlay credits remaining in the player's account or an amount of winnings available to be paid out. Other examples of balances that can be indicated by the balance indicator 565 are also possible. The balance shown in FIG. 72 (i.e., $8) is identical to the balance shown by the balance indicator 698 shown in FIG. 71. In one respect, those identical balances are merely coincidental. In another respect, those identical balances can result from the player stopping play of the game G1 and starting play of the game G2. A computing system can be configured to allow the player to use the same account balance for multiple games.

The GUI 581 includes a block identifier 585. The same block identifier can be output on the display 602 until such time that a new block of outcomes with a different block identifier is being processed for the computing system 600.

Figure 73:
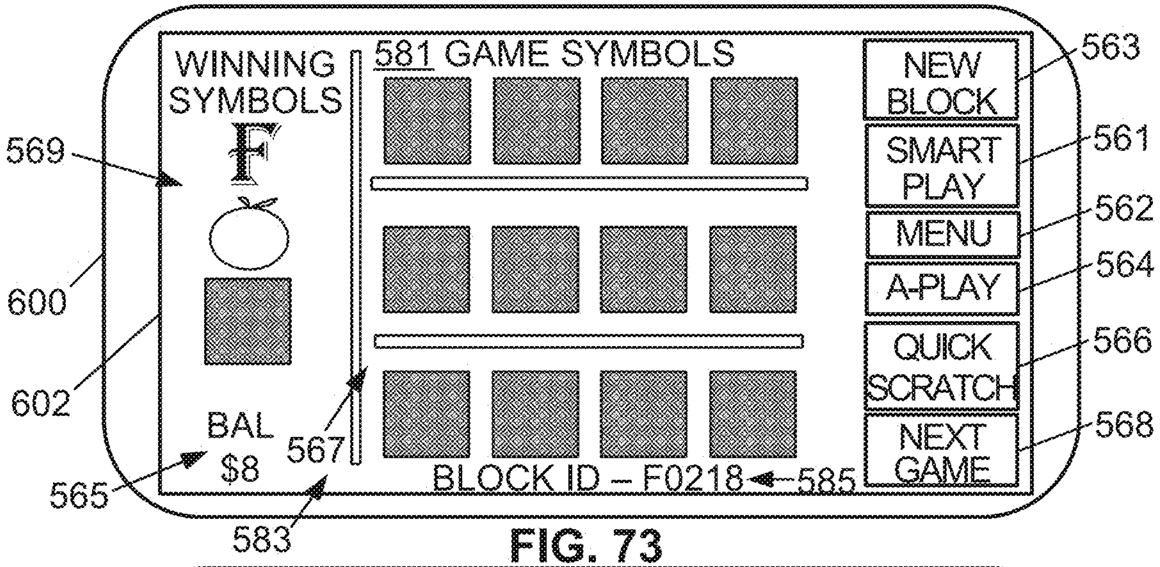

Next, FIG. 73 shows a view of the GUI 581 in which two of the winning symbols 569 have been revealed via scratch actions.

Figure 74:
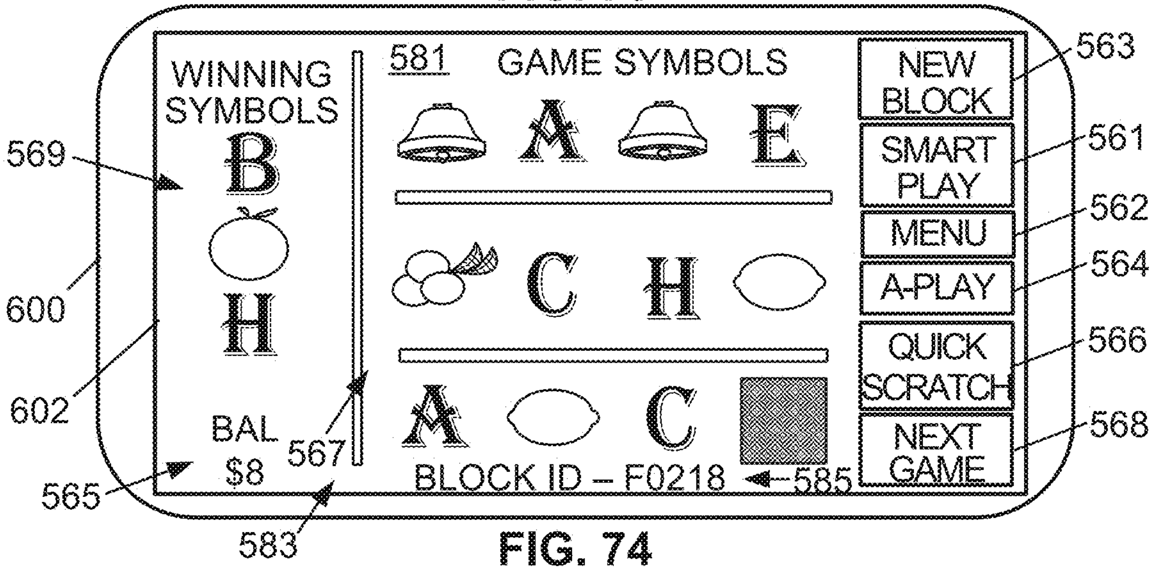

Next, FIG. 74 shows a view of the GUI 581 after all of the winning symbols 569 have been revealed via scratch actions and all but one game symbol of the game symbols 567 have been revealed via scratch actions. In accordance with at least some embodiments, individual winning symbols of the winning symbols 569 and individual game symbols of the game symbols 567 can be revealed in any order.

Figure 75:
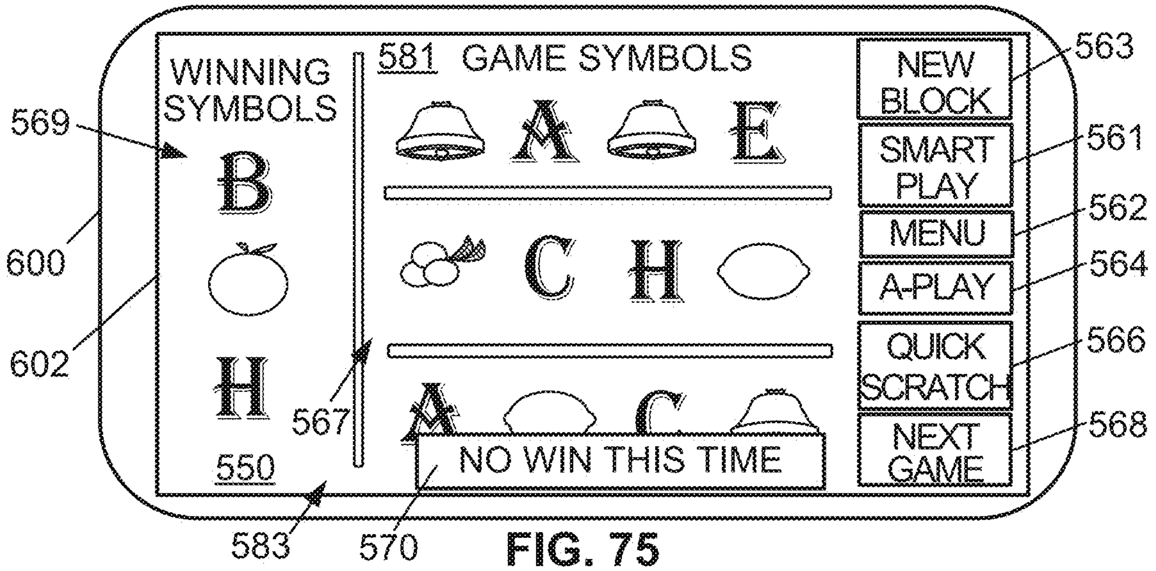

Next, FIG. 75 shows a view of the GUI 581 after all of the winning symbols 569 and all of the game symbols 567 have been revealed via scratch actions. In accordance with at least some embodiments, individual winning symbols of the winning symbols 569 and individual game symbols of the game symbols 567 can be revealed in any order.

As shown in FIG. 75, the GUI 581 includes a notification 570. The notification 570 can be displayed within a notification container (i.e., a portion of the GUI 581 designated for displaying notifications (i.e., messages). The notification 570 can be dynamic. The computing system 600 can modify the notification 570 to provide the user with guidance regarding playing the game. As shown in FIG. 75, the notification 570 indicates "No win this time" (i.e., the current outcome played out did not result in a win). In at least some embodiments, the notification 570 is displayed anytime the GUI 581 is output on the display 602.

Figure 76:
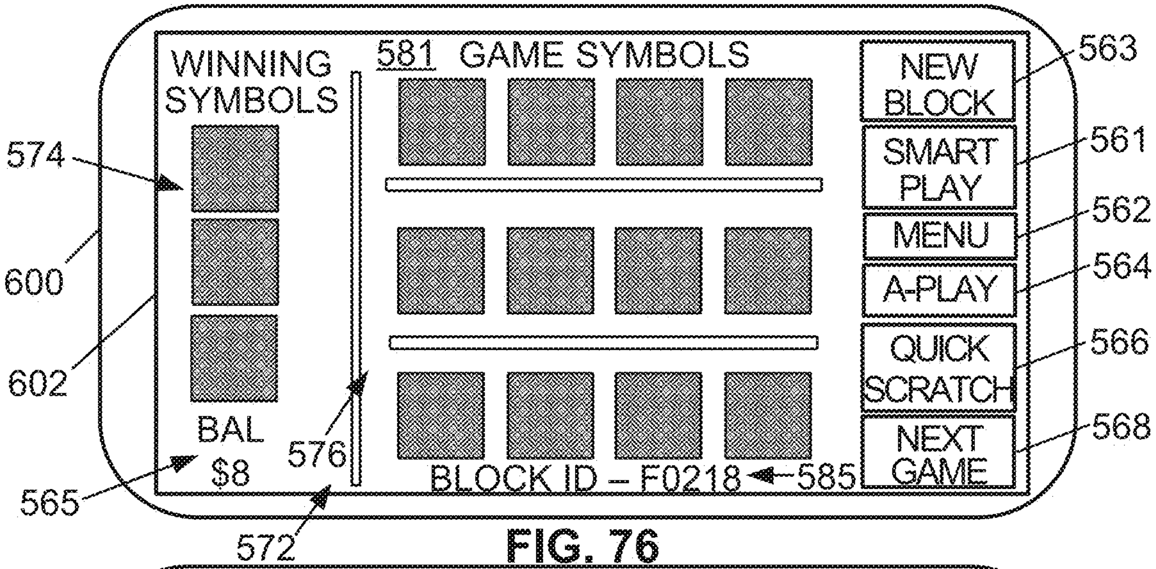

Next, FIG. 76 shows a view of the GUI 581 for playing and displaying another outcome of the non-gambling scratch-card game in the SlowPlay mode. In this view, the GUI 581 includes a scratch-card 572 (i.e., a new virtual scratch card relative to the scratch-card used in FIG. 72 to FIG. 75) including winning symbols 574 and game symbols 576. All of those symbols are covered as scratch-actions have not yet been performed to the scratch-card 572. In one respect, the displaying of a new scratch-card with its symbols covered is analogous to reels of a video slot game spinning before the symbols of the next spin are revealed. In both instances, some amount of time is required to show the reels spinning or to perform the scratch actions. Switching from SlowPlay mode to SmartPlay mode for the scratch card game can eliminate the need to perform scratch actions for some or all outcomes in a block of outcomes.

Figure 77:
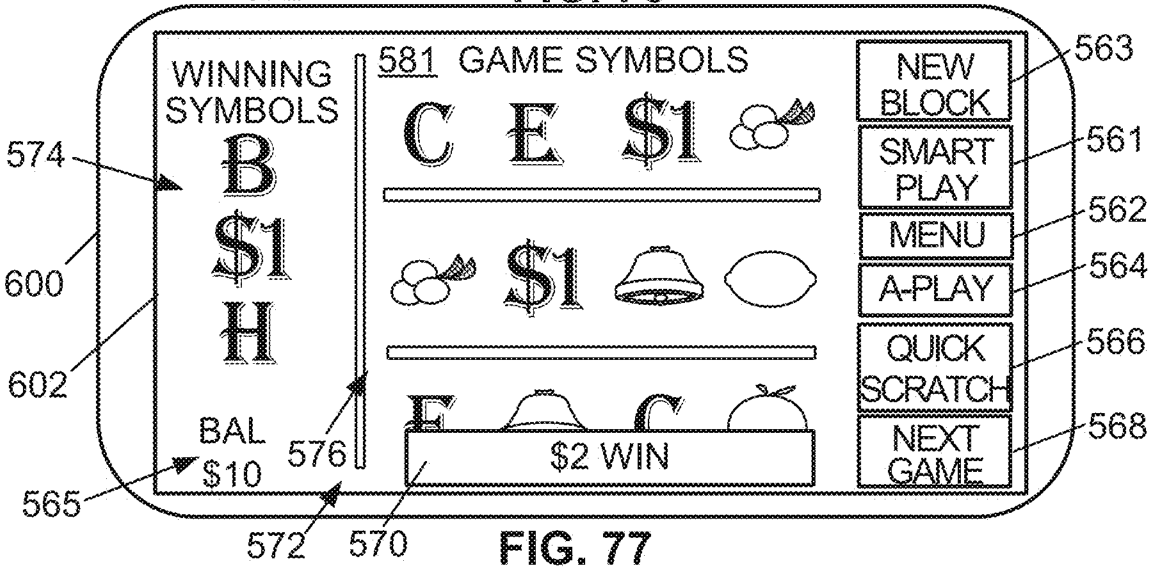

Next, FIG. 77 shows a view of the GUI 581 displaying the scratch-card 572 after scratch-actions have been performed to reveal all of the winning symbols 574 and game symbols 576. Intermediate views of the GUI 581 displaying the scratch-card 572 with only some of the winning symbols 574 and/or only some of the game symbols 576 revealed are not shown but could look similar in nature to how the GUI

581 looks in FIG. 73 and FIG. 74. In FIG. 77, the notification 570 indicates "$2 WIN," which can result from two of the game symbols ($1) matching an identical winning symbol ($1). In FIG. 77, the balance indicator 565 shows a balance has been increased to $10 (i.e., a sum of the prior account balance shown in FIG. 76 and the $2 win).

Additional outcomes of the block "F0218" identified by the block identifier 585 in FIG. 72 can be output on the display 602 prior to displaying the scratch-card 583 in FIG. 72 and/or after the outcome shown in FIG. 77. Scratch-actions on other scratch-cards can be required before outcomes of a block of outcomes corresponding to the other scratch-cards are revealed while the scratch-card game is played in the SlowPlay mode.

Figure 78:
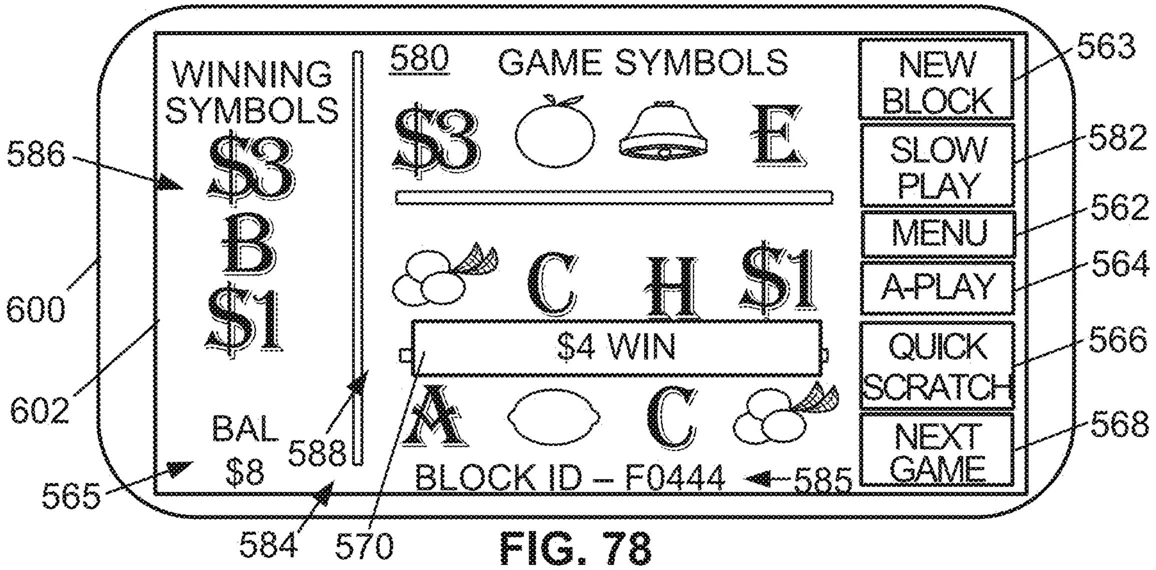
FIG. 78, FIG. 79, FIG. 80, FIG. 81, FIG. 82, FIG. 83, FIG. 84, FIG. 85, FIG. 86, FIG. 87, FIG. 88, and FIG. 89 depicts a graphical user interface (GUI), in accordance with one or more example embodiments.
Figure 79:
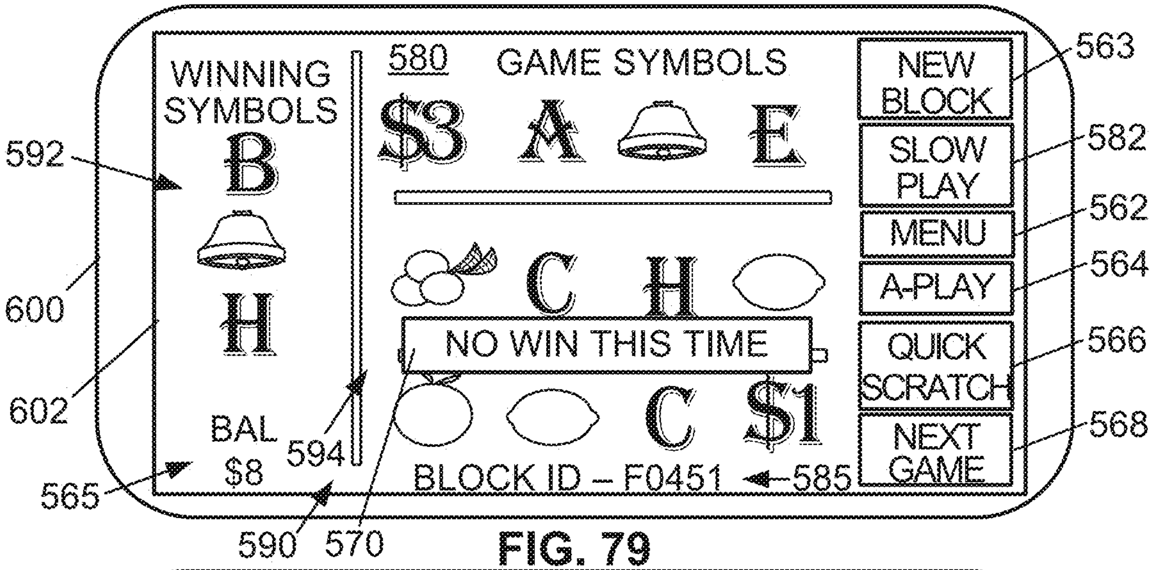
Figure 80:
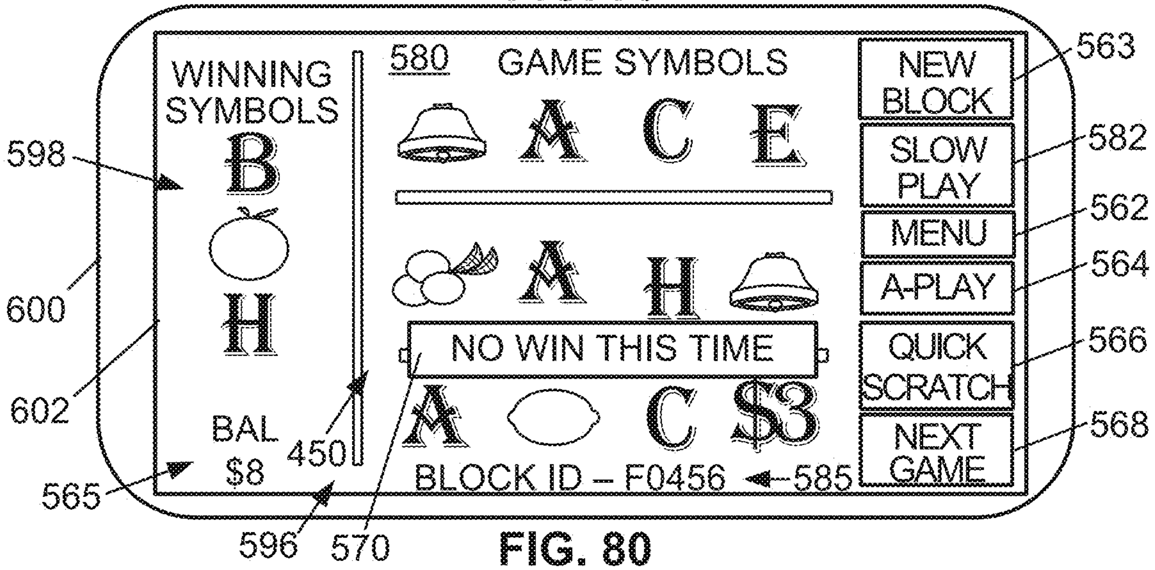

Next, FIG. 78 to FIG. 80 show different views of a GUI 580 displaying different outcomes of a non-gambling scratch-card game in the SmartPlay mode. This game can correspond to the game identifier G2. The GUI 580 includes the USC 563, 562, 564, 566, 568. The descriptions of like-numbered USC in the GUI 581 are applicable to the aforementioned USC in the GUI 580. The GUI 580 also includes a USC 582 selectable to indicate to a processor that the player wants to switch to the SlowPlay mode.

FIG. 78 includes a scratch-card 584 with winning symbols 586 and game symbols 588. Two of the winning symbols match game symbols. As shown in FIG. 78, such matching results in a $4 win as indicated by the notification 570.

FIG. 79 includes a scratch-card 590 with winning symbols 592 and game symbols 594. None of the winning symbols match game symbols. As shown in FIG. 79, the lack of matching symbols results in a loss (i.e., no win) as indicated by the notification 570.

FIG. 80 includes a scratch-card 596 with winning symbols 598 and game symbols 450. None of the winning symbols match game symbols. As shown in FIG. 80, the lack of matching symbols results in a loss (i.e., no win) as indicated by the notification 570.

The GUI 580 includes the notification 570. The notification 570 in the GUI 580 can include notifications applicable to game play in the SmartPlay mode. The GUI 580 includes the balance indicator 565. The balance indicator can indicate balances applicable to game play in the SmartPlay mode, such as an amount of SmartPlay credits remaining in the player's account or an amount of winnings available to be paid out. The GUI 580 includes the block identifier 585. As shown in FIG. 78 to FIG. 80, the block identifier 585 can change for each outcome displayed in the GUI 580. In such case, the block of outcomes including the outcome shown in FIG. 78 to FIG. 80 includes a single true outcome. In FIG. 79 and FIG. 80, the true outcome is a non-winning outcome, whereas in FIG. 78, the true outcome is a winning outcome.

Additional outcomes of different block(s) of outcomes can be output on the display 602 prior to the outcome shown in FIG. 78 and/or after the outcome shown in FIG. 80. The covering of scratch-card symbols does not have to be displayed while playing the scratch-card game in the SmartPlay mode. Alternatively, SmartPlay for the scratch-card game can be arranged such that scratch actions are still required to reveal symbols on the scratch card, but the scratch actions only need to be performed on scratch cards corresponding to a true outcome in the block of outcomes.

Figure 81:
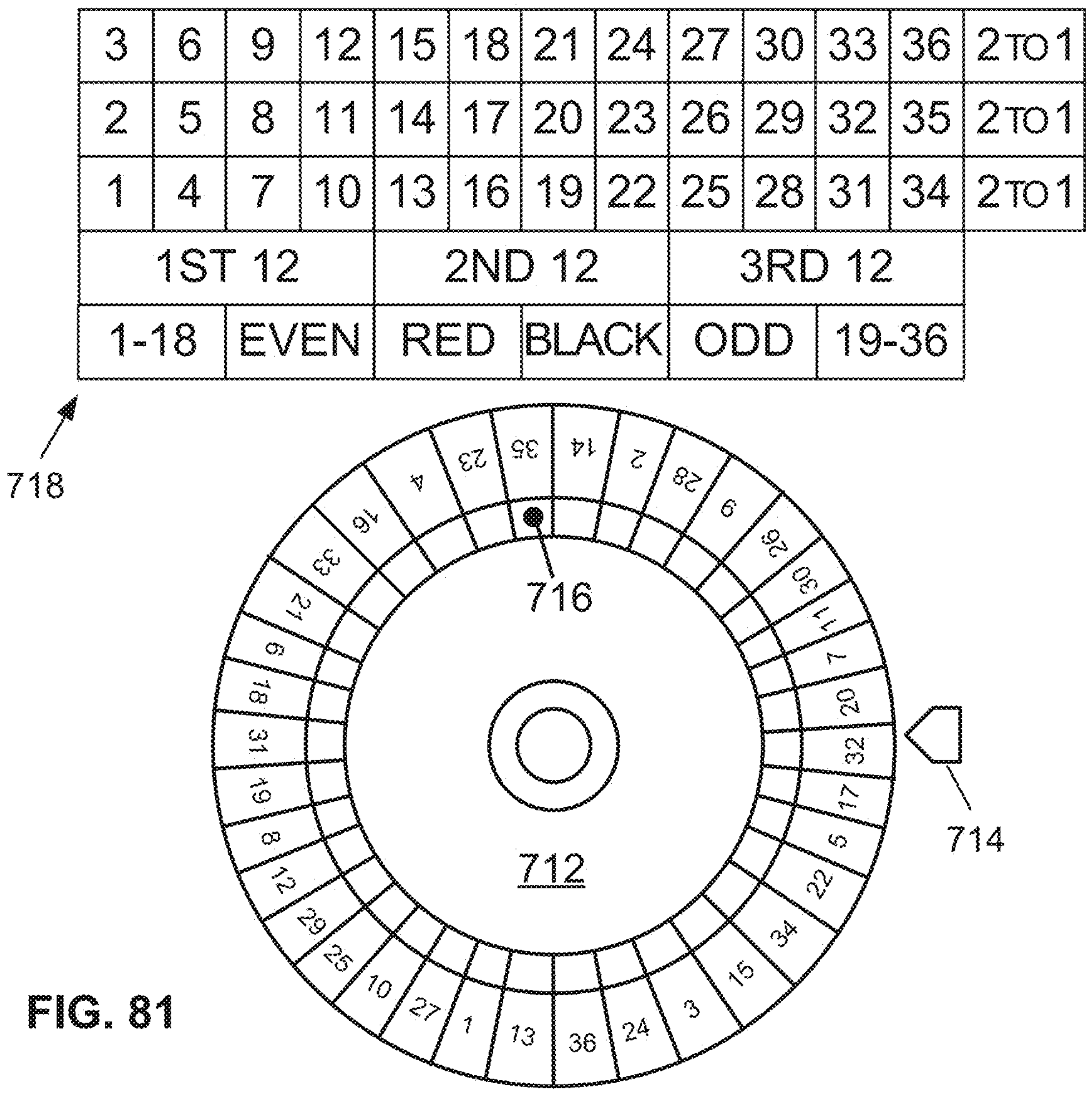

Next, FIG. 81 shows aspects corresponding to a non-gambling wheel game playable in the SlowPlay mode and the SmartPlay mode. FIG. 81 shows a wheel 712. The animation 201 can include an animation to show the wheel 712 spinning and then stopping for a turn of the game corresponding to an outcome of a block of outcomes. As described below, a GUI can include and/or display the animation showing the wheel 712 spinning and stopping. In one respect, the wheel 712 can stop with respect to a pointer 714. The pointer 714 can point to a particular portion of the wheel 712 that indicates a game outcome. In another respect, the wheel 712 can spin and then stop such that a roulette ball (i.e., a pill) lands at a particular position on the wheel 712. That position corresponds to a number on the wheel.

For a wheel game arranged as a roulette game, each game outcome can indicate a position on a roulette betting layout 718 and a number on the wheel 712 where the roulette ball 716 is to land after the wheel 712 spins during an animation. The wheel 712 is shown to have numbers 1-36. Those numbers can correspond to numbers on the roulette betting layout 718. If the number corresponding to a position on the wheel where the roulette ball 716 lands matches one of the number(s) indicated by the position on the roulette betting layout 718, then the outcome is a winning outcome. Otherwise, the outcome is a loss (i.e., a non-winning outcome). The wheel 712 for this wheel game can be referred to as a roulette wheel.

For a wheel game arranged as a prize wheel game, each game outcome can indicate a position on the wheel 712 that is to stop at a position adjacent to the pointer 714. For example, the outcome for the prize wheel game can be an integer between 1 and 36, inclusive. For the prize wheel game, the wheel 712 can list awards and non-awards (i.e., text and/or graphics that indicate something other than an award). As an example, a non-award can include a fanciful, themed icon or words such as "Better Luck Next Time." An award can include a monetary amount, a number of SmartPlay credits or some other type of prize. The wheel 712 for this wheel game can be referred to as a prize wheel.

Figure 82:
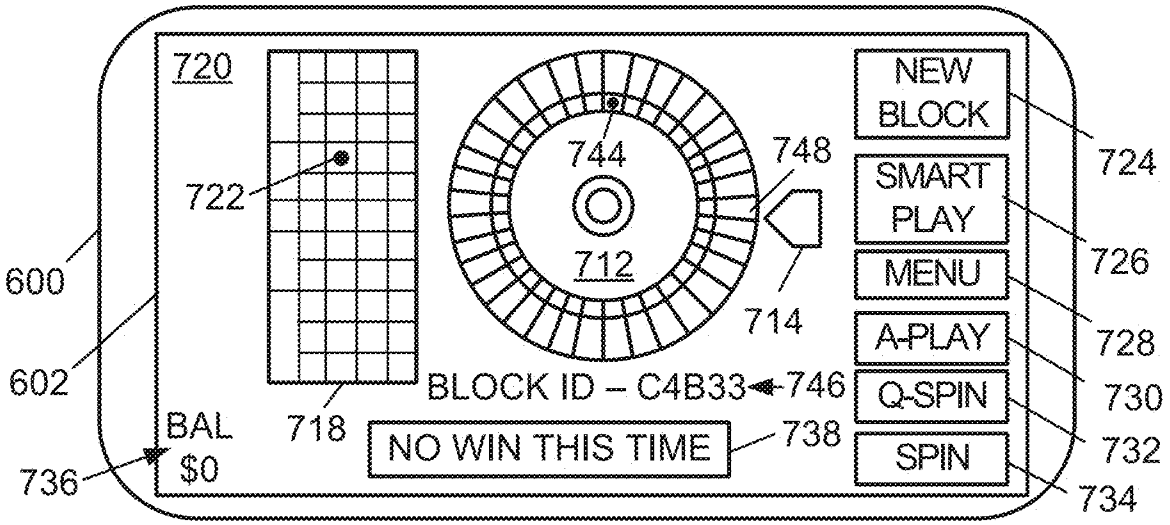

Next, FIG. 82 shows a GUI 720 for playing and displaying outcomes of a non-gambling wheel game in the SlowPlay mode. This game can correspond to the game identifier GN or a number between G2 and GN. FIG. 82 shows the GUI 720 output on the display 602 of the computing system 600. The GUI 720 can include the wheel 712, the pointer 714, and the roulette betting layout 718. In some embodiments in which the wheel game is arranged as a roulette game, the GUI 720 includes the wheel 712 and the roulette betting layout 718, but not the pointer 714. In some embodiments in which the wheel game is arranged as a prize wheel game, the GUI 720 includes the wheel 712 and the pointer 714, but not the roulette betting layout 718. In the view shown in FIG. 82, the GUI 720 is displaying a roulette ball at a position of the wheel 712 and a wheel position 748 adjacent the pointer 714.

The GUI 720 includes a USC 724, 726, 728, 730, 732, 734. The USC 724 is selectable to request a new block of outcomes for use in the game. The USC 726 is selectable to indicate to a processor that the player wants to switch to the SmartPlay mode. The USC 728 is selectable to cause a processor to output a menu on the display 602. The USC 730 is selectable to indicate to a processor that the player wants to have the game played out in AutoPlay mode and/or to toggle between a manual play mode and the AutoPlay mode. The USC 732 is selectable to indicate to a processor that the player wants to have the game played out in QuickSpin mode and/or to toggle between a default (normal) scratch mode and the QuickSpin mode. The USC 734 is selectable to trigger spinning the wheel 712. The USC 734 can be disabled if the game is being played in the AutoPlay mode.

The GUI 720 includes a balance indicator 736. The balance indicator can indicate, for example, an amount of SmartPlay credits remaining in the player's account or an amount of winnings available to be paid out. Other examples of balances that can be indicated by the balance indicator 736 are also possible.

The GUI 720 includes a notification 738. The notification 738 can be displayed within a notification container (i.e., a portion of the GUI 720 designated for displaying notifications (i.e., messages). The notification 738 can be dynamic. The computing system 600 can modify the notification 738 to provide the user with guidance regarding playing the game. As shown in FIG. 82, the notification 738 indicates "No win this time" (i.e., the current outcome played out did not result in a win). This loss can occur because the number(s) represented by a marker 722 on the roulette betting layout 718 do not match the number corresponding to a roulette ball position 744. Alternatively, this loss can occur because a non-award is indicated at a position on the wheel 712 pointed at by the pointer 714.

The GUI 720 includes a block identifier 746. The same block identifier can be output on the display 602 until such time that a new block of outcomes with a different block identifier is being processed for the computing system 600.

Figure 83:
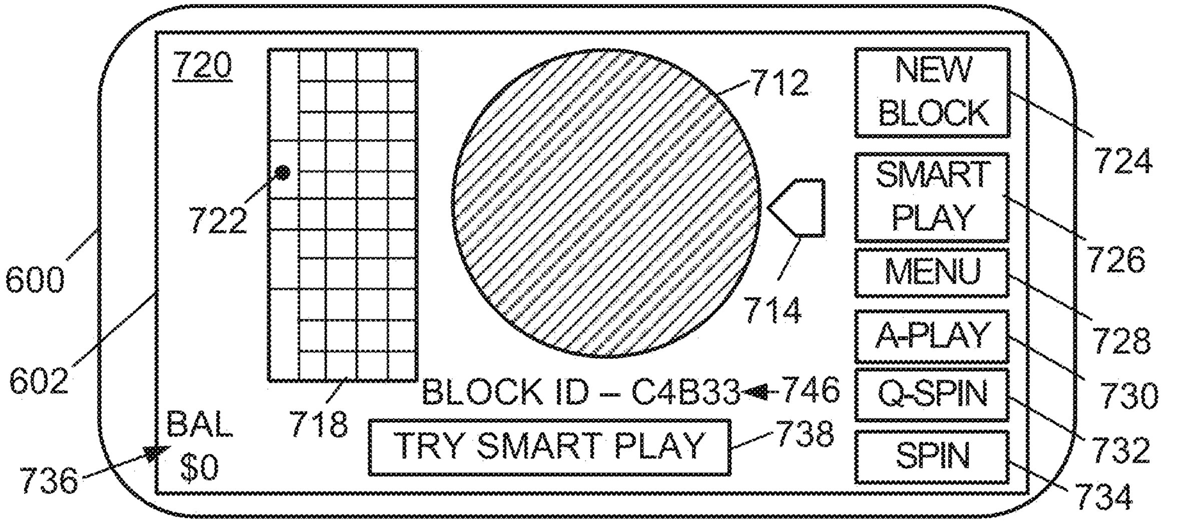

Next, FIG. 83 shows another view of the GUI 720. In this view, the GUI 720 is displaying an animation on the wheel 712. The animation can be integrated within the GUI 720 or can be retrieved from memory (e.g., the animation 201) and populated into the GUI 720. The animation can show the wheel 712 spinning then stopping. As shown in FIG. 83, the notification 738 indicates "Try Smart Play." This represents the notification 738 is dynamic.

The view of the GUI 720 shown in FIG. 83 can result from a selection of the USC 734. Alternatively, the view of the GUI 720 shown in FIG. 83 can result automatically if the game is being played out in the AutoPlay mode in response to a prior selection of the USC 730 and after the view of the GUI 720 shown in FIG. 82 is output on the display 602 for a pre-determined amount of time.

Figure 84:
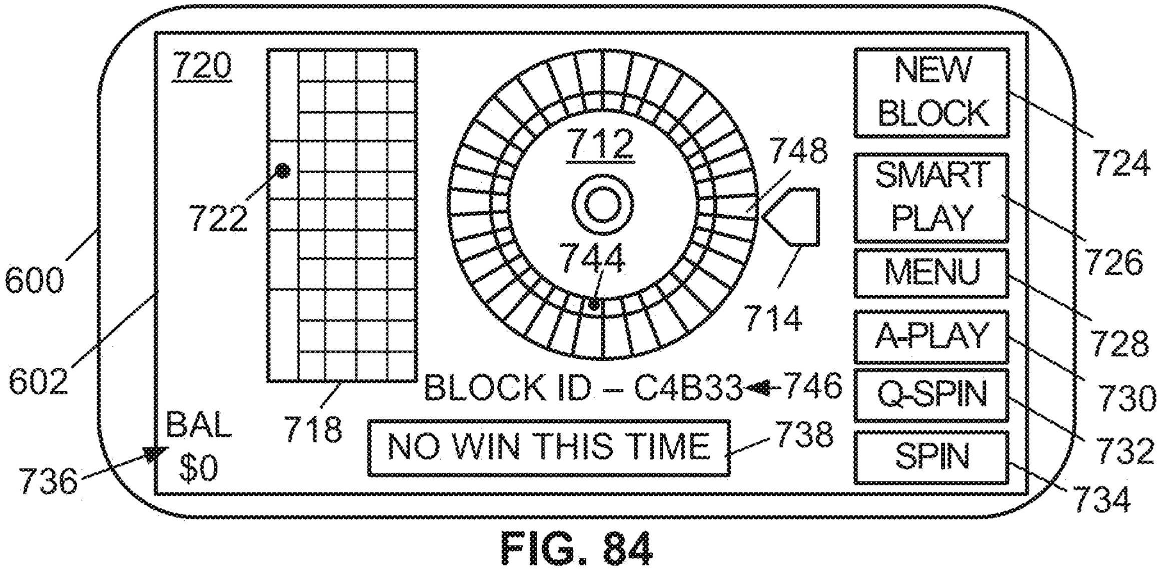

Next, FIG. 84 shows another view of the GUI 720. In this view, the GUI 720 is displaying a roulette ball at a position of the wheel 712 and a wheel position 748 adjacent the pointer 714 after the animation discussed with respect to FIG. 83 shows the wheel 712 stopped. As shown in FIG. 84, the notification 738 indicates "No win this time." This loss can occur because the number(s) represented by the marker 722 do not match the number corresponding to the roulette ball position 744. Alternatively, this loss can occur because a non-award is indicated at a position on the wheel 712 pointed at by the pointer 714.

Figure 85:
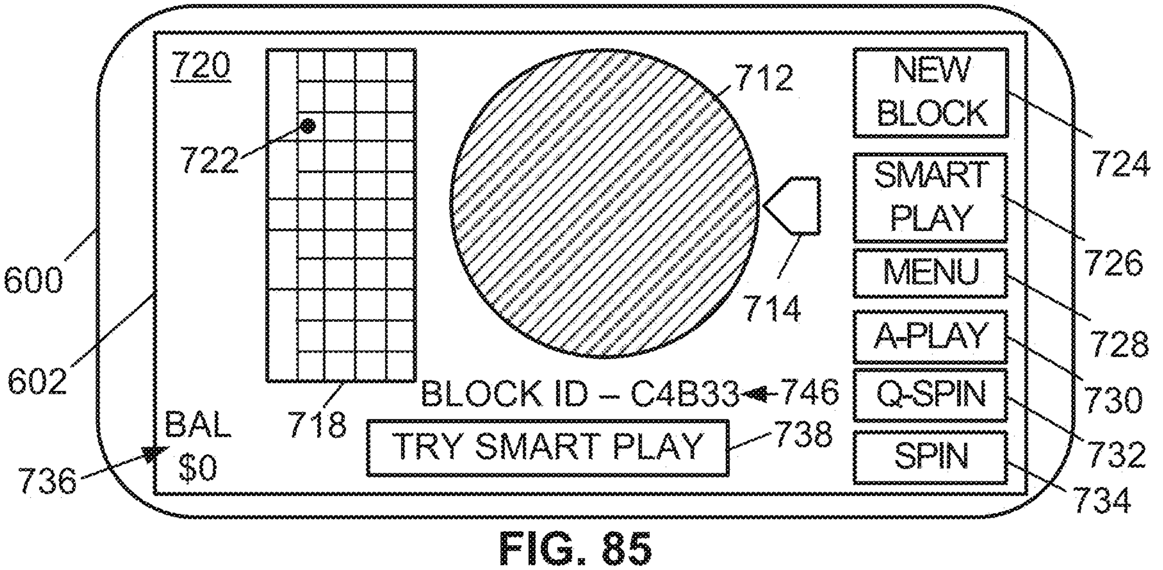

Next, FIG. 85 shows another view of the GUI 720. In this view, the GUI 720 is displaying an animation on the wheel 712 (similar to the GUI 720 shown in FIG. 83). The animation can show the wheel 712 spinning then stopping. As shown in FIG. 85, the notification 738 indicates "Try Smart Play." The view of the GUI 720 shown in FIG. 85 can result from a selection of the USC 734 while the GUI 720 is output as shown in FIG. 84. Alternatively, the view of the GUI 720 shown in FIG. 85 can result automatically if the game is being played out in the AutoPlay mode in response to a prior selection of the USC 730 and after the view of the GUI 720 shown in FIG. 84 is output on the display 602 for a pre-determined amount of time.

Figure 86:
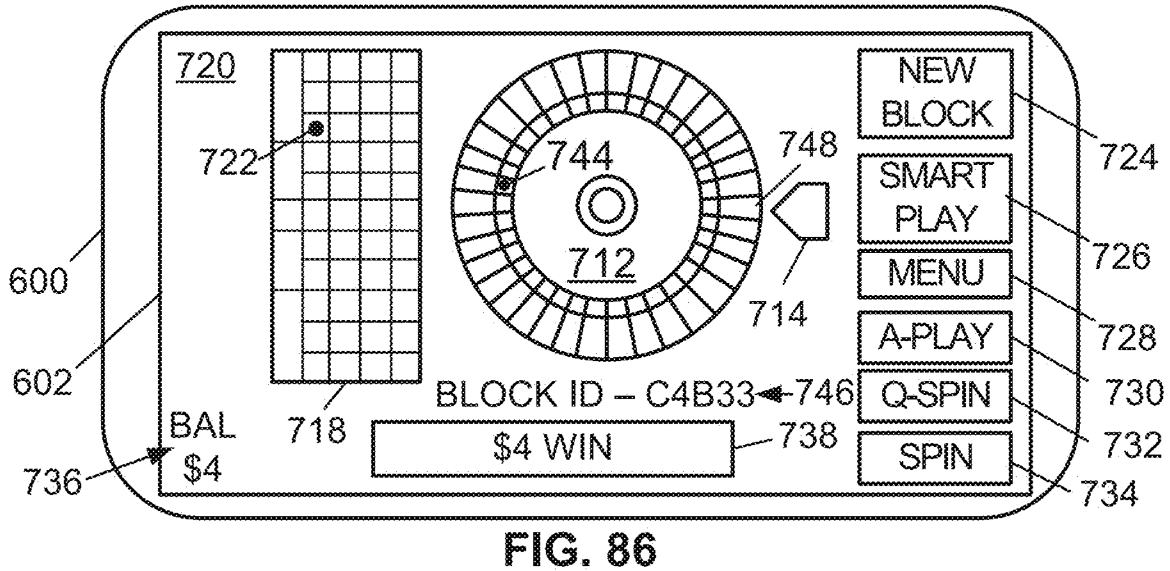

Next, FIG. 86 shows another view of the GUI 720. In this view, the GUI 720 is displaying a roulette ball at a position of the wheel 712 and a wheel position 748 adjacent the pointer 714 after the animation discussed with respect to FIG. 85 shows the wheel 712 stopped. As shown in FIG. 86, the notification 738 indicates "$4 Win," and the balance indicator 736 has been increased by the amount of the win.

As shown in FIG. 82 to FIG. 86, the block identifier 746 is the same in all views of the 720, and an animation representing the wheel 712 spinning is shown in between displaying each outcome of the identified block. Additional outcomes of the identified block can be output on the display 602 prior to the outcome shown in FIG. 82 and/or after the outcome shown in FIG. 86. An animation(s), like those shown in FIG. 83 and FIG. 85 can be displayed before each of those additional outcomes. The block identifier 746 shown in FIG. 85 and FIG. 86 could be different than C4B33 if a new block of outcomes was requested by a selection of the USC 724 while the view of the GUI 720 shown in FIG. 84 was output on the display 602. A GUI showing an advertisement, such as the GUI 670 in FIG. 63, can be output on the display 602 in between two views of the GUI 720 shown in FIG. 82 to FIG. 38. The wheel game shown in FIG. 82 to FIG. 86 occurs in the SlowPlay mode.

Figure 87:
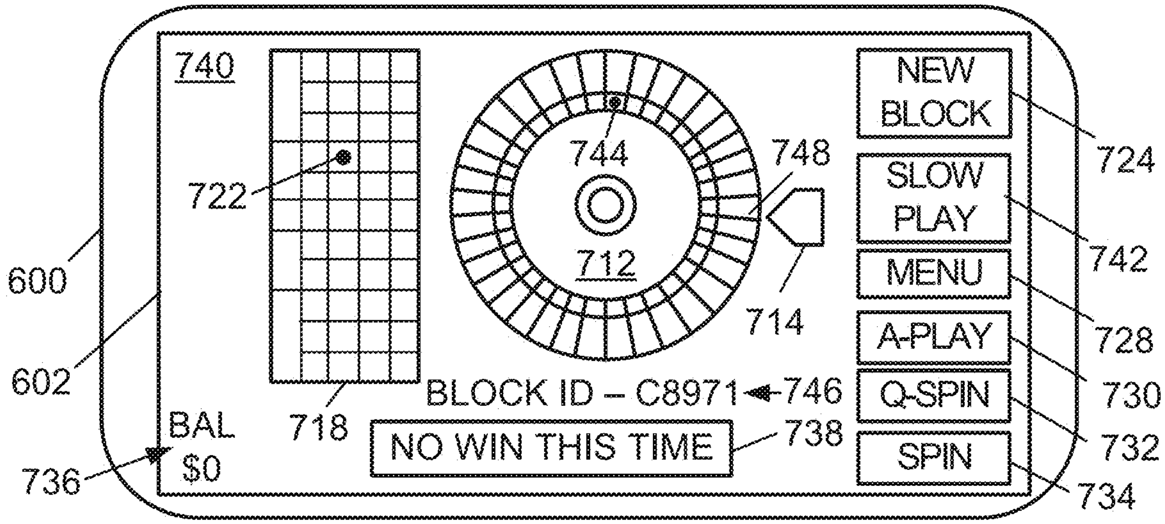
Figure 88:
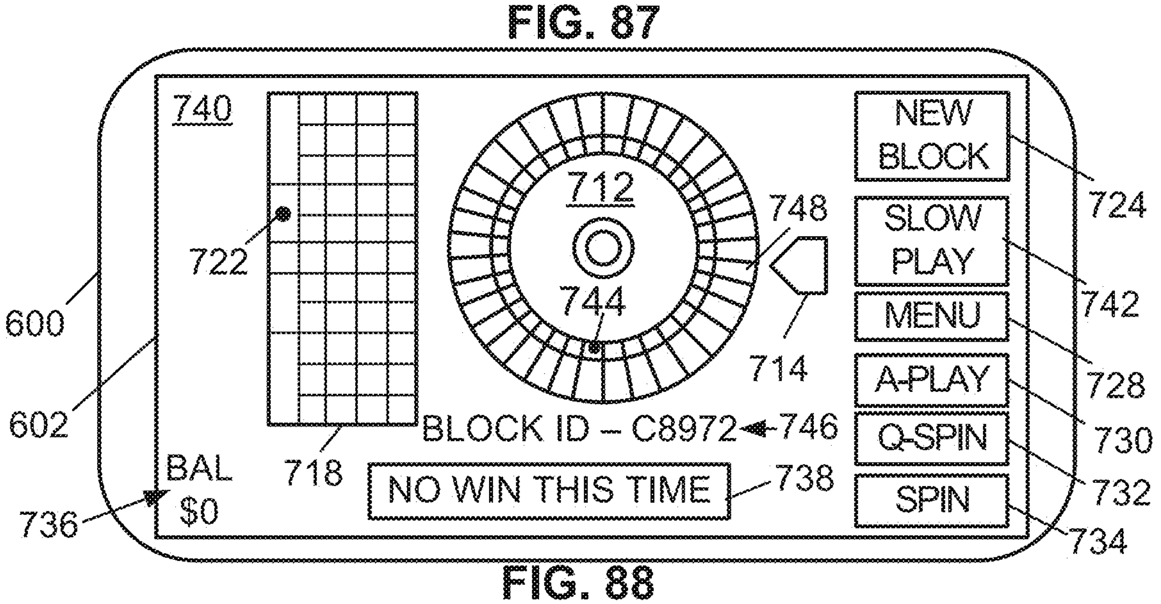
Figure 89:
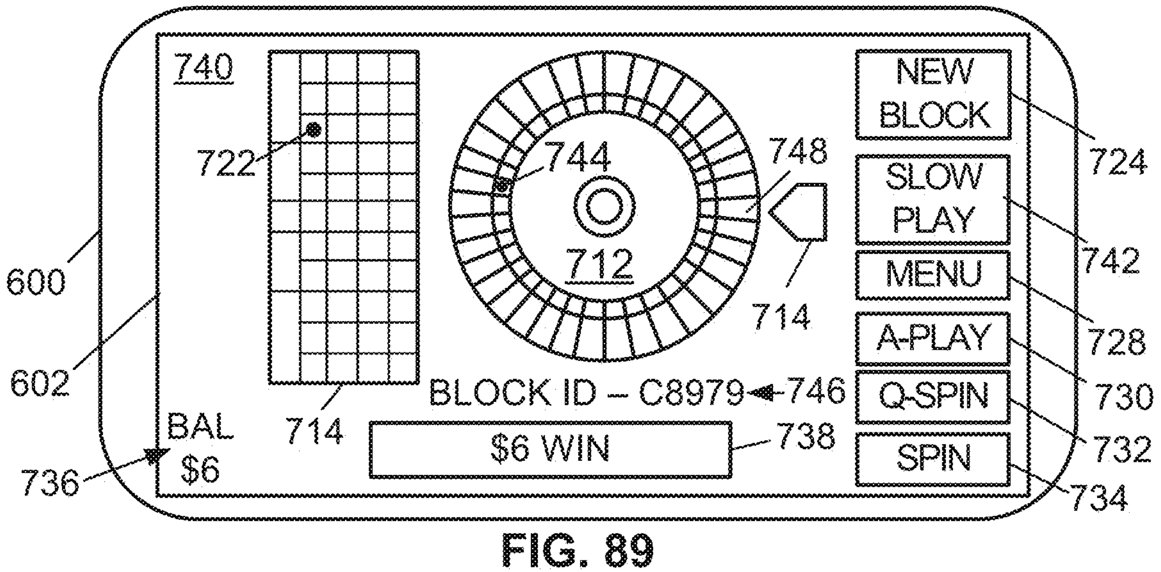

Next, FIG. 87 to FIG. 89 show a GUI 740 displaying different outcomes of a non-gambling wheel game in the SmartPlay mode. This game can correspond to the game identifier GN or a number between G2 and GN. The GUI 740 can include the wheel 712, the pointer 714, and the roulette betting layout 718. In the view shown in FIG. 87, the GUI 740 is displaying the roulette ball at a position of the wheel 712 and a wheel position 748 adjacent the pointer 714.

The GUI 740 includes the USC 724, 728, 730, 732, 734. The descriptions of like-numbered USC in the GUI 740 are applicable to the aforementioned USC in the GUI 720. The GUI 740 also includes a USC 742 selectable to indicate to a processor that the player wants to switch to the SlowPlay mode.

The GUI 740 includes the notification 738. The notification 738 in the GUI 740 can include notifications applicable to game play in the SmartPlay mode. The GUI 740 includes the balance indicator 736. The balance indicator can indicate balances applicable to game play in the SmartPlay mode, such as an amount of SmartPlay credits remaining in the player's account or an amount of winnings available to be paid out. The GUI 740 includes the block identifier 746. As shown in FIG. 87 to FIG. 89, the block identifier 746 can change for each outcome displayed in the GUI 740. In such case, the block of outcomes including the outcome shown in FIG. 87 to FIG. 89 includes a single true outcome. In FIG. 87 and FIG. 88, the true outcome is a non-winning outcome, whereas in FIG. 89, the true outcome is a winning outcome.

Additional outcomes of different block(s) of outcomes can be output on the display 602 prior to the outcome shown in FIG. 87 and/or after the outcome shown in FIG. 89. An animation, like that shown in FIG. 83 and FIG. 37, is not displayed while playing the game in the SmartPlay mode.

X. Functional Block Diagram

Next, FIG. 57 is a functional, block diagram of a system 300, in accordance with one or more example embodiments. The diagram illustrates a flow of functions and data within the system 300 with respect to the games and game play modes of the example embodiment.

As shown in FIG. 57, the system 300 includes a processor 302 (i.e., one or more processors). Those processor(s) can perform block generating 304, off-line gaming 303, block managing 308, block processing 310, SmartPlay processing 312, and live gaming 314 with a client 316 (i.e., one or more clients). The processor 302 can generate blocks (i.e., blocks of outcomes) for writing into (i.e., storing) within a block database 318. The processor 302 can archive blocks (i.e., blocks of outcomes) after a block is processed (partially or fully) for on-line gaming with the client 316. The client 316 can request playing a game (e.g., a game G1, G2, or GN described here) in a SmartPlay mode or a SlowPlay mode. The client 316 can embody or be embodied in the computing system 140B.

The block generating 304 generates blocks of outcomes of an underlying game. Each block can include a file stored in memory in the block database 318. FIG. 55 shows example blocks. In that regard, a block can include: (i) a unique block identifier, (ii) an identifier of the underlying game to which the block relates, (iii) a number 'N' of outcomes of the underlying game that are contained in the block (i.e. the block size), (iv) 'N' indexed records, each containing data representing an outcome of the game and that can be used to display that outcome to a player on the client 316, and a numeric value 'T' in encrypted form. One of the 'N' indexed records, chosen randomly at block-creation time, contains data relating to a particular outcome of the underlying game. This record can be referred to as a "true outcome record" and the index of that record can be denoted by 'T.'

The block generating 304 can randomly select index T within the range {1: N}. The SmartPlay processing 312 encrypts the value T for storage in the block. The underlying game is then run repeatedly in an offline mode via off-line gaming 303. If an outcome of the game is a winning outcome, the outcome is discarded. If the outcome is a non-winning outcome, data representing that outcome is stored in an empty indexed record in the block, except indexed record T. The process is repeated until every indexed record in the block, except indexed record T, contains data corresponding to a non-winning outcome of the underlying game.

Once the N−1 indexed records have been filled with non-winning outcome data in this manner, data representing the next outcome of the game is stored in indexed record T as true outcome data. The true outcome can be a winning or a non-winning outcome.

The use of off-line gaming 303 allows a sufficient quantity of blocks to be generated and stored in the block database 318 to satisfy player demand during live gameplay.

Blocks of outcomes from the block database 318 are provided to the block processing 310 for consumption by the player during live gameplay. In accordance with some embodiments, the block managing 308 serves a block to the block processing 310. The block managing 308 can include an application programming interface (API) to serve the block. In accordance with other embodiments, the block processing 310 retrieves blocks directly from the block database 318 without the block managing 308.

During live gameplay, the client 316 can request to change the operating mode of the underlying game between SlowPlay and SmartPlay, and vice versa.

In SlowPlay mode, the outcome data in each indexed record in of a block of outcomes undergoing the block processing 310 can be used sequentially, starting from indexed record 1, to display a corresponding game outcome to a player using the client 316. That block processing can be repeated until all the outcomes in the block have been displayed at the client. Afterward, the block managing 308 serves a new block of outcomes for block processing 310. The player can, at any time, elect to discard a partially-processed block of outcomes. The partially-processed block of outcomes is stored in the block archive 320 for auditing purposes and the block managing 308 serves another new block for block processing in the SlowPlay mode.

During SlowPlay, the client may be required to output an advertisement periodically, say every 5 minutes, and the player may be required to periodically prove that the player is not a bot, say every 10 minutes.

The player can, at any time, elect to switch the live gameplay operating mode from SlowPlay to SmartPlay. When this occurs, a block of outcomes undergoing the block processing 310 is discarded and stored away in the block archive 320 for auditing purposes and the block managing 308 serves another new block for block processing 310 in the SmartPlay mode. The SmartPlay processing 312 decrypts the encrypted data in the block of outcomes to obtain an index value T (e.g., a numeric index value), which is the index of a true outcome record in the block that contains true outcome data in that block.

The true outcome data can be used to display a true outcome of the game to the player at the client 316. Afterwards, the block of outcomes is stored away in the block archive 320 for auditing purposes. If the player continues with further live gameplay in SmartPlay mode, a new block of outcomes will be consumed for each turn of the underlying game, be that a spin of the reels of a video slot game, a wheel spin, or the revealing of a scratch-card.

During SmartPlay, a client will neither be required to output advertisements periodically, nor prove that the player is not a bot.

XI. Additional Example Operation

Each of FIG. 90 to FIG. 102 includes a flow chart. The flow charts include containers (i.e., boxes) that having text describing one or more functions. The functions shown in any of FIG. 90 to FIG. 102 can be carried out using any one or more computing systems described in this description. Any one or more functions shown in FIG. 90 to FIG. 102 can be carried by a processor, such as a processor in any computing system described in this description. As an example, a server device, alone or in cooperation with a client device, can perform one or more functions shown in any of FIG. 90 to FIG. 102. The server device can, for example, be a server hosted and/or controlled by an online casino operator (e.g., the server), and the client device can be, for example, a personal computer, laptop computer, tablet computer, or cell phone that allows a player to access the server device and the game thereon.

A. First Additional Flowchart

Figure 90:
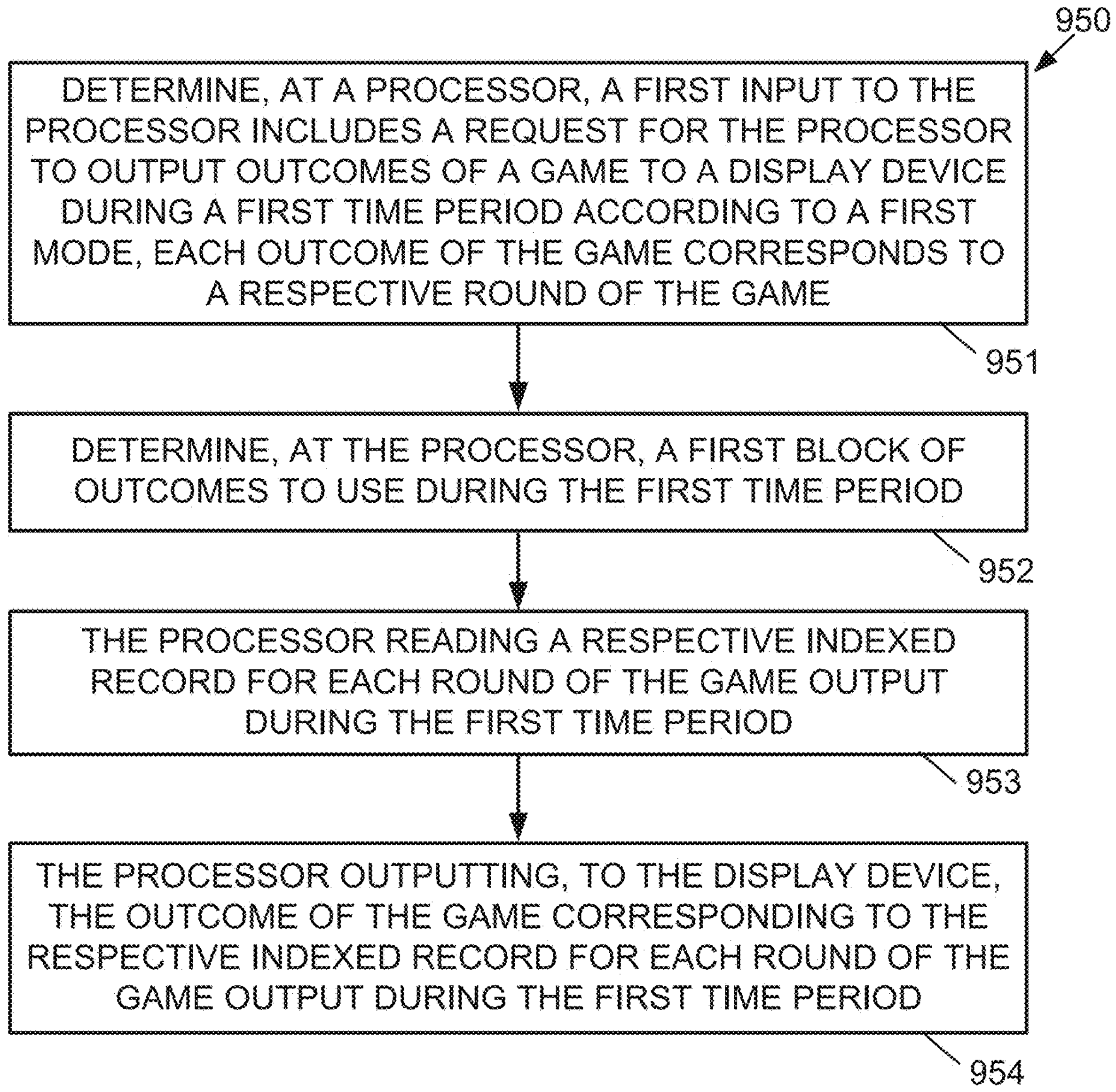
FIG. 90, FIG. 91, FIG. 92, FIG. 93, FIG. 94, FIG. 95, FIG. 96, FIG. 97, FIG. 98, FIG. 99, FIG. 100, FIG. 101, and FIG. 102 shows a flowchart, in accordance with one or more example embodiments.

FIG. 90 is a flow chart including a set 950 of functions listed in a Container 951, 952, 953, 954. The methods in accordance with the example embodiments can include performing any one or more functions of the set 950 alone or along with any other function, such as a function shown in any of FIG. 91 to FIG. 102.

Container 951 includes determining, at a processor, a first input to the processor includes a request for the processor to output outcomes of a game to a display device during a first time period according to a first mode, each outcome of the game corresponds to a respective round of the game. The function(s) of Container 951 can be performed by a processor (e.g., one or more hardware processors) configured by machine-readable instructions including a module that is the same as or similar to the determine input module 261 shown in FIG. 56. The function(s) of Container 951 can include one or more of the functions described with respect to the determine input module 261. As an example, the processor can determine a first input to the processor includes a request for the processor to output outcomes of a game to a display device during a first time period according to a first mode, each outcome of the game corresponds to a respective round of the game, as discussed in connection with the determine input module 261.

Next, Container 952 includes determining, at the processor, a first block of outcomes to use during the first time period. The function(s) of Container 952 can be performed by a processor (e.g., one or more hardware processors) configured by machine-readable instructions including a module that is the same as or similar to the to the determine block of outcomes module 255 shown in FIG. 56. The function(s) of Container 952 can include one or more of the functions described with respect to the determine block of outcomes module 255. As an example, the processor can determine a first block of outcomes to use during the first time period, as discussed in connection with the determine block of outcomes module 255.

The first block can include indexed records for multiple outcomes of the game determined while playing the game offline. The multiple outcomes of the first block include a mix of true and non-winning game outcomes. Each true game outcome of the first block is either a winning or non-winning game outcome. Each indexed record of the first block can correspond to a respective index identifier from among a first sequential order of index identifiers and includes one true or non-winning game outcome of the first block.

Next, Container 953 includes the processor reading a respective indexed record for each round of the game output during the first time period. The respective indexed record read for each round of the game is based on an index identifier corresponding to the respective indexed record. The function(s) of Container 953 can be performed by a processor (e.g., one or more hardware processors) configured by machine-readable instructions including a module that is the same as or similar to the read module 266 shown in FIG. 56. The function(s) of Container 953 can include one or more of the functions described with respect to the read module 266. As an example, the processor can read, for each round of the game output during the first time period, a respective indexed record, as discussed in connection with the read module 266.

Next, Container 954 includes the processor outputting, to the display device, the outcome of the game corresponding to the respective indexed record for each round of the game output during the first time period. The function(s) of Container 954 can be performed by a processor (e.g., one or more hardware processors) configured by machine-readable instructions including a module that is the same as or similar to the output game outcome module 462 shown in FIG. 56. The function(s) of Container 954 can include one or more of the functions described with respect to the output game outcome module 462. As an example, the processor can output, to the display device, the outcome of the game corresponding to the respective indexed record, as discussed in connection with the output game outcome module 462.

B. Second Additional Flowchart

Figure 91:
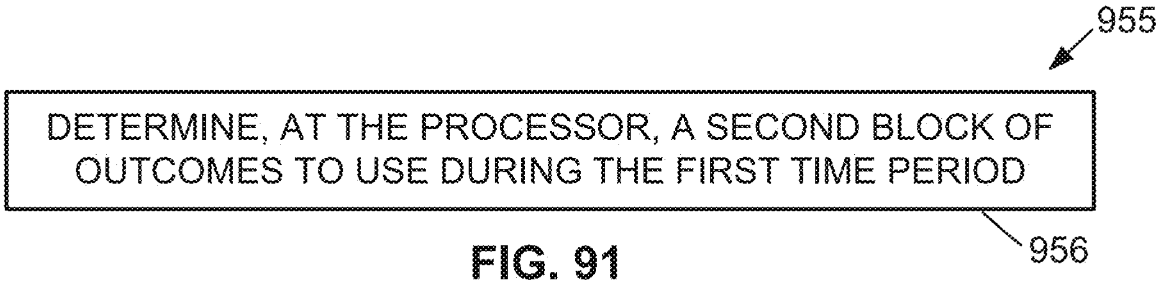

Next, FIG. 91 is a flow chart including a set 955 of functions listed in a Container 956. A method, according to one or more example embodiments, can include performing any function(s) of the set 955 and/or one or more functions shown in any of FIG. 90 and/or FIG. 92 to FIG. 102.

Container 956 includes determining, at the processor, a second block of outcomes to use during the first time period. The function(s) of Container 956 can be performed by a processor (e.g., one or more hardware processors) configured by machine-readable instructions including a module that is the same as or similar to the determine block of outcomes module 255 shown in FIG. 56. The function(s) of Container 956 can include one or more of the functions described with respect to the determine block of outcomes module 255. As an example, the processor can determine a second block of outcomes to use during the first time period, as discussed in connection with the determine block of outcomes module 255.

The second block can include indexed records for multiple outcomes of the game determined while playing the game offline. The multiple outcomes of the second block can include a mix of true and non-winning game outcomes. Each true game outcome of the second block is either a winning or non-winning game outcome. Each indexed record of the second block can correspond to a respective index identifier from among a second sequential order of index identifiers and includes one true or non-winning game outcome of the second block. The processor can be configured to read indexed records of the second block according to the second sequential order of index identifiers. The processor can read at least one respective indexed record from the first block of outcomes (e.g., the first block of outcomes referenced in Container 952) and at least one respective indexed record from the second block of outcomes.

C. Third Additional Flowchart

Figure 92:
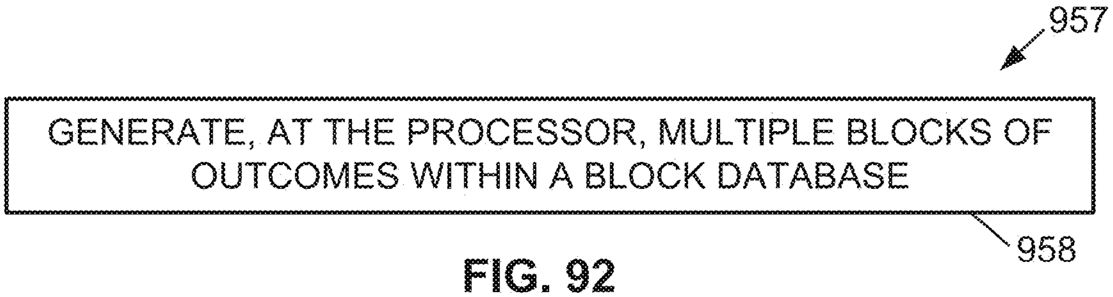

Next, FIG. 92 is a flow chart including a set 957 of functions listed in a Container 958. A method, according to one or more example embodiments, can include performing any function(s) of the set 957 and/or one or more functions shown in any of FIG. 90, FIG. 91, and/or FIG. 93 to FIG. 102.

Container 958 includes generating, at the processor, multiple blocks of outcomes within a block database. The function(s) of Container 958 can be performed by a processor (e.g., one or more hardware processors) configured by machine-readable instructions including a module that is the same as or similar to the generate block database module 237 shown in FIG. 56. The function(s) of Container 958 can include one or more of the functions described with respect to the generate block database module 237. As an example, the processor can generate multiple blocks of outcomes within a block database, as discussed in connection with the generate block database module 237. The multiple blocks of outcomes can include the first block. Each block of outcomes among the multiple blocks of outcomes can include a unique block identifier, a game identifier, a number indicating a quantity of outcomes within the block, a quantity of indexed records, an index identifier corresponding to an indexed record of the block that corresponds to a true game outcome determined for the block.

D. Fourth Additional Flowchart

Figure 93:
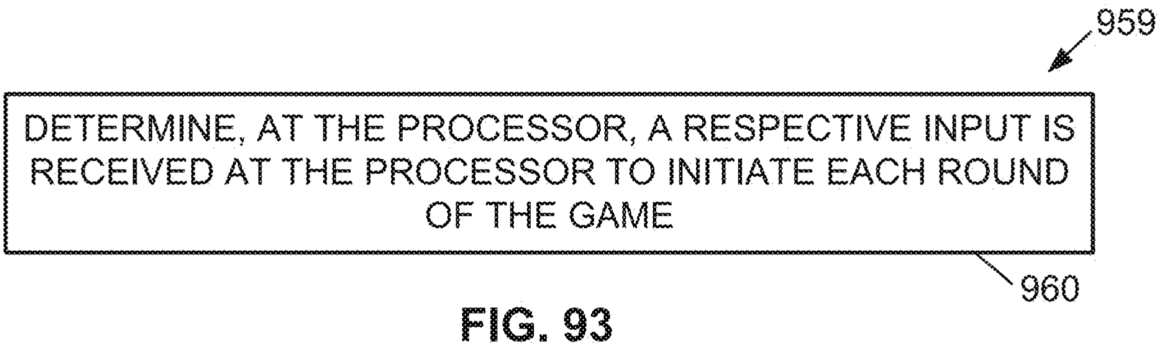

Next, FIG. 93 is a flow chart including a set 959 of functions listed in a Container 960. A method, according to one or more example embodiments, can include performing any function(s) of the set 959 and/or one or more functions shown in any of FIG. 90 to FIG. 92, and/or FIG. 94 to FIG. 102.

Container 960 includes determining, at the processor, a respective input is received at the processor to initiate each round of the game. The function(s) of Container 960 can be performed by a processor (e.g., one or more hardware processors) configured by machine-readable instructions including a module that is the same as or similar to the determine input module 261 shown in FIG. 56. The function(s) of Container 960 can include one or more of the functions described with respect to the determine input module 261. As an example, the processor can determine a respective input is received at the processor to initiate each round of the game, as discussed in connection with the determine input module 261. The processor reading the respective indexed record for each round of the game output during the first time period (as described with respect to Container 953) can occur in response to determining the respective input is received for that round of the game.

E. Fifth Additional Flowchart

Figure 94:
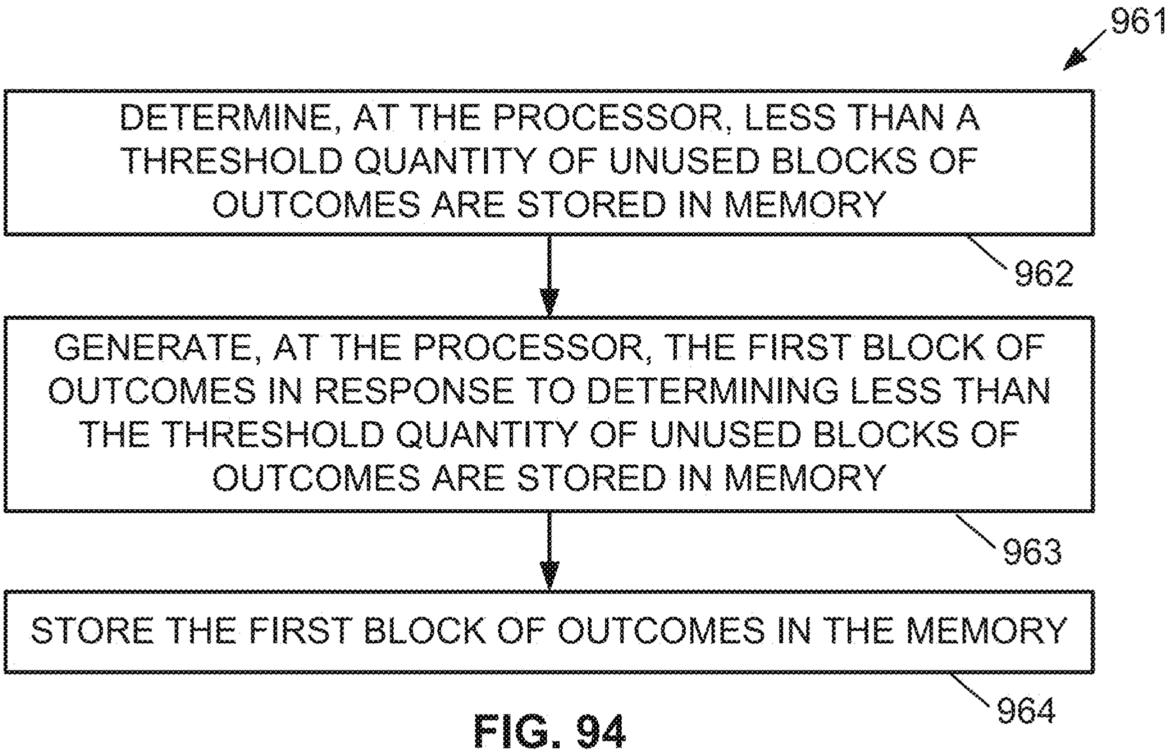

Next, FIG. 94 is a flow chart including a set 961 of functions listed in a Container 962, 963, 964. A method, according to one or more example embodiments, can include performing any function(s) of the set 961 and/or one or more functions shown in any of FIG. 90 to FIG. 93, and/or FIG. 95 to FIG. 102.

Container 962 includes determining, at the processor, less than a threshold quantity of unused blocks of outcomes are stored in memory. The function(s) of Container 962 can be performed by a processor (e.g., one or more hardware processors) configured by machine-readable instructions including a module that is the same as or similar to the threshold quantity module 466 shown in FIG. 56. The function(s) of Container 962 can include one or more of the functions described with respect to the threshold quantity module 466. As an example, the processor can determine less than a threshold quantity of unused blocks of outcomes is stored in memory, as discussed in connection with the threshold quantity module 466.

Container 963 includes generating, at the processor, the first block of outcomes in response to determining less than the threshold quantity of unused blocks of outcomes are stored in memory. The function(s) of Container 963 can be performed by a processor (e.g., one or more hardware processors) configured by machine-readable instructions including a module that is the same as or similar to the generate block database module 237 shown in FIG. 56. The function(s) of Container 963 can include one or more of the functions described with respect to the generate block database module 237. As an example, the processor can generate the first block of outcomes in response to determining less than the threshold quantity of unused blocks of outcomes are stored in memory, as discussed in connection with the generate block database module 237.

Container 964 includes storing the first block of outcomes in the memory. The function(s) of Container 964 can be performed by a processor (e.g., one or more hardware processors) configured by machine-readable instructions including a module that is the same as or similar to the write data module 268 shown in FIG. 56. The function(s) of Container 964 can include one or more of the functions described with respect to the write data module 268. As an example, the processor can store the first block of outcomes in the memory, as discussed in connection with the write data module 268.

F. Sixth Additional Flowchart

Figure 95:
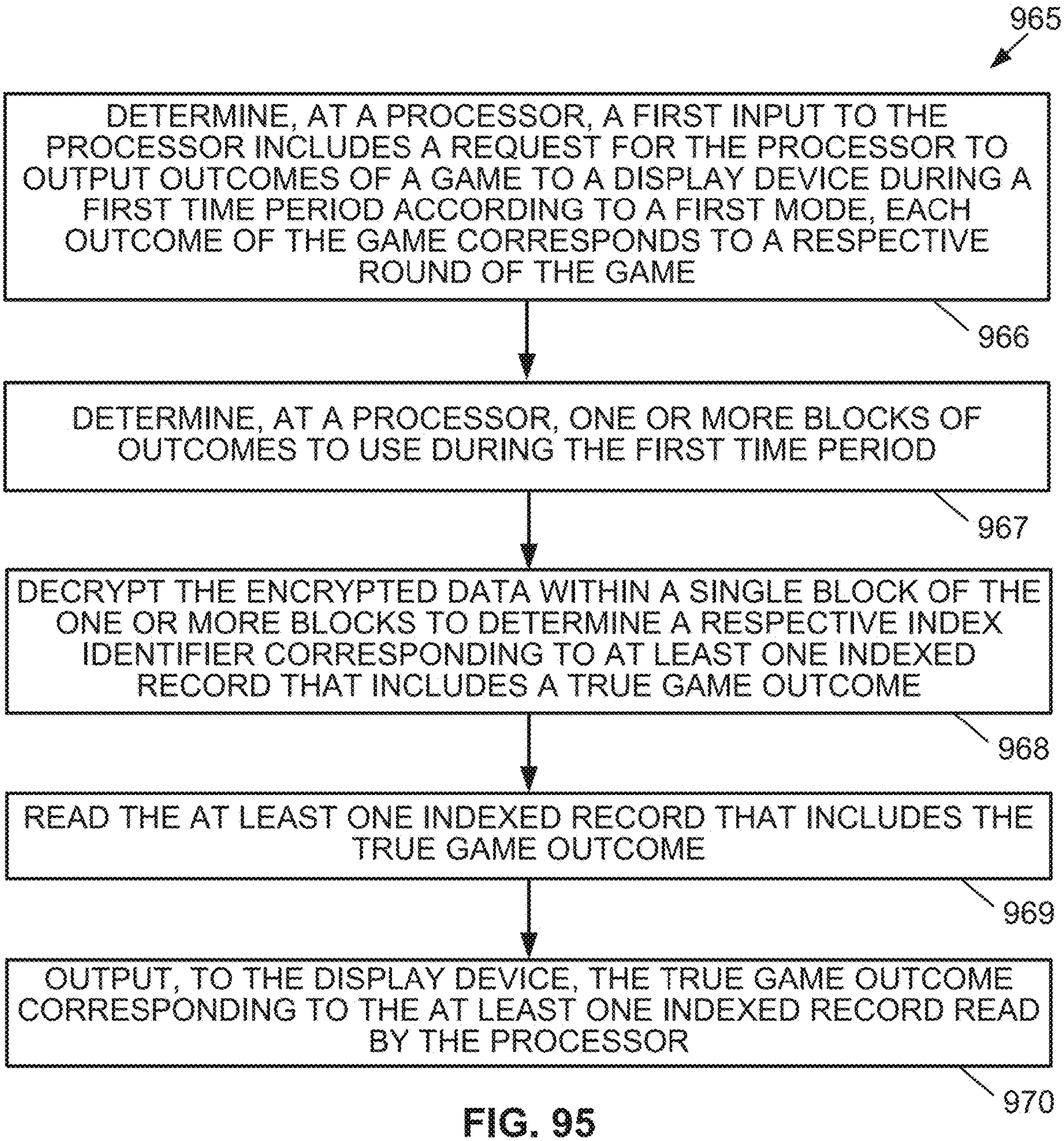

Next, FIG. 95 is a flow chart including a set 965 of functions listed in a Container 966, 967, 968, 969, 995, 970. The methods in accordance with the example embodiments can include performing any one or more functions of the set 965 alone or along with any other function, such as a function shown in any of FIG. 90 to FIG. 94 and/or FIG. 96 to FIG. 99.

Container 966 includes determining, at a processor, a first input to the processor includes a request for the processor to output outcomes of a game to a display device during a first time period according to a first mode, each outcome of the game corresponds to a respective round of the game. The function(s) of Container 966 can be performed by a processor (e.g., one or more hardware processors) configured by machine-readable instructions including a module that is the same as or similar to the determine input module 261 shown in FIG. 56. The function(s) of Container 966 can include one or more of the functions described with respect to the determine input module 261. As an example, the processor can determine a first input to the processor includes a request for the processor to output outcomes of a game to a display device during a first time period according to a first mode, each outcome of the game corresponds to a respective round of the game, as discussed in connection with the determine input module 261.

Container 967 includes determining, at the processor, one or more blocks of outcomes to use during the first time period. The function(s) of Container 967 can be performed by a processor (e.g., one or more hardware processors) configured by machine-readable instructions including a module that is the same as or similar to the determine block of outcomes module 255 shown in FIG. 56. The function(s) of Container 967 can include one or more of the functions described with respect to the determine block of outcomes module 255. As an example, the processor can determine one or more blocks of outcomes to use during the first time period, as discussed in connection with the determine block of outcomes module 255.

Each block of outcomes includes indexed records for multiple outcomes of the game determined while playing the game offline. The multiple outcomes of each block include a mix of true and non-winning game outcomes. Each true game outcome is either a winning or non-winning game outcome. Each indexed record of each block corresponds to a respective index identifier from among sequential orders of index identifiers and includes one true or non-winning game outcome. Each block further includes encrypted data representing the respective index identifier corresponding to each indexed record of the block that includes a true game outcome.

Container 968 includes decrypting the encrypted data within a single block of the one or more blocks to determine a respective index identifier corresponding to at least one indexed record that includes a true game outcome. A processor can perform this decrypting for each round of the game performed during the first time period. The function(s) of Container 968 can be performed by a processor (e.g., one or more hardware processors) configured by machine-readable instructions including a module that is the same as or similar to the decryption module 263 shown in FIG. 56. The function(s) of Container 968 can include one or more of the functions described with respect to the decryption module 263. As an example, the processor can decrypt the encrypted data within a single block of the one or more blocks to determine a respective index identifier corresponding to at least one indexed record that includes a true game outcome, as discussed in connection with the decryption module 263.

Container 969 includes reading the at least one indexed record that includes the true game outcome. A processor can perform this reading for each round of the game performed during the first time period. The function(s) of Container 969 can be performed by a processor (e.g., one or more hardware processors) configured by machine-readable instructions including a module that is the same as or similar to the read module 266 shown in FIG. 56. The function(s) of Container 969 can include one or more of the functions described with respect to the read module 266. As an example, the processor can read the at least one indexed record that includes the true game outcome, as discussed in connection with the read module 266.

Container 970 includes outputting, to the display device, the true game outcome corresponding to the at least one indexed record read by the processor. A processor can cause this outputting for each round of the game performed during the first time period. The function(s) of Container 970 can be performed by a processor (e.g., one or more hardware processors) configured by machine-readable instructions including a module that is the same as or similar to the output game outcome module 462 shown in FIG. 56. The function(s) of Container 970 can include one or more of the functions described with respect to the output game outcome module 462. As an example, the processor can output, to the display device, the true game outcome corresponding to the at least one indexed record read by the processor, as discussed in connection with the output game outcome module 462.

G. Seventh Additional Flowchart

Figure 96:
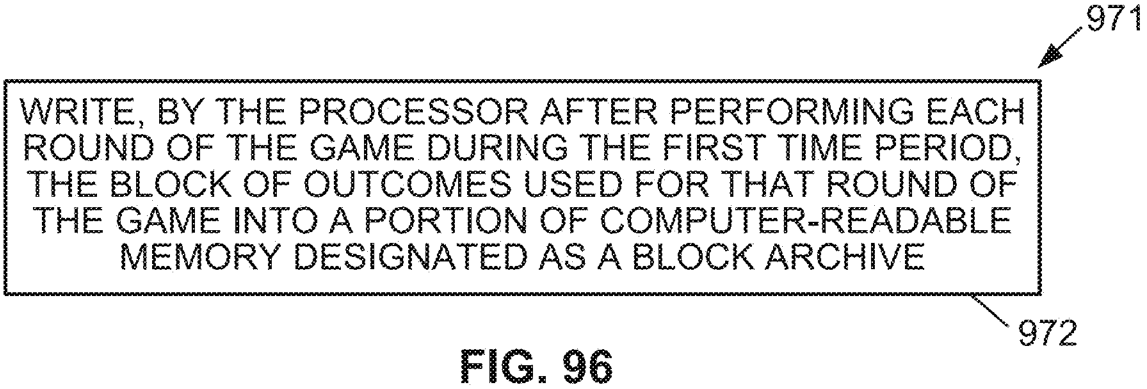

Next, FIG. 96 is a flow chart including a set 971 of functions listed in a Container 972. A method, according to one or more example embodiments, can include performing any function(s) of the set 971 and/or one or more functions shown in any of FIG. 90 to FIG. 95, and/or FIG. 97 to FIG. 102.

Container 972 includes writing, by the processor after performing each round of the game during the first time period, the block of outcomes used for that round of the game into a portion of computer-readable memory designated as a block archive. The function(s) of Container 972 can be performed by a processor (e.g., one or more hardware processors) configured by machine-readable instructions including a module that is the same as or similar to the write data module 268 shown in FIG. 56. The function(s) of Container 972 can include one or more of the functions described with respect to the write data module 268. As an example, the processor can write, after performing each round of the game during the first time period, the block of outcomes used for that round of the game into a portion of computer-readable memory designated as a block archive, as discussed in connection with the write data module 268.

H. Eighth Additional Flowchart

Figure 97:
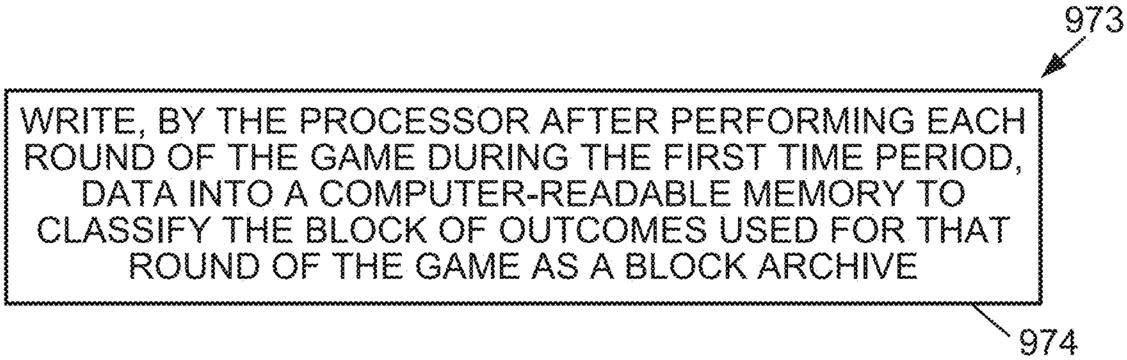

Next, FIG. 97 is a flow chart including a set 973 of functions listed in a Container 974. A method, according to one or more example embodiments, can include performing any function(s) of the set 973 and/or one or more functions shown in any of FIG. 90 to FIG. 96, and/or FIG. 98 to FIG. 102.

Container 974 includes writing, by the processor after performing each round of the game during the first time period, data into a computer-readable memory to classify the block of outcomes used for that round of the game as a block archive. The function(s) of Container 974 can be performed by a processor (e.g., one or more hardware processors) configured by machine-readable instructions including a module that is the same as or similar to the write data module 268 shown in FIG. 56. The function(s) of Container 974 can include one or more of the functions described with respect to the write data module 268. As an example, the processor can write, after performing each round of the game during the first time period, data into a computer-readable memory to classify the block of outcomes used for that round of the game as a block archive, as discussed in connection with the write data module 268.

I. Ninth Additional Flowchart

Figure 98:
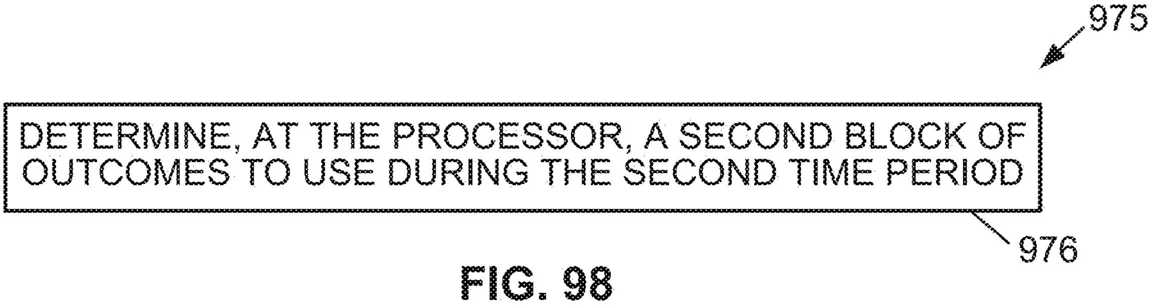

Next, FIG. 98 is a flow chart including a set 975 of functions listed in a Container 976. A method, according to one or more example embodiments, can include performing any function(s) of the set 975 and/or one or more functions shown in any of FIG. 90 to FIG. 97, and/or FIG. 99 to FIG. 102.

Container 976 includes determining, at the processor, a second block of outcomes to use during the second time period. The function(s) of Container 976 can be performed by a processor (e.g., one or more hardware processors) configured by machine-readable instructions including a module that is the same as or similar to the determine block of outcomes module 255 shown in FIG. 56. The function(s) of Container 976 can include one or more of the functions described with respect to the determine block of outcomes module 255. As an example, the processor can determine a second block of outcomes to use during the second time period, as discussed in connection with the determine block of outcomes module 255.

The second block can include indexed records for multiple outcomes of the game determined while playing the game offline. The multiple outcomes of the second block include a mix of true and non-winning game outcomes. Each true game outcome of the second block is either a winning or non-winning game outcome. Each indexed record of the second block can correspond to a respective index identifier from among a second sequential order of index identifiers and includes one true or non-winning game outcome of the second block. The processor can be configured to read indexed records of the second block for the second mode according to the second sequential order of index identifiers. The processor can read the respective indexed record includes the processor reading at least one respective indexed record from the first block of outcomes and at least one respective indexed record from the second block of outcomes.

J. Tenth Additional Flowchart

Figure 99:

Next, FIG. 99 is a flow chart including a set 977 of functions listed in a Container 978. A method, according to one or more example embodiments, can include performing any function(s) of the set 977 and/or one or more functions shown in any of FIG. 90 to FIG. 98, and/or FIG. 100 to FIG. 102.

Container 978 includes outputting, by the processor, an advertisement to the display device. The function(s) of Container 978 can be performed by a processor (e.g., one or more hardware processors) configured by machine-readable instructions including a module that is the same as or similar to the output advertisement module 464 shown in FIG. 56. The function(s) of Container 978 can include one or more of the functions described with respect to the output advertisement module 464. As an example, the processor can output an advertisement to the display device, as discussed in connection with the output advertisement module 464. For instance, the processor can output an advertisement during a second time period described in Container 976. In such case, the processor may not output any advertisement to the display device during the first time period.

K. Eleventh Additional Flowchart

Figure 100:
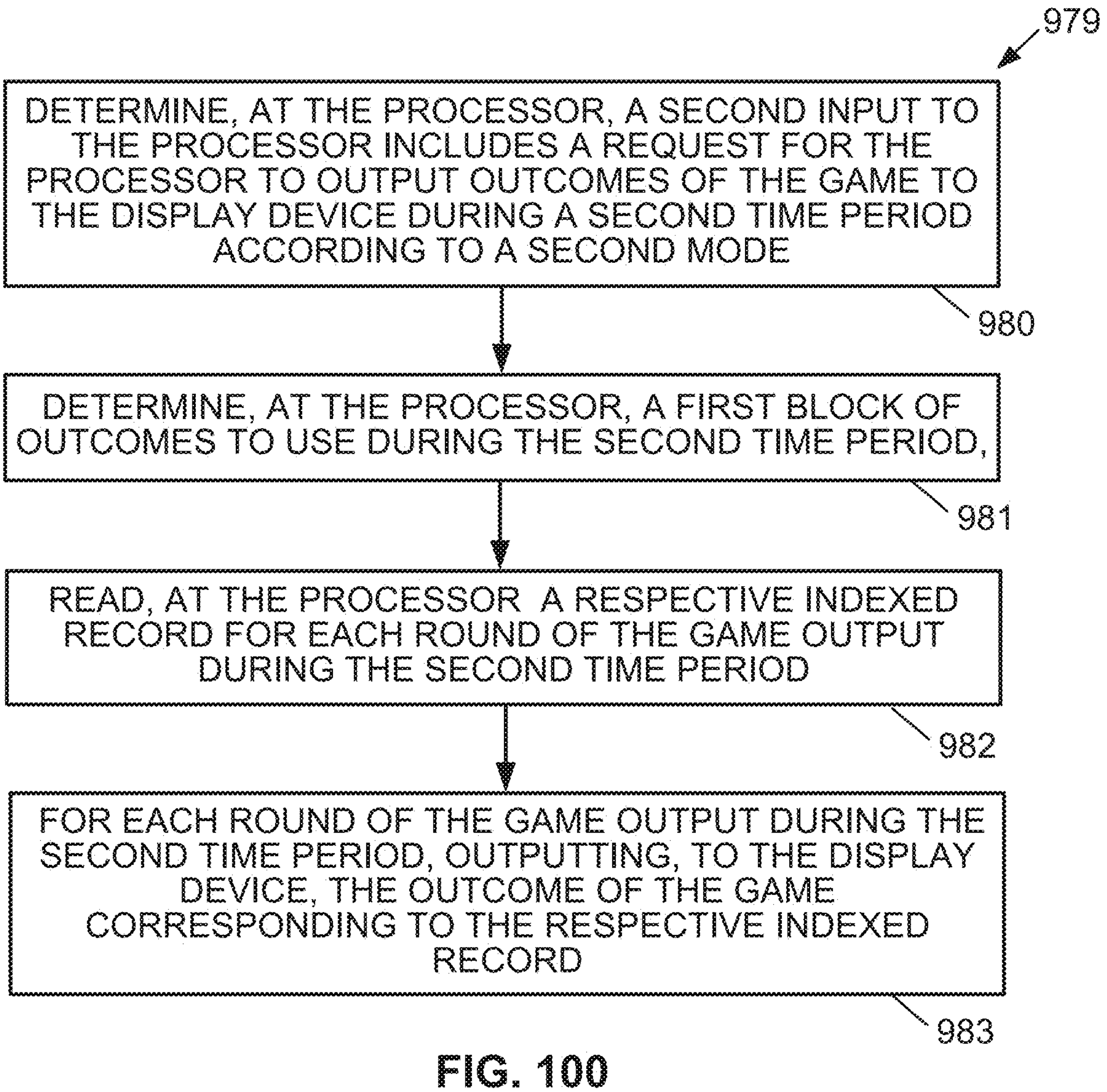

Next, FIG. 100 is a flow chart including a set 979 of functions listed in a Container 980, 981, 982, 983. A method, according to one or more example embodiments, can include performing any function(s) of the set 979 and/or one or more functions shown in any of FIG. 90 to FIG. 99, FIG. 101, and/or FIG. 102.

Container 980 includes determining, at the processor, a second input to the processor includes a request for the processor to output outcomes of the game to the display device during a second time period according to a second mode. The function(s) of Container 980 can be performed by a processor (e.g., one or more hardware processors) configured by machine-readable instructions including a module that is the same as or similar to the determine input module 261 shown in FIG. 56. The function(s) of Container 980 can include one or more of the functions described with respect to the determine input module 261. As an example, the processor can determine a second input to the processor includes a request for the processor to output outcomes of the game to the display device during a second time period according to a second mode, as discussed in connection with the determine input module 261.

Container 981 includes determining, at the processor, a first block of outcomes to use during the second time period. The function(s) of Container 981 can be performed by a processor (e.g., one or more hardware processors) configured by machine-readable instructions including a module that is the same as or similar to the determine block of outcomes module 255 shown in FIG. 56. The function(s) of Container 981 can include one or more of the functions described with respect to the determine block of outcomes module 255. As an example, the processor can determine a first block of outcomes to use during the second time period, as discussed in connection with the determine block of outcomes module 255.

The first block for the second time period can include indexed records for multiple outcomes of the game determined while playing the game offline. The multiple outcomes of the first block include a mix of true and non-winning game outcomes. Each true game outcome of the first block is either a winning or non-winning game outcome. Each indexed record of the first block corresponds to a respective index identifier from among a first sequential order of index identifiers and includes one true or non-winning game outcome of the first block.

Container 982 includes reading, at the processor, a respective indexed record for each round of the game output during the second time period. The function(s) of Container 982 can be performed by a processor (e.g., one or more hardware processors) configured by machine-readable instructions including a module that is the same as or similar to the read module 266 shown in FIG. 56. The function(s) of Container 982 can include one or more of the functions described with respect to the read module 266. As an example, the processor can read a respective indexed record for each round of the game output during the second time period, as discussed in connection with the read module 266.

Container 983 includes, for each round of the game output during the second time period, outputting, to the display device, the outcome of the game corresponding to the respective indexed record. The function(s) of Container 983 can be performed by a processor (e.g., one or more hardware processors) configured by machine-readable instructions including a module that is the same as or similar to the output game outcome module 462 shown in FIG. 56. The function(s) of Container 983 can include one or more of the functions described with respect to the output game outcome module 462. As an example, the processor can determine one or more blocks of outcomes to use during the first time period, as discussed in connection with the output game outcome module 462.

L. Twelfth Additional Flowchart

Figure 101:
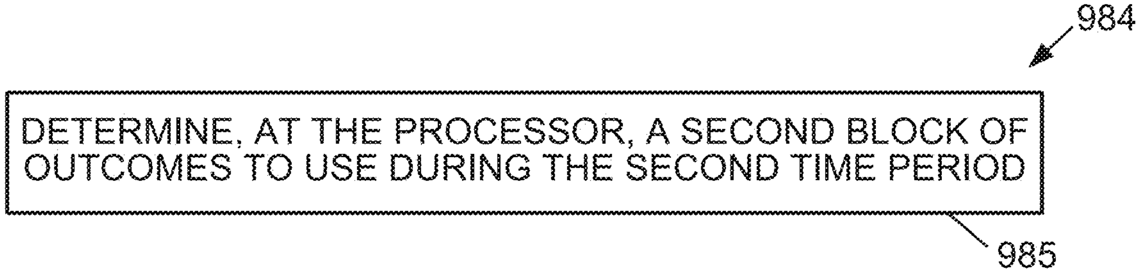

Next, FIG. 101 is a flow chart including a set 984 of functions listed in a Container 985. A method, according to one or more example embodiments, can include performing any function(s) of the set 984 and/or one or more functions shown in any of FIG. 90 to FIG. 100, and/or FIG. 102.

Container 985 includes determining, at the processor, a second block of outcomes to use during the second time period. The function(s) of Container 985 can be performed by a processor (e.g., one or more hardware processors) configured by machine-readable instructions including a module that is the same as or similar to the determine block of outcomes module 255 shown in FIG. 56. The function(s) of Container 963 can include one or more of the functions described with respect to the determine block of outcomes module 255. As an example, the processor can determine a second block of outcomes to use during the second time period, as discussed in connection with the determine block of outcomes module 255.

M. Thirteenth Additional Flowchart

Figure 102:
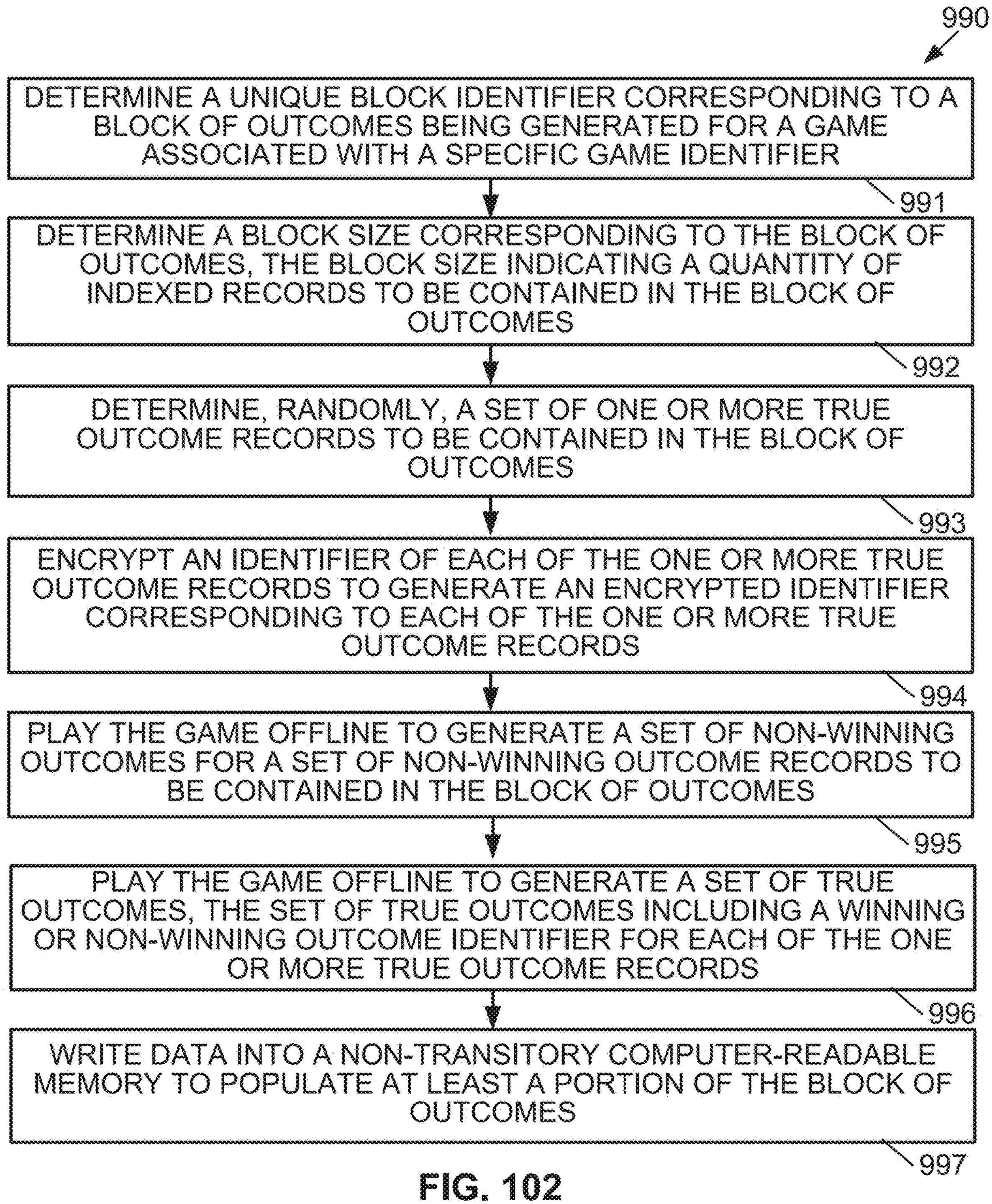

Next, FIG. 102 is a flow chart including a set 990 of functions listed in a Container 991, 992, 993, 994, 995, 996, 997. The methods in accordance with the example embodiments can include performing any one or more functions of the set 990 alone or along with any other function, such as a function shown in any of FIG. 90 to FIG. 101.

Container 991 includes determining a unique block identifier corresponding to a block of outcomes being generated for a game associated with a specific game identifier. The function(s) of Container 991 can be performed by a processor (e.g., one or more hardware processors) configured by machine-readable instructions including a module that is the same as or similar to the determine block identifier module 251 shown in FIG. 56. The function(s) of Container 991 can include one or more of the functions described with respect to the determine block identifier module 251. As an example, the processor can determine a unique block identifier corresponding to a block of outcomes being generated for a game associated with a specific game identifier, as discussed in connection with the determine block identifier module 251.

Container 992 includes determining a block size corresponding to the block of outcomes. The block size indicates a quantity of indexed records to be contained in the block of outcomes. The function(s) of Container 992 can be performed by a processor (e.g., one or more hardware processors) configured by machine-readable instructions including a module that is the same as or similar to the determine block size module 253 shown in FIG. 56. The function(s) of Container 992 can include one or more of the functions described with respect to the determine block size module 253. As an example, the processor can determine a block size corresponding to the block of outcomes, as discussed in connection with the determine block size module 253.

Container 993 includes determining, randomly, a set of one or more true outcome records to be contained in the block of outcomes. The function(s) of Container 993 can be performed by a processor (e.g., one or more hardware processors) configured by machine-readable instructions including a module that is the same as or similar to the determine outcomes module 460 shown in FIG. 56. The function(s) of Container 993 can include one or more of the functions described with respect to the determine outcomes module 460. As an example, the processor can determine, randomly, a set of one or more true outcome records to be contained in the block of outcomes, as discussed in connection with the determine outcomes module 460.

Container 994 includes encrypting an identifier of each of the one or more true outcome records to generate an encrypted identifier corresponding to each of the one or more true outcome records. The function(s) of Container 994 can be performed by a processor (e.g., one or more hardware processors) configured by machine-readable instructions including a module that is the same as or similar to the encryption module 259 shown in FIG. 56. The function(s) of Container 994 can include one or more of the functions described with respect to the encryption module 259. As an example, the processor can encrypt an identifier of each of the one or more true outcome records to generate an encrypted identifier corresponding to each of the one or more true outcome records, as discussed in connection with the encryption module 259.

Container 995 includes playing the game offline to generate a set of non-winning outcomes for a set of non-winning outcome records to be contained in the block of outcomes. The set of non-winning outcomes including a respective non-winning outcome identifier for each indexed record of the set of non-winning outcome records. The function(s) of Container 995 can be performed by a processor (e.g., one or more hardware processors) configured by machine-readable instructions including a module that is the same as or similar to the offline game play module 257 shown in FIG. 56. The function(s) of Container 995 can include one or more of the functions described with respect to the offline game play module 257. As an example, the processor can play the game offline to generate a set of non-winning outcomes for a set of non-winning outcome records to be contained in the block of outcomes, as discussed in connection with the offline game play module 257.

Container 996 includes playing the game offline to generate a set of true outcomes. The set of true outcomes including a winning or non-winning outcome identifier for each of the one or more true outcome records. The function(s) of Container 996 can be performed by a processor (e.g., one or more hardware processors) configured by machine-readable instructions including a module that is the same as or similar to the offline game play module 257 shown in FIG. 56. The function(s) of Container 996 can include one or more of the functions described with respect to the offline game play module 257. As an example, the processor can play the game offline to generate a set of true outcomes, as discussed in connection with the offline game play module 257.

Container 997 includes writing data into a non-transitory computer-readable memory to populate at least a portion of the block of outcomes. The data includes: the unique block identifier, the specific game identifier, the block size, the encrypted identifier corresponding to each of the one or more true outcome records, the set of non-winning outcome identifiers, and the set of true outcome identifiers. The function(s) of Container 997 can be performed by a processor (e.g., one or more hardware processors) configured by machine-readable instructions including a module that is the same as or similar to the write data module 268 shown in FIG. 56. The function(s) of Container 997 can include one or more of the functions described with respect to the write data module 268. As an example, the processor can write data into a non-transitory computer-readable memory to populate at least a portion of the block of outcomes, as discussed in connection with the write data module 268.

XII. Conclusions

The functions described throughout this can be performed in an order different than an order of functions (if any) described in in this disclosure or shown in the drawings. Additionally, embodiments in the form of a method can include one or more of the functions described in this disclosure or shown in the drawings.

While examples have been described in terms of select embodiments, alterations and permutations of these embodiments will be apparent to those of ordinary skill in the art. Other changes, substitutions, and alterations are also possible without departing from the disclosed machines, computing systems, and methods in their broader aspects as set forth in the claims below.

Finally, one or more embodiments described above can relate to one or more of the following enumerated example embodiment(s) (EEE).

EEE A1 is a method of providing a non-gambling game comprising: receiving, at a computing system, registration data; confirming, by the computing system, the registration data and determining whether the registration data corresponds to a base or premium tier; receiving, at the computing system, a start input; in response to receiving the start input, and without any requirement of payment for a bet, the computing system performing a game operation resulting in a game outcome; detecting, by the computing system, the game outcome and responsively making a payout determination, wherein the computing system performs a base mode of game operation upon determining the registration data corresponds to a base tier and an enhanced mode of game operation upon determining the registration data corresponds to a premium tier membership; and transmitting, by the computing system, data on any payout to a payout device.

EEE A2 is the method of EEE A1, wherein the payout determination is made in accordance with a pay table correlating possible game outcomes with payouts, and wherein the base mode of game operation utilizes a base pay table in which all game outcomes are correlated to a raffle ticket payout.

EEE A3 is the method of any one of EEE A1 to A2, wherein the enhanced mode of game operation utilizes a premium pay table in which at least one game outcome is correlated to an unrestricted payout.

EEE A4 is the method of EEE A3, wherein the premium pay table correlates a majority of game outcomes to a raffle ticket payout and at least two game outcomes to an unrestricted payout.

EEE A5 is the method of any one of EEE A1 to A4, further comprising: generating, by the computing system, an advertisement on a display during the base mode of game operation but not generating an advertisement during the enhanced mode of game operation.

EEE A6 is the method of any one of EEE A1 to A5, wherein the non-gambling game includes a video slot game.

EEE A7 is the method of EEE A6, wherein the video slot game includes three, four, or five reels of symbols.

EEE A8 is the method of any one of EEE A1 to A7, wherein the raffle ticket payout is output for a first raffle conducted after the computing system determines a particular amount of time has passed since the computing system conducted a previous raffle.

EEE A9 is the method of any one of EEE A1 to A7, wherein the raffle ticket payout is output for a first raffle conducted after the computing system determines a threshold quantity of raffle tickets have been awarded since the computing system conducted a previous raffle.

EEE A10 is the method of any one of EEE A8 to A9, wherein conducting the first raffle includes conducting the first raffle based on raffle tickets awarded to any player subscribing to the base tier and raffle tickets awarded to any player subscribing to the premium tier, and wherein the method further comprises conducting a second chance raffle based on the raffle tickets awarded to any player subscribing to the premium tier.

EEE A11 is the method of any one of EEE A1 to A10, wherein the game outcomes correlated to the raffle ticket payout are game outcomes based on video slot games performed for a single gaming workstation.

EEE A12 is the method of any one of EEE A1 to A10, wherein the game outcomes correlated to the raffle ticket payout are game outcomes based on video slot games performed for multiple gaming workstations.

EEE A13 is the method of any one or EEE A1 to A5, wherein the non-gambling game includes a roulette game.

EEE A14 is the method of EEE A13, further comprising: receiving a selection of one or more numbers on a roulette wheel; and outputting an animation showing the roulette wheel spinning and stopping with a particular position of the roulette wheel as a spin outcome.

EEE A15 is the method of EEE A14, further comprising awarding a quantity of raffle tickets if a number corresponding to the particular position of the roulette wheel matches the one or more selected numbers.

EEE A16 is the method of any one or EEE A1 to A5, wherein the non-gambling game includes a prize wheel game.

EEE A17 is the method of EEE A16, further comprising: outputting an animation showing a prize wheel spinning and stopping with a particular position of the prize wheel as a spin outcome.

EEE A18 is the method of EEE A17, wherein the particular position of the prize wheel indicates a quantity of raffle tickets to be awarded.

EEE A19 is the method of EEE A17, wherein the particular position of the prize wheel indicates a quantity of raffle tickets to be subtracted from a quantity of previously awarded raffle tickets.

EEE A20 is a computing system comprising: at least one processor; and a non-transitory, computer-readable memory having stored thereon program instructions that, when executed by the at least one processor, cause the computing system to perform operations comprising: receiving, by the at least one processor, registration data; confirming, by the at least one processor, the registration data and determining whether the registration data corresponds to a base or premium tier; receiving, at the at least one processor, a start input; in response to receiving the start input, and without any requirement of payment for a wager, the at least one processor performing a game operation resulting in a game outcome; detecting, by the at least one processor, the game outcome and responsively making a payout determination, wherein the at least one processor performs a base mode of game operation upon determining the registration data corresponds to the base tier or an enhanced mode of game operation upon determining the registration data corresponds to the premium tier; and transmitting, by the at least one processor, data on any payout to a payout device.

EEE A21 is the computing system of EEE A20, wherein execution of the program instructions by the at least one processor causes the computing system to perform the method of any one of EEE A2 to A19.

EEE A22 is the computing system of any one of EEE A20 to A21, wherein execution of the program instructions by the at least one processor causes the computing system to perform the method of any one of EEE B1 to B19.

EEE A23 is the computing system of any one of EEE A20 to A22, wherein execution of the program instructions by the at least one processor causes the computing system to perform the method of any one of EEE C1 to C47.

EEE A24 is the computing system of any one of EEE A20 to A23, wherein execution of the program instructions by the at least one processor causes the computing system to perform the method of any one of EEE D1 to D38.

EEE A25 is a computing system comprising at least one processor and a non-transitory, computer-readable memory storing executable instructions, wherein execution of the executable instructions by the at least one processor causes the computing system to perform the method of any one of EEE A1 to A19, EEE B1 to B19, EEE C1 to C47, or EEE D1 to D38.

EEE A26 is a non-transitory computer-readable memory having stored therein instructions executable by a processor to cause a computing system to perform functions, the functions comprising: receiving, by the at least one processor, registration data; confirming, by the at least one processor, the registration data and determining whether the registration data corresponds to a base or premium tier; receiving, at the at least one processor, a start input; in response to receiving the start input, and without any requirement of payment for a wager, the at least one processor performing a game operation resulting in a game outcome; detecting, by the at least one processor, the game outcome and responsively making a payout determination, wherein the at least one processor performs a base mode of game operation upon determining the registration data corresponds to the base tier or an enhanced mode of game operation upon determining the registration data corresponds to the premium tier; and transmitting, by the at least one processor, data on any payout to a payout device.

EEE A27 is the non-transitory computer-readable memory of EEE A26, wherein the instructions are executable by the processor to cause the computing system to perform the method of any one of EEE A2 to A19.

EEE A28 is the non-transitory computer-readable memory of any one of EEE A26 to A27, wherein the instructions are executable by the processor to cause the computing system to perform the method of any one of EEE B1 to B19.

EEE A29 is the non-transitory computer-readable memory of any one of EEE A26 to A28, wherein the instructions are executable by the processor to cause the computing system to perform the method of any one of EEE C1 to C47.

EEE A30 is the non-transitory computer-readable memory of any one of EEE A26 to A29, wherein the instructions are executable by the processor to cause the computing system to perform the method of any one of EEE D1 to D38.

EEE A31 is a non-transitory, computer-readable memory having stored therein instructions executable by at least one processor to cause a computing system to perform the method of any one of EEE A1 to A19, EEE B1 to B19, EEE C1 to C47, or EEE D1 to D38.

EEE B1 is a method of providing a non-gambling video slot game comprising: receiving, at a computing system, registration data; confirming, by the computing system, the registration data and determining whether the registration data corresponds to a base or premium tier; receiving, at the computing system, a start input; in response receiving the start input, and without any requirement of payment for a bet, the computing system generating a pattern of symbols to performing a video slot game operation resulting in a game outcome; determining, by the computing system, the game outcome and responsively making a payout determination, wherein: upon determining the registration data corresponds to a base tier, the computing system performs the payout determination in accordance with a base pay table, the base pay table correlating a plurality of game outcomes with a raffle ticket payout, and upon determining the registration data corresponds to the premium tier, the computing system performs the payout determination in accordance with a premium pay table, the premium pay table correlating at least one game outcome with a raffle ticket payout and at least one game outcome with an unrestricted payout; and transmitting, by the computing system, data on any payout to a payout device.

EEE B2 is the method of EEE B1, further comprising: periodically conducting a raffle in which a raffle ticket is selected; and transmitting, by the computing system, data on the selected raffle ticket to a payout device.

EEE B3 is the method of any one of EEE B2, wherein conducting the raffle occurs after the computing system determines a particular amount of time has passed since the computing system conducted a previous raffle.

EEE B4 is the method of any one of EEE B2, wherein conducting the raffle occurs after the computing system determines a threshold quantity of raffle tickets have been awarded since the computing system conducted a previous raffle.

EEE B5 is the method of any one of EEE B2 to B4, wherein conducting the raffle includes conducting a first raffle based on raffle tickets awarded to any player subscribing to the base tier and raffle tickets awarded to any player subscribing to the premium tier, and wherein the method further comprises conducting a second chance raffle based on the raffle tickets awarded to any player subscribing to the premium tier.

EEE B6 is the method of any one of EEE B1 to B2, wherein both the base and premium pay tables correlate a plurality of potential game outcomes to a raffle ticket payout, and wherein, for at least one potential game outcome, a raffle ticket payout of the premium pay table is larger than a raffle ticket payout of the base pay table.

EEE B7 is the method of EEE B6, wherein, for the at least one potential game outcome, the raffle ticket payout of the premium pay table is larger than all raffle ticket payouts of the base pay table.

EEE B8 is the method of any one of EEE B1 to B7, wherein the premium tier includes at least first and second premium tier levels, and wherein: upon determining the registration data corresponds to the first premium tier level, the computing system makes the payout determination in accordance with a first premium pay table; upon determining the registration data corresponds to the second premium tier level, the computing system makes the payout determination in accordance with a second premium pay table; and the first and second premium pay tables each correlate a plurality of game outcomes with a raffle ticket payout and, for at least one potential game outcome, the second premium pay table correlates a larger raffle ticket payout than the first premium pay table.

EEE B9 is the method of EEE B8, wherein: the first premium pay table correlates at least one possible game outcome to an unrestricted payout; and the second premium pay table correlates a larger number of game outcomes to an unrestricted payout than the first premium pay table.

EEE B10 is the method of EEE B8, wherein, for the at least one potential game outcome, the second premium pay table correlates a larger raffle ticket payout than all raffle ticket payouts of the first premium pay table.

EEE B11 is the method of any one of EEE B1 to B7, wherein the premium tier includes at least first, second, and third premium tier levels, and wherein: upon determining the registration data corresponds to the first premium tier level, the computing system makes the payout determination in accordance with a first premium pay table, upon determining the registration data corresponds to the second premium tier level, the computing system makes the payout determination in accordance with a second premium pay table, upon determining the registration data corresponds to the third premium tier level, the computing system makes the payout determination in accordance with a third premium pay table, and the first, second, and third premium pay tables each correlate a plurality of game outcomes to a raffle ticket payout and, for least one game outcome, the second premium pay table correlates to a larger raffle ticket payout than the first premium pay table, and for at least one game outcome, the third premium pay table correlates to a larger raffle ticket payout than the second premium pay table.

EEE B12 is the method of EEE B11, wherein: the first premium pay table correlates at least one possible game outcome to an unrestricted payout, the second premium pay table correlates a larger number of possible game outcomes to an unrestricted payout than the first premium pay table, and the third premium pay table correlates a larger number of possible game outcomes to an unrestricted payout than the second premium pay table.

EEE B13 is the method of any one of EEE B1 to B12, wherein: upon determining the registration data corresponds to a base tier, the computing system performs the video slot game operation at a first rate of play, and upon determining the registration data corresponds to a premium tier, the computing system performs the video slot game operation at a second, faster rate of play.

EEE B14 is the method of any one of EEE B1 to B13, wherein: upon determining the registration data corresponds to a base tier, the computing system provides a graphical display and sound at a first quality level during the video slot game operation, and upon determining the registration data corresponds to a premium tier, the computing system provides a graphical display and sound at a second, higher quality level.

EEE B15 is the method of any one of EEE B1 to B7, wherein, the premium tier includes at least first and second premium tier levels, wherein: upon determining the registration data corresponds to the first premium tier level, the computing system makes the payout determination in accordance with a first premium pay table, upon determining the registration data corresponds to the second premium tier level, the computing system makes the payout determination in accordance with a second premium pay table, and both the base and first premium pay tables correlate a plurality of potential game outcomes to a raffle ticket payout, and wherein: the first premium pay table correlates a plurality of game outcomes to a larger raffle ticket payout than the base pay table, and the second premium pay table correlates a plurality of potential game outcomes to a drawing ticket payout, the drawing ticket payout being different than the raffle ticket payout, and wherein the method further comprises: periodically conducting a drawing, separate from the raffle, in which a drawing ticket is selected; and transmitting, by the computing system, data on the drawing ticket selected to a payout device.

EEE B16 is the method of any one of EEE B1 to B7, wherein the premium tier includes at least first and second premium tier levels, wherein: upon determining the registration data corresponds to the first premium tier level, the computing system makes the payout determination in accordance with a first premium pay table, and upon determining the registration data corresponds to the second premium tier level, the computing system makes the payout determination in accordance with a second premium pay table, and wherein: the second premium pay table correlates a plurality of game outcomes to tokens, and a predetermined number of tokens accumulated over one or more gaming operations correlate to an unrestricted payout.

EEE B17 is the method of any one of EEE B1 to B16, wherein a premium pay table correlates at least one game outcome to a pass for playing a different arcade game at no cost.

EEE B18 is the method of any one of EEE B1 to B17, wherein a premium pay table correlates at least one potential game outcome to a pass for playing a different, video slot game at no cost.

EEE B19 is the method of any one of EEE B1 to B18, wherein the video slot game includes three, four, or five reels of symbols.

EEE B20 is a computing system comprising: at least one processor; and a non-transitory, computer-readable memory having stored thereon program instructions that, when executed by the at least one processor, cause the computing system to perform operations comprising: receiving, at a computing system, registration data; confirming, by the computing system, the registration data and determining whether the registration data corresponds to a base or premium tier; receiving, at the computing system, a start input; in response receiving the start input, and without any requirement of payment for a bet, the computing system generating a pattern of symbols to performing a video slot game operation resulting in a game outcome; determining, by the computing system, the game outcome and responsively making a payout determination, wherein: upon determining the registration data corresponds to a base tier, the computing system performs the payout determination in accordance with a base pay table, the base pay table correlating a plurality of game outcomes with a raffle ticket payout, and upon determining the registration data corresponds to the premium tier, the computing system performs the payout determination in accordance with a premium pay table, the premium pay table correlating at least one game outcome with a raffle ticket payout and at least one game outcome with an unrestricted payout; and transmitting, by the computing system, data on any payout to a payout device.

EEE B21 is the computing system of EEE B20, wherein execution of the program instructions by the at least one processor causes the computing system to perform the method of any one of EEE B2 to B19.

EEE B22 is the computing system of any one of EEE B20 to B21, wherein execution of the executable instructions by the at least one processor causes the computing system to perform the method of any one of EEE A1 to A19.

EEE B23 is the computing system of any one of EEE B20 to B22, wherein execution of the executable instructions by the at least one processor causes the computing system to perform the method of any one of EEE C1 to C47.

EEE B24 is the computing system of any one of EEE B20 to B23, wherein execution of the executable instructions by the at least one processor causes the computing system to perform the method of any one of EEE D1 to D38.

EEE B25 is a computing system comprising at least one processor and a non-transitory, computer-readable memory storing executable instructions, wherein execution of the executable instructions by the at least one processor causes the computing system to perform the method of any one of EEE A1 to A19, EEE B1 to B19, EEE C1 to C47, or EEE D1 to D38.

EEE B26 is a non-transitory computer-readable memory having stored therein instructions executable by a processor to cause a computing system to perform functions, the functions comprising: receiving, at a computing system, registration data; confirming, by the computing system, the registration data and determining whether the registration data corresponds to a base or premium tier; receiving, at the computing system, a start input; in response receiving the start input, and without any requirement of payment for a bet, the computing system generating a pattern of symbols to performing a video slot game operation resulting in a game outcome; determining, by the computing system, the game outcome and responsively making a payout determination, wherein: upon determining the registration data corresponds to a base tier, the computing system performs the payout determination in accordance with a base pay table, the base pay table correlating a plurality of game outcomes with a raffle ticket payout, and upon determining the registration data corresponds to the premium tier, the computing system performs the payout determination in accordance with a premium pay table, the premium pay table correlating at least one game outcome with a raffle ticket payout and at least one game outcome with an unrestricted payout; and transmitting, by the computing system, data on any payout to a payout device.

EEE B27 is the non-transitory computer-readable memory of EEE B26, wherein the instructions are executable by the processor to cause the computing system to perform the method of any one of EEE B2 to B19.

EEE B28 is the non-transitory, computer-readable memory of any one of EEE B26 to B27, wherein the instructions are executable by the processor to cause the computing system to perform the method of any one of EEE A1 to A19.

EEE B29 is the non-transitory, computer-readable memory of any one of EEE B26 to B28, wherein the instructions are executable by the processor to cause the computing system to perform the method of any one of EEE C1 to C47.

EEE B30 is the non-transitory, computer-readable memory of any one of EEE B26 to B29, wherein the instructions are executable by the processor to cause the computing system to perform the method of any one of EEE D1 to D38.

EEE B31 is a non-transitory, computer-readable memory having stored therein instructions executable by at least one processor to cause a computing system to perform the method of any one of EEE A1 to A19, EEE B1 to B19, EEE C1 to C47, or EEE D1 to D38.

EEE C1 is a method comprising: launching, at a processor of a client device, an application to play a non-gambling game; determining, by the processor, whether a playout mode of the non-gambling game is a manual mode or an automatic mode; receiving, by the processor, a quantity of results of a first block of results, wherein the first block of results includes multiple results for the non-gambling game; outputting, by the processor on a display, a representation of one or more results of the block, wherein if the playout mode is the manual mode, then outputting the representation includes displaying a respective animation for the one or more results of the block, and wherein if the playout mode is the automatic mode, then outputting the representation includes displaying an award amount based on all results of the block without displaying an animation for every individual result of the block.

EEE C2 is the method of EEE C1, further comprising: determining, by the processor, whether the playout mode of the non-gambling game has changed.

EEE C3 is the method of any one of EEE C1 to C2, wherein the quantity of results is all results of the block.

EEE C4 is the method of any one of EEE C1 to C3, wherein the first block of results is exclusive to the client device or to multiple devices corresponding to a user of the client device.

EEE C5 is the method of any one of EEE C1 to C4, wherein launching the application results in outputting a user-selectable control on the display, and wherein determining whether the playout mode of the non-gambling game is the manual mode or the automatic mode is based on an input the processor receives in response to a use of the user-selectable control.

EEE C6 is the method of any one of EEE C1 to C5, wherein determining whether the playout mode of the non-gambling game is the manual mode or the automatic mode includes determining the playout mode is the automatic mode in response to receipt of a token or a signal indicating user approval to deduct a token from a token account corresponding to a user.

EEE C7 is the method of any one of EEE C1 to C6, wherein the playout mode is determined to be the manual mode, wherein the method further comprises outputting a user-selectable control on the display, and wherein displaying each respective animation occurs in response to a respective use of the user-selectable control.

EEE C8 is the method of any one of EEE C1 to C7, wherein the playout mode is determined to be the manual mode, wherein the method further comprises outputting a user-selectable control on the display, and wherein displaying each respective animation occurs in response to a single use of the user-selectable control.

EEE C9 is the method of EEE C8, further comprising: counting, by the processor, an amount of time greater than 0.0 second between displaying each respective animation for each pair of two consecutive results.

EEE C10 is the method of any one of EEE C1 to C9, wherein outputting the representation of one or more results of the block includes outputting a representation for only some results of the first block of results.

EEE C11 is the method of EEE C10, further comprising: outputting a user-selectable control selectable to refresh the first block of results, wherein the processor determines to output the representation for only some results of the first block of results is completed in response to a selection of the user-selectable control.

EEE C12 is the method of any one of EEE C1 to C11, wherein the playout mode is the manual mode, wherein the multiple results for the non-gambling game are arranged sequentially and each of the multiple results corresponds to a respective numerical index value, wherein the quantity of results includes an index value corresponding to a result a server determined using a random number generator, and wherein the respective animation for the one or more results of the block includes an animation corresponding to the index value corresponding to the result the server determined using the random number generator.

EEE C13 is the method of EEE C12, further comprising: receiving, by the processor, a block size indicator indicating a quantity of results contained in the first block of results, wherein the playout mode is the manual mode; wherein outputting the representation of one or more results of the block includes outputting a quantity of animations showing a non-winning result, and wherein the quantity of animations showing the non-winning result equals the quantity of results minus a quantity of index values corresponding to a result the server determined using the random number generator.

EEE C14 is the method of any one of EEE C1 to C13, further comprising: determining, at the processor, a selection of a user-selectable control at the client device, wherein the selection of the user-selectable control corresponds to selection of the automatic mode, and wherein the selection of the automatic mode indicates a player at the client device authorized payment of a fee corresponding to selection of the automatic mode or authorized use of a credit earned in response to the client device providing a server with one or more player details.

EEE C15 is the method of any one of EEE C1 to C14, wherein if the playout mode is the automatic mode and the block includes at least one winning result, then outputting the representation further includes displaying a respective animation corresponding to each winning result of the block, and wherein if the playout mode is the automatic mode and the block includes no winning results, then outputting the representation further includes displaying a single animation showing a non-winning result.

EEE C16 is the method of any one of EEE C1 to C15, wherein the playout mode is the manual mode, wherein the method further comprises determining, by the processor, a user-selectable control at the client device has been selected to select an auto-play mode, wherein the one or more results of the first block include multiple results, and wherein displaying animations for the multiple results occurs without needing a user-selectable control at the client device to be selected to trigger displaying each animation for the multiple results.

EEE C17 is the method of EEE C16, wherein a selection of the auto-play mode indicates a player at the client device authorized use of a credit or payment of a fee corresponding to selection of the auto-play mode.

EEE C18 is the method of any one of EEE C1 to C17, wherein the playout mode is the manual mode, wherein an auto-play mode available for the manual mode is unselected, wherein the one or more results of the block include multiple results, and wherein displaying the respective animation for each result of the one or more results of the block occurs after a respective selection of a user-selectable control at the client device.

EEE C19 is the method of any one of EEE C1 to C18, wherein the first block of results includes a first quantity of results, wherein the first quantity equals a sum of a second quantity and a third quantity, wherein the second quantity equals how many results are determined using a first random process and the third quantity equals how many results are determined using a second random process, wherein each result determined using the first random process is a winning result or a non-winning result, and wherein each result determined using the second random process is a non-winning result.

EEE C20 is the method of EEE C19, wherein generating the first block of results is conditioned on use of a third random process, and wherein the third random process includes using a random number generator to determine how many results are contained in either the second quantity or the third quantity.

EEE C21 is the method of EEE C19, wherein the first quantity, the second quantity and the third quantity are predetermined without performing any random process.

EEE C22 is the method of EEE C19, wherein a server performs the first random process and the client device performs the second random process, wherein the method further comprises receiving, at the server from the client device, data indicative of each result determined using the second random process, and wherein generating the first block of results includes storing the data indicative of each result determined using the second random process into a non-transitory computer-readable memory.

EEE C23 is the method of EEE C19, wherein the first quantity of results includes an ordered sequence of results, wherein each result of the ordered sequence corresponds to a numerical index value, and wherein outputting data for outputting the representation of one or more results of the first block includes a respective numerical index value corresponding to each result determined using the first random process that is a winning result.

EEE C24 is the method of EEE C23, wherein the playout mode is the manual mode, wherein the method further comprises determining, at the client device, a particular animation corresponding to the respective numerical index value, and wherein displaying the respective animation for each result of the one or more results of the first block includes displaying the particular animation corresponding to the respective numerical index value when the respective numerical index value within the ordered sequence of results is reached during playout of first block of results according to the ordered sequence of results.

EEE C25 is the method of EEE C19, wherein the non-gambling game comprises a video slots game, wherein performing the second random process include using a random number generator to generate one or more random numbers corresponding to a set of symbols for a particular non-winning result, wherein the set of symbols is displayable at the client device to represent stopped positions of one or more virtual reels of the video slots game for the particular non-winning result, and wherein data for outputting the representation of one or more results of the first block includes one or more of the following: the one or more random numbers, the set of symbols, an identifier of the set of symbols, or identifiers of symbols within the set of symbols.

EEE C26 is the method of any one of EEE C1 to C25, wherein the playout mode is the manual mode, wherein the first input includes a request to use a new block of results, and wherein the one or more results of the first block is a subset of all results of the first block.

EEE C27 is the method of any one of EEE C1 to C26, further comprising: performing, at a server, a server thread for performance of the non-gambling game based on the first block of results, wherein performing the server thread for performance of the non-gambling game based on the first block of results includes determining whether the playout mode of the non-gambling game for the client device is the manual mode or the automatic mode, and outputting data for displaying the representation of one or more results of the first block at the client device.

EEE C28 is the method of EEE C27, further comprising: receiving, at the server from a second client device, a second input regarding playing the non-gambling game; generating, at the server, a second block of results, wherein the second block of results includes multiple results of the non-gambling game; and performing, at the server, the server thread for performance of the non-gambling game based on the second block of results, wherein performing the server thread for performance of the non-gambling game based on the second block of results includes determining whether a playout mode of the non-gambling game for the second client device is the manual mode or the automatic mode, and outputting data for outputting a representation of one or more results of the second block at the second client device.

EEE C29 is the method of EEE C28, wherein the multiple second results are arranged in a sequence of results.

EEE C30 is the method of any one of EEE C28 to C29, wherein generating the second block of results occurs in response to receiving the second input.

EEE C31 is the method of any one of EEE C1 to C30, further comprising: determining, at a server, a test to confirm whether a human is playing the non-gambling game at the client device has failed; and transmitting, from the server to the client device, an instruction for the client device to end playing the non-gambling game.

EEE C32 is the method of EEE C31, further comprising: performing the test at the client device; and receiving, at the server, data indicating the test has failed.

EEE C33 is the method of any one of EEE C1 to C32, wherein the non-gambling game comprises a video slots game, a video prize wheel game, or a video roulette game.

EEE C34 is the method of EEE C33, wherein the playout mode is the manual mode, wherein receiving the first input includes a server receiving multiple instances of the first input from the client device, wherein each instance of the first input indicates a user-selectable control at the client device was selected to request a spin of: a set of reels displayed for the video slots game, a prize wheel displayed for the video prize wheel game, or a roulette wheel displayed for the video roulette game, and wherein outputting data for outputting the representation of one or more results of the first block including outputting data for one result of the first block after receiving each instance of the first input.

EEE C35 is the method of EEE C33, further comprising: activating, at the client device, a user-selectable control when the following conditions exist: the playout mode is the manual mode, at least one result of the first block remains to be displayed, and the client device is not currently displaying an animation for any result of the first block; and deactivating, at the client device, the user-selectable control while displaying the animation for any result of the first block, wherein displaying the animation for any result of the first block occurs in response to a respective selection of the user-selectable control while the user-selectable control is activated, and wherein, when the non-gambling game comprises: the video slots game, the video prize wheel game, or the video roulette game, displaying the animation for any result of the first block includes displaying: an animation of a set of reels spinning, an animation of a prize wheel spinning, or displaying a roulette wheel spinning, respectively.

EEE C36 is the method of EEE C35, wherein the first input indicates the client device received an input corresponding to selection of an auto-play mode, and wherein the input corresponding to selection of the auto-play mode indicates a player at the client device authorized use of a credit or payment of a fee corresponding to selection of the auto-play mode.

EEE C37 is the method of any one of EEE C1 to C36, wherein the first block of results includes 10,000 or more results of the non-gambling game.

EEE C38 is the method of any one of EEE C1 to C37, wherein the first block of results includes between 2 and 9,999 results of the non-gambling game, inclusive.

EEE C39 is the method of any one of EEE C1 to C38, further comprising: generating, at a server, a second block of results, wherein the second block of results includes multiple results of the non-gambling game; transmitting, from the server to the client device, data for displaying a representation of one or more results of the second block at the client device in the manual mode; and discarding, in response to receiving the first input, any un-played results of the first block of results, wherein a user-selectable control at the client device is selectable to request the server to refresh of the first block of results corresponding to the client device, wherein the first input indicates the user-selectable control at the client device was selected, and wherein receiving the first input occurs while the client device is displaying a representation of a result of the first block.

EEE C40 is the method of EEE C39, wherein generating the second block of results occurs in response to receiving the first input.

EEE C41 is the method of any one of EEE C1 to C26, further comprising: performing, at a server for the client device, at least a portion of a server thread for performance of the non-gambling game based on the first block of results; terminating, at the server, performance of the non-gambling game based on the first block of results; and performing, at the server for the client device, at least a portion of the server thread for performance of the non-gambling game based on a second block of results.

EEE C42 is the method of EEE C41, wherein performing at least the portion of the server thread for performance of the non-gambling game based on the first block of results includes outputting the data for displaying the representation of one or more results of the first block, wherein terminating performance of the non-gambling game based on the first block of results occurs in response to receiving an input to terminate the non-gambling game from the client device or after a predetermined amount of time has passed since the server received a communication from the client device, and wherein performing at least the portion of the server thread for performance of the non-gambling game based on the second block of results includes outputting the data for displaying the representation of one or more results of the second block.

EEE C43 is the method of any one of EEE C1 to C42, wherein the playout mode is the manual mode, wherein the first input indicates whether the client device received an input to activate a quick-spin option, wherein, if the client device received the input to activate the quick-spin option, then displaying the respective animation for each result of the one or more results of the first block includes pausing between displaying each pair of consecutive animations for a first amount of time, wherein, if the client device did not receive the input to activate the quick-spin option, then displaying the respective animation for each result of the one or more results of the first block includes pausing between displaying each pair of consecutive animations for a second amount of time, and wherein the first amount of time is less than the second amount of time.

EEE C44 is the method of any one of EEE C1 to C43, further comprising: displaying, at the client device, a graphical user interface including one or more fields for entry of registration data regarding a player at the client device; and transmitting registration data entered into the one or more fields to and a request to register the player.

EEE C45 is the method of any one of EEE C1 to C44, further comprising: outputting on the display a credit balance indicator indicating a first quantity of credits before a server modifies the quantity of credits and a second quantity of credits after the server modifies quantity of credits.

EEE C46 is the method of EEE C45, wherein the second quantity of credits is less than the first quantity of credits as a result of selecting the automatic mode.

EEE C47 is the method of EEE C45, wherein the second quantity of credits is greater than the first quantity of credits as a result of the one or more results of the block containing a winning result.

EEE C48 is a computing system comprising: a processor; and a non-transitory computer-readable memory having stored thereon program instructions that, when executed by the processor, cause the computing system to perform operations comprising: launching, at the processor, an application to play a non-gambling game; determining, by the processor, whether a playout mode of the non-gambling game is a manual mode or an automatic mode; receiving, by the processor, a quantity of results of the first block of results, wherein the first block of results includes multiple results for the non-gambling game; outputting, by the processor on a display, a representation of one or more results of the block, wherein if the playout mode is the manual mode, then outputting the representation includes displaying a respective animation for the one or more results of the block, and wherein if the playout mode is the automatic mode, then outputting the representation includes displaying an award amount based on all results of the block without displaying an animation for every individual result of the block.

EEE C49 is the computing system of EEE C48, wherein execution of the program instructions by the processor causes the computing system to perform the method of any one of C2 to C47.

EEE C50 is the computing system of any one of EEE C48 to C49, wherein execution of the program instructions by the processor causes the computing system to perform the method of any one of EEE A1 to A19.

EEE C51 is the computing system of any one of EEE C48 to C50, wherein execution of the program instructions by the processor causes the computing system to perform the method of any one of EEE B1 to B19.

EEE C52 is the computing system of any one of EEE C48 to C51, wherein execution of the program instructions by the processor causes the computing system to perform the method of any one of EEE D1 to D38.

EEE C53 is a computing system comprising a processor and a non-transitory, computer-readable memory storing executable instructions, wherein execution of the executable instructions by the processor causes the computing system to perform the method of any one of EEE A1 to A19, EEE B1 to B19, EEE C1 to C47, or EEE D1 to D38.

EEE C54 is a non-transitory computer-readable memory having stored therein instructions executable by a processor to cause a computing system to perform functions, the functions comprising: launching, at the processor, an application to play a non-gambling game; determining, by the processor, whether a playout mode of the non-gambling game is a manual mode or an automatic mode; receiving, by the processor, a quantity of results of a first block of results, wherein the first block of results includes multiple results for the non-gambling game; outputting, by the processor on a display, a representation of one or more results of the block, wherein if the playout mode is the manual mode, then outputting the representation includes displaying a respective animation for the one or more results of the block, and wherein if the playout mode is the automatic mode, then outputting the representation includes displaying an award amount based on all results of the block without displaying an animation for every individual result of the block.

EEE C55 is the non-transitory computer-readable memory of EEE C54, wherein the instructions are executable by the processor to cause the computing system to perform the method of any one of EEE C2 to C47.

EEE C56 is the non-transitory computer-readable memory of any one of EEE C54 to C55, wherein the instructions are executable by the processor to cause the computing system to perform the method of any one of EEE A1 to A19.

EEE C57 is the non-transitory computer-readable memory of any one of EEE C54 to C56, wherein the instructions are executable by the processor to cause the computing system to perform the method of any one of EEE B1 to B19.

EEE C58 is the non-transitory computer-readable memory of any one of EEE C54 to C57, wherein the instructions are executable by the processor to cause the computing system to perform the method of any one of EEE D1 to D38.

EEE C59 is a non-transitory, computer-readable memory having stored therein instructions executable by at least one processor to cause a computing system to perform the method of any one of EEE A1 to A19, EEE B1 to B19, EEE C1 to C47, or EEE D1 to D38.

EEE D1 is a method comprising: receiving, at a first computing system from a second computing system, a first input regarding playing a non-gambling game; generating, at the first computing system, a first block of results, wherein the first block of results includes multiple results of the non-gambling game; determining, at the first computing system, whether a playout mode of the non-gambling game is a manual mode or an automatic mode; and outputting, via the first computing system to the second computing system, data for displaying a representation of one or more results of the first block at the second computing system, wherein if the playout mode is the manual mode, then outputting the representation includes displaying a respective animation for each result of the one or more results of the first block, and wherein if the playout mode is the automatic mode, then outputting the representation includes displaying an award amount based on all results of the first block without displaying an animation for every individual result of the first block.

EEE D2 is the method of EEE D1, wherein the first input indicates whether the second computing system received an input corresponding to selection of the automatic mode.

EEE D3 is the method of EEE D2, wherein the input corresponding to selection of the automatic mode indicates a player at the second computing system authorized payment of a fee corresponding to selection of the automatic mode.

EEE D4 is the method of EEE D2, wherein the input corresponding to selection of the automatic mode indicates a player at the second computing system authorized use of a credit earned in response to providing the first computing system with one or more player details.

EEE D5 is the method of any one of EEE D1 to D4, wherein if the playout mode is the automatic mode and the first block includes at least one winning result, then outputting the representation further includes displaying a respective animation corresponding to each winning result of the first block, and wherein if the playout mode is the automatic mode and the first block includes no winning results, then outputting the representation further includes displaying a single animation showing a non-winning result.

EEE D6 is the method of EEE D1, wherein the playout mode is the manual mode, wherein the first input indicates the second computing system received an input corresponding to selection of an auto-play mode, wherein the one or more results of the first block include multiple results, and wherein displaying animations for the multiple results occurs without needing a user-selectable control at the second computing system to be selected to trigger displaying each animation for the multiple results.

EEE D7 is the method of EEE D6, wherein the input corresponding to selection of the auto-play mode indicates a player at the second computing system authorized use of a credit or payment of a fee corresponding to selection of the auto-play mode.

EEE D8 is the method of any one of EEE D6 to D7, wherein the playout mode is the manual mode, wherein an auto-play mode available for the manual mode is unselected, wherein the one or more results of the first block include multiple results, and wherein displaying the respective animation for each result of the one or more results of the first block occurs after a respective selection of a user-selectable control at the second computing system.

EEE D9 is the method of any one of EEE D1 to D8, wherein generating the first block of results includes generating a first quantity of results, wherein the first quantity equals a sum of a second quantity and a third quantity, wherein the second quantity equals how many results are determined using a first random process and the third quantity equals how many results are determined using a second random process, wherein each result determined using the first random process is a winning result or a non-winning result, and wherein each result determined using the second random process is a non-winning result.

EEE D10 is the method of EEE D9, wherein generating the first block of results is conditioned on use of a third random process, and wherein the third random process includes using a random number generator to determine how many results are contained in either the second quantity or the third quantity.

EEE D11 is the method of EEE D9, wherein the first quantity, the second quantity and the third quantity are predetermined without performing any random process.

EEE D12 is the method of EEE D9, wherein the first computing system performs the first random process and the second computing system performs the second random process, wherein the method further comprises receiving, at the first computing system from the second computing system, data indicative of each result determined using the second random process, and wherein generating the first block of results includes storing the data indicative of each result determined using the second random process into a non-transitory computer-readable memory.

EEE D13 is the method of EEE D9, wherein the first quantity of results includes an ordered sequence of results, wherein each result of the ordered sequence corresponds to a numerical index value, and wherein outputting the data for outputting the representation of one or more results of the first block includes a respective numerical index value corresponding to each result determined using the first random process that is a winning result.

EEE D14 is the method of EEE D13, wherein the playout mode is the manual mode, wherein the method further comprises determining, at the second computing system, a particular animation corresponding to the respective numerical index value, and wherein displaying the respective animation for each result of the one or more results of the first block includes displaying the particular animation corresponding to the respective numerical index value when the respective numerical index value within the ordered sequence of results is reached during playout of first block of results according to the ordered sequence of results.

EEE D15 is the method of EEE D9, wherein the non-gambling game comprises a video slots game, wherein performing the second random process include using a random number generator to generate one or more random numbers corresponding to a set of symbols for a particular non-winning result, wherein the set of symbols is displayable at the second computing system to represent stopped positions of one or more virtual reels of the video slots game for the particular non-winning result, and wherein the data for outputting the representation of one or more results of the first block includes one or more of the following: the one or more random numbers, the set of symbols, an identifier of the set of symbols, or identifiers of symbols within the set of symbols.

EEE D16 is the method of EEE D1, wherein the playout mode is the manual mode, wherein the first input includes a request to use a new block of results, and wherein the one or more results of the first block is a subset of all results of the first block.

EEE D17 is the method of anyone of EEE D1 to D16, further comprising: performing, at the first computing system, a server thread for performance of the non-gambling game based on the first block of results, wherein performing the server thread for performance of the non-gambling game based on the first block of results includes determining whether the playout mode of the non-gambling game for the second computing system is the manual mode or the automatic mode, and outputting the data for displaying the representation of one or more results of the first block at the second computing system.

EEE D18 is the method of EEE D17, further comprising: receiving, at the first computing system from a third computing system, a second input regarding playing the non-gambling game; generating, at the first computing system, a second block of results, wherein the second block of results includes multiple results of the non-gambling game; and performing, at the first computing system, the server thread for performance of the non-gambling game based on the second block of results, wherein performing the server thread for performance of the non-gambling game based on the second block of results includes determining whether a playout mode of the non-gambling game for the third computing system is the manual mode or the automatic mode, and outputting data for outputting a representation of one or more results of the second block at the third computing system.

EEE D19 is the method of any one of EEE D1 to D18, wherein the multiple results are arranged in a sequence of results.

EEE D20 is the method of any one of EEE D1 to D19, wherein generating the first block of results occurs in response to receiving the first input.

EEE D21 is the method of any one of EEE D1 to D20, further comprising: determining, at the first computing system, a test to confirm whether a human is playing the non-gambling game at the second computing system has failed; and outputting, via the first computing system to the second computing system, an instruction for second computing system to end playing the non-gambling game.

EEE D22 is the method of EEE D21, further comprising: performing the test at the second computing system; and receiving, at the first computing system, data indicating the test has failed.

EEE D23 is the method of any one of EEE D1 to D22, wherein the non-gambling game comprises a video slots game, a video prize wheel game, or a video roulette game.

EEE D24 is the method of EEE D23, wherein the playout mode is the manual mode, wherein receiving the first input includes the first computing system receiving multiple instances of the first input from the second computing system, wherein each instance of the first input indicates a user-selectable control at the second computing system was selected to request a spin of: a set of reels displayed for the video slots game, a prize wheel displayed for the video prize wheel game, or a roulette wheel displayed for the video roulette game, and wherein outputting the data for outputting the representation of one or more results of the first block including outputting data for one result of the first block after receiving each instance of the first input.

EEE D25 is the method of EEE D23, further comprising: activating, at the second computing system, a user-selectable control when the following conditions exist: the playout mode is the manual mode, at least one result of the first block remains to be displayed, and the second computing system is not currently displaying an animation for any result of the first block; and deactivating, at the second computing system, the user-selectable control while displaying the animation for any result of the first block, wherein displaying the animation for any result of the first block occurs in response to a respective selection of the user-selectable control while the user-selectable control is activated, and wherein, when the non-gambling game comprises: the video slots game, the video prize wheel game, or the video roulette game, displaying the animation for any result of the first block includes displaying: an animation of a set of reels spinning, an animation of a prize wheel spinning, or displaying a roulette wheel spinning, respectively.

EEE D26 is the method of EEE D25, wherein the first input indicates the second computing system received an input corresponding to selection of an auto-play mode, and wherein the input corresponding to selection of the auto-play mode indicates a player at the second computing system authorized use of a credit or payment of a fee corresponding to selection of the auto-play mode.

EEE D27 is the method of any one of EEE D1 to D26, wherein the first block of results includes 10,000 or more results of the non-gambling game.

EEE D28 is the method of any one of EEE D1 to D26, wherein the first block of results includes between 2 and 9,999 results of the non-gambling game, inclusive.

EEE D29 is the method of any one of EEE D1 to D28, further comprising: generating, at the first computing system, a second block of results, wherein the second block of results includes multiple results of the non-gambling game; outputting, via the first computing system to the second computing system, data for displaying a representation of one or more results of the second block at the second computing system in the manual mode; and discarding, in response to receiving the first input, any un-played results of the first block of results, wherein a user-selectable control at the second computing system is selectable to request the first computing system to refresh of the first block of results corresponding to the second computing system, wherein the first input indicates the user-selectable control at the second computing system was selected, and wherein receiving the first input occurs while the second computing system is displaying a representation of a result of the first block.

EEE D30 is the method of EEE D29, wherein generating the second block of results occurs in response to receiving the first input.

EEE D31 is the method of anyone of EEE D1 to D28, further comprising: performing, at the first computing system for the second computing system, at least a portion of a server thread for performance of the non-gambling game based on the first block of results; terminating, at the first computing system, performance of the non-gambling game based on the first block of results; and performing, at the first computing system for the second computing system, at least a portion of the server thread for performance of the non-gambling game based on a second block of results.

EEE D32 is the method of EEE D31, wherein performing at least the portion of the server thread for performance of the non-gambling game based on the first block of results includes outputting the data for displaying the representation of one or more results of the first block, wherein terminating performance of the non-gambling game based on the first block of results occurs in response to receiving an input to terminate the non-gambling game from the second computing system or after a predetermined amount of time has passed since the first computing system received a communication from the second computing system, and wherein performing at least the portion of the server thread for performance of the non-gambling game based on the second block of results includes outputting the data for displaying a representation of one or more results of the second block.

EEE D33 is the method of EEE D1, wherein the playout mode is the manual mode, wherein the first input indicates whether the second computing system received an input to activate a quick-spin option, wherein, if the second computing system received the input to activate the quick-spin option, then displaying the respective animation for each result of the one or more results of the first block includes pausing between displaying each pair of consecutive animations for a first amount of time, wherein, if the second computing system did not receive the input to activate the quick-spin option, then displaying the respective animation for each result of the one or more results of the first block includes pausing between displaying each pair of consecutive animations for a second amount of time, and wherein the first amount of time is less than the second amount of time.

EEE D34 is the method of any one of EEE D1 to D33, further comprising: registering, at the first computing system, a player of the non-gambling game at the second computing system.

EEE D35 is the method of EEE D34, wherein registering the player includes transmitting, to the second computing system, a graphical user interface including fields corresponding to requested registration data, receiving registration data from the second computing system, and storing the received registration data within a memory at the first computing system.

EEE D36 is the method of any one of EEE D1 to D35, further comprising: modifying a credit balance corresponding to a player at the second computing system from a first quantity of credits to a second quantity of credits.

EEE D37 is the method of EEE D36, wherein the second quantity of credits is less than the first quantity of credits as a result of the player selecting the automatic mode.

EEE D38 is the method of EEE D36, wherein the second quantity of credits is greater than the first quantity of credits as a result of the one or more results of the block containing a winning result.

EEE D39 is a first computing system comprising: a processor; and a non-transitory computer-readable memory having stored thereon program instructions that, when executed by the processor, cause the first computing system to perform operations comprising: receiving, at the first computing system from a second computing system, a first input regarding playing a non-gambling game; generating, at the first computing system, a first block of results, wherein the first block of results includes multiple results of the non-gambling game; determining, at the first computing system, whether a playout mode of the non-gambling game is a manual mode or an automatic mode; and outputting, via the first computing system to the second computing system, data for displaying a representation of one or more results of the first block at the second computing system, wherein if the playout mode is the manual mode, then outputting the representation includes displaying a respective animation for each result of the one or more results of the first block, and wherein if the playout mode is the automatic mode, then outputting the representation includes displaying an award amount based on all results of the first block without displaying an animation for every individual result of the first block.

EEE D40 is the first computing system of EEE D39, wherein execution of the program instructions by the at least one processor causes the computing system to perform the method of any one of D2 to D38.

EEE D41 is the computing system of any one of EEE D39 to D40, wherein execution of the executable instructions by the at least one processor causes the computing system to perform the method of any one of EEE A1 to A19.

EEE D42 is the computing system of any one of EEE D39 to D41, wherein execution of the executable instructions by the at least one processor causes the computing system to perform the method of any one of EEE B1 to B19.

EEE D43 is the computing system of any one of EEE D39 to D42, wherein execution of the executable instructions by the at least one processor causes the computing system to perform the method of any one of EEE C1 to C47.

EEE D44 is a computing system comprising a processor and a non-transitory, computer-readable memory storing executable instructions, wherein execution of the executable instructions by the processor causes the computing system to perform the method of any one of EEE A1 to A19, EEE B1 to B19, EEE C1 to C47, or EEE D1 to D38.

EEE D45 is a non-transitory computer-readable memory having stored therein instructions executable by a processor to cause a first computing system to perform functions, the functions comprising: receiving, at the first computing system from a second computing system, a first input regarding playing a non-gambling game; generating, at the first computing system, a first block of results, wherein the first block of results includes multiple results of the non-gambling game; determining, at the first computing system, whether a playout mode of the non-gambling game is a manual mode or an automatic mode; and outputting, via the first computing system to the second computing system, data for displaying a representation of one or more results of the first block at the second computing system, wherein if the playout mode is the manual mode, then outputting the representation includes displaying a respective animation for each result of the one or more results of the first block, and wherein if the playout mode is the automatic mode, then outputting the representation includes displaying an award amount based on all results of the first block without displaying an animation for every individual result of the first block.

EEE D46 is the non-transitory computer-readable memory of EEE D45, wherein the instructions are executable by the processor to cause the first computing system to perform the method of any one of EEE D2 to D38.

EEE D47 is the non-transitory, computer-readable memory of any one of EEE D45 to D46, wherein the instructions are executable by the processor to cause the computing system to perform the method of any one of EEE A1 to A19.

EEE D48 is the non-transitory, computer-readable memory of any one of EEE D45 to D47, wherein the instructions are executable by the processor to cause the computing system to perform the method of any one of EEE B1 to B19.

EEE D49 is the non-transitory, computer-readable memory of any one of EEE D45 to D48, wherein the instructions are executable by the processor to cause the computing system to perform the method of any one of EEE C1 to C47.

EEE D50 is a non-transitory, computer-readable memory having stored therein instructions executable by at least one processor to cause a first computing system to perform the method of any one of EEE A1 to A19, EEE B1 to B19, EEE C1 to C47, or EEE D1 to D38.

EEE E1 is a method comprising: determining, at a processor, a first input to the processor includes a request for the processor to output outcomes of a game to a display device during a first time period according to a first mode, each outcome of the game corresponds to a respective round of the game; determining, at the processor, a first block of outcomes to use during the first time period, the first block includes indexed records for multiple outcomes of the game determined while playing the game offline, the multiple outcomes of the first block include a mix of true and non-winning game outcomes, each true game outcome of the first block is either a winning or non-winning game outcome, each indexed record of the first block corresponds to a respective index identifier from among a first sequential order of index identifiers and includes one true or non-winning game outcome of the first block; for each round of the game output during the first time period, the processor reading a respective indexed record, wherein the respective indexed record read for each round of the game is based on an index identifier corresponding to the respective indexed record; and for each round of the game output during the first time period, the processor outputting, to the display device, the outcome of the game corresponding to the respective indexed record.

EEE E2 is a method according to EEE E1, wherein: the mix of true and non-winning game outcomes includes multiple true game outcomes and multiple non-winning game outcomes, the multiple true game outcomes are contained within particular indexed records of the first block, and the first block further includes encrypted data representing an index identifier corresponding to each particular indexed record of the first block.

EEE E3 is a method according to EEE E2, wherein: causing the display device to output the outcome of the game corresponding to the respective indexed record includes the processor instructing the display device to output one or more of the multiple true game outcomes in response to the processor reading one or more of the particular indexed records without having decrypted the encrypted data.

EEE E4 is a method according to EEE E2, wherein: causing the display device to output the outcome of the game corresponding to the respective indexed record includes: decrypting, at the processor, the encrypted data to determine an index identifier corresponding to a first particular indexed record; reading the first particular indexed record to determine a first true game outcome; and instructing the display device to output the first true game outcome read from the first particular indexed record.

EEE E5 is a method according to EEE E1, wherein: the mix of true and non-winning game outcomes includes a single true game outcome, the single true game outcome is contained within a particular indexed record of the first block, and the first block further includes encrypted data representing an index identifier corresponding to the particular indexed record.

EEE E6 is a method according to EEE E5, wherein: causing the display device to output the outcome of the game corresponding to the respective indexed record includes the processor instructing the display device to output the single true game outcome in response to the processor reading the particular indexed record without having decrypted the encrypted data.

EEE E7 is a method according to EEE E5, wherein: causing the display device to output the outcome of the game corresponding to the respective indexed record includes: decrypting, at the processor, the encrypted data to determine the index identifier corresponding to the particular indexed record; reading the particular indexed record to determine the single true game outcome; and instructing the display device to output the single true game outcome read from the particular indexed record.

EEE E8 is a method according to any one of EEE E1 to E7, wherein: the first time period ends after: outputting a last outcome of the block of outcomes, receiving, at the processor, a request to use a different block of outcomes; or receiving, at the processor, an instruction to output outcomes of the game to the display device in a second mode different than the first mode.

EEE E9 is a method according to any one of EEE E1 to E8, wherein the respective index identifier includes a respective numeric index identifier.

EEE E10 is a method according to any one of EEE E1 to E9, wherein playing the game offline to determine the multiple outputs of the game occurs before the processor receives the first input.

EEE E11 is a method according to any one of EEE E1 to E10, wherein playing the game offline to determine the multiple outputs of the game occurs during the first time period.

EEE E12 is a method according to any one of EEE E1 to E11, further comprising: determining, at the processor, a second block of outcomes to use during the first time period, the second block includes indexed records for multiple outcomes of the game determined while playing the game offline, the multiple outcomes of the second block include a mix of true and non-winning game outcomes, each true game outcome of the second block is either a winning or non-winning game outcome, each indexed record of the second block corresponds to a respective index identifier from among a second sequential order of index identifiers and includes one true or non-winning game outcome of the second block, wherein: the processor is configured to read indexed records of the second block according to the second sequential order of index identifiers, and the processor reading the respective indexed record includes the processor reading at least one respective indexed record from the first block of outcomes and at least one respective indexed record from the second block of outcomes.

EEE E13 is a method according to EEE E12, wherein the first sequential order of index identifiers is identical to the second sequential order of index identifiers.

EEE E14 is a method according to any one of EEE E1 to E13, wherein the display device is contained within a smartphone or a tablet device.

EEE E15 is a method according to any one of EEE E1 to E14, further comprising: generating, at the processor, multiple blocks of outcomes within a block database, the multiple blocks of outcomes including the first block, wherein: each block of outcomes among the multiple blocks of outcomes includes a unique block identifier, a game identifier, a number indicating a quantity of outcomes within the block, a quantity of indexed records, an index identifier corresponding to an indexed record of the block that corresponds to a true game outcome determined for the block.

EEE E16 is a method according to EEE E15, wherein the game identifier within the first block identifies the game performed during the first time period.

EEE E17 is a method according to EEE E15, wherein: the multiple blocks of outcomes within the block database include a first set of blocks and a second set of blocks, the game identifier within each block of outcomes in the first set of blocks identifies the game performed during the first time period, and the game identifier within each block of outcomes in the second set of blocks identifies a game different than the game performed during the first time period.

EEE E18 is a method according to any one of EEE E1 to E17, further comprising: determining, at the processor, a respective input is received at the processor to initiate each round of the game, wherein the processor reading the respective indexed record for each round of the game output during the first time period occurs in response to determining the respective input is received for that round of the game.

EEE E19 is a method according to any one of EEE E1 to E17, further comprising: determining, at the processor, a single input is received at the processor to initiate each round of the game in an auto-play mode, wherein the processor reading the respective indexed record for each round of the game output during the first time period occurs in response to determining the single input is received for that round of the game.

EEE E20 is a method according to EEE E18, wherein: the processor is contained within a server device, the display device is contained within a client device, the client device initiates a WebSocket connection with the server device, and the server receives the first input and the respective input to initiate each round of the game from the client device via the WebSocket connection.

EEE E21 is a method according to EEE E18, wherein: the processor is contained within a server device, the server device includes an application programming interface (API) executable by the processor, the display device is contained within a client device, the client device includes an application configured to send requests to the API, and the processor receives the first input and the respective input to initiate each round of the game from the client device via the requests sent to the API.

EEE E22 is a method according to any one of EEE E1 to E21, wherein: the first block of outcomes further includes an additional indexed record, and data contained in the additional indexed record, and the data contained in the additional indexed record includes an encrypted sum of all winnings corresponding to each winning outcome of the multiple outcomes of the game.

EEE E23 is a method according to any one of EEE E1 to E22, further comprising: determining, at the processor, less than a threshold quantity of unused blocks of outcomes are stored in memory; generating, at the processor, the first block of outcomes in response to determining less than the threshold quantity of unused blocks of outcomes are stored in memory; and storing the first block of outcomes in the memory.

EEE E24 is a computing system comprising: a processor; and a non-transitory computer-readable memory having stored thereon program instructions that, when executed by the processor, cause the computing system to perform functions comprising: determining, at the processor, a first input to the processor includes a request for the processor to output outcomes of a game to a display device during a first time period according to a first mode, each outcome of the game corresponds to a respective round of the game; determining, at the processor, a first block of outcomes to use during the first time period, the first block includes indexed records for multiple outcomes of the game determined while playing the game offline, the multiple outcomes of the first block include a mix of true and non-winning game outcomes, each true game outcome of the first block is either a winning or non-winning game outcome, each indexed record of the first block corresponds to a respective index identifier from among a first sequential order of index identifiers and includes one true or non-winning game outcome of the first block; for each round of the game output during the first time period, the processor reading a respective indexed record, wherein the respective indexed record read for each round of the game is based on an index identifier corresponding to the respective indexed record; and for each round of the game output during the first time period, the processor outputting, to the display device, the outcome of the game corresponding to the respective indexed record.

EEE E25 is the computing system of EEE E24, wherein execution of the program instructions by the processor causes the computing system to perform the method of any one of E2 to E23.

EEE E26 is the computing system of any one of EEE E24 to E25, wherein execution of the program instructions by the processor causes the computing system to perform the method of any one of EEE F1 to F14.

EEE E27 is the computing system of any one of EEE E24 to E25, wherein execution of the program instructions by the processor causes the computing system to perform the method of any one of EEE G1 to G14.

EEE E28 is a non-transitory computer-readable memory having stored therein instructions executable by a processor to cause a computing system to perform functions, the functions comprising: determining, at the processor, a first input to the processor includes a request for the processor to output outcomes of a game to a display device during a first time period according to a first mode, each outcome of the game corresponds to a respective round of the game; determining, at the processor, a first block of outcomes to use during the first time period, the first block includes indexed records for multiple outcomes of the game determined while playing the game offline, the multiple outcomes of the first block include a mix of true and non-winning game outcomes, each true game outcome of the first block is either a winning or non-winning game outcome, each indexed record of the first block corresponds to a respective index identifier from among a first sequential order of index identifiers and includes one true or non-winning game outcome of the first block; for each round of the game output during the first time period, the processor reading a respective indexed record, wherein the respective indexed record read for each round of the game is based on an index identifier corresponding to the respective indexed record; and for each round of the game output during the first time period, the processor outputting, to the display device, the outcome of the game corresponding to the respective indexed record.

EEE E29 is the non-transitory computer-readable memory of EEE E28, wherein the instructions are executable by the processor to cause the computing system to perform the method of any one of EEE E2 to E23.

EEE E30 is the non-transitory computer-readable memory of any one of EEE E28 to E29, wherein the instructions are executable by the processor to cause the computing system to perform the method of any one of EEE F1 to F14.

EEE E31 is the non-transitory computer-readable memory of any one of EEE E28 to E29, wherein the instructions are executable by the processor to cause the computing system to perform the method of any one of EEE G1 to G14.

EEE F1 is a method comprising: determining, at a processor, a first input to the processor includes a request for the processor to output outcomes of a game to a display device during a first time period according to a first mode, each outcome of the game corresponds to a respective round of the game; determining, at the processor, one or more blocks of outcomes to use during the first time period, each block of outcomes includes indexed records for multiple outcomes of the game determined while playing the game offline, the multiple outcomes of each block include a mix of true and non-winning game outcomes, each true game outcome is either a winning or non-winning game outcome, each indexed record of each block corresponds to a respective index identifier from among sequential orders of index identifiers and includes one true or non-winning game outcome, and each block further includes encrypted data representing the respective index identifier corresponding to each indexed record of the block that includes a true game outcome; and for each round of the game performed during the first time period, the processor: decrypting the encrypted data within a single block of the one or more blocks to determine a respective index identifier corresponding to at least one indexed record that includes a true game outcome, reading the at least one indexed record that includes the true game outcome; and outputting, to the display device, the true game outcome corresponding to the at least one indexed record read by the processor.

EEE F2 is a method according to EEE F1, wherein: each of the one or more blocks of outcomes includes a single true game outcome, and for each round of the game: decrypting the encrypted data within the single block includes decrypting the encrypted data to determine a respective index identifier corresponding to the single true game outcome of the single block, reading the at least one indexed record includes reading the indexed record corresponding to the single true game outcome of the single block, and causing the display device to output the true game outcome includes causing the display device to output the single true game outcome of the single block.

EEE F3 is a method according to EEE F2, wherein determining the one or more blocks of outcomes to use during the first time period includes determining a next block of outcomes for each subsequent round of the game performed during the first time period.

EEE F4 is a method according to any one of EEE F1 to F3, wherein: the one or more blocks of outcomes includes a particular block of outcomes including multiple true game outcomes, the particular block of outcomes is used during a particular round of the game performed during the first time period, and for the particular round of the game, causing the display device to output the true game outcome corresponding to the at least one indexed record read by the processor includes outputting a single true winning outcome of the particular block and a sum of awards corresponding to the multiple true game outcomes.

EEE F5 is a method according to any one of EEE F1 to F4, wherein: the one or more blocks of outcomes includes a particular block of outcomes including multiple true game outcomes, the particular block of outcomes is used during a particular round of the game performed during the first time period, and for the particular round of the game, causing the display device to output the true game outcome corresponding to the at least one indexed record read by the processor includes outputting each true winning outcome of the particular block and a sum of awards corresponding to the multiple true game outcomes.

EEE F6 is a method according to any one of EEE F1 to F5, wherein the respective index identifier includes a respective numeric index identifier.

EEE F7 is a method according to any one of EEE F1 to F6, further comprising: writing, by the processor after performing each round of the game during the first time period, the block of outcomes used for that round of the game into a portion of computer-readable memory designated as a block archive.

EEE F8 is a method according to any one of EEE F1 to F7, further comprising: writing, by the processor after performing each round of the game during the first time period, data into a computer-readable memory to classify the block of outcomes used for that round of the game as a block archive.

EEE F9 is a method according to any one of EEE F1 to F8, further comprising: determining, at the processor, a second input to the processor includes a request for the processor to output outcomes of the game to the display device during a second time period according to a second mode; determining, at the processor, a first block of outcomes to use during the second time period, the first block includes indexed records for multiple outcomes of the game determined while playing the game offline, the multiple outcomes of the first block include a mix of true and non-winning game outcomes, each true game outcome of the first block is either a winning or non-winning game outcome, each indexed record of the first block corresponds to a respective index identifier from among a first sequential order of index identifiers and includes one true or non-winning game outcome of the first block; for each round of the game output during the second time period, the processor reading a respective indexed record, wherein the respective indexed record read for each round of the game is based on an index identifier corresponding to the respective indexed record; and for each round of the game output during the second time period, outputting, to the display device, the outcome of the game corresponding to the respective indexed record.

EEE F10 is a method according to EEE F9, wherein the second time period occurs before the first time period.

EEE F11 is a method according to EEE F9, wherein the second time period occurs after the first time period.

EEE F12 is a method according to EEE F9, further comprising: determining, at the processor, a second block of outcomes to use during the second time period, the second block includes indexed records for multiple outcomes of the game determined while playing the game offline, the multiple outcomes of the second block include a mix of true and non-winning game outcomes, each true game outcome of the second block is either a winning or non-winning game outcome, each indexed record of the second block corresponds to a respective index identifier from among a second sequential order of index identifiers and includes one true or non-winning game outcome of the second block, wherein: the processor is configured to read indexed records of the second block for the second mode according to the second sequential order of index identifiers, and the processor reading the respective indexed record includes the processor reading at least one respective indexed record from the first block of outcomes and at least one respective indexed record from the second block of outcomes.

EEE F13 is a method according to EEE F9, further comprising: outputting by the processor, an advertisement to the display device during the second time period, wherein the processor does not output any advertisement to the display device during the first time period.

EEE F14 is a method according to any one of EEE F1 to F13, wherein the request for the processor to output outcomes of the game to the display device during the first time period according to the first mode is accompanied by or is associated with a payment.

EEE F15 is a computing system comprising: a processor; and a non-transitory computer-readable memory having stored thereon program instructions that, when executed by the processor, cause the computing system to perform functions comprising: determining, at a processor, a first input to the processor includes a request for the processor to output outcomes of a game to a display device during a first time period according to a first mode, each outcome of the game corresponds to a respective round of the game; determining, at the processor, one or more blocks of outcomes to use during the first time period, each block of outcomes includes indexed records for multiple outcomes of the game determined while playing the game offline, the multiple outcomes of each block include a mix of true and non-winning game outcomes, each true game outcome is either a winning or non-winning game outcome, each indexed record of each block corresponds to a respective index identifier from among sequential orders of index identifiers and includes one true or non-winning game outcome, and each block further includes encrypted data representing the respective index identifier corresponding to each indexed record of the block that includes a true game outcome; and for each round of the game performed during the first time period, the processor: decrypting the encrypted data within a single block of the one or more blocks to determine a respective index identifier corresponding to at least one indexed record that includes a true game outcome, reading the at least one indexed record that includes the true game outcome; and outputting, to the display device, the true game outcome corresponding to the at least one indexed record read by the processor.

EEE F16 is the computing system of EEE F15, wherein execution of the program instructions by the processor causes the computing system to perform the method of any one of F2 to F14.

EEE F17 is the computing system of any one of EEE F15 to F16, wherein execution of the program instructions by the processor causes the computing system to perform the method of any one of EEE E1 to E23.

EEE F18 is the computing system of any one of EEE F15 to F16, wherein execution of the program instructions by the processor causes the computing system to perform the method of any one of EEE G1 to G14.

EEE F19 is a non-transitory computer-readable memory having stored therein instructions executable by a processor to cause a computing system to perform functions, the functions comprising: determining, at the processor, a first input to the processor includes a request for the processor to output outcomes of a game to a display device during a first time period according to a first mode, each outcome of the game corresponds to a respective round of the game; determining, at the processor, one or more blocks of outcomes to use during the first time period, each block of outcomes includes indexed records for multiple outcomes of the game determined while playing the game offline, the multiple outcomes of each block include a mix of true and non-winning game outcomes, each true game outcome is either a winning or non-winning game outcome, each indexed record of each block corresponds to a respective index identifier from among sequential orders of index identifiers and includes one true or non-winning game outcome, and each block further includes encrypted data representing the respective index identifier corresponding to each indexed record of the block that includes a true game outcome; and for each round of the game performed during the first time period, the processor: decrypting the encrypted data within a single block of the one or more blocks to determine a respective index identifier corresponding to at least one indexed record that includes a true game outcome, reading the at least one indexed record that includes the true game outcome; and outputting, to the display device, the true game outcome corresponding to the at least one indexed record read by the processor.

EEE F20 is the non-transitory computer-readable memory of EEE F19, wherein the instructions are executable by the processor to cause the computing system to perform the method of any one of EEE F2 to F14.

EEE F21 is the non-transitory computer-readable memory of any one of EEE F19 to F20, wherein the instructions are executable by the processor to cause the computing system to perform the method of any one of EEE E1 to E23.

EEE F22 is the non-transitory computer-readable memory of any one of EEE F19 to F20, wherein the instructions are executable by the processor to cause the computing system to perform the method of any one of EEE G1 to G14.

EEE G1 is a method comprising: determining a unique block identifier corresponding to a block of outcomes being generated for a game associated with a specific game identifier; determining a block size corresponding to the block of outcomes, the block size indicating a quantity of indexed records to be contained in the block of outcomes; determining, randomly, a set of one or more true outcome records to be contained in the block of outcomes; encrypting an identifier of each of the one or more true outcome records to generate an encrypted identifier corresponding to each of the one or more true outcome records; playing the game offline to generate a set of non-winning outcomes for a set of non-winning outcome records to be contained in the block of outcomes, the set of non-winning outcomes including a respective non-winning outcome identifier for each indexed record of the set of non-winning outcome records; playing the game offline to generate a set of true outcomes, the set of true outcomes including a winning or non-winning outcome identifier for each of the one or more true outcome records; and writing data into a non-transitory computer-readable memory to populate at least a portion of the block of outcomes, wherein the data includes: the unique block identifier, the specific game identifier, the block size, the encrypted identifier corresponding to each of the one or more true outcome records, the set of non-winning outcome identifiers, and the set of true outcome identifiers.

EEE G2 is a method according to EEE G1, wherein writing data into the non-transitory computer-readable memory includes writing the data into a computer-readable file.

EEE G3 is a method according to EEE G2, wherein the computer-readable file includes a Java Script Object Notation (JSON) file or an eXtensible Markup Language (XML) file.

EEE G4 is a method according to any one of EEE G1 to G3, wherein the game associated with the specific game identifier includes a video slots game, a video scratch card game, or a video wheel game.

EEE G5 is a method according to EEE G4, wherein: the game associated with the specific game identifier includes the video slots game, the respective non-winning outcome identifier for each indexed record of the block of outcomes other than the one or more true outcome records and any non-winning outcome identifier of the set of true outcomes is indicative of a set of symbols, displayable on a virtual set of reels for the video slots game, without any winning symbol or combination of winning symbols, and any winning outcome identifier of the set of true outcome identifiers is indicative of a set of symbols, displayable on the virtual set of reels for the video slots game, with a winning symbol or combination of winning symbols.

EEE G6 is a method according to EEE G4, wherein: the game associated with the specific game identifier includes the video scratch card game, the respective non-winning outcome identifier for each indexed record of the block of outcomes other than the one or more true outcome records and any non-winning outcome identifier of the set of true outcomes is indicative of a set of symbols, displayable on a virtual scratch card for the video scratch card game, without any winning symbol or combination of winning symbols, and any winning outcome identifier of the set of true outcome identifiers is indicative of a set of symbols, displayable on a virtual scratch card for the video scratch card game, with a winning symbol or combination of winning symbols.

EEE G7 is a method according to any one of EEE G1 to G6, wherein: the data further includes a quantity of unique index position identifiers, the quantity of unique index position identifiers equals the quantity of indexed records, each record of the set of one or more true outcome records and each record of the set of non-winning outcome records corresponds to a respective one of the unique index position identifiers, and the quantity of unique index position identifiers are arranged in an ordered sequence of position identifiers.

EEE G8 is a method according to EEE G7, wherein the unique index position identifiers are numeric.

EEE G9 is a method according to EEE G7, wherein: the winning or non-winning outcome identifier for each of the one or more true outcome records and the respective non-winning outcome identifier for each indexed record of the set of non-winning outcome records are written into the non-transitory computer-readable memory sequentially based on an order of determination and according to the ordered sequence of position identifiers, and the encrypted identifier of each of the one or more true outcome records includes an encrypted version of a unique index position identifier corresponding each of the one or more true outcome records.

EEE G10 is a method according to any one of EEE G1 to G9, wherein: playing the game offline to generate the set of non-winning outcomes includes playing the game offline for at least one indexed record of the set of non-winning outcome records one or more times with winning outcomes before generating the identifier of a non-winning outcome for the at least one indexed record of the set of non-winning outcome records, and the method further includes discarding the winning outcomes.

EEE G11 is a method according to any one of EEE G1 to G10, wherein set of one or more true outcome records includes a single true outcome record.

EEE G12 is a method according to any one of EEE G1 to G11, wherein set of one or more true outcome records includes multiple true outcome records.

EEE G13 is a method according to EEE G12, wherein: the identifier of each of the one or more true outcome records includes, and each indexed record of the set of non-winning outcome records corresponds to, a respective index position identifier, and the set of non-winning outcomes and the set of true outcomes are written into the non-transitory computer-readable memory sequentially based on an order of determination and into an ordered sequence of positions corresponding to the index position identifiers.

EEE G14 is a method according to EEE G13, wherein the index position identifiers are numeric.

EEE G15 is a computing system comprising: a processor; and a non-transitory computer-readable memory having stored thereon program instructions that, when executed by the processor, cause the computing system to perform functions comprising: determining a unique block identifier corresponding to a block of outcomes being generated for a game associated with a specific game identifier; determining a block size corresponding to the block of outcomes, the block size indicating a quantity of indexed records to be contained in the block of outcomes; determining, randomly, a set of one or more true outcome records to be contained in the block of outcomes; encrypting an identifier of each of the one or more true outcome records to generate an encrypted identifier corresponding to each of the one or more true outcome records; playing the game offline to generate a set of non-winning outcomes for a set of non-winning outcome records to be contained in the block of outcomes, the set of non-winning outcomes including a respective non-winning outcome identifier for each indexed record of the set of non-winning outcome records; playing the game offline to generate a set of true outcomes, the set of true outcomes including a winning or non-winning outcome identifier for each of the one or more true outcome records; and writing data into a non-transitory computer-readable memory to populate at least a portion of the block of outcomes, wherein the data includes: the unique block identifier, the specific game identifier, the block size, the encrypted identifier corresponding to each of the one or more true outcome records, the set of non-winning outcome identifiers, and the set of true outcome identifiers.

EEE G16 is the computing system of EEE G15, wherein execution of the program instructions by the processor causes the computing system to perform the method of any one of G2 to G14.

EEE G17 is the computing system of any one of EEE G15 to G16, wherein execution of the program instructions by the processor causes the computing system to perform the method of any one of EEE E1 to E23.

EEE G18 is the computing system of any one of EEE G15 to G16, wherein execution of the program instructions by the processor causes the computing system to perform the method of any one of EEE F1 to F14.

EEE G19 is a non-transitory computer-readable memory having stored therein instructions executable by a processor to cause a computing system to perform functions, the functions comprising: determining a unique block identifier corresponding to a block of outcomes being generated for a game associated with a specific game identifier; determining a block size corresponding to the block of outcomes, the block size indicating a quantity of indexed records to be contained in the block of outcomes; determining, randomly, a set of one or more true outcome records to be contained in the block of outcomes; encrypting an identifier of each of the one or more true outcome records to generate an encrypted identifier corresponding to each of the one or more true outcome records; playing the game offline to generate a set of non-winning outcomes for a set of non-winning outcome records to be contained in the block of outcomes, the set of non-winning outcomes including a respective non-winning outcome identifier for each indexed record of the set of non-winning outcome records; playing the game offline to generate a set of true outcomes, the set of true outcomes including a winning or non-winning outcome identifier for each of the one or more true outcome records; and writing data into a non-transitory computer-readable memory to populate at least a portion of the block of outcomes, wherein the data includes: the unique block identifier, the specific game identifier, the block size, the encrypted identifier corresponding to each of the one or more true outcome records, the set of non-winning outcome identifiers, and the set of true outcome identifiers.

EEE G20 is the non-transitory computer-readable memory of EEE G19, wherein the instructions are executable by the processor to cause the computing system to perform the method of any one of EEE G2 to G14.

EEE G21 is the non-transitory computer-readable memory of any one of EEE G19 to G20, wherein the instructions are executable by the processor to cause the computing system to perform the method of any one of EEE E1 to E23.

EEE G22 is the non-transitory computer-readable memory of any one of EEE G19 to G20, wherein the instructions are executable by the processor to cause the computing system to perform the method of any one of EEE F1 to F14.

The invention claimed is:

1. A method comprising:

determining, at a processor, a first input to the processor includes a request for the processor to output outcomes of a game to a display device during a first time period according to a first mode, each outcome of the game corresponds to a respective round of the game;

determining, at the processor, a first block of outcomes to use during the first time period, the first block includes indexed records for multiple outcomes of the game determined while playing the game offline, the multiple outcomes of the first block include a mix of true and non-winning game outcomes, each true game outcome of the first block is either a winning or non-winning game outcome, each indexed record of the first block corresponds to a respective index identifier from among a first sequential order of index identifiers and includes one true or non-winning game outcome of the first block;

for each round of the game output during the first time period, the processor reading a respective indexed record, wherein the respective indexed record read for each round of the game is based on an index identifier corresponding to the respective indexed record; and for each round of the game output during the first time period, the processor outputting, to the display device, the outcome of the game corresponding to the respective indexed record.

2. The method of claim 1, wherein:

the mix of true and non-winning game outcomes includes multiple true game outcomes and multiple non-winning game outcomes, the multiple true game outcomes are contained within particular indexed records of the first block, and the first block further includes encrypted data representing an index identifier corresponding to each particular indexed record of the first block.

3. The method of claim 2, wherein:

causing the display device to output the outcome of the game corresponding to the respective indexed record includes the processor instructing the display device to output one or more of the multiple true game outcomes in response to the processor reading one or more of the particular indexed records without having decrypted the encrypted data.

4. The method of claim 2, wherein:

causing the display device to output the outcome of the game corresponding to the respective indexed record includes:

decrypting, at the processor, the encrypted data to determine an index identifier corresponding to a first particular indexed record;

reading the first particular indexed record to determine a first true game outcome; and instructing the display device to output the first true game outcome read from the first particular indexed record.

5. The method of claim 1, wherein:

the mix of true and non-winning game outcomes includes a single true game outcome, the single true game outcome is contained within a particular indexed record of the first block, and the first block further includes encrypted data representing an index identifier corresponding to the particular indexed record.

6. The method of claim 1, wherein:

the first time period ends after:

outputting a last outcome of the first block of outcomes, receiving, at the processor, a request to use a different block of outcomes; or receiving, at the processor, an instruction to output outcomes of the game to the display device in a second mode different than the first mode.

7. The method of claim 1, further comprising:

determining, at the processor, a second block of outcomes to use during the first time period, the second block includes indexed records for multiple outcomes of the game determined while playing the game offline, the multiple outcomes of the second block include a mix of true and non-winning game outcomes, each true game outcome of the second block is either a winning or non-winning game outcome, each indexed record of the second block corresponds to a respective index identifier from among a second sequential order of index identifiers and includes one true or non-winning game outcome of the second block, wherein:

the processor is configured to read indexed records of the second block according to the second sequential order of index identifiers, and the processor reading the respective indexed record includes the processor reading at least one respective indexed record from the first block of outcomes and at least one respective indexed record from the second block of outcomes.

8. The method of claim 1, further comprising:

generating, at the processor, multiple blocks of outcomes within a block database, the multiple blocks of outcomes including the first block, wherein:

each block of outcomes among the multiple blocks of outcomes includes a unique block identifier, a game identifier, a number indicating a quantity of outcomes within the block, a quantity of indexed records, and an index identifier corresponding to an indexed record of the block that corresponds to a true game outcome determined for the block.

9. The method of claim 1, further comprising:

determining, at the processor, a respective input is received at the processor to initiate each round of the game, wherein the processor reading the respective indexed record for each round of the game output during the first time period occurs in response to determining the respective input is received for that round of the game.

10. The method of claim 9, wherein:

the processor is contained within a server device, the display device is contained within a client device, the client device initiates a WebSocket connection with the server device, and the server device receives the first input and the respective input to initiate each round of the game from the client device via the WebSocket connection.

11. The method of claim 9, wherein:

the processor is contained within a server device, the server device includes an application programming interface (API) executable by the processor, the display device is contained within a client device, the client device includes an application configured to send requests to the API, and the processor receives the first input and the respective input to initiate each round of the game from the client device via the requests sent to the API.

12. The method of claim 1, wherein:

the first block of outcomes further includes an additional indexed record, and data contained in the additional indexed record, and the data contained in the additional indexed record includes an encrypted sum of all winnings corresponding to each winning outcome of the multiple outcomes of the game.

13. The method of claim 1, further comprising:

determining, at the processor, less than a threshold quantity of unused blocks of outcomes are stored in memory;

generating, at the processor, the first block of outcomes in response to determining less than the threshold quantity of unused blocks of outcomes are stored in memory; and storing the first block of outcomes in the memory.

14. A method comprising:

determining, at a processor, a first input to the processor includes a request for the processor to output outcomes of a game to a display device during a first time period according to a first mode, each outcome of the game corresponds to a respective round of the game;

determining, at the processor, one or more blocks of outcomes to use during the first time period, each block of outcomes includes indexed records for multiple outcomes of the game determined while playing the game offline, the multiple outcomes of each block include a mix of true and non-winning game outcomes, each true game outcome is either a winning or non-winning game outcome, each indexed record of each block corresponds to a respective index identifier from among sequential orders of index identifiers and includes one true or non-winning game outcome, and each block further includes encrypted data representing the respective index identifier corresponding to each indexed record of the block that includes a true game outcome; and for each round of the game performed during the first time period, the processor:

decrypting the encrypted data within a single block of the one or more blocks to determine a respective index identifier corresponding to at least one indexed record that includes a true game outcome, reading the at least one indexed record that includes the true game outcome; and outputting, to the display device, the true game outcome corresponding to the at least one indexed record read by the processor.

15. The method of claim 14, wherein:

each of the one or more blocks of outcomes includes a single true game outcome, and for each round of the game:

decrypting the encrypted data within the single block includes decrypting the encrypted data to determine a respective index identifier corresponding to the single true game outcome of the single block, reading the at least one indexed record includes reading the indexed record corresponding to the single true game outcome of the single block, and causing the display device to output the true game outcome includes causing the display device to output the single true game outcome of the single block.

16. The method of claim 14, wherein:

the one or more blocks of outcomes includes a particular block of outcomes including multiple true game outcomes, the particular block of outcomes is used during a particular round of the game performed during the first time period, and for the particular round of the game, causing the display device to output the true game outcome corresponding to the at least one indexed record read by the processor includes outputting a single true winning outcome of the particular block and a sum of awards corresponding to the multiple true game outcomes.

17. The method of claim 14, wherein:

the one or more blocks of outcomes includes a particular block of outcomes including multiple true game outcomes, the particular block of outcomes is used during a particular round of the game performed during the first time period, and for the particular round of the game, causing the display device to output the true game outcome corresponding to the at least one indexed record read by the processor includes outputting each true winning outcome of the particular block and a sum of awards corresponding to the multiple true game outcomes.

18. The method of claim 14, further comprising:

writing, by the processor after performing each round of the game during the first time period:

the block of outcomes used for that round of the game into a portion of computer-readable memory designated as a block archive, or data into a computer-readable memory to classify the block of outcomes used for that round of the game as a block archive.

19. The method of claim 14, further comprising:

determining, at the processor, a second input to the processor includes a request for the processor to output outcomes of the game to the display device during a second time period according to a second mode;

determining, at the processor, a first block of outcomes to use during the second time period, the first block includes indexed records for multiple outcomes of the game determined while playing the game offline, the multiple outcomes of the first block include a mix of true and non-winning game outcomes, each true game outcome of the first block is either a winning or non-winning game outcome, each indexed record of the first block corresponds to a respective index identifier from among a first sequential order of index identifiers and includes one true or non-winning game outcome of the first block;

for each round of the game output during the second time period, the processor reading a respective indexed record, wherein the respective indexed record read for each round of the game is based on an index identifier corresponding to the respective indexed record; and for each round of the game output during the second time period, outputting, to the display device, the outcome of the game corresponding to the respective indexed record.

20. The method of claim 14, wherein the request for the processor to output outcomes of the game to the display device during the first time period according to the first mode is accompanied by or is associated with a payment.

* * * * *